United States Patent
Schechter et al.

(10) Patent No.: US 11,680,365 B2
(45) Date of Patent: Jun. 20, 2023

(54) AUTONOMOUS LAUNDRY FOLDING DEVICES, SYSTEMS, AND METHODS OF USE

(71) Applicant: Monotony.ai, Inc., Allston, MA (US)

(72) Inventors: Stuart E. Schechter, Newton, MA (US); Benjamin D. Bixby, Newton, MA (US); Kevin M. LeBlanc, Medford, MA (US); Wilson J. Mefford, Watertown, MA (US); Elliot Sinclair Pennington, Lexington, MA (US); Laura E. Schwartz, Newtonville, MA (US); Jesse Sielaff, Norfolk, MA (US); Madeline R. Hickman, Arlington, MA (US); Carter J. Ithier, Hooksett, NH (US); Samuel Duffley, Cambridge, MA (US)

(73) Assignee: MONOTONY.AI, INC., Allston, MA (US)

( * ) Notice: Subject to any disclaimer, the term of this patent is extended or adjusted under 35 U.S.C. 154(b) by 0 days.

(21) Appl. No.: 17/929,840

(22) Filed: Sep. 6, 2022

(65) Prior Publication Data

US 2022/0411991 A1 Dec. 29, 2022

Related U.S. Application Data

(63) Continuation of application No. 17/364,533, filed on Jun. 30, 2021, now Pat. No. 11,486,084.
(Continued)

(51) Int. Cl.
*D06F 89/02* (2006.01)
(52) U.S. Cl.
CPC ................. *D06F 89/023* (2013.01)

(58) Field of Classification Search
CPC ........ D06F 89/00; D06F 89/005; D06F 89/02; D06F 89/023; D06F 89/026; B65H 45/12
See application file for complete search history.

(56) References Cited

U.S. PATENT DOCUMENTS 3,869,073 A * 3/1975 Knappe ................. D06F 89/023
223/37
3,904,090 A 9/1975 Kannegiesser et al.
(Continued)

FOREIGN PATENT DOCUMENTS

CA 2687272 C 7/2012
CN 105926257 A 9/2016
(Continued)

OTHER PUBLICATIONS

International Search Report and Written Opinion corresponding to PCT/US2021/039985, dated Nov. 2, 2021, (16 pages).
(Continued)

*Primary Examiner* — Nathan E Durham
(74) *Attorney, Agent, or Firm* — Myers Bigel, P.A.

(57) ABSTRACT

Devices, systems, and methods for autonomously folding a deformable laundry article are described. A folding device includes a rotatable platform configured to receive the article. A rotatable blade is suspended above the surface and a clamp rod is disposed parallel to a longitudinal axis of the blade. The clamp rod is configured to raise and lower from a surface of the rotatable platform, slidably move parallel to the surface, and clamp the deformable article to the surface in a lowered position. The blade is configured to raise and lower from the surface of the rotatable platform, slidably move parallel to the surface, slide under an unclamped portion of the article, lift the unclamped portion above the clamp rod, pass the unclamped portion over the clamp rod,
(Continued)

and lower the free end to a resting position atop another portion of the article to fold the article.

20 Claims, 76 Drawing Sheets

Related U.S. Application Data

(60) Provisional application No. 63/168,540, filed on Mar. 31, 2021, provisional application No. 63/168,555, filed on Mar. 31, 2021, provisional application No. 63/106,891, filed on Oct. 29, 2020, provisional application No. 63/046,697, filed on Jul. 1, 2020.

(56) References Cited

U.S. PATENT DOCUMENTS

| | | | |
|---|---|---|---|
| 5,934,523 | A | 8/1999 | Willett et al. |
| 6,776,316 | B2 * | 8/2004 | Van Eperen ...... A61F 13/15764 223/37 |
| 6,826,856 | B1 | 12/2004 | McCabe |
| 8,973,792 | B1 | 3/2015 | Selker et al. |
| 9,022,259 | B2 | 5/2015 | Breier |
| 2008/0092415 | A1 | 4/2008 | McCabe |
| 2013/0249157 | A1 | 9/2013 | Endo et al. |
| 2017/0204555 | A1 | 7/2017 | Tanii |
| 2019/0153661 | A1 | 5/2019 | Rozov |
| 2019/0309465 | A1 | 10/2019 | Rozov |
| 2021/0071353 | A1 | 3/2021 | Gabai et al. |
| 2021/0079587 | A1 * | 3/2021 | Matarasso ............... D06F 89/02 |

FOREIGN PATENT DOCUMENTS

| | | |
|---|---|---|
| CN | 206691509 U | 12/2017 |
| CN | 105671901 B | 4/2018 |
| CN | 107974820 A | 5/2018 |
| CN | 110558739 A | 12/2019 |
| CN | 110565351 A | 12/2019 |
| EP | 1690975 A1 | 8/2006 |
| JP | H01310700 A | 12/1989 |
| KR | 102026187 B1 | 9/2019 |
| WO | 2008032826 A1 | 3/2008 |
| WO | 2012046227 A1 | 4/2012 |
| WO | 2017060226 A1 | 4/2017 |
| WO | 2017191637 A1 | 11/2017 |
| WO | 2019214754 A1 | 11/2019 |

OTHER PUBLICATIONS

Laundrynerds, "Expert Session: Automatic Soiled Side Sorting", YouTube Video, uploaded Jun. 8, 2020, downloaded from https://www.youtube.com/watch?v=FnGHgJSNY0Q.

Jensen, "Jenfold Butterfly Fox AF: Automatic unloading, folding and stacking of garments", Product information; available as of date of filing or Jul. 1, 2020, (6 pages).

Jensen, "State-of-the-art Jensen reference laundry for hotel and restaurant linen", YouTube Video, uploaded Sep. 9, 2009, downloaded from https://www.youtube.com/watch?v=OpiFp9i6owY.

Li, Yinxiao, et al., "Multi-Sensor Surface Analysis for Robotic Ironing", Laundry Robot, Columbia University, Jun. 5, 2020, 2 pages.

Liu, Yiwei, et al., "Cloth Folding Machine", Mechanical Engineering Design Project Class. 66. https://openscholarship.wustl.edu/mems411/66, 2017, 44 pages.

Mypro, "Product Manual: Towel Folder Machine", Retrieved from: https://www.myprolaundry.com/product/Towel-Folder-Machine.html; accessed Jul. 16, 2021, (6 pages).

Thermotron, "Automatic folding & bagging & sealing for casual clothes by (STP950/PV38/KL55)", YouTube Video, uploaded Jun. 16, 2010, downloaded from https://www.youtube.com/watch?v=oKgHEz05lqw.

Thermotron, "Automatic folding machine for garments "STP1000" (clothes folding)", YouTube Video, uploaded Mar. 10, 2016, downloaded from https://www.youtube.com/watch?v=Pw49ITNsQrw.

* cited by examiner

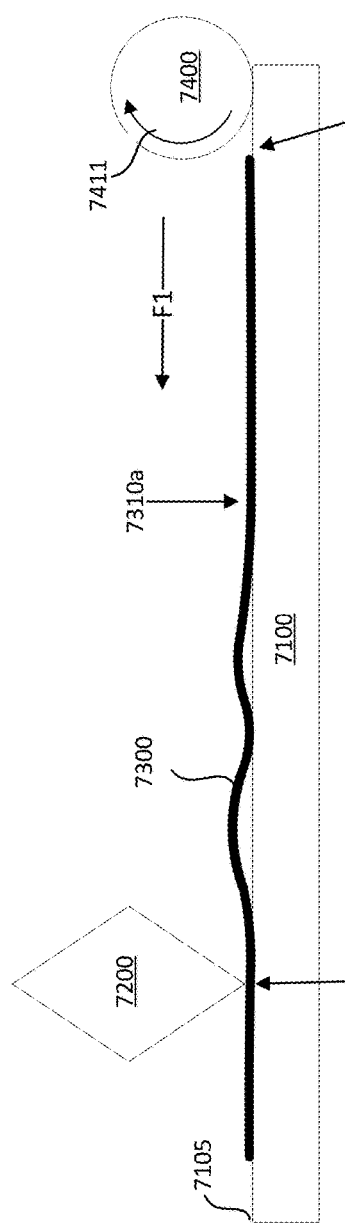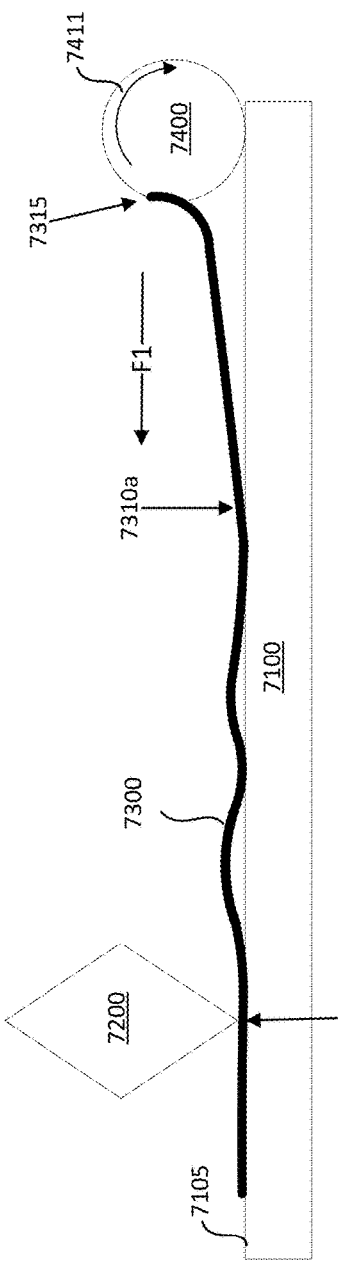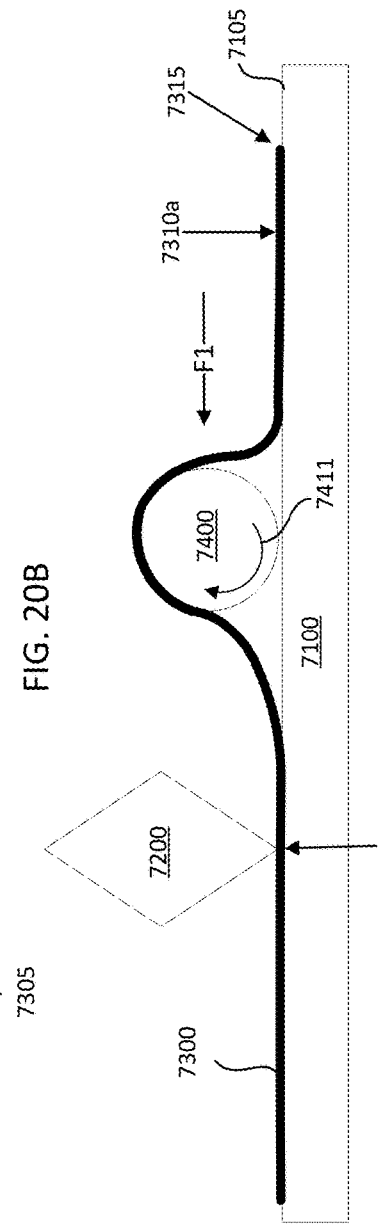

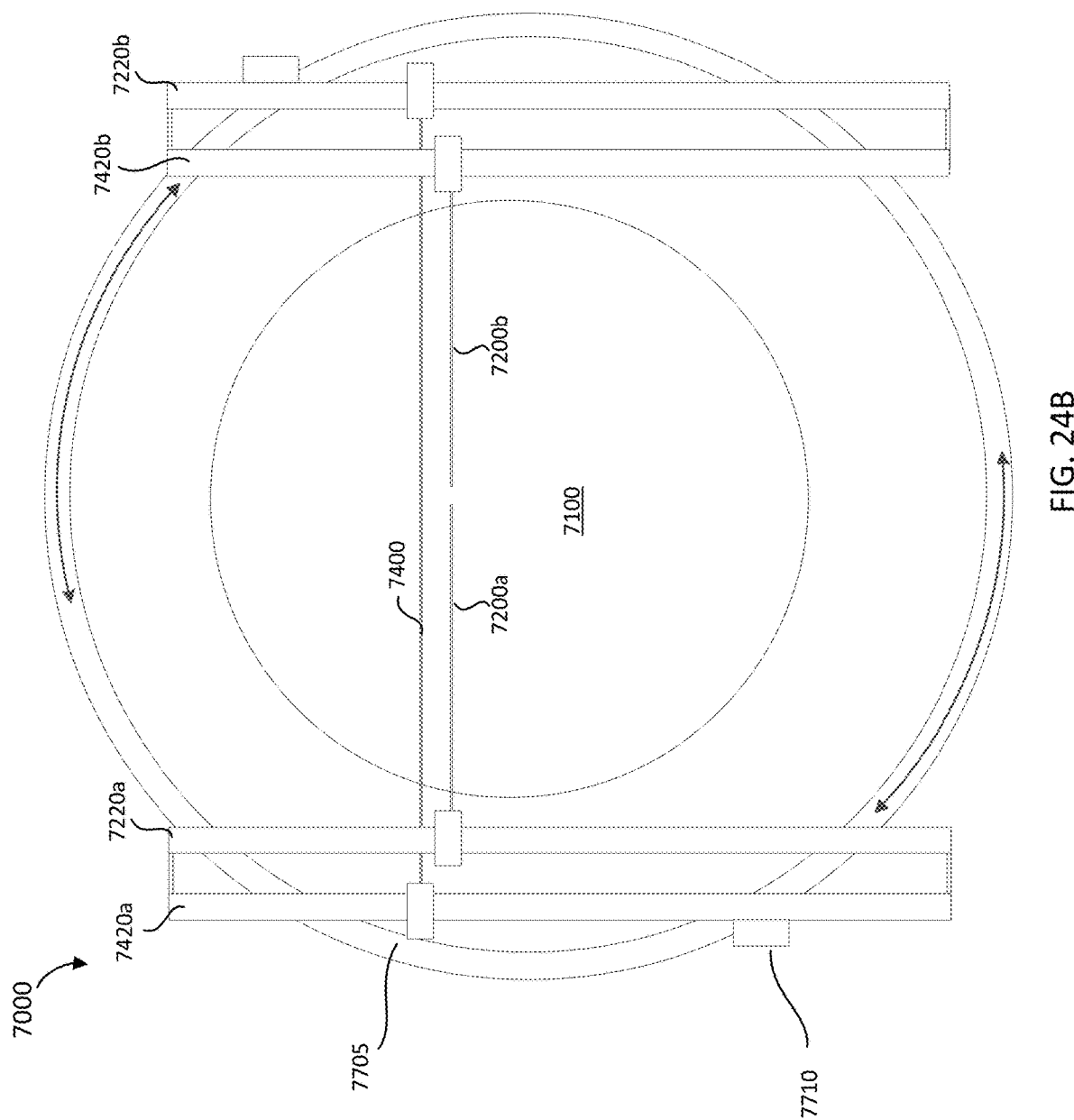

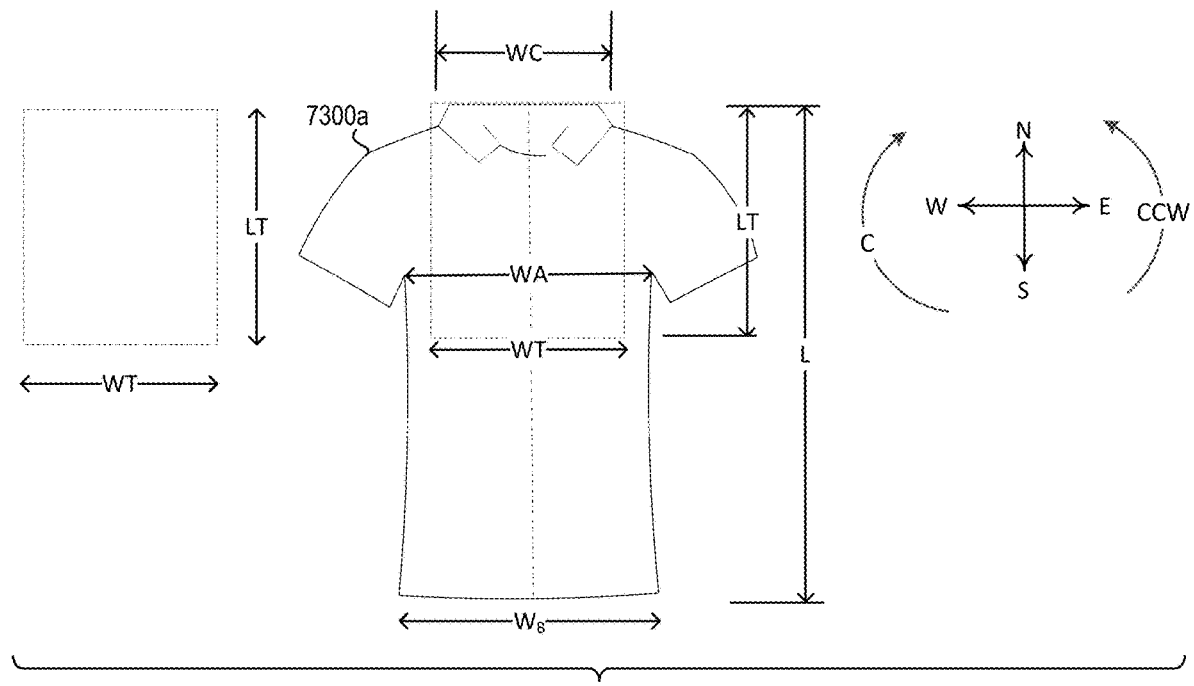
FIG. 40A
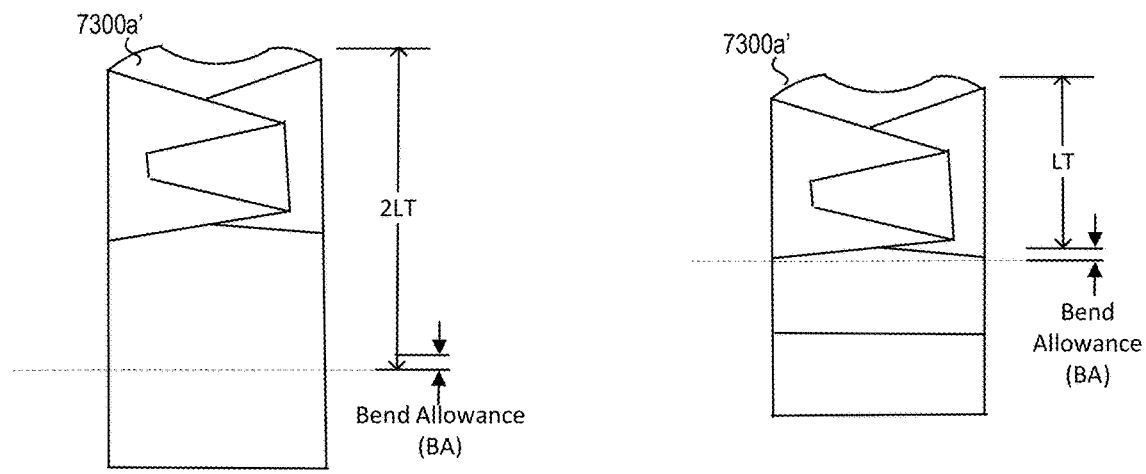
FIG. 40B
FIG. 40C

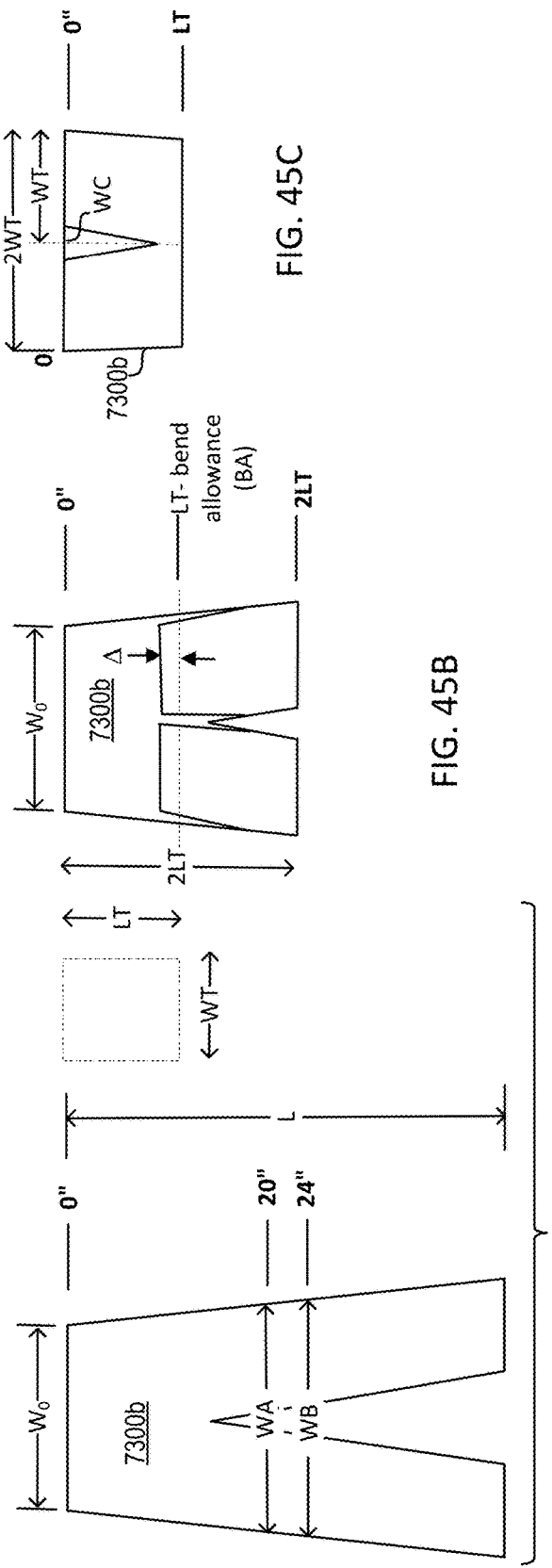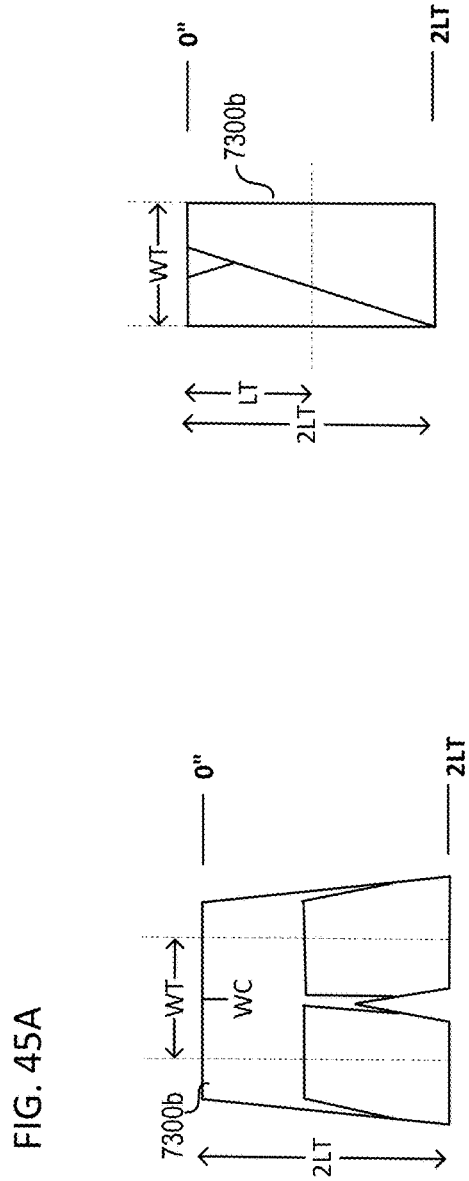

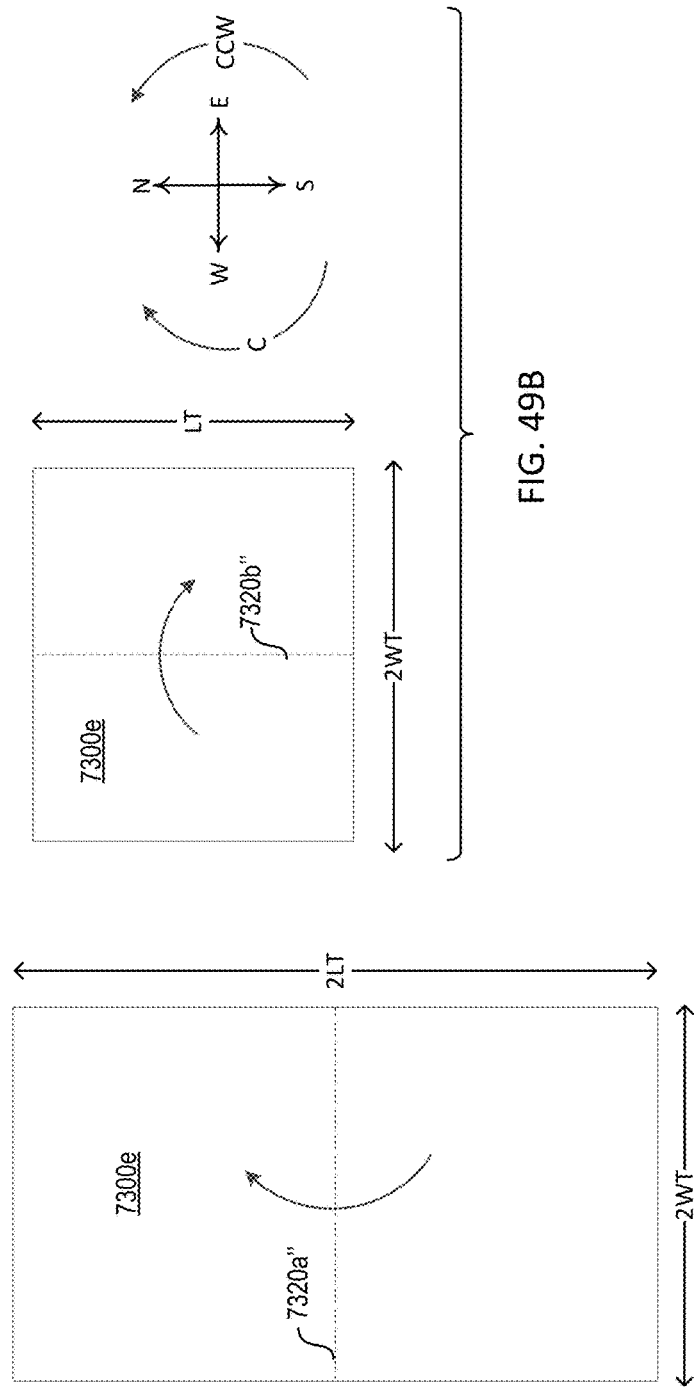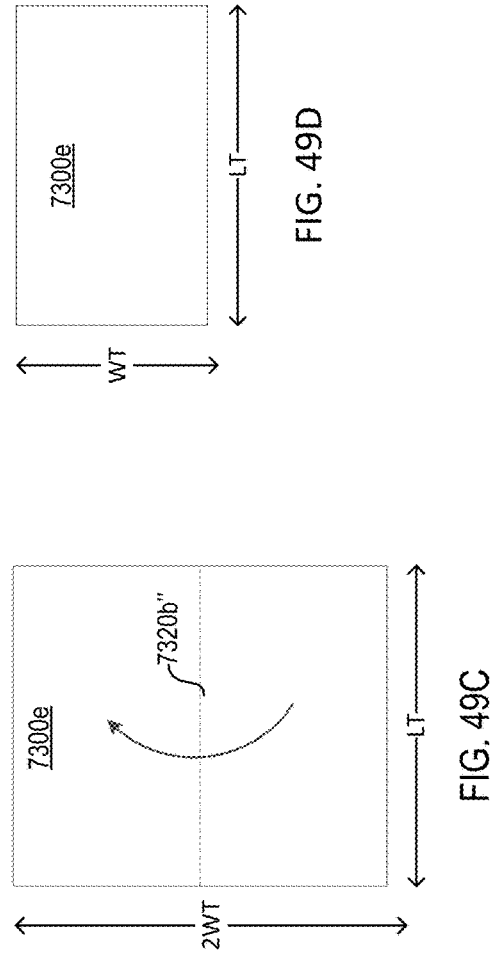

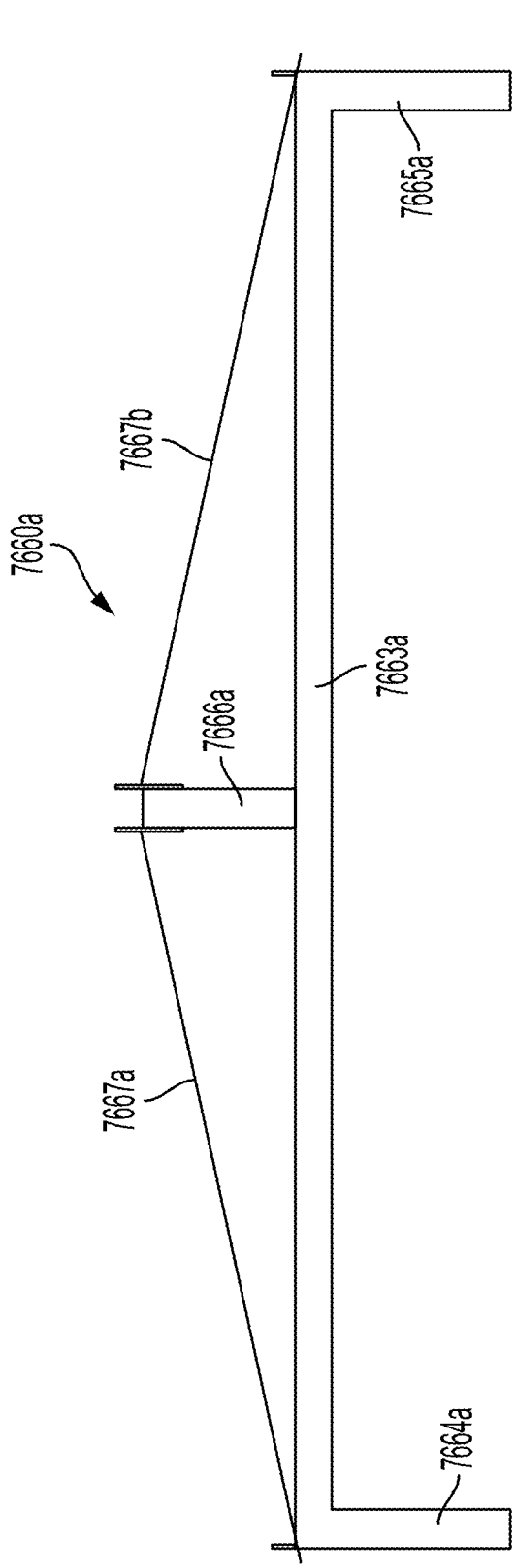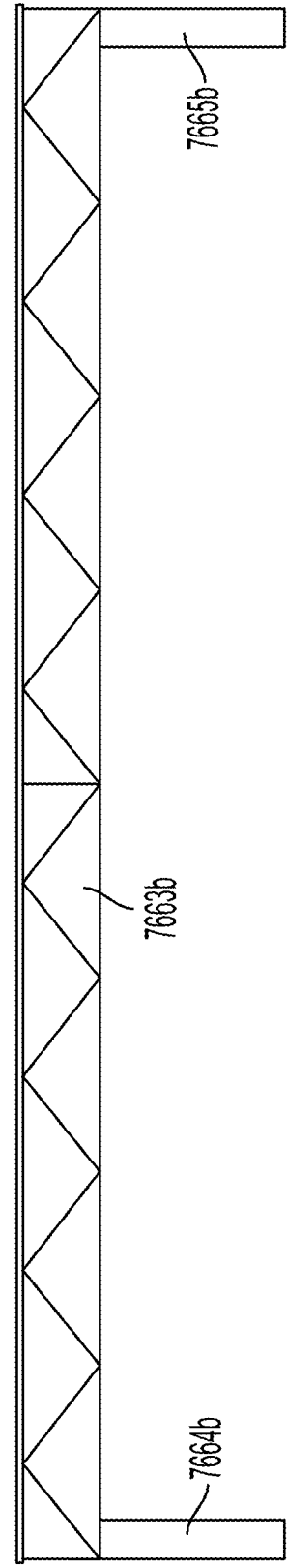
FIG. 69
FIG. 70

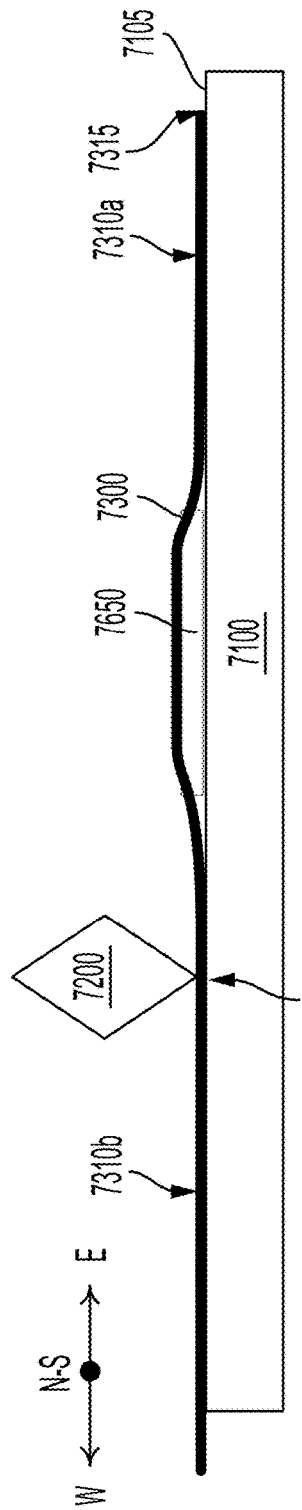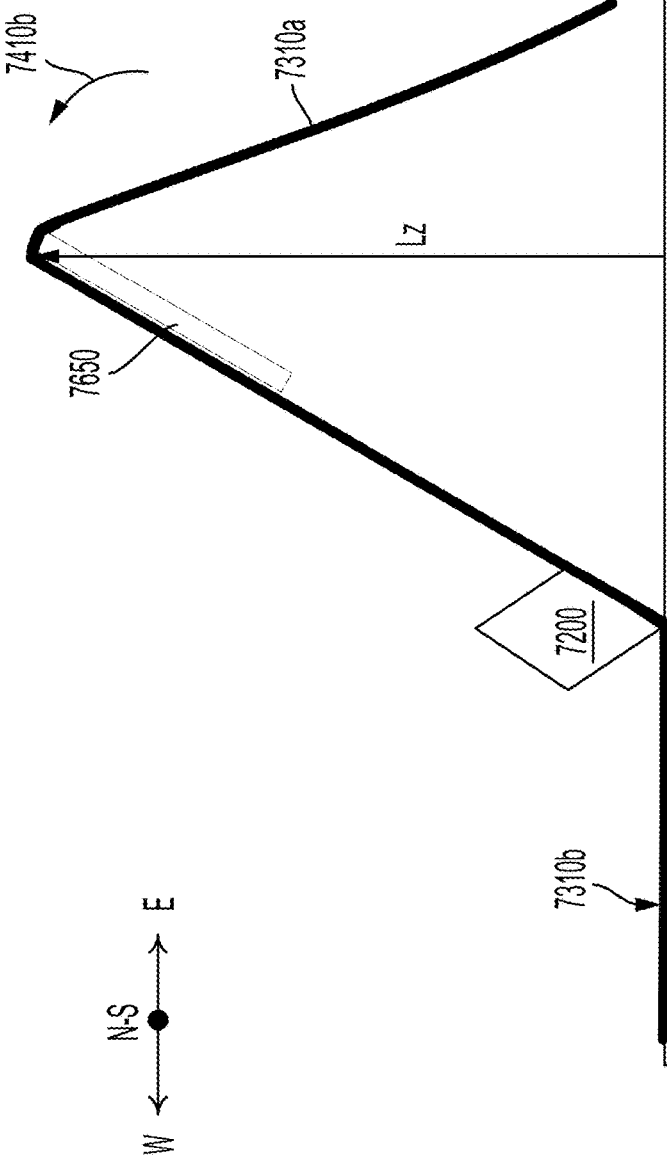

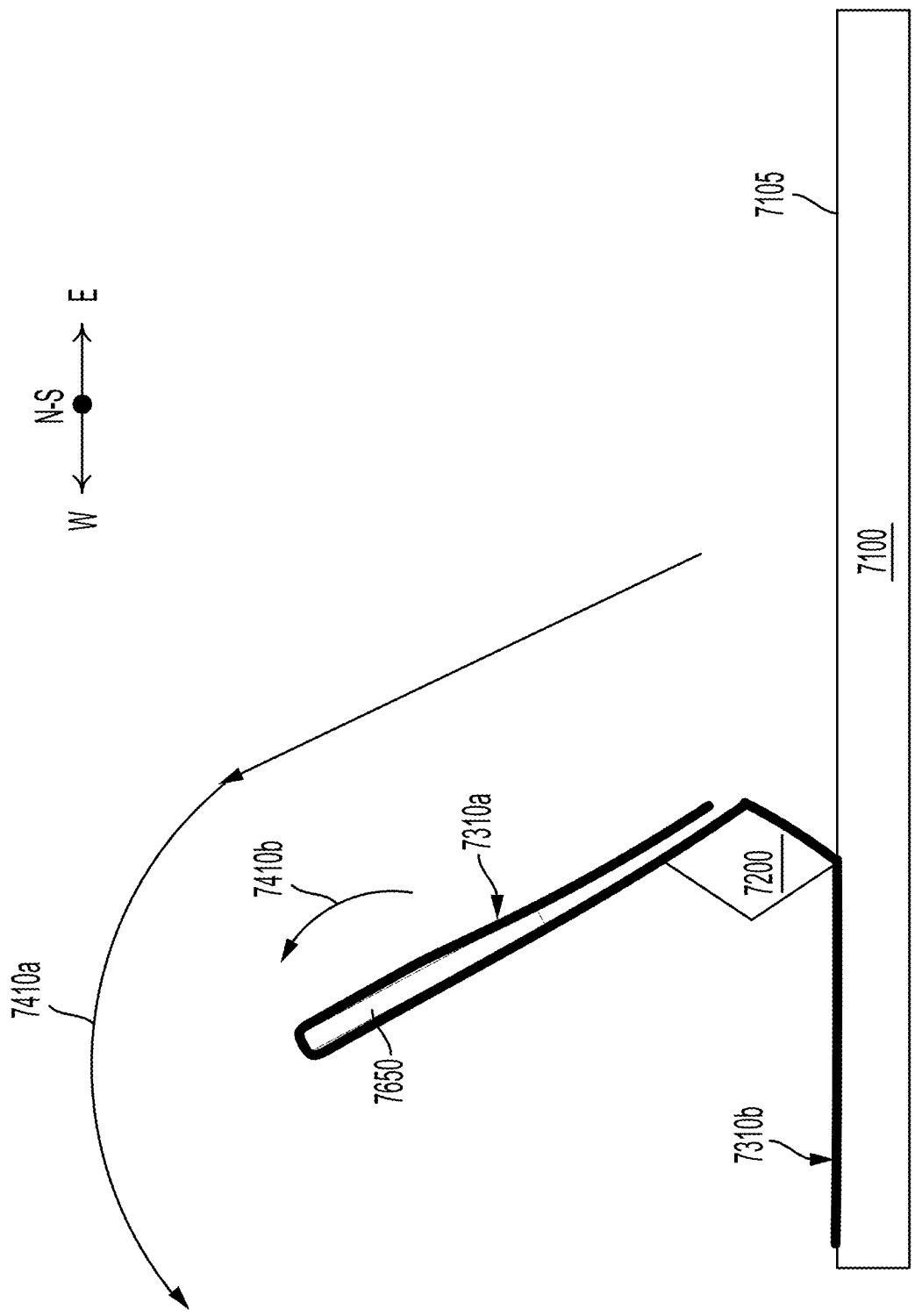

AUTONOMOUS LAUNDRY FOLDING DEVICES, SYSTEMS, AND METHODS OF USE

CROSS-REFERENCE TO RELATED APPLICATIONS

This application is a continuation application of U.S. patent application Ser. No. 17/364,533 filed Jun. 30, 2021, titled "Autonomous Laundry Folding Devices, Systems, And Methods Of Use," which claims priority under 35 U.S.C. § 119(e) U.S. Provisional Patent Application Ser. No. 63/046,697 filed Jul. 1, 2020, titled "Autonomous Laundry Folding Device And Methods Of Use," U.S. Provisional Patent Application Ser. No. 63/106,891 filed Oct. 29, 2020, titled "Autonomous Devices, Systems, And Methods For Handling Folded Laundry," U.S. Provisional Patent Application Ser. No. 63/168,540 filed Mar. 31, 2021, titled "Autonomous Devices, Systems, And Methods For Packing Folded Laundry," and U.S. Provisional Patent Application Ser. No. 63/168,555 filed Mar. 31, 2021, titled "Autonomous Devices, Systems, And Methods For Queuing Folded Laundry," the entirety of each of these applications is hereby incorporated by reference.

BACKGROUND

The present disclosure is directed to robotic laundry devices, systems, and methods.

Automating and outsourcing mundane, time-consuming household chores to robotic devices is increasingly common. Time-saving home robots include, for example, floor vacuuming and floor washing robots. Outsourcing responsibilities include, for example, engaging grocery shopping and delivery, and manually operated and human-operator dependent laundry washing and dry-cleaning pick up and return services.

Many homes are appointed with a dedicated washer and dryer for family use. Domestic washers and dryers are increasingly sophisticated and include IoT connectivity features and push notifications for alerting users about cycle progress and energy and resource usage. These technologically advanced machines, however, require human interaction and cannot eliminate the time and manual labor required for processing loads of laundry in the home. Although more modern, "high efficiency" machines are equipped with sensors for metering water usage and dryer temperatures, the efficiency gains are capped by the constraints of sequentially processing single loads of laundry. Additionally, grey water is output to the city water and sewer system for mitigation with each load of laundry processed, and energy is consumed with each load of laundry washed and dried.

Households can outsource laundry chores to laundromat facilities for a fee in exchange for time. Laundromats offering residential mixed load laundering services, however, require human interaction for intake and sorting of dirty laundry, transferring loads from washer to dryer, and then manually folding clean laundry. These are costly processes as measured in time, energy consumption, water consumption, and wastewater output, and they rely on human intervention to keep the process running at every transition and throughout several process steps. This invites delays at every stage. Because these processes are human-dependent and inefficient, the costs are passed along to the customers outsourcing their laundry for cleaning. Human-reliant laundering services also require that employees touch the belongings of the customer, potentially exposing the employee to contaminants in the dirty laundry and potentially exposing the clean laundry to transferable pathogens, dust, hair, and other debris emanating from a laundromat employee. In addition to potentially introducing undesirable contact contamination from the employees processing the loads of laundry, a privacy barrier is breached. Outsourcing household laundry to a laundromat involves employees interacting with customers' personal belongings including bodily worn garments.

Industrial laundry services exist for handling uniform business-related items, such as hospital bed sheets, medical scrubs, and hotel towels. Such industrial machines are tailor-made to accept one type of laundry item of one size or style. For example, unique folding machines exist to accept one of washed flat sheets, fitted sheets, hotel towels, and hotel bathrobes. These machines require human operators to load the washed article into its dedicated machine, which is sized and designed to fold that one type and/or size of article. This type of process line relies on a human operator for properly aligning and loading the clean article into the machine, which could introduce bodily contaminants, bacteria, and viral matter into the clean articles. Like laundromat services, these industrial services rely on human intervention and potentially introduce bio-contaminants into clean loads of laundry. Because these services are only profitable by processing large volumes of like items, these industrial processors are generally subscription-based services for large clients like hotels and hospitals producing standard-size, repeat laundry articles and are not available to consumers at an individual household level. Additionally, these services are configured to combine laundry from more than one source and are not configured to isolate and process separate loads for individual households.

Autonomous robotic devices are provided to process loads of household laundry. Such devices eliminate human contact with deformable laundry articles and autonomously process batches of disparate article types and sizes. As such, the devices need to be designed to be efficient and reliable for replacing the common, human-dependent chore of laundry.

SUMMARY

In one example, a device for autonomously folding a deformable article includes a rotatable platform configured to receive the deformable article, at least one clamp rod, a table drive and at least one movable sweep rod. The at least one clamp rod is configured to raise and lower from a surface of the rotatable platform and slidably move parallel to the surface. The at least one clamp rod is in operable communication with at least one clamp drive and is configured to clamp the deformable article to the surface in a lowered position. The table drive is configured to engage the rotatable platform and rotate the platform about a central axis such that the at least one clamp rod aligns with a first clamp position for the deformable article. The at least one movable sweep rod is disposed parallel to the at least one clamp rod and is in operable communication with at least one sweep drive. The at least one movable sweep rod is configured to raise and lower from the surface of the rotatable platform, slidably move parallel to the surface, slide under an unclamped portion of the deformable article, lift the unclamped portion above the at least one clamp rod, pass the unclamped portion over the at least one clamp rod, and dispose the free end to a resting position atop another portion of the deformable article.

Implementations of the device may include one or more of the following features.

In examples, the received deformable article is substantially extended. The deformable article is received from a repositioning device adjacent the rotatable platform, the repositioning device being configured to extend the deformable article for folding.

In examples, the received deformable article is one of a plurality of deformable laundry articles comprising two or more article types of at least one of different sizes and different shapes. The plurality of deformable laundry articles can include one or more loads of household laundry. Each of the two or more article types can comprise a longest dimension of between about 4 cm to 500 cm.

In examples, the platform has a shortest dimension in a range of between about 0.5 m to 5 m.

In examples, the platform is circular and the shortest dimension is a diameter.

In examples, the platform includes a continuous flat surface. The continuous flat surface can be opaque. The continuous flat surface can includes at least one of a color and pattern. The platform can include a cross sectional thickness of between about 0.5" to 2". The platform can include and/or be manufactured from at least one of foam core, polystyrene, balsa wood, bamboo, aluminum, stainless steel, sign board, and ULTRABOARD.

In examples, the table drive is configured to rotate the platform at a fastest speed in a range of between about 30 RPM to 120 RPM. The table drive can be reversible and configured to rotate the platform in at least one of a forward direction and reverse direction.

In examples, the device further includes a first pair of parallel support rails disposed adjacent the platform. The at least one clamp rod is configured to engage a first carrier slidably disposed on an inner one of the pair of parallel support rails and the at least one sweep rod is configured to engage a second carrier slidably disposed on an outer one of the parallel rails. Alternatively, the at least one clamp rod can be configured to engage the second carrier slidably disposed on the outer one of the pair of parallel support rails and the at least one sweep rod can be configured to engage the first carrier slidably disposed on the inner one of the parallel rails. The first and second carrier each further include a linear drive configured to raise and lower the engaged at least one retractable clamp rod and at least one sweep rod. The drive can be at least one of a belt drive, chain and sprocket, a screw drive, and a pneumatic drive. The first carrier can be configured to cantilever the engaged at least one clamp rod above the rotatable platform. The first carrier further comprises a pivot joint for tilting the engaged at least one clamp rod above the rotatable platform. In examples, the at least one clamp rod is retractable and the first carrier further includes at least one friction wheel configured to engage the clamp rod for extending and retracting over the platform. In examples, the at least one clamp rod is telescoping and configured to extend and retract over the platform. Additionally or alternatively, the first carrier can further comprise a pivot joint for tilting the engaged at least one clamp rod above the rotatable platform. The first and second carriers can be configured to engage with the corresponding clamp drive and sweep drive. The first and second carriers can be configured to slide along the first pair of parallel support rails at drive rate of between about 5 mm/s to 3 m/s.

In examples, the device further includes a second pair of parallel support rails disposed parallel to the first pair of parallel support rails and adjacent the rotatable platform, the rotatable platform being disposed between the first pair and second pair of parallel support rails. In examples, the at least one clamp rod includes a first clamp rod engaged with the first carrier and a second clamp rod engaged with a third carrier slidably engaged with one of the second pair of support rails. The third carrier slidably can be engaged with an inner one of the second pair of parallel support rails. Alternatively, the third carrier slidably can be engaged with an outer one of the second pair of parallel support rails. The first and second clamp rods can be configured to slide synchronously. The first and second clamp rods can be configured to slide asynchronously. The first and second clamp rods can be configured to extend and retract synchronously. A longitudinal axis of each of the first and second clamp rods can align with a shared axis. The first and second clamp rods can include a gap therebetween in a range of between about 0 to 50 mm in a fully extended position. In examples, the at least one clamp rod includes a single clamp rod engaged with the first carrier and a third carrier slidably engaged with an inner one of the second pair of parallel support rails such that the single clamp rod extends across the entire rotatable platform. The at least one clamp rod can be retractable and the first carrier can further include at least one friction wheel configured to engage the clamp rod for extending and retracting over the platform. The at least one clamp rod can be telescoping and configured to extend and retract over the platform.

In examples of at least one of a retractable and telescoping single clamp rod, the third carrier can be configured to selectively receive and release the single clamp rod when fully extended. In examples, the first carrier further includes a pivot joint for tilting the engaged at least one clamp rod above the rotatable platform and the third carrier is configured to selectively receive and release the single clamp rod when tilted to a lowered position.

In examples, the at least one sweep rod comprises a first sweep rod engaged with the second carrier and a second sweep rod configured to engage with a fourth carrier slidably engaged with one of the second pair of parallel support rails. In examples, the fourth carrier is slidably engaged with an outer one of the second pair of parallel support rails. In examples, the fourth carrier is slidably engaged with an inner one of the second pair of parallel support rails. In examples, the at least one sweep rod comprises a single sweep rod engaged with the second carrier and a fourth carrier slidably engaged with an outer one of the second pair of parallel support rails, the single sweep rod extending across the entire rotatable platform.

In examples, the device further includes a rotating drive configured to rotate the at least one movable sweep rod about a longitudinal axis at least one of parallel to or coaxial with a longitudinal central axis of the sweep rod while slidably moving along the sweep slide rail. In examples, the at least one movable sweep rod is configured to slide under a terminal edge of the unclamped portion of the garment while rotating. In examples, at least one movable sweep rod rotates under the deformable article clockwise while sliding from the right of the at least one clamp rod to left and counterclockwise while sliding from the left of the at least one clamp rod to right. In examples, the at least one movable sweep rod rotates in a range of about 5 to 500 RPM.

In examples, the at least one clamp rod and at least one movable sweep rod each comprise a shaped cross section. The shaped cross section can include at least one of circular, rectangular, square, diamond, triangular, oval, pentagonal, hexagonal, spline, and octagonal. In examples, the shaped cross section includes a largest dimension of between about 2 mm and 25 mm.

In examples, the at least one clamp rod and at least one movable sweep rod each include, or are manufactured from, at least one of wood, stainless steel, aluminum, DELRIN, polycarbonate, graphite, titanium, PVC, bamboo, and chromoly.

In examples, the device further includes a force sensor in operable communication with the at least one clamp drive configured to limit the applied clamping force to a range of between about 2.5 N and 50 N.

In examples, the device further includes one or more sensors configured to at least one of detect one of one or more features and capture one or more images of the deformable article disposed on the rotatable platform. In examples, the device further includes a controller in operative communication with the table drive, the at least one clamp drive, the at least one sweep drive, and one or more sensors disposed about the surface. The one or more sensors can include at least one of a 3-D camera, an IR sensor, a 2-D camera, LIDAR, LADAR, a sonar proximity sensor, an ultrasonic ranging sensor, a radar sensor (e.g., including Doppler radar and/or millimeter-wave radar), and a pair of stereo depth cameras. The one or more sensors can be configured to output 3-D image data to the controller. The one or more sensors can be configured to output one or more 2-D images to the controller.

In examples, the controller is further configured to determine, based on a comparison of a received output signal of the one or more sensors to data stored in a memory in communication with the controller, at least one of an article type, a front side, a back side, and an inside surface of the deformable laundry article. The at least one of the one or more sensors can be a 2-D camera and the data associated with repositioned deformable laundry article is size invariant image data. The at least one of the one or more sensors can be a 3-D camera and the memory further comprises a neural network.

In examples, the controller is configured to receive one or more output signals from the one or more sensors, determine, based on the received one or more output signals, at least one of an article type and size of the deformable article, determine, based at least on the at least one of the determined article type and determined article size, a fold line of the deformable article, instruct a drive motor to rotate the platform to align the fold line of the deformable article with the at least one clamp rod suspended above the platform, and instruct the at least one clamp rod to lower onto the first fold line, the lowered at least one clamp rod configured to apply force and immobilize the fold line of the deformable laundry article against the surface. The controller is further configured to instruct the at least one movable sweep rod to slidably move in a first direction between the deformable article and the surface to a position adjacent and parallel to the at least one retractable clamp rod, and raise the deformable article up and over the at least one retractable clamp rod, slidably moving in the first direction at least until the article disengages from the at least one movable sweep rod. In examples, aligning the fold line of the deformable article with the at least one clamp rod comprises rotating the fold line to a substantially parallel position with the at least one clamp rod.

In examples, the fold lines include a line across at least a portion of the deformable article about which the deformable article is configured to fold. The fold line crosses two outer edges of at least a portion of the deformable article.

In examples, the at least one clamp rod is retractable and configured to extend and retract over the platform. In examples, the at least one clamp rod is telescoping. In examples, the at least one clamp rod engages a driven friction wheel configured to advance and retract the at least one clamp rod. In examples, after the article disengages from the at least one movable sweep rod, the controller is further configured to instruct the clamp rod to retract until disengaged from the deformable article.

In one example, a method of robotically folding a deformable article, includes iterating a folding sequence one or more times, and stopping iterating the folding sequence upon the determining the article comprises the at least one final fold dimension. The folding sequence includes receiving, at a controller, one or more output signals from one or more sensors in communication with the controller, the one or more sensors being configured to at least one of detect one of one or more features and capture one or more images of a deformable article disposed on a platform, determining, based on the at least one of one or more features and one or more images, at least one of an article type and an article size, determining a fold line of the deformable article, instructing a drive motor to rotate the platform to align the fold line of the deformable article with a clamp suspended above and elongated parallel to a surface of the platform, instructing the clamp to lower onto the fold line, the lowered clamp configured to apply force and immobilize the fold line of the deformable article against the surface, and instructing an elongated sweep rod to move. Instructing the elongated sweep rod to move includes instructing the elongated sweep rod to slidably move in a first direction toward the clamp to a position adjacent and parallel to the clamp, the elongated sweep rod being disposed between the deformable article and the surface and rotating about a longitudinal axis while slidably moving, raise the deformable article up and over the clamp while slidably moving in the first direction at least until the article disengages from the elongated sweep rod, retract the clamp until disengaged from the article, and determine whether the article includes the at least one final fold dimension.

Implementations of the method may include one or more of the following features.

In examples, the fold line includes a corresponding line across at least a portion of the deformable article about which the deformable article is configured to fold. In examples, the fold line crosses two outer edges of at least a portion of the deformable article.

In examples, the drive motor is configured to operate bi-directionally and wherein instructing the drive motor to rotate the platform includes rotating the platform at least one of in a forward direction and in a reverse direction.

In examples, the method further includes rotating the sweep rod while slidably moving. In examples, the at least one movable sweep rod is configured to slide under a terminal edge of the unclamped portion of the garment while rotating. In examples, the elongated sweep rod comprises a circular cross section and rotates about a central axis. In examples, the elongated sweep rod rotates under the deformable article clockwise while sliding from the right of the at least one clamp rod to left and counterclockwise while sliding from the left of the at least one clamp rod to right. Additionally or alternatively, the elongated sweep rod rotates under the deformable article counterclockwise while sliding from the right of the at least one clamp rod to left and clockwise while sliding from the left of the at least one clamp rod to right. In examples, the sweep rod rotates in a range of about 5 to 500 RPM.

In examples, the method further includes receiving input from a force sensor in operable communication with the at least one clamp drive configured to limit the applied clamping force to a range of between about 2.5 N and 50 N.

In examples, the method further includes determining the fold line based on at least one of the article type and the article size. In examples, the method further includes the controller determining the at least one final folded dimension of the article by identifying in a memory store one or more pre-determined final folded dimensions associated with the determined at least one of the article type and the article size.

In examples, the at least one final folded dimension is dynamically selected based on the determined at least one of article type and article size and determining the fold line is based at least in part on the dynamically selected final folded dimension.

In examples, the one or more features comprise natural fold lines. In implementations, the method further includes determining the fold line based on one or more natural fold lines of the deformable article. In implementations, the one or more natural fold lines comprises a bisector of the deformable article.

In examples, determining the article type includes processing the received output signal of the one or more sensors with a neural network classifier. In examples, the one or more sensors comprises at least one of a 3-D camera, an IR sensor, a 2-D camera, LIDAR, LADAR, a sonar proximity sensor, an ultrasonic ranging sensor, a radar sensor (e.g., including Doppler radar and/or millimeter-wave radar), and a pair of stereo depth cameras. In examples, the controller is configured to receive an output signal comprising 3-D image data of the deformable article. Alternatively or additionally, in examples, the controller is configured to receive an output signal comprising one or more 2-D images of the deformable article. In examples, determining article type comprises performing a size invariant imagery comparison to classified images stored in a memory in communication with the controller. In examples, the controller is further configured to determine, based on a comparison of a received output signal of the one or more sensors to data stored in a memory in communication with the controller, at least one of an article type, a front side, a back side, and an inside surface of the deformable laundry article In examples, the one or more sensors comprises at least one of a 3-D camera, an IR sensor, a 2-D camera, LIDAR, LADAR, a sonar proximity sensor, an ultrasonic ranging sensor, a radar sensor (e.g., including Doppler radar and/or millimeter-wave radar), and a pair of stereo depth cameras. In implementations, the controller is configured to receive an output signal comprising one or more 2-D images of the deformable article, and determining the article type comprises performing a size invariant imagery comparison to classified images stored in a memory in communication with the controller.

In examples, the method further includes receiving an output signal comprising a 3-D image data of the deformable article and determining, based on the 3-D image data, one or more critical features of the deformable article. In implementations, the one or more critical features includes a portion of the deformable article comprising at least one of a raised prominence, a closure, and an affixed embellishment.

In examples, determining the fold line includes, based on the output signal of each of the one or more sensors, determining one or more natural fold lines of the deformable article. In implementations, the one or more natural fold lines includes a bisector of the deformable article.

In implementations, the one or more natural fold lines includes a seam of the deformable article.

In examples, the method further includes, determining, based on the article type, a sequence of instructions for smoothing the deformable article prior to folding, the sequence of instructions being executable by the controller and stored on a memory in communication with the controller. In implementations, the sequence of instructions for smoothing the deformable article prior to folding includes instructing a drive motor to rotate the platform to align an anchor location of the deformable article with the clamp suspended above and elongated parallel to a surface of the platform, instructing the clamp to lower onto the anchor location, the lowered clamp configured to apply force and immobilize the anchor of the deformable laundry article against the surface, and instructing the elongated sweep rod to slidably move in a first direction toward the clamp to a position adjacent and parallel to the clamp, the elongated sweep rod being disposed between the deformable article and the surface and rotating about a longitudinal axis while slidably moving, raise the deformable article up above the surface of the platform, and slidably move in a second direction opposite the first direction until the elongated sweep rod disengages from the deformable article. In examples, the sequence of instructions for smoothing further includes instructing the elongated sweep rod to slidably move in the first direction to the position adjacent and parallel to the clamp, lower to contact the deformable article, and slidably move in a second direction opposite the first direction until the elongated sweep rod disengages from the article. In examples, the anchor location comprises the fold line. In any of the preceding examples and implementations, the sweep rod can rotates counterclockwise for the first motion comprising a right to left movement and clockwise for the first motion comprising a left to right movement. Additionally or alternatively, in any of the preceding implementations, the sweep rod can rotates counterclockwise for the first motion comprising a right to left movement and clockwise for the first motion comprising a left to right movement. In examples, in any of the preceding examples and implementations the method further comprising repeating the sequence of instructions for smoothing, the repeated sequence comprising at least one of sliding and rotating the elongated sweep rod at a relatively slower rate than a first execution of the sequence of instructions for smoothing. In any of the preceding examples and implementations, the anchor location comprises a middle location of the deformable article and the sequence of instructions for smoothing the deformable article prior to folding is executed by the controller on both sides of the anchor location.

In implementations, the method further includes comparing the received output signal to data stored in a memory in communication with the controller for determining the article type. The method can further include identifying features indicative of at least one of a front side and a back side of the deformable article. In examples, the method can further include identifying features indicative of the deformable article being inside out. The identifiable features indicative of the deformable article being inside out can include at least one a visible seam, a tag, and stitching.

In examples of the method, the deformable article is one of a plurality of deformable laundry articles including two or more article types of at least one of different sizes and different shapes. Each of the two or more article types can include a longest dimension of between about 4 cm to 500 cm. In examples, the platform is configured to receive a plurality of deformable articles including alternating non-identical article types of the two or more article types.

In examples, the method is configured to be executed autonomously by the controller, and the controller is configured to be in operative communication with the one or more sensors, the drive motor of the rotatable platform, the clamp, and the elongated sweep rod. In examples, the controller is configured to communicate with a network via at least one of wired and wireless communication protocols. In implementations, the method further includes receiving one or more folding instructions from a remote device in operable communication with the network. The one or more folding instructions can include user inputs to at least one of a computer portal and smartphone application representative of one or more user inputs. The one or more user inputs can include at least one of a preferred at least one final dimension for the deformable article, a request for not folding the deformable article, a submission of an article type for the deformable article, one or more specified fold lines, and a preferred sequence for folding the deformable article at each of the one of the one or more specified fold lines.

In examples, the method further includes communicating with a packing robot configured to receive the deformable article from the platform upon stopping iterating the folding sequence.

In examples, the method further includes instructing a packing robot in communication with the network to retrieve the deformable article upon stopping iterating the folding sequence.

In examples, the method further includes instructing a tilt motor of the platform to tilt the platform to slidably release the deformable article to a receiving platform upon stopping iterating the folding sequence.

In one example, a method of robotically flattening a deformable article for folding includes receiving, at a controller, one or more output signals from one or more sensors in communication with the controller, the one or more sensors being configured to at least one of detect one of one or more features and capture one or more images of a deformable article disposed on a platform. The method includes instructing a drive motor to rotate the platform to align an anchor location of the deformable article with a clamp suspended above and elongated parallel to a surface of the platform, instructing the clamp to lower onto the anchor location, the lowered clamp configured to apply force and immobilize the anchor location of the deformable laundry article against the surface, and instructing an elongated sweep rod to move. Instructing the elongated sweep rod to move includes instructing the elongated sweep rod to slidably move in a first direction toward the clamp to a position adjacent and parallel to the clamp, the elongated sweep rod being disposed between the deformable article and the surface and rotating about a longitudinal axis while slidably moving, raise the deformable article up above the surface of the platform, and slidably move in a second direction opposite the first direction until the elongated sweep rod disengages from the deformable article.

Implementations of the method may include one or more of the following features.

In examples, the method further includes instructing the elongated sweep rod to slidably move in the first direction to the position adjacent and parallel to the clamp, lower to contact the deformable article, and slidably move in a second direction opposite the first direction until the elongated sweep rod disengages from the article.

In any of the preceding examples, the method further includes determining at least one of an article type and an article size. In examples, the method further includes determining, based on at least one of the article type and the article size, at least one final folded dimension of the article.

In examples, the method further includes iterating a folding sequence one or more times and stopping iterating the folding sequence upon the determining the article comprises the at least one final fold dimension. In examples, the folding sequence includes determining a fold line of the deformable article, instructing a drive motor to rotate the platform to align the fold line of the deformable article with the clamp suspended above and elongated parallel to a surface of the platform, instructing the clamp to lower onto the fold line, the lowered clamp configured to apply force and immobilize the fold line of the deformable laundry article against the surface, and instructing the elongated sweep rod move. In examples, instructing the elongated sweep rod to move includes instructing the sweep rod to slidably move in a first direction toward the clamp to a position adjacent and parallel to the clamp, the elongated sweep rod being disposed between the deformable article and the surface and rotating about a longitudinal axis while slidably moving, raise the deformable article up and over the clamp while slidably moving in the first direction at least until the article disengages from the elongated sweep rod, retract the clamp until disengaged from the article, and determine whether the article comprises the at least one final fold dimension.

In examples, the at least one final folded dimension of the article is dynamically determined. In implementations, the at least one final folded dimension of the article is determined by a remaining volume in a packing container configured to receive the article from the platform.

In implementations, the at least one final folded dimension of the article is stored in a database including a plurality of final folded dimensions associated with at least one of article type and article size.

BRIEF DESCRIPTION OF THE DRAWINGS

FIG. 20A depicts a side view schematic of an example start of a motion sequence of a rotating clamp rod of FIGS. 18 and 19 approaching an edge of a clamped article to slide therebeneath without bunching the fabric of the article.

FIG. 20B depicts a side view schematic of the rotating clamp rod of FIG. 20A engaging and lifting the edge of a clamped article to slide therebeneath without bunching the fabric of the article.

FIG. 20C depicts a side view schematic of the rotating clamp rod of FIG. 20B sliding beneath the article to a position adjacent a clamp rod without bunching the fabric of the article.

FIG. 24B depicts a side view of the example of a folding device of 24A.

FIGS. 40A-40C schematically depict example dimensions and sequentially folded states of a shirt in accordance with the methods of FIGS. 38-39.

FIG. 45A depicts a schematic example measured dimensions and target folded dimensions of flattened pants for use in the methods of FIGS. 41-44.

FIGS. 45B-C schematically depict example sequentially folded states of a pants in accordance with the half fold methods of FIG. 43.

FIGS. 45D-E schematically depict example sequentially folded states of a pants in accordance with the thirds fold method of FIG. 44.

FIGS. 49A-D sequentially schematically depicts an example method executable by a controller of the folding robot for folding an article according to a general recursive fold in half routine of the folding method of FIG. 25.

FIG. 69 depicts an alternative schematic example of a pre-tensioned blade support structure of the blade assembly of FIGS. 62-64.

FIG. 70 depicts another alternative schematic example of a pre-tensioned blade support structure of the blade assembly of FIGS. 62-64.

FIGS. 72A-72C depict a folding sequence of a clamped article using the rotatable blade of the folding device of FIGS. 62-64.

DETAILED DESCRIPTION

This disclosure relates to autonomous robotic devices, systems, and methods for handling residential loads of laundry. The system includes one or more autonomous process lines comprising a plurality of robotic devices configured to work in concert to process a dirty load of household laundry from a mass of dirty, non-uniform articles to individually separated, cleaned, and folded laundry articles. The plurality of robotic devices operate without human intervention to efficiently and effectively launder a customer's dirty items. This disclosure relates to autonomous robotic devices configured to autonomously fold clean, deformable laundry articles for introduction to an autonomous packing robot. The autonomous robotic devices are configured to fold a plurality of loads of laundry each comprising a plurality of deformable article types. The laundry articles are collected from a household and delivered to the process line for cleaning. The autonomous processes are time and cost efficient, eliminate human intervention-based delays, eliminate line workers and associated introduction of human contaminants introduced by line workers, and eliminate any concerns with having private personal items handled by strangers.

Figure 1:
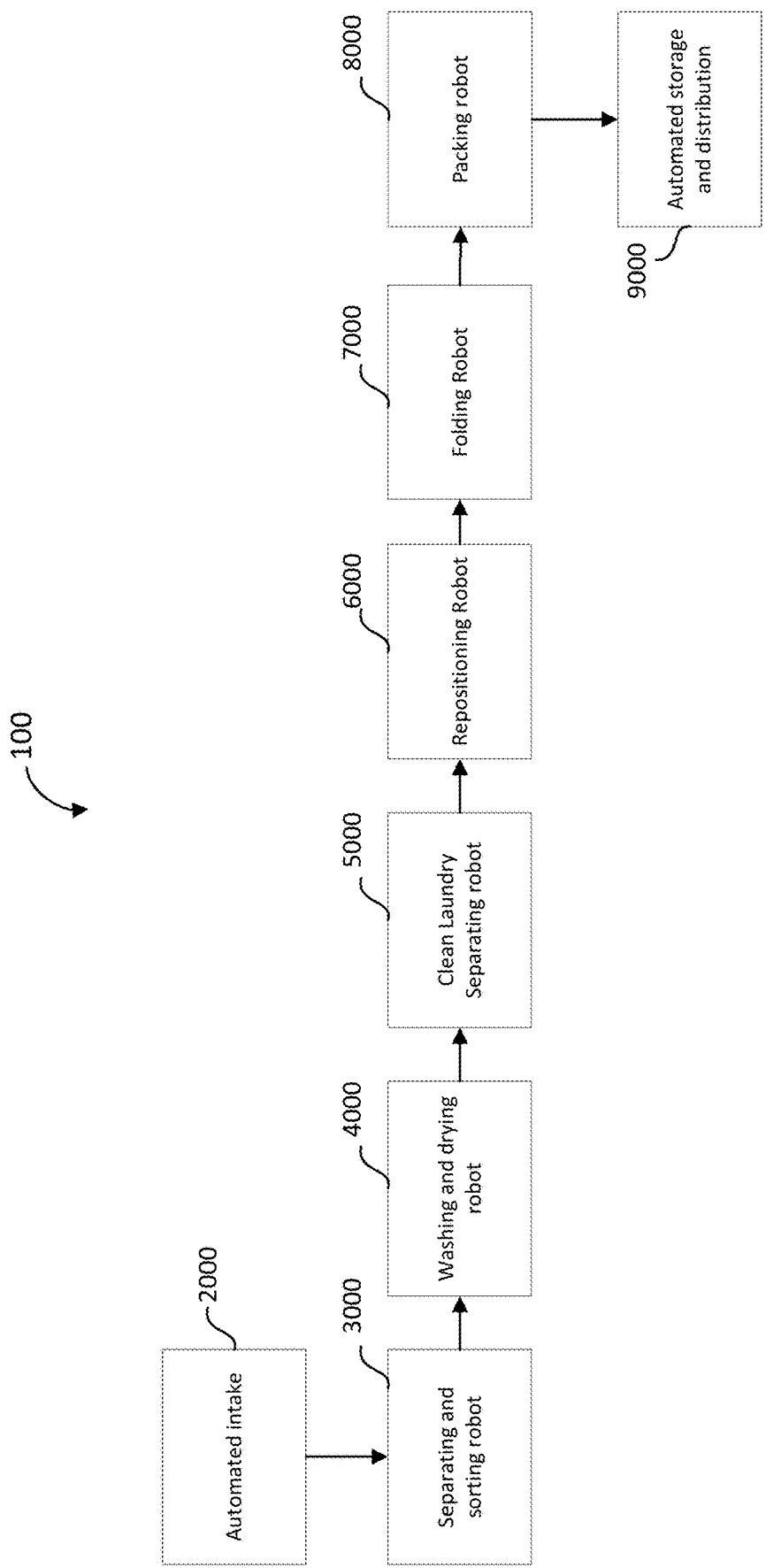
FIG. 1 depicts a schematic of an example autonomous robotic laundry process line.

As shown in FIG. 1, in implementations of the system, a process line 100 comprises a plurality of autonomous robots configured to operate in series without human intervention to process and transport dirty laundry through the cleaning process and fold and repack the clean laundry for return to a household. In one implementation, the process line 100 comprises an autonomous intake robot 2000 for receiving a load of dirty household laundry comprising a plurality of deformable laundry articles. The deformable laundry articles can be non-uniform in type, size, shape, color, and fabric and can require particular treatment and handling. For example, the plurality of deformable laundry articles can include items commonly laundered in homes, such as sheets, towels, table cloths, and adult and children's garments, for example, tee shirts, pants, socks, undergarments, hooded sweatshirts, baby socks, wash cloths, dresses, open front dress shirts, and blouses. The autonomous intake robot 2000 is configured to introduce the plurality of deformable laundry articles to a separating and sorting robot 3000 configured to separate out each one of the deformable laundry articles of the plurality of deformable laundry articles pertaining to a single customer and/or household. In implementations, the separating and sorting robot 3000 is configured to sort each one of the separated deformable laundry articles into one or more related batches for washing. In implementations, the separating and sorting robot 3000 is configured to intelligently batch the separated each one of the deformable laundry articles into its own dedicated load or into a load with at least one other separated deformable laundry article according to a programmed sorting algorithm. The programmed sorting algorithm can be based, for example, on criteria including at least one of material color, material type, customer washing preference, water temperature requirements, and load size. In implementations, the separating and sorting robot 3000 is configured to identify and record the number and types of garments in the load of laundry and provide this information to one or more robots in the process line 100.

The separating and sorting robot 3000 outputs one or more intelligently sorted batches of deformable laundry articles to one or more washing and drying robots 4000 for laundering. The one or more washing and drying robots 4000 output the clean laundry articles to a clean laundry separating robot 5000. Implementations of the clean laundry separating robot 5000 can be similar or identical to the separating and sorting robot 3000. The clean laundry separating robot 5000 is configured to separate a load of clean laundry into individual deformable laundry articles for introduction into a repositioning robot 6000. In implementations to be described herein in detail, the repositioning robot 6000 receives a single deformable laundry article and manipulates and repositions it for automated introduction into a folding robot 7000, which automatically folds the laundry article for introduction to a packing robot 8000. In implementations, the packing robot 8000 automatically packs the clean load of laundry comprising the plurality of clean and folded deformable laundry articles in a shipping container for automated redistribution to the customer. In implementations, the shipping container is a reusable container. In implementations, the shipping container is a disposable container. In implementations, the shipping container is a non-deformable container with an ingress protection rating that includes an intrusion protection rating of 5 or 6 and a moisture protection rating of any and all of 1 through 6 in accordance with the Ingress Protection Code, IEC standard 60529.

Implementations of the process line 100a of household laundry cleaning robots can comprise one or more of each of the robots depicted in FIG. 1. In implementations, each autonomous process line 100 can include a cluster of washing and drying robots 4000a-n. In other implementations, the autonomous process line 100 includes a cluster of washing and drying robots 4000a-n shared by two or more sets of automated intake robots 2000 and dirty laundry separating and sorting robots 3000 and two or more sets of clean laundry separating robots 5000, repositioning robots 6000, folding robots 7000, and packing robots 8000. Additionally or alternatively, a process line can include two or more folding robots 7000 to prevent a process bottleneck at the folding step. Additionally, two or more of the robots can be combined in a single module in alternate implementations. In implementations, one or more of the robots in the process line 100 are configured to communicate over wired connections or wireless communication protocols. For example, in implementations, one or more robots in the process line 100 can communicate with another one or more robots in the process line 100 over a wired BUS, LAN, WLAN, 4G, 5G, LTE, Ethernet, BLUETOOTH, or other IEEE 801.11 standard.

Figure 2:
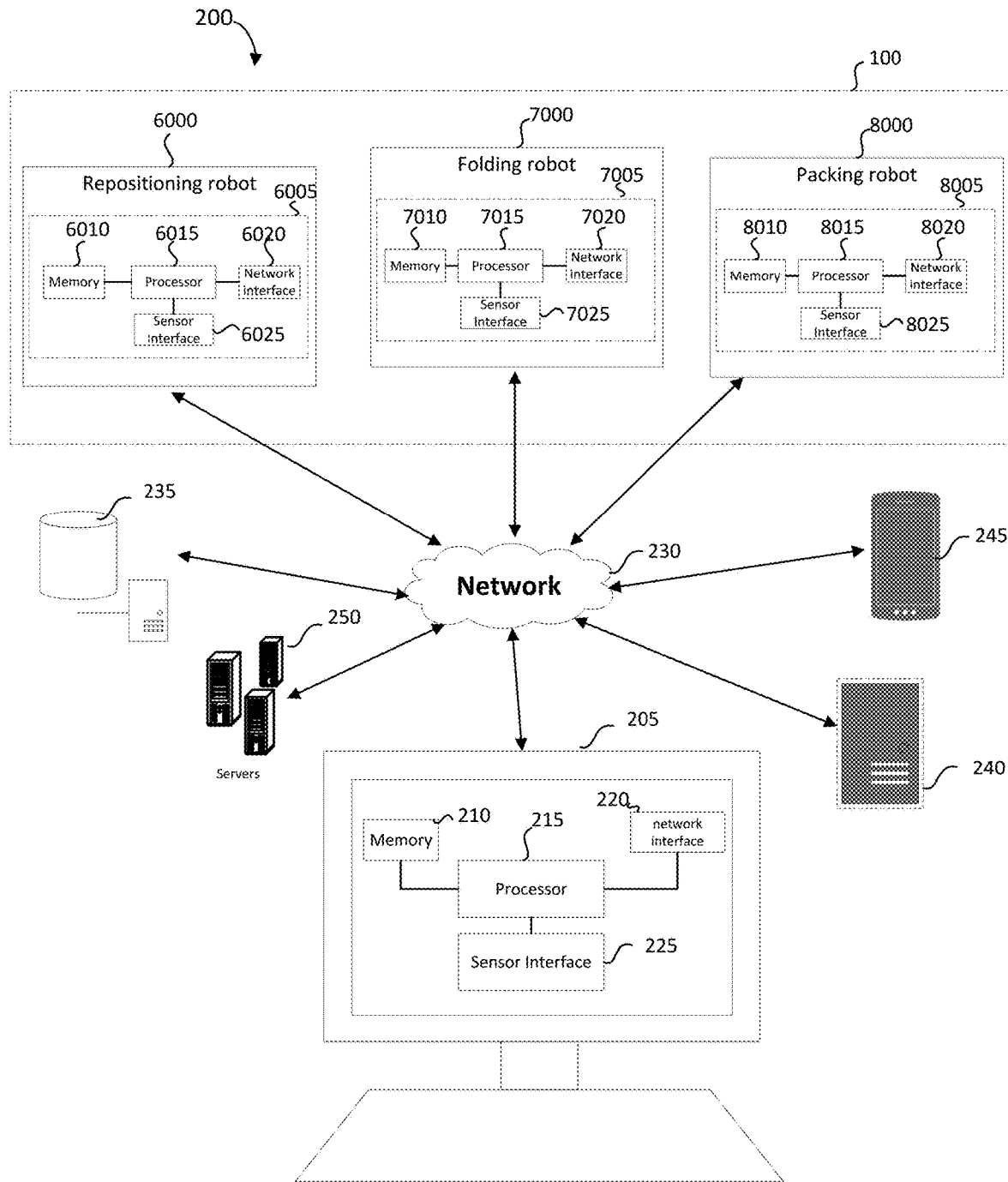
FIG. 2 depicts a schematic example of a system for controlling an autonomous robotic process line.

Referring to FIG. 2, an example of a system 200 of operatively connected autonomous robots is shown. FIG. 2 depicts a schematic implementation of a portion of an autonomous robotic process line 100 that processes the clean deformable laundry articles. A folding robot 7000 is in operative communication with a repositioning robot 6000 configured to output a repositioned, or substantially spread, deformable laundry article to the folding robot 7000, and the folding robot is in communication with a packing robot 8000 configured to receive the folded article for packing for return to the customer. In implementations, each robot 6000, 7000, 8000 includes at least one controller 6005, 7005, 8005 configured to operate the associated robot.

For example, in implementations, the folding robot 7000 includes a controller 7005. The controller 7005 includes a processor 7015 in communication with a memory 7010, a network interface 7020, and a sensor interface 7025. The processor 7015 can be a single microprocessor, multiple microprocessors, a many-core processor, a microcontroller, and/or any other general purpose computing system that can be configured by software and/or firmware. In implementations, the memory 7010 contains any of a variety of software applications, algorithms, data structures, files and/or databases as appropriate to the requirements of repositioning non-uniform deformable laundry articles. In one implementation, the controller 7005 includes dedicated hardware, such as single-board computers, one or more GPUs, application specific integrated circuits (ASICs), and field programmable gate arrays (FPGAs).

A network interface 7020 is configured to couple the controller 7005 to a network 230. The network 230 may include both private networks, such as local area networks, and public networks, such as the Internet. It should be noted that, in some examples, the network 230 may include one or more intermediate devices involved in the routing of packets from one endpoint to another. In implementations, the network interface 7020 is coupled to the network 230 via a networking device, such as a bridge, router, or hub. In other implementations, the network 230 may involve only two endpoints that each have a network connection directly with the other. In implementations, the network interface 7020 supports a variety of standards and protocols, examples of which include USB (via, for example, a dongle to a computer), TCP/IP, Ethernet, Wireless Ethernet, BLUETOOTH, ZigBee, M-Bus, CAN-bus, IP, IPV6, UDP, DTN, HTTP, FTP, SNMP, CDMA, NMEA and GSM. To ensure data transfer is secure, in some examples, the controller 7005 can transmit data via the network interface 7020 using a variety of security measures including, for example, TLS, SSL or VPN. In implementations, the network interface 7020 includes both a physical interface configured for wireless communication and a physical interface configured for wired communication. According to various embodiments, the network interface 7020 enables communication between the controller 7005 of the repositioning robot and at least one of the plurality of robots 2000, 3000, 4000, 5000, 6000, 8000, 9000 of the process line 100.

Additionally or alternatively, the network interface 7020 is configured to facilitate the communication of information between the processor 7020 and one or more other devices or entities over the network 230. For example, in implementations, the network interface 7020 is configured to communicate with a remote computing device such as a computing terminal 205, database 235, server 240, smartphone 245, and server farm 250. In implementations, the network interface 7020 can include communications circuitry for at least one of receiving data from a database 235 and transmitting data to a remote server 240, 250. In some implementations, the network interface 7020 can communicate with a remote server over any of the wired protocols previously described, including a WI-FI communications link based on the IEEE 802.11 standard.

In some examples in accordance with FIG. 2, the network 230 may include one or more communication networks through which the various robots and computing devices illustrated in FIG. 2 may send, receive, and/or exchange data. In various implementations, the network 230 may include a cellular communication network and/or a computer network. In some examples, the network 230 includes and supports wireless network and/or wired connections. For instance, in these examples, the network 230 may support one or more networking standards such as GSM, CMDA, USB, BLUETOOTH®, CAN, ZigBee®, Wireless Ethernet, Ethernet, and TCP/IP, among others. In implementations, the network 230 can implement broadband cellular technology (e.g., 2.5 G, 2.75 G, 3 G, 4 G, 5 G cellular standards) and/or Long-Term Evolution (LTE) technology or GSM/EDGE and UMTS/HSPA technologies for high-speed wireless communication.

Although an embodiment of a controller 7005 of the folding robot 7000 is described herein in particular, one or more of the plurality of robots 2000, 3000, 4000, 5000, 6000, 8000, 9000 of the process line 100 includes similar components having similar functionality.

Figure 3:
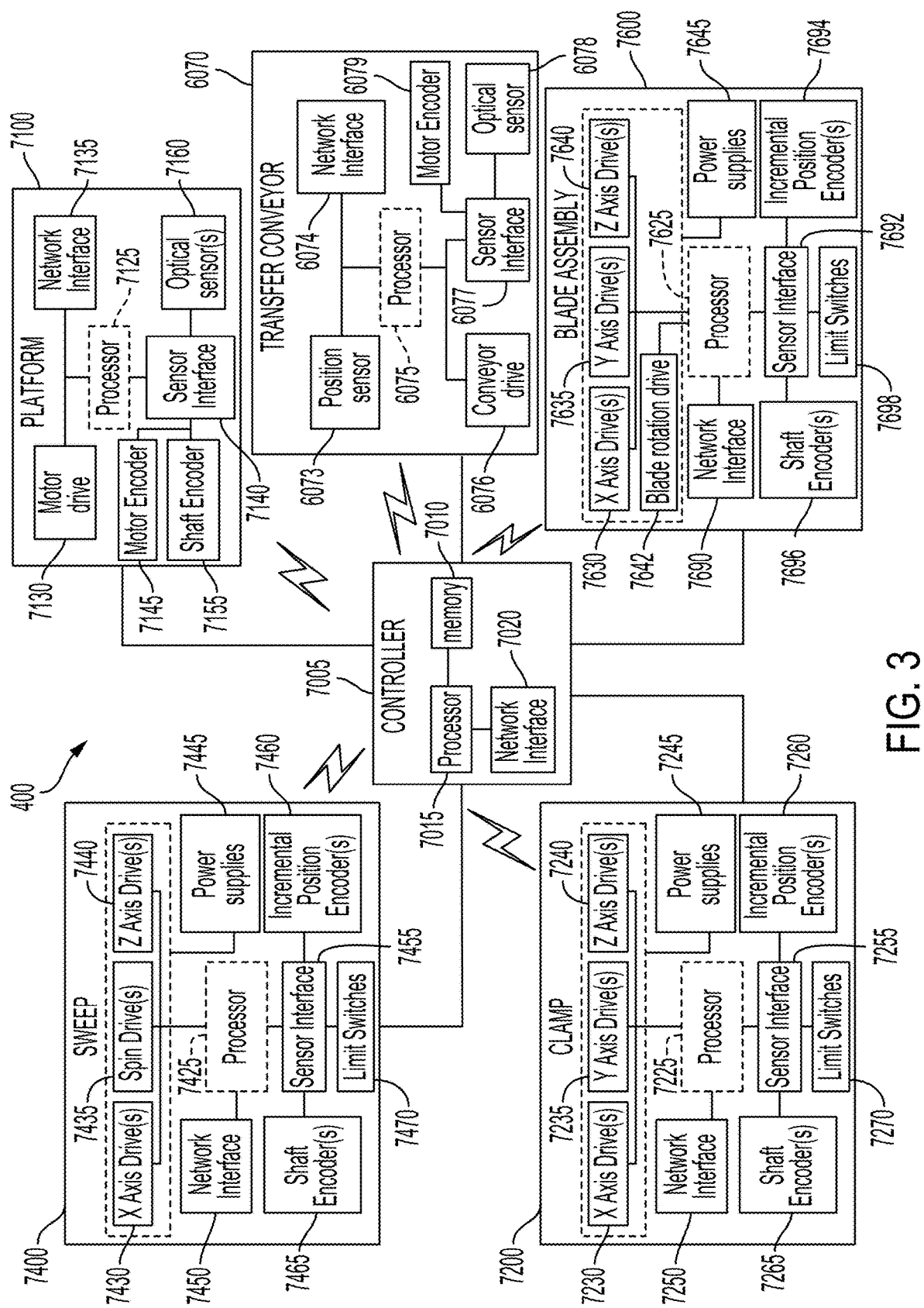
FIG. 3 depicts a system level schematic of an example autonomous folding device.

Turning to FIG. 3, an implementation of a schematic controls system 400 of a folding robot 7000 (also alternatively referred to hereinafter as "a robotic device," "device," and "folding device") is shown. FIG. 3 depicts an implementation of concurrently monitored and/or autonomously controlled components of the folding robot 7000 in operable control with the one or more controllers 7005 of the system 400. In implementations, each of the components comprises one or more elements having similar or identical functionality to the components described with regard to FIG. 2, such as processors, sensor interfaces, and networking interfaces for communicating with a controller 7005 and other components of the system 400 via a at least one of a wired and wireless network 230. The system 400 includes one or more of the features described with regard to the embodiments of FIGS. 1 and 2. In implementations the system 400 comprises a rotatable platform 7100 and at least two of the following: at least one movable sweep rod 7400, at least one clamp rod 7200, and at least one blade assembly 7600 in wired or wireless communication with the at least one controller 7005. In implementations, the system 400 comprises a transfer conveyor 6070 configured to deliver a repositioned deformable laundry article 7300 to the platform 7100 for folding. The repositioned deformable laundry article can be at least one of spread out, oriented, and partially folded by a preceding autonomous robot, for example a repositioning robot 6000 manipulating and outputting the repositioned article 7300.

Figure 4:
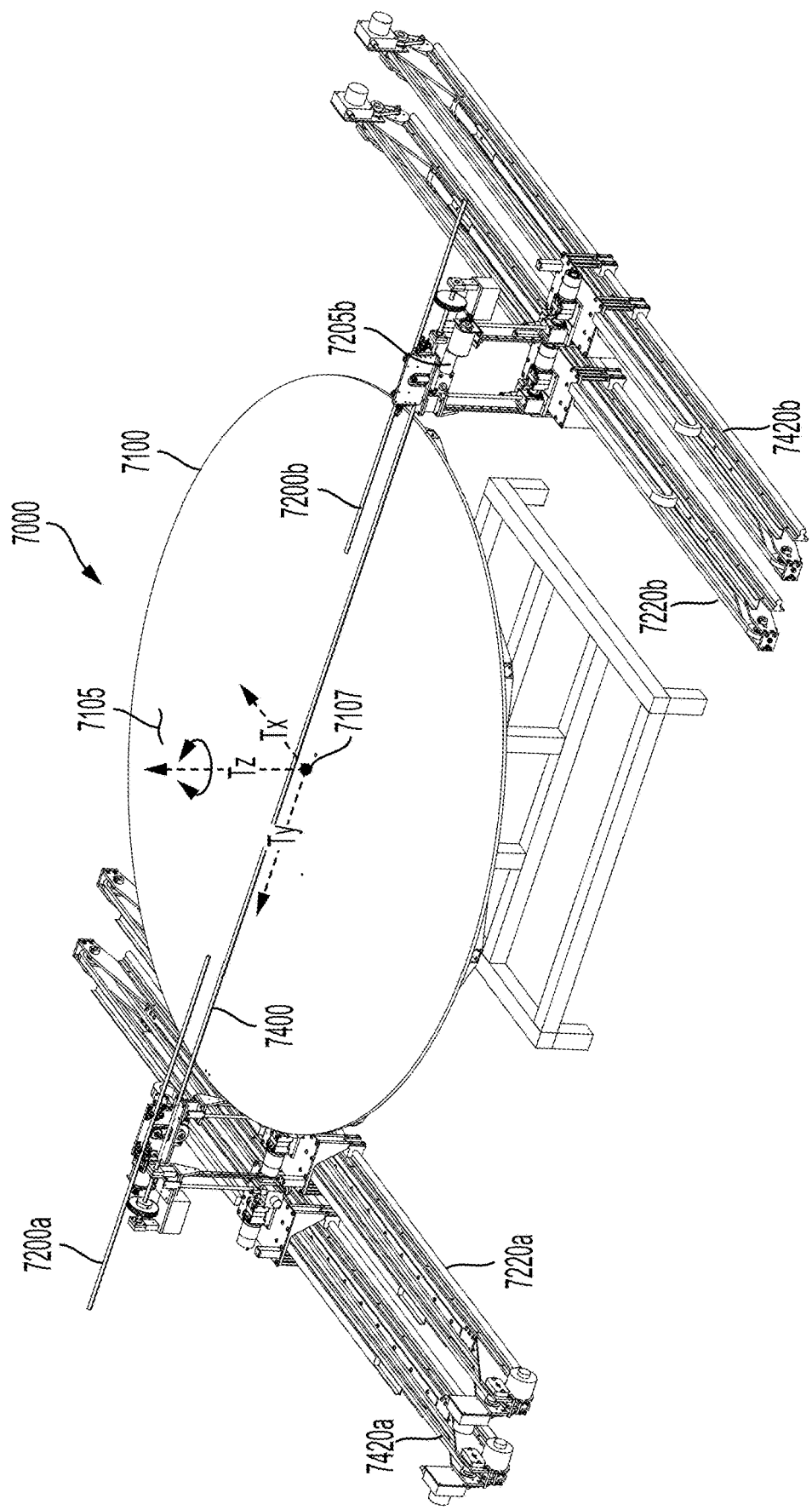
FIG. 4 depicts an orthogonal view of an example of a folding device.
Figure 5:
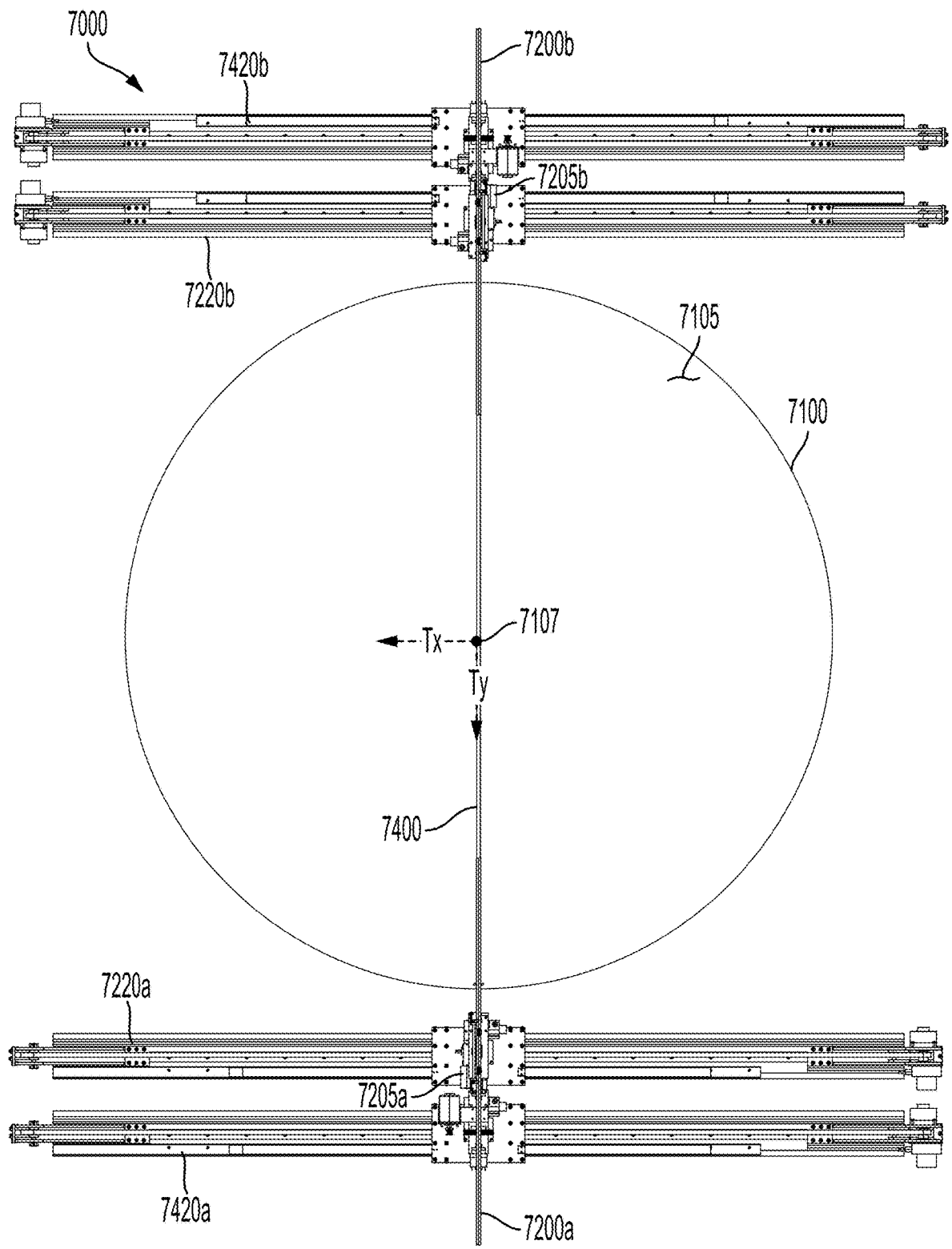
FIG. 5 is a top view of FIG. 4.

Taking FIGS. 3-5 together, in implementations, the folding device 7000 includes one or more of the features described with regard to the embodiments of FIGS. 1-3. In implementations, the device 7000 comprises a rotatable platform 7100 configured to receive a deformable article thereon for folding to a packing state that is at or within the bounds of predetermined outer dimensions. The rotatable platform 7100 comprises a substantially flat, smooth surface 7105. As indicated in FIG. 4, a coordinate system can include orthogonal X-axis "Tx" and Y-axis "Ty" coordinates defined by the planar surface 7105 and a Z-axis "Tz" substantially orthogonal to the planar surface 7105 and the X-axis "Tx" and Y-axis "Ty". In implementations, the surface 7105 is continuous. Implementations of the continuous surface 7105 can include one or more seams. Alternatively, the rotatable platform 7100 can be monolithic. In implementations, the device 7000 includes at least one clamp 7200, 7200a, 7200b configured to clamp the deformable article to the surface 7105 in a lowered position. The at least one clamp 7200, 7200a-b is configured to raise and lower from the surface 7105 of the rotatable platform and slidably move parallel to the surface 7105. In implementations, the at least one clamp 7200, 7200a, 7200b is configured to be moved in Tx, Ty, and Tz directions by drive motors in operable communication with corresponding clamp drives, e.g. X axis drive 7230, 7230a-b, Y axis drive 7235, 7235a-b, and Z axis drive 7240, 7240a-b (FIG. 3). In implementations, the at least one clamp 7200, 7200a-b can be an elongated rod. In other implementations, the at least one clamp 7200, 7200a-b can be an elongated flat, spatula-like bar. In implementations, the at least one clamp 7200 can comprise two retractable clamps 7200a, 7200b as shown in FIGS. 4 and 5, configured to be simultaneously controlled for synchronized, coordinated movement.

Figure 6:
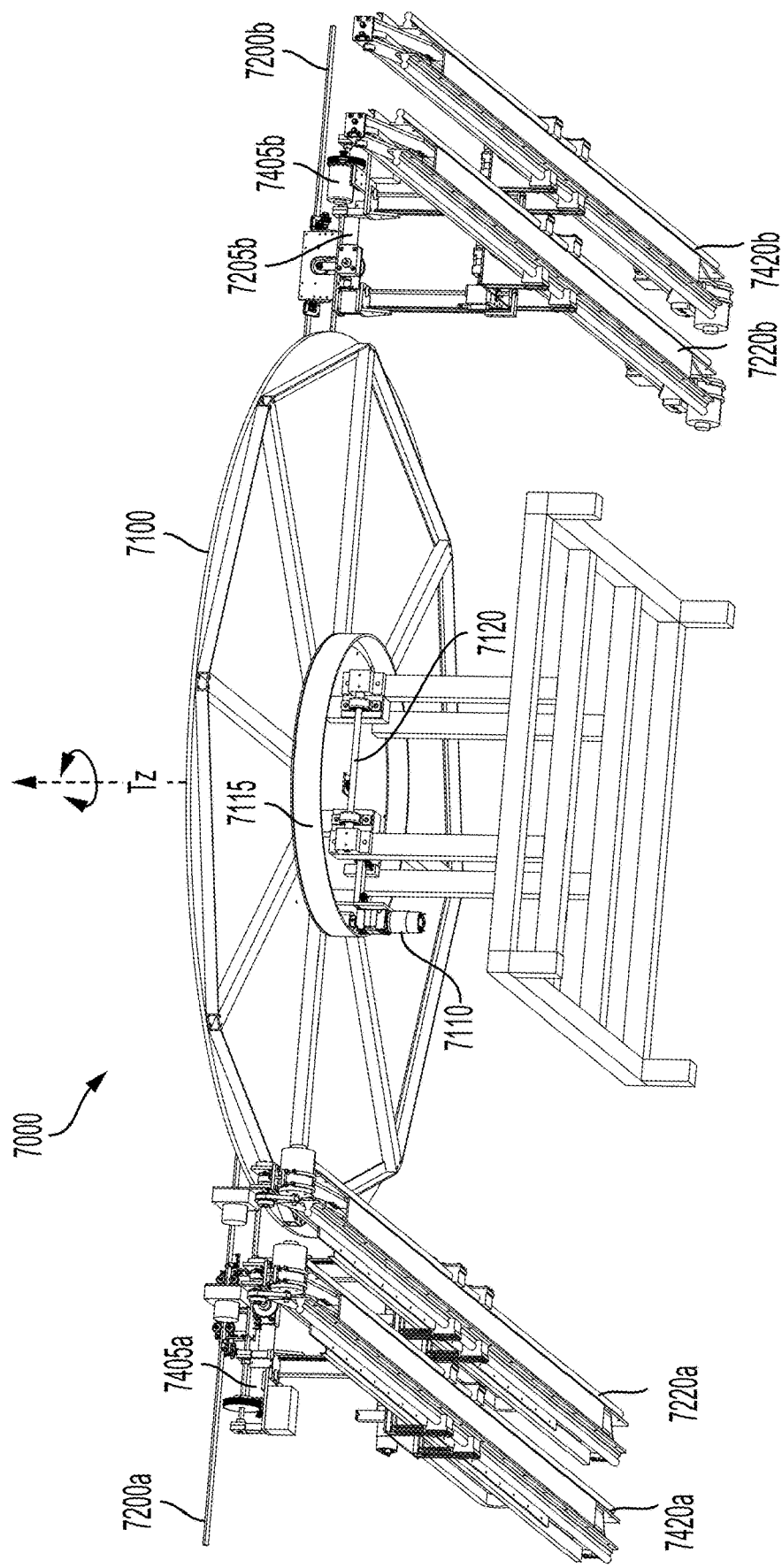
FIG. 6 is a perspective bottom view of FIG. 4.
Figure 7:
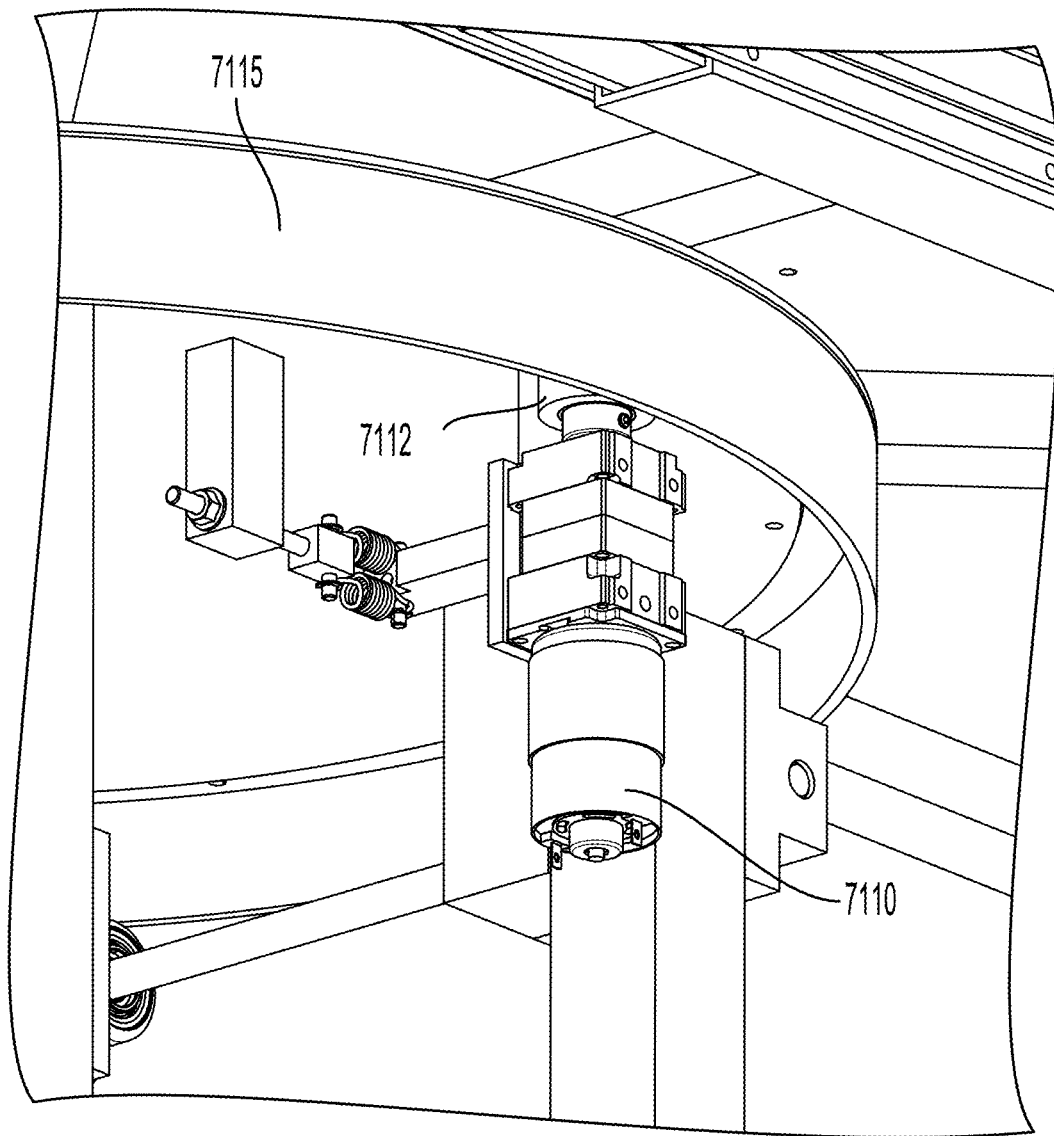
FIG. 7 is a magnified partial view of FIG. 6 showing a drive motor for rotating a platform of the folding device.

As shown in FIGS. 6 and 7, the device 7000 includes a table drive motor 7110 configured to engage the rotatable platform 7100 and rotate the platform 7100 about a central axis. The table drive motor 7110 is driven by a motor drive 7130 (FIG. 3) in operable communication with the controller 7005. In implementations, the table drive motor 7110 comprises a driven friction wheel 7112 configured to engage a table drive ring 7115 centered about a central axis oriented in the direction of the Z-axis Tz and through a center 7107 of the platform 7100 as shown in FIG. 4. The table drive motor 7110 can include an encoder 7145 for determining rotational position of the rotatable platform 7100. In implementations, the rotatable platform 7100 is at least one of belt driven and chain driven and comprises a central shaft about which the platform 7100 rotates. The central shaft comprises at least one shaft encoder 7155 for determining a rotational position of the rotatable platform. The controller 7005 is configured to receive signals from at least one of the encoder 7154, 7155 and a positional feedback sensor (e.g., an optical sensor 7160 such as a break beam or a camera configured to detect one or more detectable fiducials, a hall sensor, etc.) for determining the rotational position such that an article on the platform 7100 can be rotated to a particular angle for at least one of clamping and folding, as will be described subsequently with regard to implementations. In implementations, the one or more encoders 7145, 7155 and sensors 7160 are in communication with a sensor interface 7140 configured to communicate with the controller 7005 via a network interface. Additionally or alternatively, the platform 7100 comprises a processor 7125 in operable communication with the motor drive 7130, the encoder 7145, 7155, one or more sensors 7160, the sensor interface 7140, and the network interface 7135 configured to communicate with the controller 7005 via wired or wireless communications.

Figure 8:
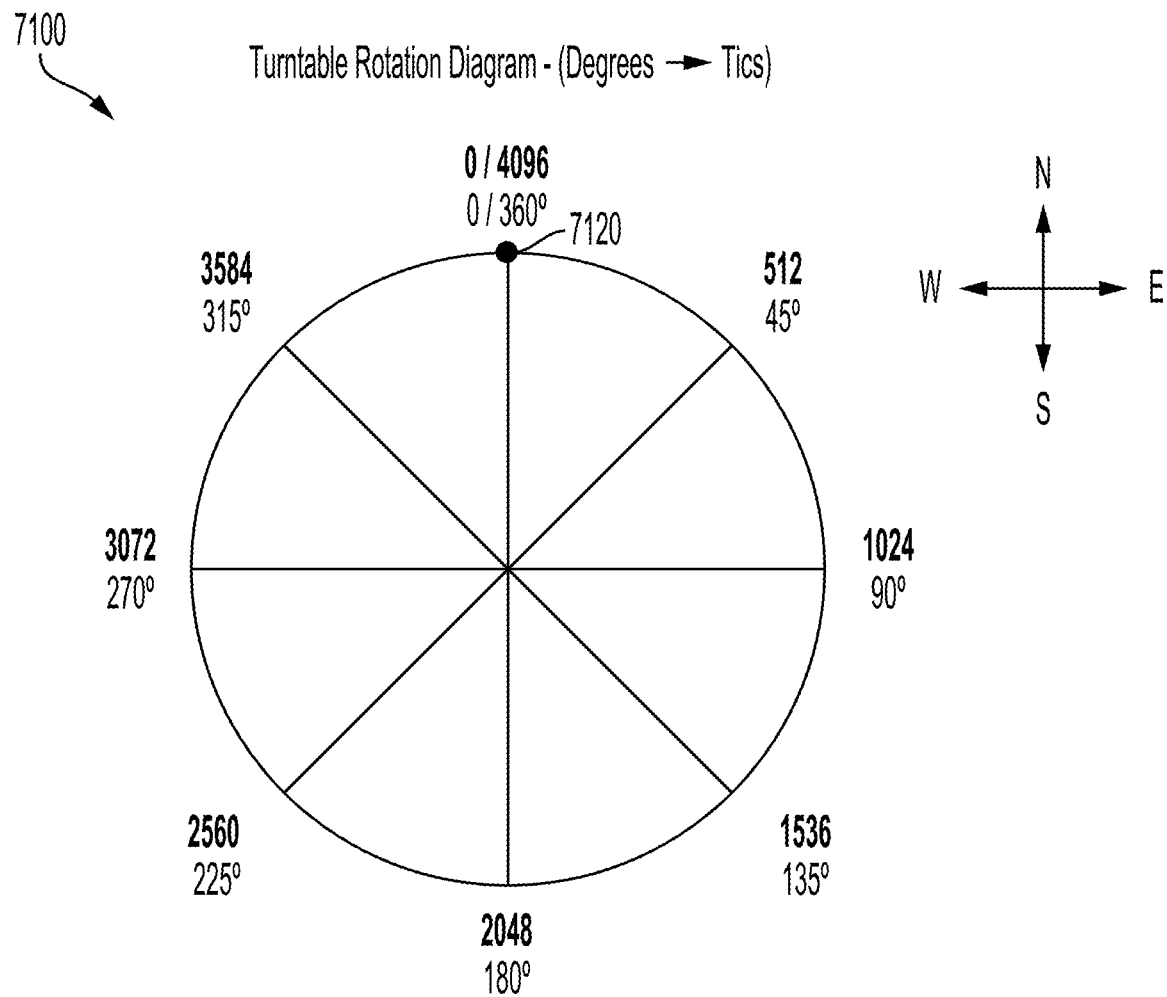
FIG. 8 is an example schematic of rotational positions of a folding platform.
Figure 9A:
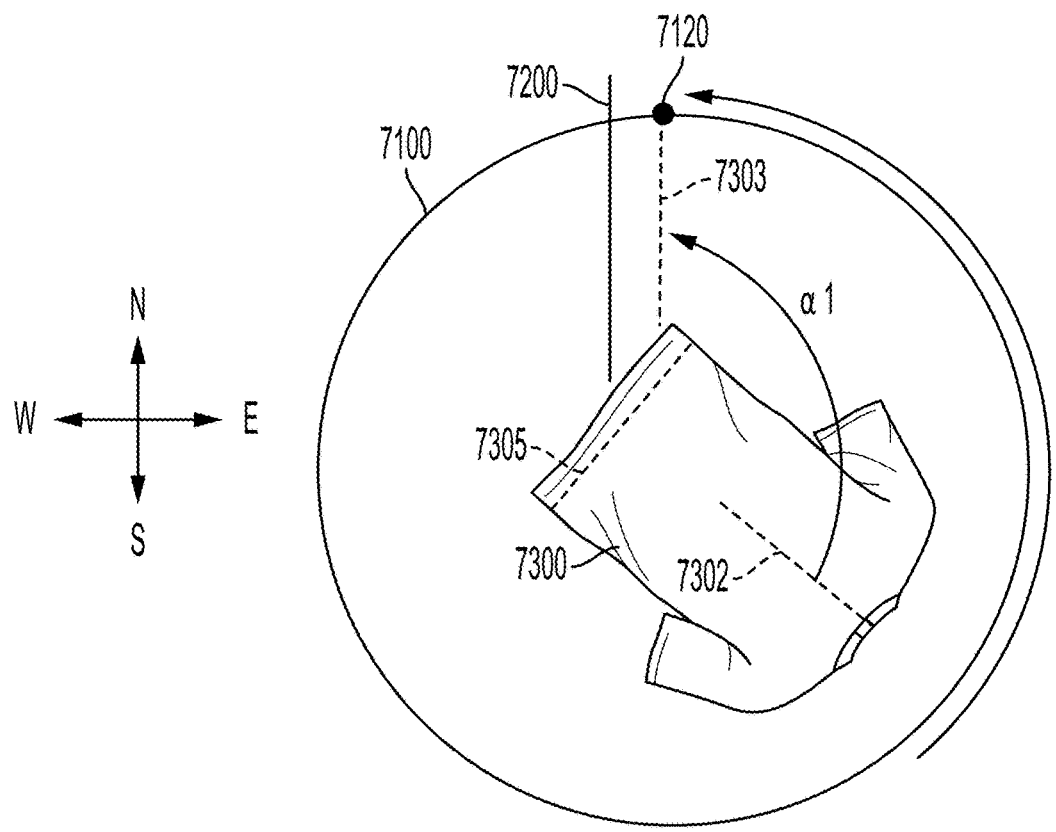
FIGS. 9A and 9B depict an example motion sequence of a rotating folding platform to orient an article thereon relative to a clamp rod.

As shown in FIG. 8, the rotatable platform 7100 can be oriented like a compass with "North" N, indicating a beginning for rotation, regardless of the position of the turntable as determined by encoder tics. The encoder tic position can inform a direction of travel (e.g., rotation) to arrive at a desired rotational position. In one implementation, a full rotation comprises 4096 tics. The number of tics in a full rotation can be specific to a particular encoder. As shown in FIG. 8, the rotatable platform 7100 can be round and a complete rotation of the rotatable platform 7100 includes rotating a north most point 7120 by 360 degrees, or, 4096 tics. For example, as shown in FIG. 9A a deformable article 7300 can be disposed on the rotatable platform 7100 such that a clothing vector 7302 is at an initial angle α1 to a radius 7303 through the northern most point 7120. As shown in FIG. 9A, rotating the platform 7100 counterclockwise until to a desired rotational position results in an angle α2 between the clothing vector 7302 and the radius through the northern most point 7120. The desired angle α2 can be selected to align the clothing vector and/or a fold line 7305 with a clamp rod 7200 as will be described subsequently with regard to implementations. As shown in FIGS. 6 and 7, the table drive motor 7110 can rotate the rotatable platform 7100 such that the at least one clamp rod 7200, 7200a-b aligns with a first clamp position 7305 on the deformable article 7300. The first clamp position 7305 can be, for example, a fold line on the deformable article 7300, along which at least a portion of the article 7300 is folded.

Figure 10A:
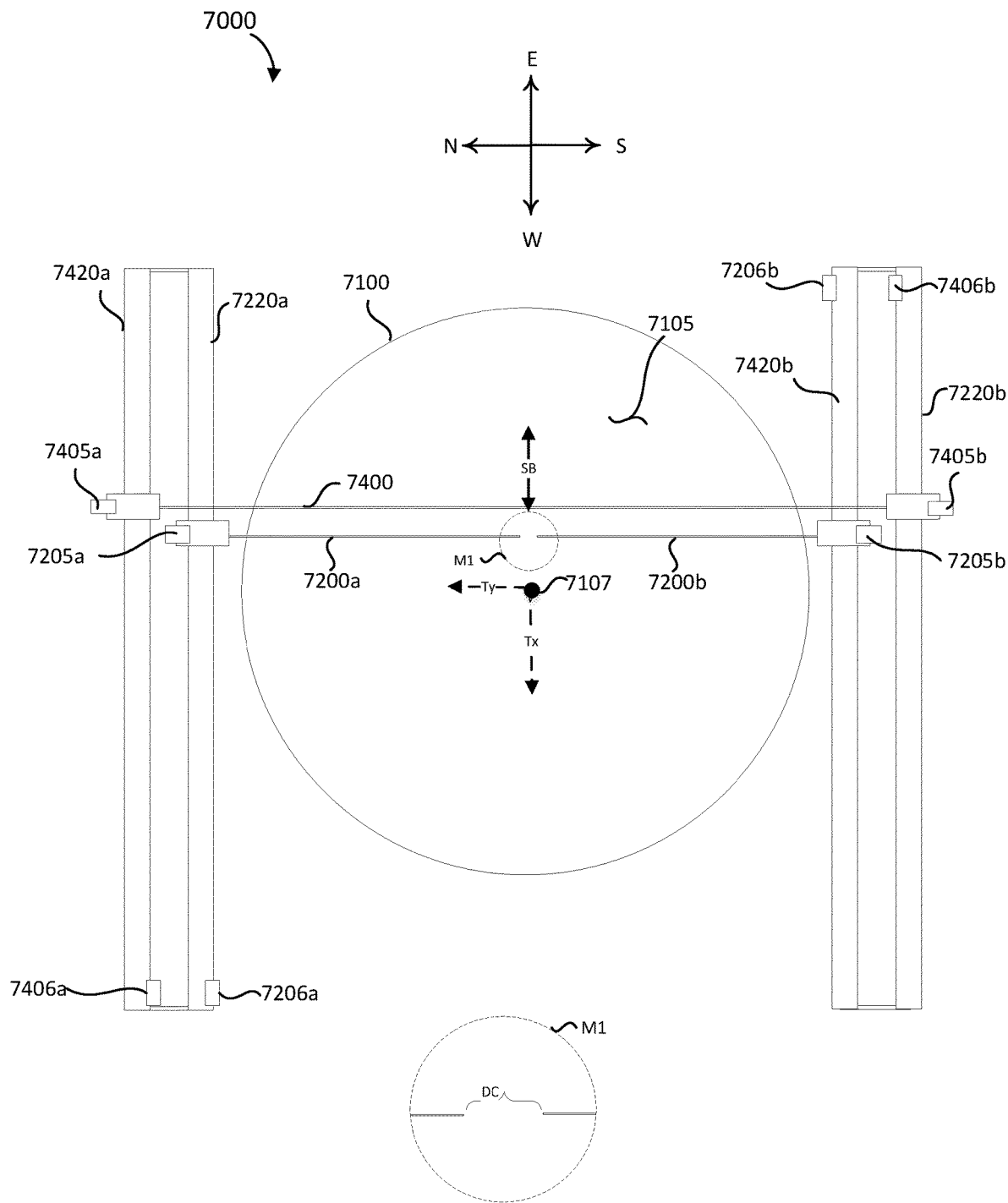
FIG. 10A depicts a top view of an example a folding device.
Figure 10B:
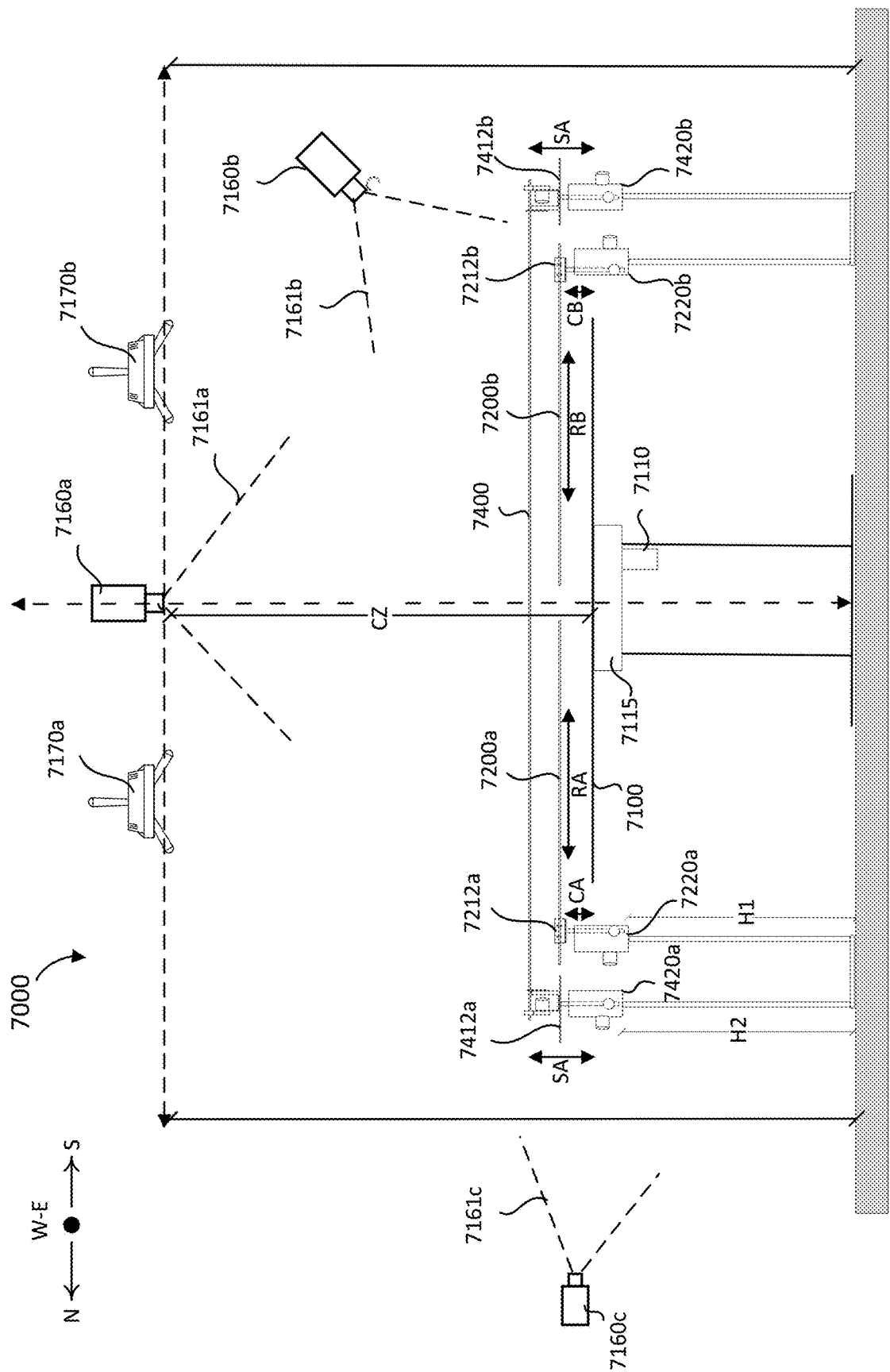
FIG. 10B depicts a side view of the example of a folding device of FIG. 10A.
Figure 11A:
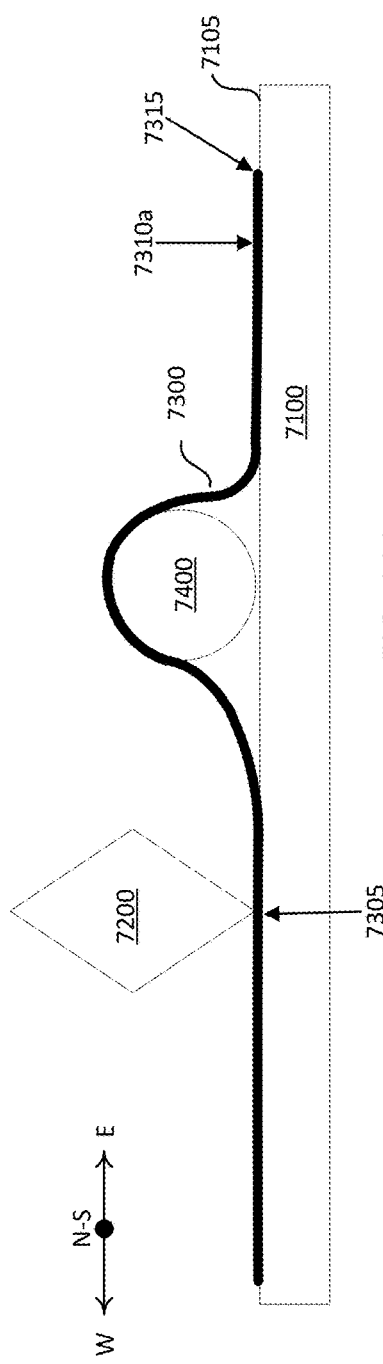
FIG. 11A depicts an example schematic side view of movable rods the folding device of FIGS. 10A-B in a starting position for folding an article over a clamp rod.
Figure 11B:
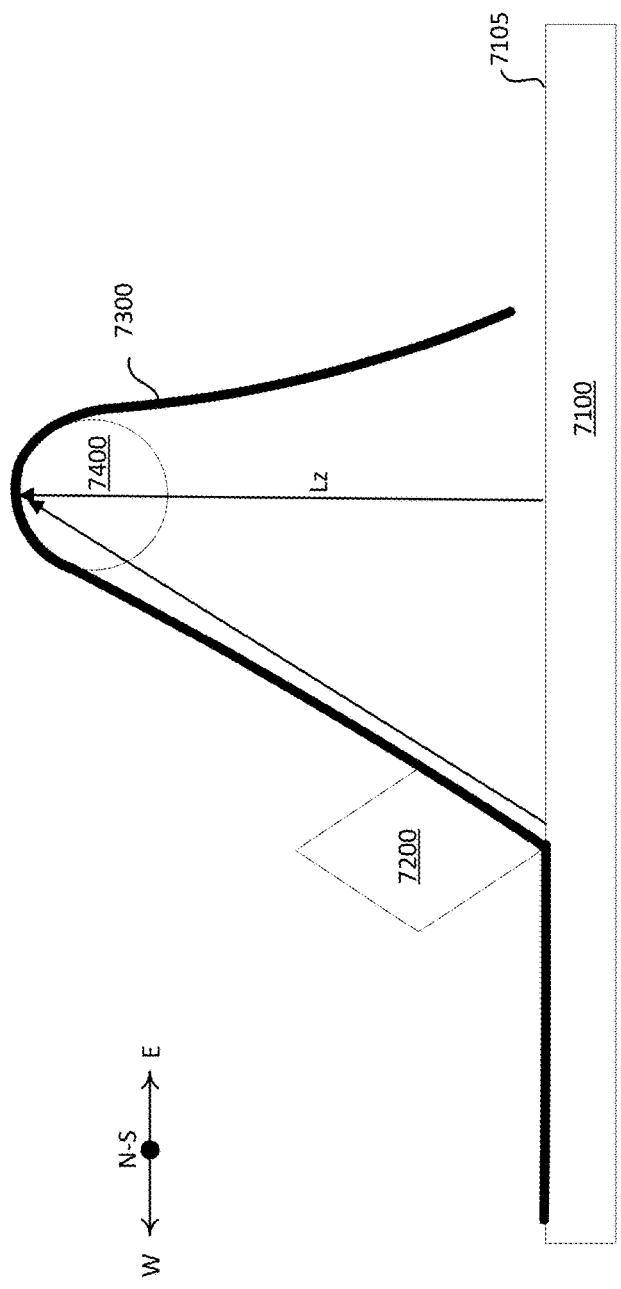
FIG. 11B depicts an example of a raised article position during a folding sequence of folding a deformable article over a clamp rod.

As shown in FIGS. 4-5 and 10A-B, the device 7000 also includes at least one movable sweep rod 7400 disposed parallel to the at least one clamp rod 7200, 7200*a-b*. In implementations, the at least one movable sweep rod 7400 is configured to be moved in at least Tx and Tz directions (e.g., in the direction of double arrows SA and SB) by drive motors in operable communication with corresponding sweep drives, e.g., X axis drive 7430, 7430*a-b* and Z axis drive 7440, 7440*a-b*. Optionally, in some embodiments, the at least one movable sweep rod 7400 is configured to be moved in the Ty direction by at least one drive motor in operable communication with at least one Y axis drive. Additionally, in implementations, the at least one movable sweep rod 7400 is configured to be rotate about its longitudinal axis by a rotation motor in operable communication with a spin drive 7435, 7435*a-b*. As indicated in FIGS. 10A-B, the at least one Z-axis drive 7440 is configured to raise and lower the at least one movable sweep rod 7400 from the surface 7105 of the rotatable platform 7100, in the direction of bidirectional arrow SA. The at least one movable sweep rod 7400 is configured to slidably move parallel to the surface in the direction of bidirectional arrow SB, which aligns with an X-Axis coordinate "Tx" of the device 7000, alternatively referred to in implementations as a West "W" to East "E" axis.

Figure 12:
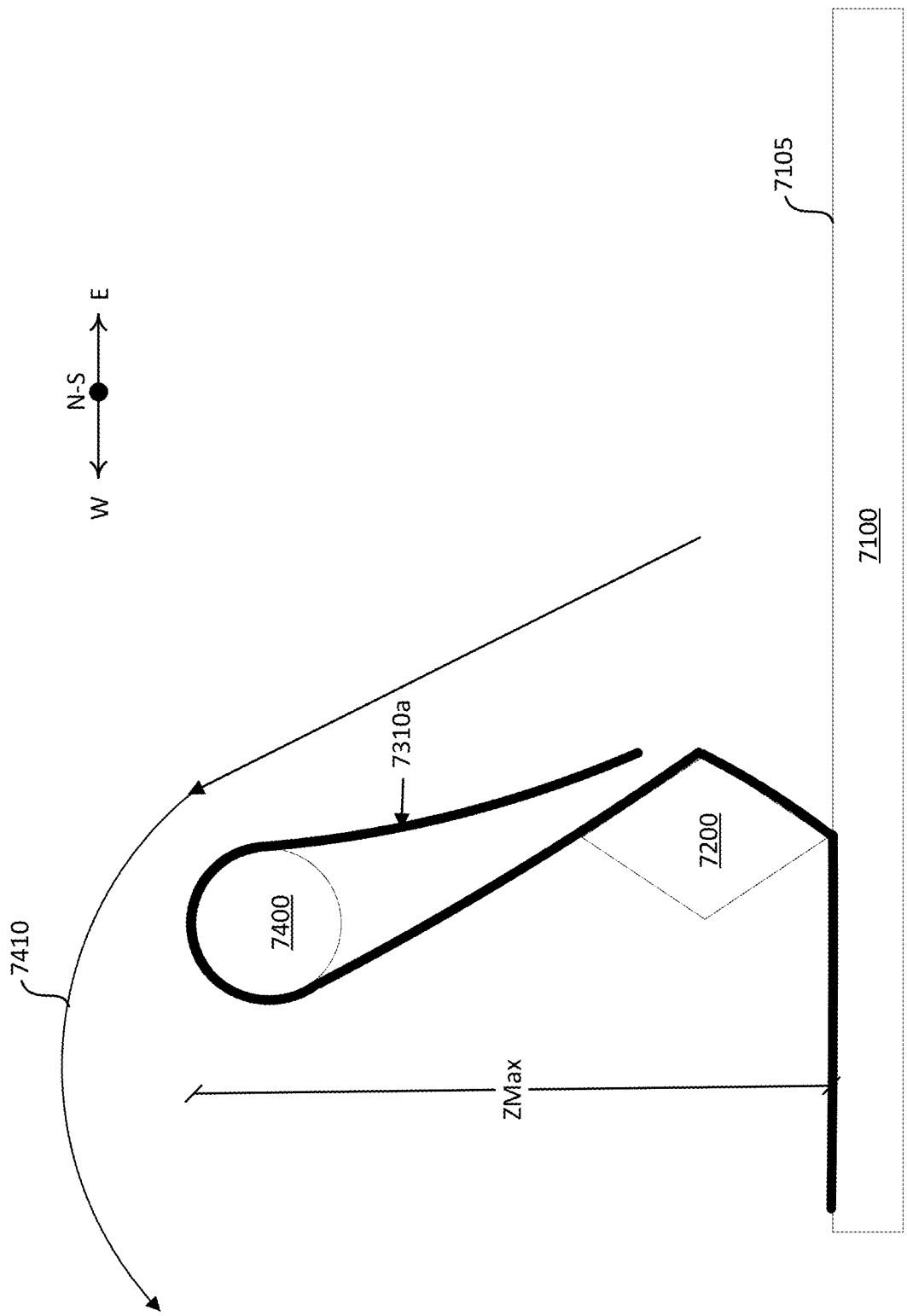
FIG. 12 depicts an example of the raised article of FIG. 11B being folded over the clamp rod.
Figure 13:
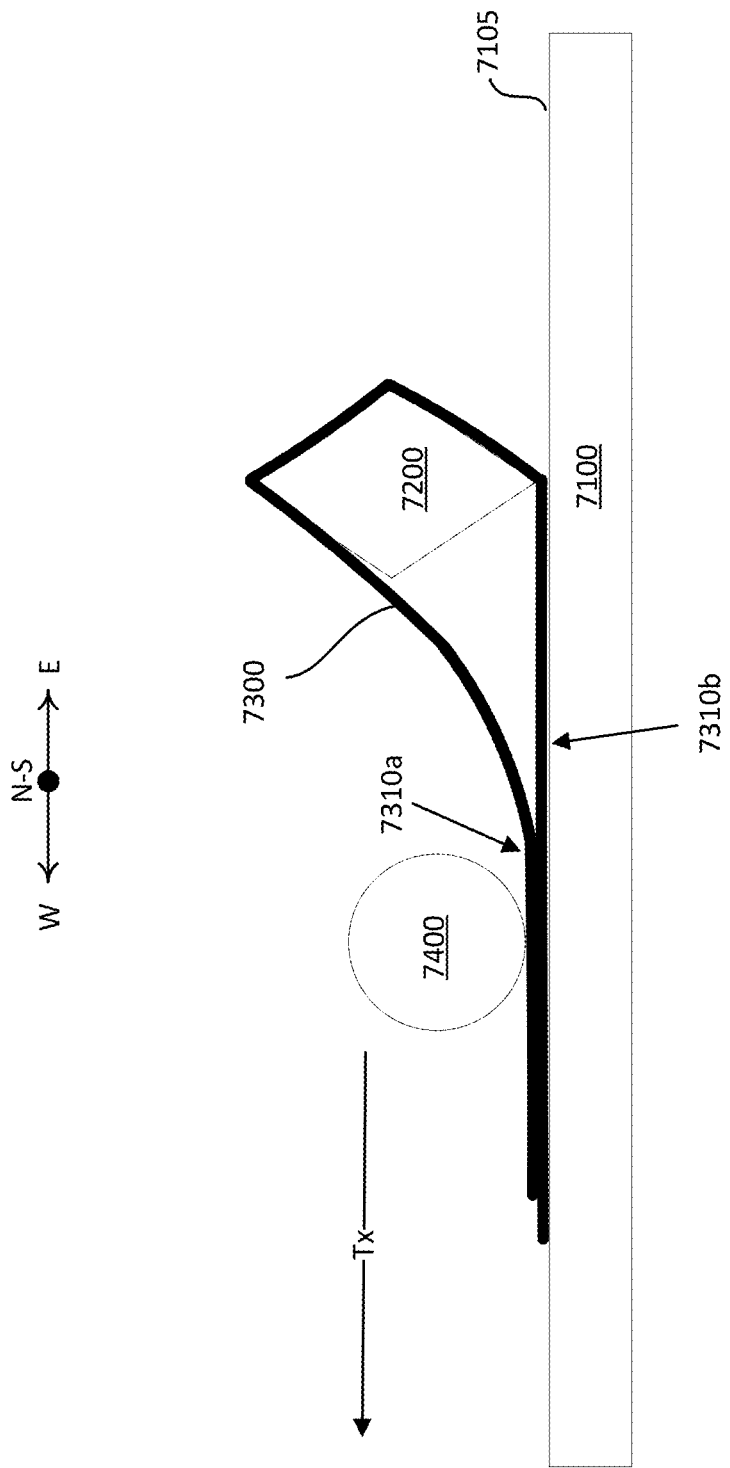
FIG. 13 depicts an example of the article of FIG. 12 being folded over the clamp rod while a sweep rod moves to disengage from the folded article.
Figure 14:
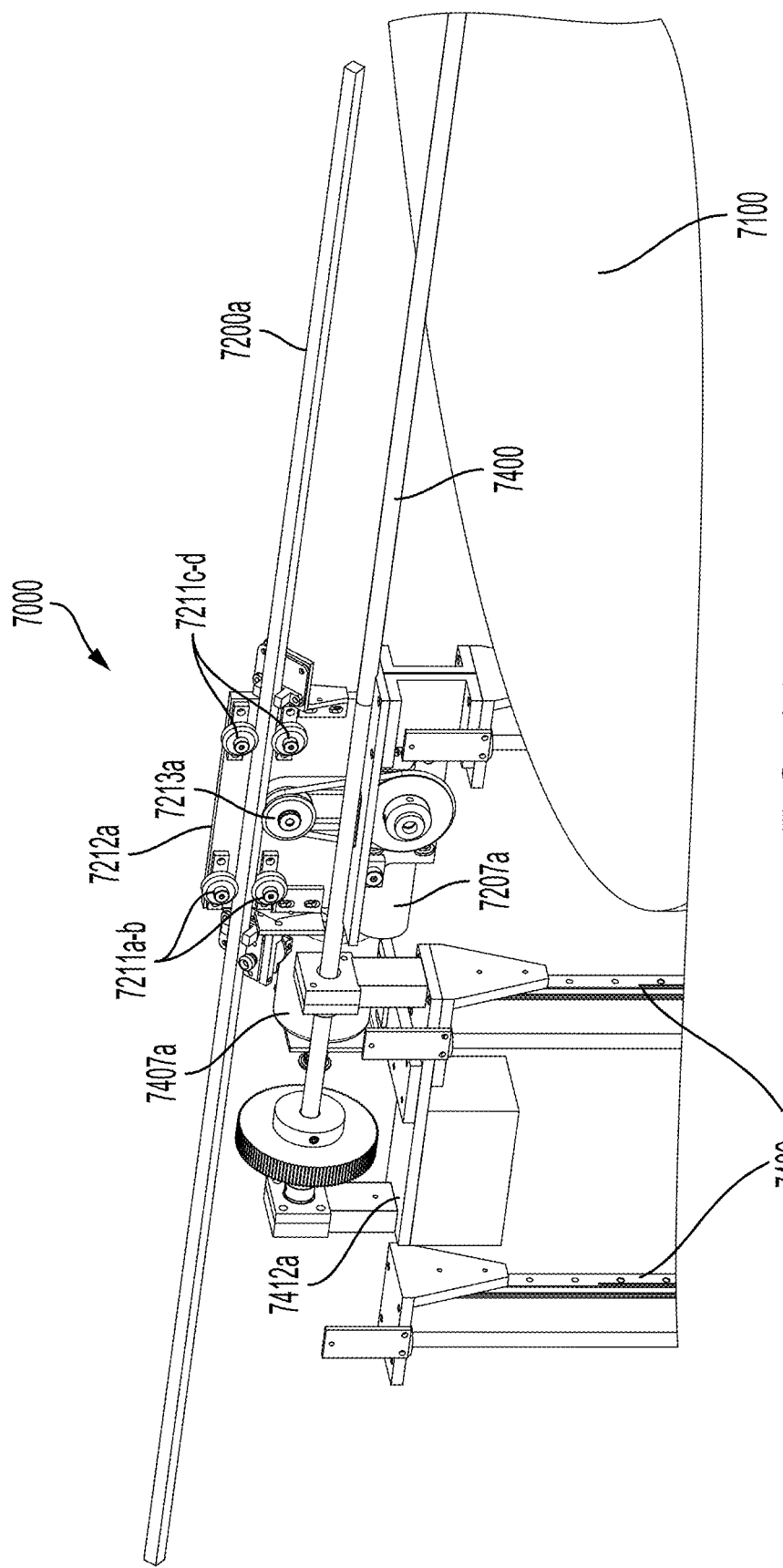
FIG. 14 depicts a close-up partial view of example clamp and sweep rod carriers of the folding device.
Figure 15:
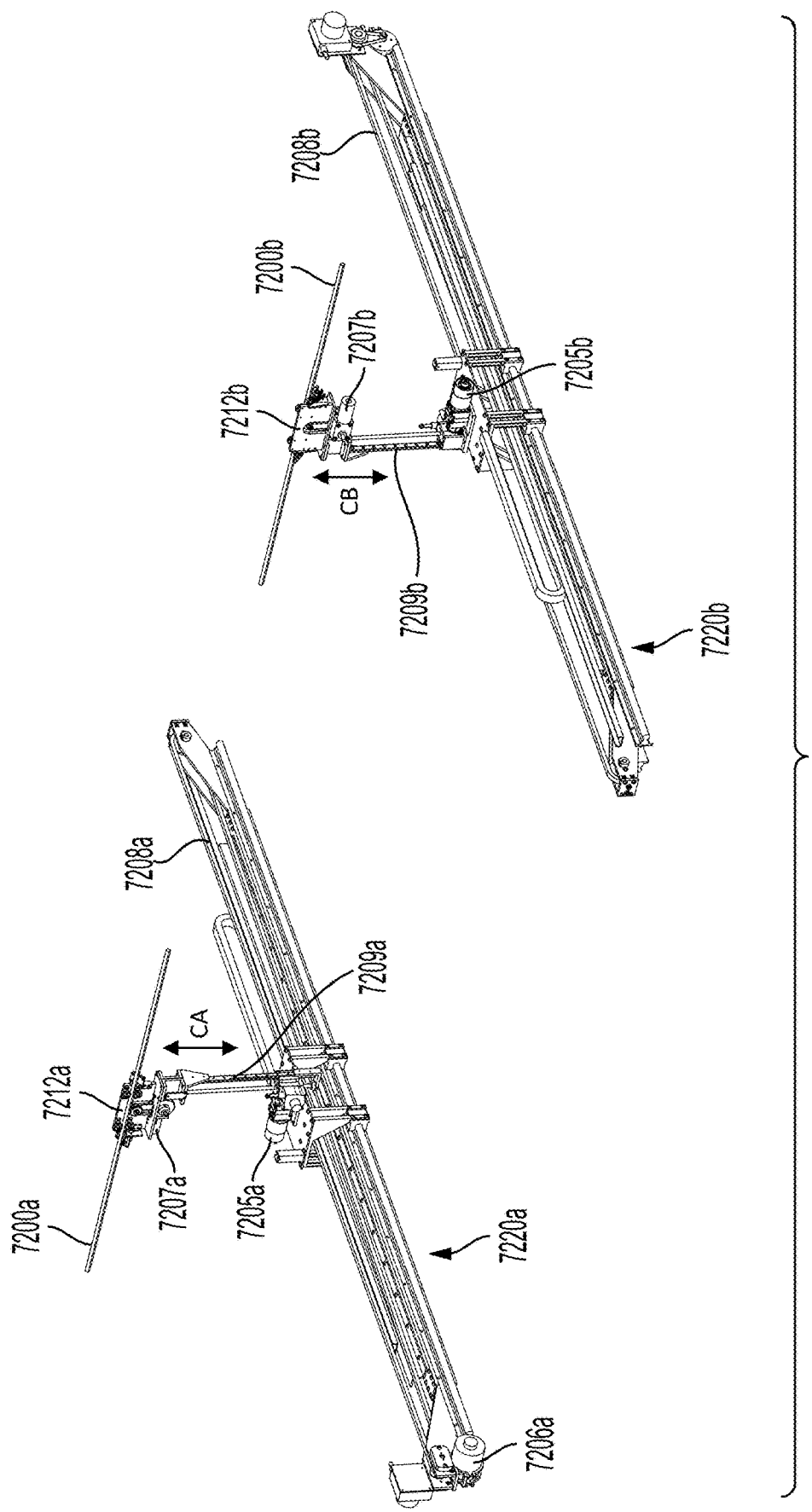
FIG. 15 depicts a perspective view of example clamp rods, clamp carriers, and claim support rails of the folding device.

As shown in FIGS. 11A-13, under the operable control of the at least one controller 7005, the at least one movable sweep rod 7400 is configured to slide under an unclamped portion 7310 of the deformable article 7300, and lift the unclamped 7310 portion above the at least one clamp rod 7200. For example, as shown in FIG. 11B, the at least one movable sweep rod 7400 is configured lift the unclamped portion 7310*a* of the deformable article 7300 to a height of Lz above the surface 7105 of the rotatable platform 7100 while the at least one clamp rod 7200 is clamped to the surface 7105 at the first clamp position 7305. As shown in FIGS. 12 and 13, the at least one movable sweep rod 7400 is configured to pass, or carry, the unclamped portion 7310*a* over the at least one retractable clamp rod 7200, and dispose the lifted unclamped portion 7310*a* to a resting position atop another portion 7310*b* of the deformable article 7300 while continuing to move in the X-axis direction Tx (East to West in FIG. 13) to disengage from the article. As depicted in FIG. 12, in implementations, the at least one movable sweep rod 7400 can move in an arc 7410 while passing the unclamped portion 7310*a* deformable article 7300 over the at least one clamp rod 7200 at a peak height ZMax above the surface 7105 of the platform that clears the clamp rod and enables the article to wrap around the clamp rod. In implementation, the article wraps around the clamp rod 7200 in tension during folding for a tightest possible fold bend radius that ensures a stable fold.

Carrying the unclamped portion 7310*a* in an arc 7410 ensures the raised portion 7310*a* of the article 7300 is passed up, over, and away from the clamp to land atop an unclamped portion 7310*b* of the article disposed on the rotatable platform in as tightly folded a layering as possible, wrapping the folded unclamped portion 7310*a* around the clamp rod 7200. Laying the folded layers as flat as possible ensures the final folded garment will be stackable in a packing queue without toppling and/or unfolding. As will be described subsequently, with regard to implementations of methods of folding, at least one of article thickness and stiffness are considered in determining where to place a clamp rod 7200 such that the unclamped portion 7310*a* passed over the clamp does not resist folding and spring back to an unfolded state. In implementations, thicker and stiffer fabrics require clamping further into a garment from the edge than thinner, less stiff fabrics. In implementations, a default minimum clamp position from an edge (e.g., 5 cm, 5.5 cm, 6 cm, 6.5 cm, 7 cm, 7.5 cm, 8 cm, 8.5 cm, 9 cm, 9.5 cm, 10 cm, 10.5 cm, 11 cm, 11.5 cm, 12 cm, 12.5 cm) ensures successful folding regardless of fabric type or thickness.

As previously described, the folding device 7000 is configured to fold a plurality of types of deformable articles. In implementations, the received deformable article is substantially extended. For example, a preceding robot in the process line (e.g., a repositioning robot 6000) can manipulate each of the deformable articles to spread each the article 7300 such that all extremities, arms, and legs are fully spread or substantially spread to a flat or substantially flat condition. A substantially flat condition can include a deformable article 7300 having in a range of 1 to 5 tucked or twisted edges or corners of the article that can be resolved and/or accommodated by smoothing and folding processes executed by the folding robot 7000. Additionally or alternatively, in implementations, flat or substantially flat can include articles comprising a plurality of surface wrinkles that can be resolved and/or accommodated by smoothing and folding processes executed by the folding robot 7000.

In implementations, the deformable article 7300 is one of a plurality of deformable laundry articles comprising two or more article types of at least one of different sizes and different shapes. For example, the deformable article 7300 can be one of a plurality of laundry articles comprising a single load of household laundry. Household laundry can comprise many types of bodily worn garments and cloth articles requiring washing (e.g., sheets, tablecloths, curtains, bath rugs). These garments and articles are deformable meaning they do not hold their shape. Because garments and other cloth articles are supple, they deform when manipulated. Different items of the plurality of laundry articles may have different thickness and stiffness values depending on the material and style of the item. For example, a woven bathmat will be stiffer than a silk blouse. The plurality of laundry articles in a single load of household laundry also can comprise many different laundry articles each having a different weight. Additionally, the size of each deformable article 7300 of the plurality of laundry articles can vary greatly within a single load of laundry, such that folding each deformable article 7300 requires maneuvers particular to each article. As will be described subsequently with regard to implementations, the controller 7005 will determine a folding process based on a determination of at least one of article type (e.g., shirt, pants, sock, bathrobe, zippered top, hooded sweatshirt, blouse, button front shirt, sweater, baby clothes, coats, blankets, coats, curtains, bed sheets, and towels), article size, article material thickness, material stiffness, receiving box remaining available volume, one or more predetermined target final folded area footprint dimensions, and dynamical changing responses to each sequential maneuver.

In implementations, each of the two or more article types comprises a longest dimension of between about 4 cm to 500 cm. Accordingly, in examples, the rotatable platform 7100 has a shortest dimension in a range of between about 0.5 m to 5 m. In examples, such as those of the preceding examples, the rotatable platform 7100 is circular and the shortest dimension is a diameter. In implementations, the diameter is in a range of about 2.4 m to 2.6 m. In examples, the platform comprises a continuous flat surface. The continuous flat surface 7105 can be opaque. In implementations, the continuous flat surface 7105 comprises at least one of a solid color and pattern. In implementations, the flat surface 7105 can include one or more fiducial markers affixed to the flat surface 7105 at known positions about z-axis Tz for orienting the deformable article 7300 on the rotatable platform 7100. For example, the fiducial marker can be one or more visible markers (e.g., a line, a dot, a barcode tag, a letter, a number, a refractory disc, etc.) detectable by an optical sensor disposed adjacent the platform 7100 for sensing detectable fiducial markers on the surface 7105 of the platform 7100. The one or more sensors can output a signal to the controller 7005, and the controller can determine a rotational position of the platform 7100 based on the received signal indicative of a pose of one or more sensed fiducial markers relative to a known rotation position (e.g., a "home" position, such as a 0-degree rotational position). In implementations, the rotatable platform 7100 comprises a cross sectional thickness (in the direction of Tz) in a range of between about 0.5" to 2" (e.g., in a range of between about 1 cm to 5 cm). The rotatable platform 7100 comprises and/or is manufactured from at least one of foam core, polystyrene, balsa wood, aluminum, aluminum honeycomb, stainless steel, sign board, bamboo, and ULTRABOARD. The rotatable platform 7100 comprises and/or is manufactured from a stiff, lightweight material that has a low inertia under rotation for more immediate response to commands to rotate and stop in precise alignment to one or more of the clamp rod 7200, the sweep rod 7400, and another element, such as a folding blade 7650 as will be described subsequently with regard to implementations.

In examples, the table drive motor 7110 is configured to rotate the platform 7100 at a fastest speed in a range of between about 30 RPM to 120 RPM. The table drive motor 7110 can be reversible and configured to rotate the platform 7100 in at least one of a forward direction and reverse direction depending on the most efficient rotation (e.g., a least amount of rotational distance) for orienting a received article with the at least one clamp rod 7200.

Returning to FIGS. 10A and 10B, in implementations, the folding device 7000 further comprises a first pair of parallel support rails 7420a, 7220a disposed adjacent the platform 7100. The at least one clamp rod 7200 is configured to engage a first carrier 7212a slidably disposed on an inner one 7220a of the pair of parallel support rails and the at least one sweep rod 7400 is configured to engage a second carrier 7412a slidably disposed on an outer one 7420a of the parallel rails. Alternatively, the at least one clamp rod 7200 can be configured to engage the second carrier slidably disposed on the outer one of the pair of parallel support rails and the at least one sweep rod can be configured to engage the first carrier slidably disposed on the inner one of the parallel rails. As shown in FIGS. 14-15 and 18-19, in implementations, the first and second carrier 7212a, 7412a each further comprise at least one of a clamp Z-axis drive motor 7205a and a sweep Z-axis drive motor 7405a. In implementations, the at least one Z-axis clamp drive motor 7205a and the sweep Z-axis drive motor 7405a are linear drive motors configured to raise and lower the engaged at least one clamp rod 7200 and at least one sweep rod 7400 up and down, away from and toward, the surface 7105 of the platform 7100 in the direction of double arrows SA, CA and CB. In implementations, the at least one clamp rod is a pair of clamp rods 7200a-b that can operate synchronously or asynchronously, lowering to different clamp heights to accommodate uneven thicknesses of an article disposed on the platform 7100.

In implementations, the linear drive motor 7205, 7405 can operate a linear actuator 7209, 7409 including at least one of a belt, chain and sprocket, a screw drive, and a pneumatic drive. In implementations, the folding device 7000 comprises similar components on both sides of the platform, and the Z-axis drive motors 7205a-b, 7405a-b on either side of the platform 7100 are configured to be synchronously controlled for level raising and lowering the engaged respective clamp rod 7400 and one or more sweep rods 7200a-b evenly along their lengths. Alternatively, in implementations, the Z-axis drive motors 7205a-b, 7405a-b on either side of the platform 7100 can be asynchronously controlled, being operated one side at a time, for example, to accommodate clamping a particular article having a sensed uneven thickness (e.g., measured height from the surface 7105) In implementations, the Z-axis drive motors 7205a, 7405a further comprise a motor gear brake for preventing the raised sweep rod 7400 and one or more clamp rods 7200a-b from lowering in an uncontrolled and unexpected movement.

As shown in FIGS. 10A-B, and 14-15 the first carrier 7212a can be configured to cantilever the engaged at least one clamp rod 7200a above the rotatable platform 7100. Additionally or alternatively to the at least one clamp rod 7200, 7200a, 7200b being retractable and/or telescoping, as shown in FIG. 17 the first carrier 7212a can further comprise a pivot joint 7214a for tilting the engaged at least one clamp rod 7200a above the rotatable platform 7100 in the direction of arcs CRA and CRB. In examples, as shown in FIGS. 14-16A-B, the at least one clamp rod 7200, 7200a, 7200b is retractable, and the first carrier 7212a further comprises at least one friction wheel 7213a configured to engage the clamp rod 7200a for extending and retracting over the platform 7100 in the direction of double arrows RA and RB. For example, the at least one friction wheel 7213a is driven by a Y-axis drive motor 7207a in operative communication via a drive belt or other similar motion transfer mechanism. The Y-axis drive motor 7207a drives the friction wheel to rotate forward and in reverse to extend and retract the at least one clamp rod 7200a. The friction wheel engages a lower edge of the at least one clamp rod 7200, 7200a, 7200b to extend and retract the at least one clamp rod over the platform 7100 and a deformable article 7300 disposed thereon. In implementations, the at least one clamp rod 7200, 7200a, 7200b can be supported by two or more rotatable guide wheels 7211a-d for supporting and aligning the at least one clamp rod 7200, 7200a, 7200b at a fixed position parallel to the y-axis Ty. In examples, the at least one clamp rod 7200, 7200a, 7200b is telescoping and configured to extend and retract over the platform 7100.

In implementations, the first and second carriers 7212a, 7412a are configured to transit along the first pair of parallel support rails 7420a, 7220a at drive rate of between about 5 mm/s to 3 m/s in either direction parallel to the X-axis Tx. In implementations, the first and second carriers 7212a, 7412a transit at a rate in a range of between about 5 mm/s to 0.5 m/s during a folding motion. In implementations, first and second carriers 7212a, 7412a transit at a rate in a range of between about 1 m/s to 3 m/s during a stowing motion that moves the at least one clamp 7200 and sweep rod 7400 aside to provide an unimpeded volume above the platform 7100 through which one or more conveyors or arms transits to retrieve the folded laundry article. As indicated in FIGS. 10A, 15, and 18-19, the first and second carriers are driven to slide along the first pair of parallel support rails 7420a, 7220a by respective first and second X-axis drive motors 7206a, 7406a. In implementations, the X-axis drive motors 7206a, 7406a power linear actuators configured to move the first and second carriers 7212a, 7412a along their respective support rails 7420a, 7220a in the X-axis Tx direction, as indicated by double arrow SB. In implementations, the linear actuators comprise at least one of a belt, such as a timing belt 7208a-b, 7408a-b a chain, a reel and spool, and a pneumatic drive. In implementations, each of the X-axis drive motors 7206a, 7406a comprises a shaft encoder 7265a, 7465a. Additionally or alternatively, each of the support rails 7420a, 7220a comprises a limit switch 7270, 7470 for determining a starting, or home, position of each respective carrier 7212a, 7412a and an incremental position encoder 7260, 7460 for subsequently tracking a location of each carrier 7212a, 7412a along their respective support rail 7420a, 7220a during folding and smoothing operations.

In implementations, as shown in FIGS. 4-6 and 10A, the folding device 7000 further comprises a second pair of parallel support rails 7420b, 7220b disposed parallel to the first pair of parallel support rails 7420a, 7220a and adjacent the rotatable platform 7100 such that the rotatable platform 7100 is disposed between the first pair of parallel support rails 7420a, 7220a and second pair of parallel support rails 7420b, 7220b. The second pair of parallel support rails 7420b, 7220b comprises a second set of carriers 7212b, 7412b and X-axis drive motors 7206b, 7406b, Y-axis drive motor 7207b, and Z-axis drive motors 7205b, 7405b as described previously with regard to the first parallel support rails 7420a, 7220a and corresponding carriers 7212b, 7412b, drives, linear actuators, shaft encoders, limit switches and incremental encoders. In implementations, as shown in FIG. 10B, the first and second pairs of parallel support rails 7420a-b, 722-a-b are supported by a base such that the support rails are raised from a floor surface to a height proximate the platform 7100. In implementations, the first pair 7420a, 7220a and second pair 7420b, 7220b of parallel support rails are disposed lower than the platform 7100. Alternatively, the first pair 7420a, 7220a and second pair 7420b, 7220b of parallel support rails are disposed at the height of the platform 7100.

In implementations, the X-axis drive motors 7206a-b of the at least one clamp rod 7200, 7200a-b are configured to be synchronously controlled on both sides of the platform 7100 to maintain the carrier ends of the at least one clamp rod 7200 at matching positions along their respective rails and therefore in line with one another along a Y-axis Ty. In implementations in which the at least one clamp rod 7200, 7200a-b is a single rod, the synchronized control of the X-axis drive motors 7206a-b prevents an uneven motion of the carrier ends that would result in twisting the unitary clamp rod 7200. Similarly, the X-axis drive motors 7406a-b of the sweep rod 7400 are configured to be synchronously controlled on both sides of the platform 7100 to maintain the carrier ends of the at least one clamp rod 7200 at matching positions along their respective rails and therefore in line with one another along a Y-axis Ty.

In implementations, as shown in FIGS. 10A, 10B, 15 and 17, the at least one clamp rod 7200 comprises a first clamp rod 7200a engaged with the first carrier 7212a and a second clamp rod 7200b engaged with a third carrier 7212b slidably engaged with one of the second pair of support rails 7420b, 7220b. The third carrier 7212b can be engaged with an inner one 7220b of the second pair of parallel support rails. Alternatively, the third carrier 7212b can be slidably engaged with an outer one 7420b of the second pair of parallel support rails. Under operative control of the at least one controller 7005, the X-axis drive motors 7206a-b of the first and second clamp rods 7200a-b can be configured to transit synchronously the first and second clamp rods 7200a-b along their respective support rails 7220a-b in an X-axis Tx direction (e.g., the direction of double arrow SB). Alternatively, the first and second clamp rods 7200a-b can be configured to slide asynchronously in an X-axis Tx direction, for example, when clamping an article in more than one location simultaneously or when clamping with only of the first and second clamp rods 7200a-b and stowing the other out of the way of the sweep rod 7400 during a folding motion. Under operative control of the at least one controller 7005, the Y-axis drive motors 7207a-b of the first and second clamp rods 7200a-b can be configured to extend and retract the first and second clamp rods 7200a-b synchronously along the Y-axis Ty direction (e.g., the direction of double arrows RA and RB). A central longitudinal axis of each of the first and second clamp rods 7200a, 7200b can align with a shared axis such that the rods align end to end over the platform 7100. As shown in the magnified portion of FIG. 9A, the first and second clamp rods 7200a-b comprise a gap DC therebetween of between about 0 to 50 mm in a fully extended position. In implementations, the first and second clamp rods 7200a-b can extend to allow the sweep rod 7400 to pass over the first and second clamp rods 7200a-b while moving along the X-axis Tx direction.

In implementations, the at least one clamp rod comprises a single piece clamp rod engaged with the first carrier and a third carrier slidably engaged with an inner one of the second pair of parallel support rails such that the single clamp rod extends across the entire rotatable platform. The single piece clamp rod can be retractable and the first carrier can further comprise at least one friction wheel configured to engage the clamp rod for extending and retracting over the platform. The at least one clamp rod can be telescoping and configured to extend and retract over the platform. In examples of at least one of a retractable and telescoping single clamp rod, the third carrier can be configured to selectively receive and release the single clamp rod when fully extended. In examples, the first carrier further comprises a pivot joint for tilting the engaged at least one clamp rod above the rotatable platform and the third carrier is configured to selectively receive and release the single clamp rod when tilted to a lowered position.

In implementations, the at least one sweep rod comprises a first sweep rod configured to engage with the second carrier and a second sweep rod configured to engage with a fourth carrier slidably engaged with one of the second pair of parallel support rails. In examples, the fourth carrier is slidably engaged with an outer one of the second pair of parallel support rails. In examples, the fourth carrier is slidably engaged with an inner one of the second pair of parallel support rails. In implementations, as shown in FIGS. 4-6, 10A-B, and 18-19, the at least one sweep rod 7400 comprises a single sweep rod 7400 engaged with the second carrier 7412a slidably engaged along an outer support rail 7420a of the first pair of parallel support rails and a fourth carrier 7412b slidably engaged with an outer support rail 7420b of the second pair of parallel support rails, the single sweep rod 7400 extending across the entire rotatable platform 7100. Additionally or alternatively, the parallel support rails can comprise three or more rails on opposing sides of the platform 7100. For example, a third rail or pair of rails (one on each side of the platform) can support one or more of a pin point clamp, a robotic arm, a rotatable blade (as will be subsequently described with regard to implementations), and a scoop conveyor for retrieving a folded article from the surface of the platform 7100.

Figure 18:
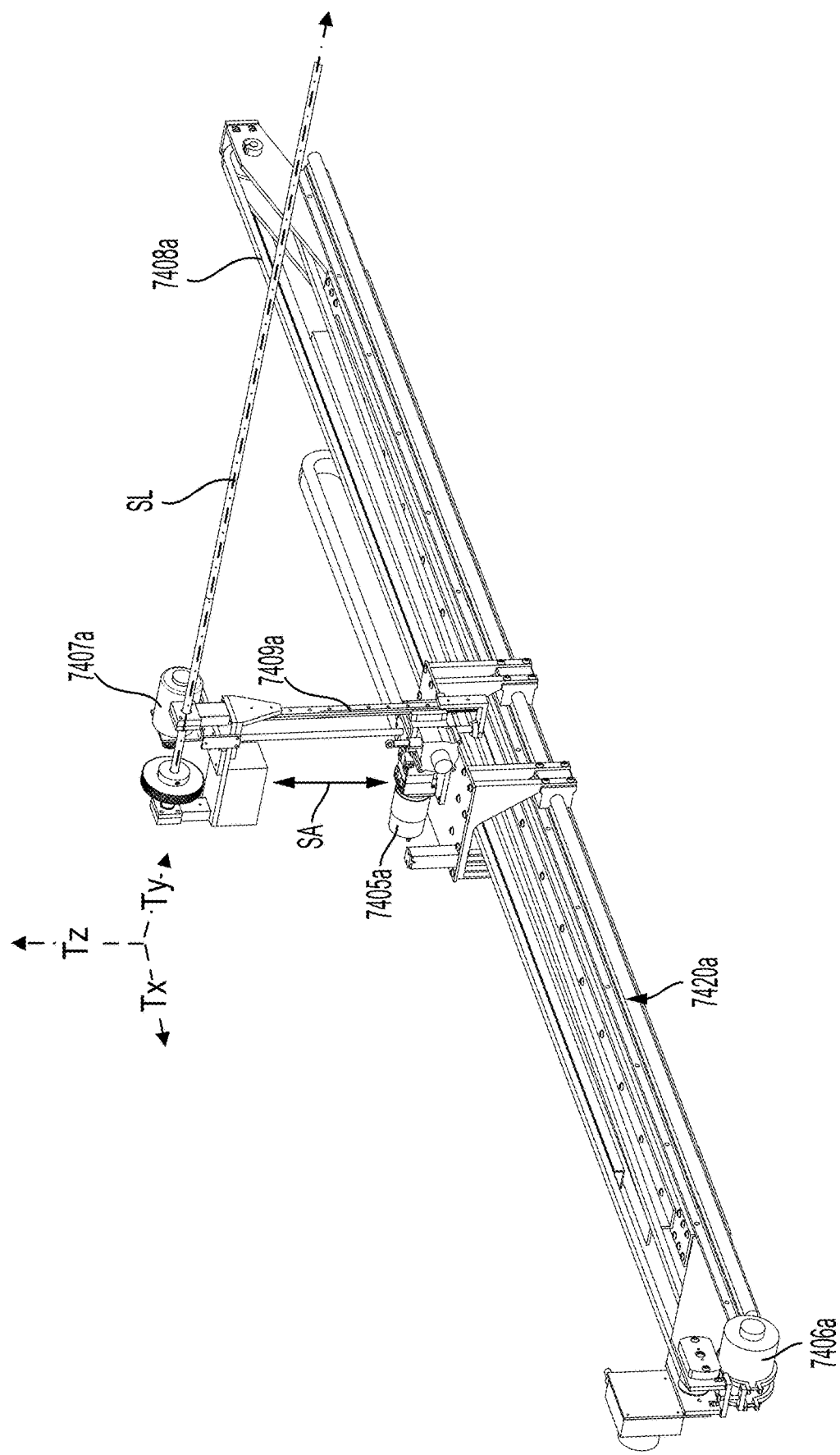
FIG. 18 depicts a close-up partial view of an example clamp rod, clamp rod carrier, clamp rod support rail, and drive motors of the folding device.
Figure 19:
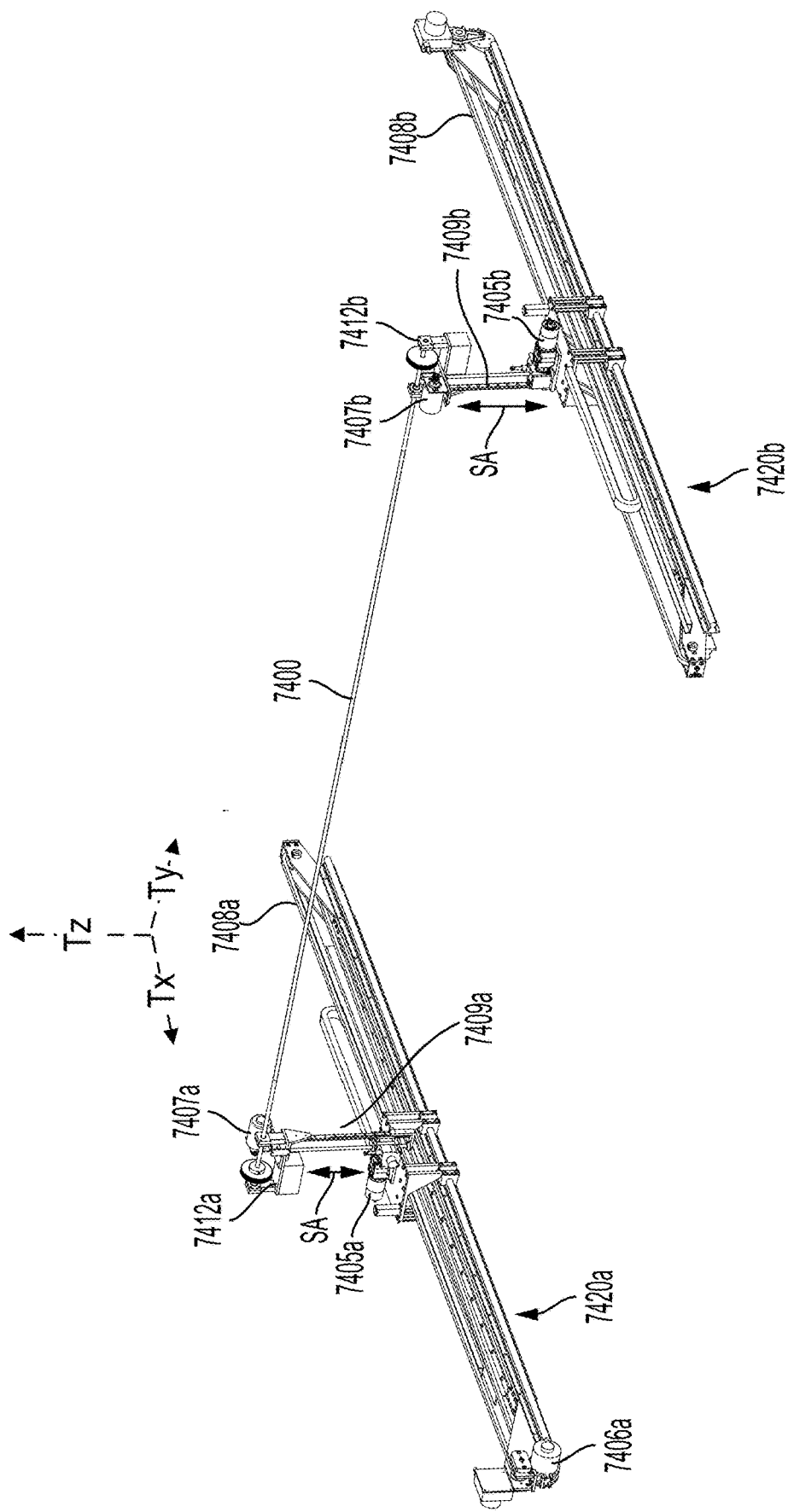
FIG. 19 depicts the example clamp rod of FIG. 18 supported by a pair of carriers and support rails.

In implementations, as shown in FIGS. 18 and 19, the folding device 7000 further comprises at least one spin drive motor 7407, 7407a, 7407b operating under the control of the spin drive 7435. The spin drive motor 7407, 7407a-b is configured to rotate (e.g., spin) the at least one movable sweep rod 7400 about a longitudinal axis at least one of parallel to or coaxial with a longitudinal central axis SL of the sweep rod 7400 while suspended above the platform 7100 and slidably moving in an X-axis Tx direction along corresponding support rails 7420a-b. In implementations the at least one spin drive motor 7407, 7407a-b comprises a first spin drive motor 7407a disposed on the second carrier 7412a and a second spin drive motor 7407b disposed on the fourth carrier 7412b. Under operative control of the at least one controller 7005, the spin drive motors 7407a-b are configured to spin synchronously such that the entire length of the sweep rod 7400 rotates at the same revolution rate. In implementations, the spin drive motors 4707a-b each rotate a drive belt or other similar motion transfer mechanism to spin the sweep rod 7400. Rotating the entire length of the sweep rod 7400 at the same revolution rate and rotational position ensures that the rod 7400 does not twist or cause an article being swept smooth by the sweep rod 7400 to bunch by moving up or beneath the article at variable rates of rotation. In implementations, the spin motors 7407a-b are configured to engage a shaft encoder for maintaining a rotational position and such that a controller can monitor for any slip.

In implementations, as shown in FIGS. 20A-C, the at least one movable sweep rod 7400 is configured to slide under a terminal edge 7315 of an unclamped portion 7310a of the garment 7300 while rotating, as indicated by directional arrow 7411. As will be described subsequently with regard to implementations, one or more sensors 7160, 7160a-c (FIG. 10B) can be configured to detect the terminal edge 7315 for aligning a length of the at least one movable sweep rod 7400 with the length of the terminal edge such that the terminal edge tangentially contacts movable sweep rod upon contact. This tangential contact assists with rotating the terminal edge up and onto the rotating sweep rod 7400 so that the rotating sweep rod 7400 can slide beneath the article 7300 disposed on the platform. In implementations, at least one movable sweep rod 7400 rotates under the deformable article 7300 clockwise while sliding from the right of the at least one clamp rod 7200, 7200a-b to the left in the direction of arrow F1 and counterclockwise while sliding from the left of the at least one clamp rod to right, in the direction opposite arrow F1. In examples, the at least one movable sweep rod 7400 rotates in a range of about 5 to 500 RPM. In implementations, the at least one movable sweep rod 7400 rotates in a range of between about 100 RPM to 150 RPM.

In implementations, the at least one clamp rod 7200, 7200a-b and at least one movable sweep rod 7400 each comprise a shaped cross section. The shaped cross section comprises at least one of circular, rectangular, square, diamond, triangular, oval, pentagonal, hexagonal, spline, and octagonal. In examples, the shaped cross section comprises a largest dimension of between about 2 mm and 25 mm (e.g, 2 mm, 3 mm, 4 mm, 5 mm, 7 mm, 10 mm, 12 mm, 15 mm, 16 mm, 18 mm, 20 mm, 22 mm, 24 mm and 25 mm). In implementations, the at least one clamp rod 7200, 7200a-b and the at least one movable sweep rod 7400 each comprise a length of between about 1 m to 2.5 m. In implementations, a ratio of the length largest cross-sectional dimension comprises a range of between about 1000 to 1 to 2400 to 1. In one implementation, the at least one clamp rod 7200, 7200a-b comprise a square cross section comprising a height of around about 6 mm.

Figure 16A:
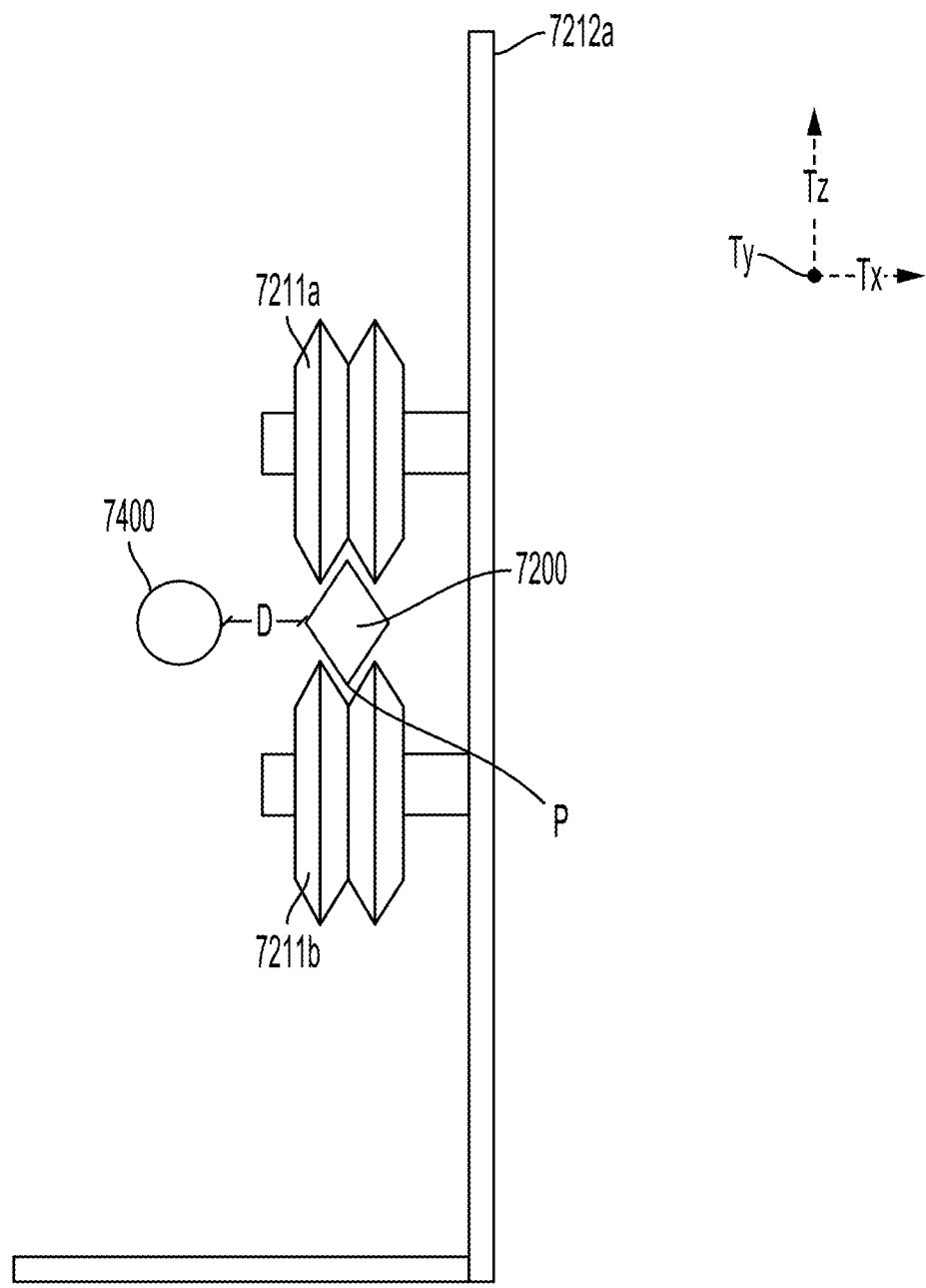
FIG. 16A depicts an end view schematic of an example clamp rod and carrier.
Figure 16B:
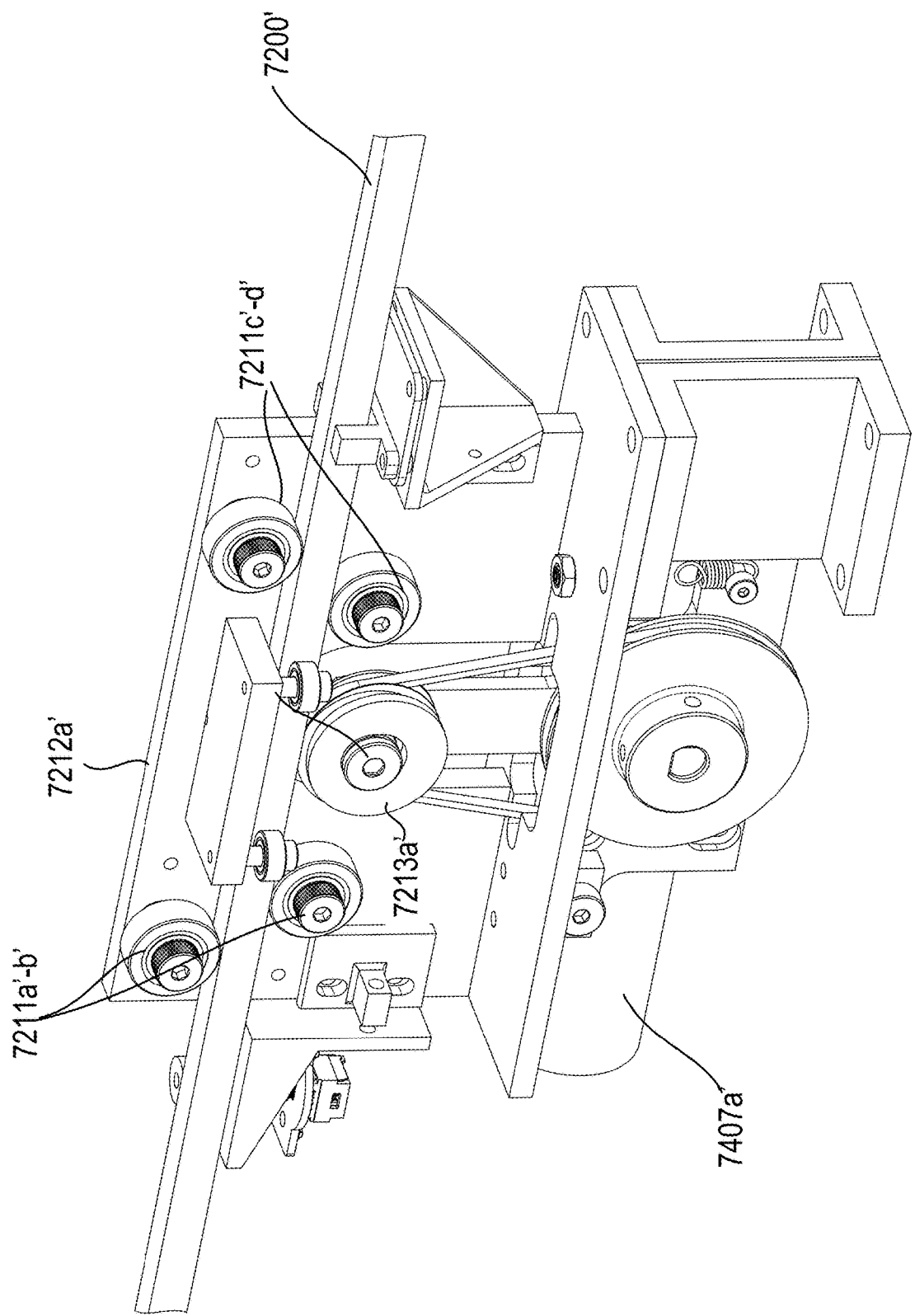
FIG. 16B depicts a perspective side view schematic of an example clamp rod and carrier.
Figure 17:
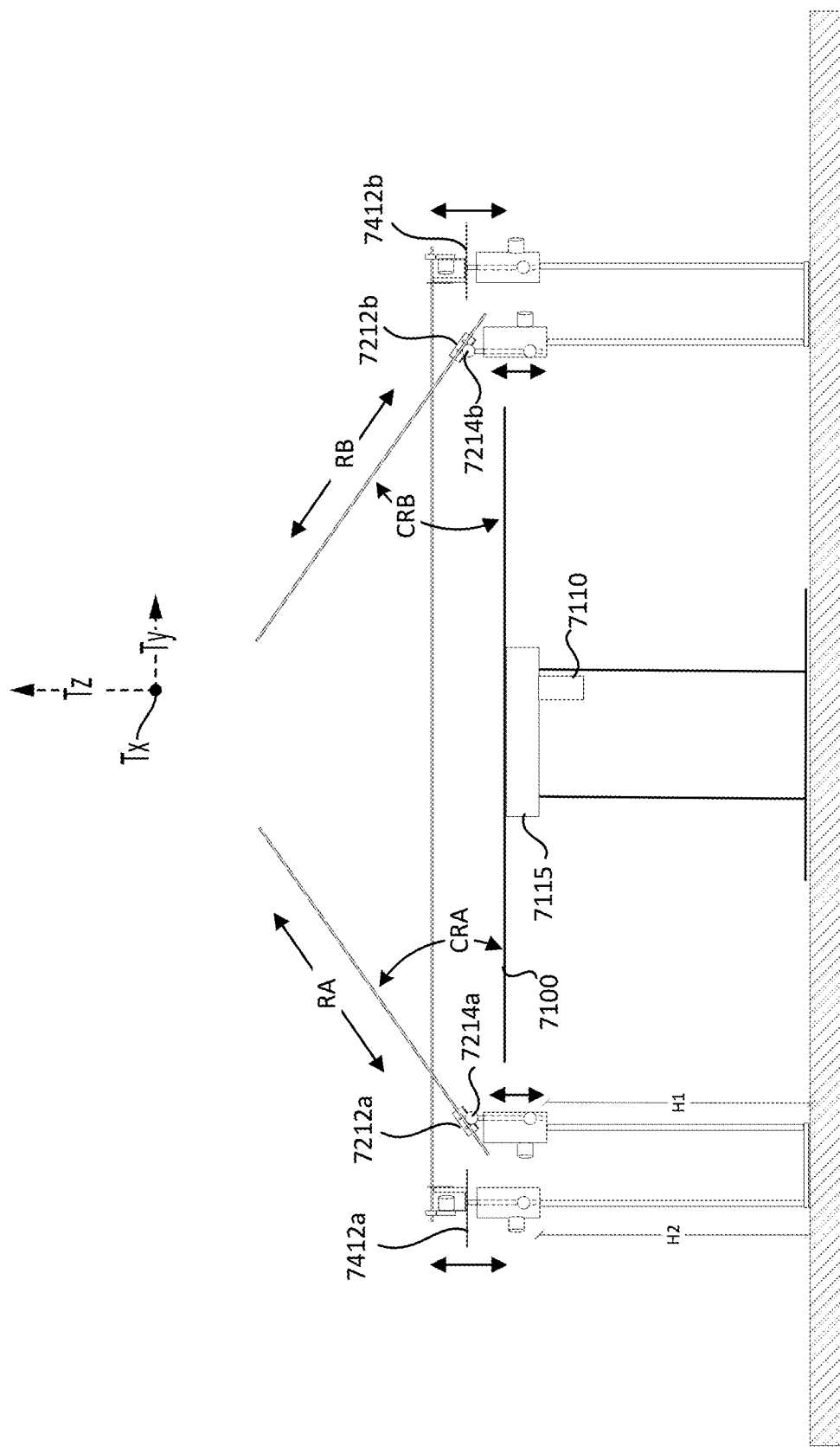
FIG. 17 depicts a side view of an example folding device including carrier pivots for raising the clamp rods at an angle to the platform.

As shown in FIG. 16A, in implementations, the at least one clamp rod 7200 can be diamond shaped and oriented such that a lowest point P of the diamond is configured to contact the deformable article 7300, and the at least one movable sweep rod 7400 can be circular. In implementations, as depicted in the end view of FIG. 16A, the two or more rotatable guide wheels 7211a-d comprise v-groove bearings configured to engage the pointed edges of the diamond shaped clamp rod 7200. Additionally or alternatively, in implementations, the two or more rotatable guide wheels 7211a-d comprise one or more crowned rollers having rounded edges to guarantee no wear on an engaged clamp rod 7200. By orienting the diamond shaped clamp rod 7200 point down, the at least one movable sweep rod is able to slide close to the clamp rod 7200 and form a tighter arc 7410 while lifting the deformable article 7300 over the clamp rod 7200 such that a tight fold is achieved. In implementations, the minimum distance D between the clamp and sweep rods is in a range of between 2 mm and 15 mm. In other implementations, as shown in FIG. 16B, the at least one clamp rod 7200' comprises a square cross section oriented such that a flat surface of the square contacts the deformable article for increased surface contact and application of downward clamping force and the two or more rotatable guide wheels 7211a'-d' comprise flat (e.g., smooth, constant radius) surfaces for engaging and pushing the contact surfaces of the clamp rod 7200 during extending and retracting motions.

In implementations, the at least one clamp rod 7200 and at least one movable sweep rod 7400 each comprise, or are manufactured from, at least one of wood, stainless steel, aluminum, DELRIN, polycarbonate, graphite, titanium, PVC, bamboo, and chromoly. In implementations, the rods 7200, 7400 are stiff and resistant to bending in a fully extended position. In some examples the at least one clamp rod 7200 and at least one movable sweep rod 7400 can be tubular to reduce weight while maintaining radial strength and stiffness along the length of the elongated rods. Additionally or alternatively, in implementations, the at least one movable sweep rod 7400 comprises a tensioned wire.

In implementations, the folding device 7000 further comprises one or more force sensors disposed on at least one of the at least one clamp Z-axis drive motor 7205 and a contact surface of the at least one clamp rod 7200, 7200a-b configured to contact an article 7300 disposed on the platform 7100. The one or more force sensors are configured to be in operative communication with a sensor interface 7255 and the controller 7005 via a network interface 7250 as shown in FIG. 3. The one or more force sensors can output a signal to the controller 7002 for limiting the applied clamping force to a range of between about 2.5 N and 50 N.

Figure 62:
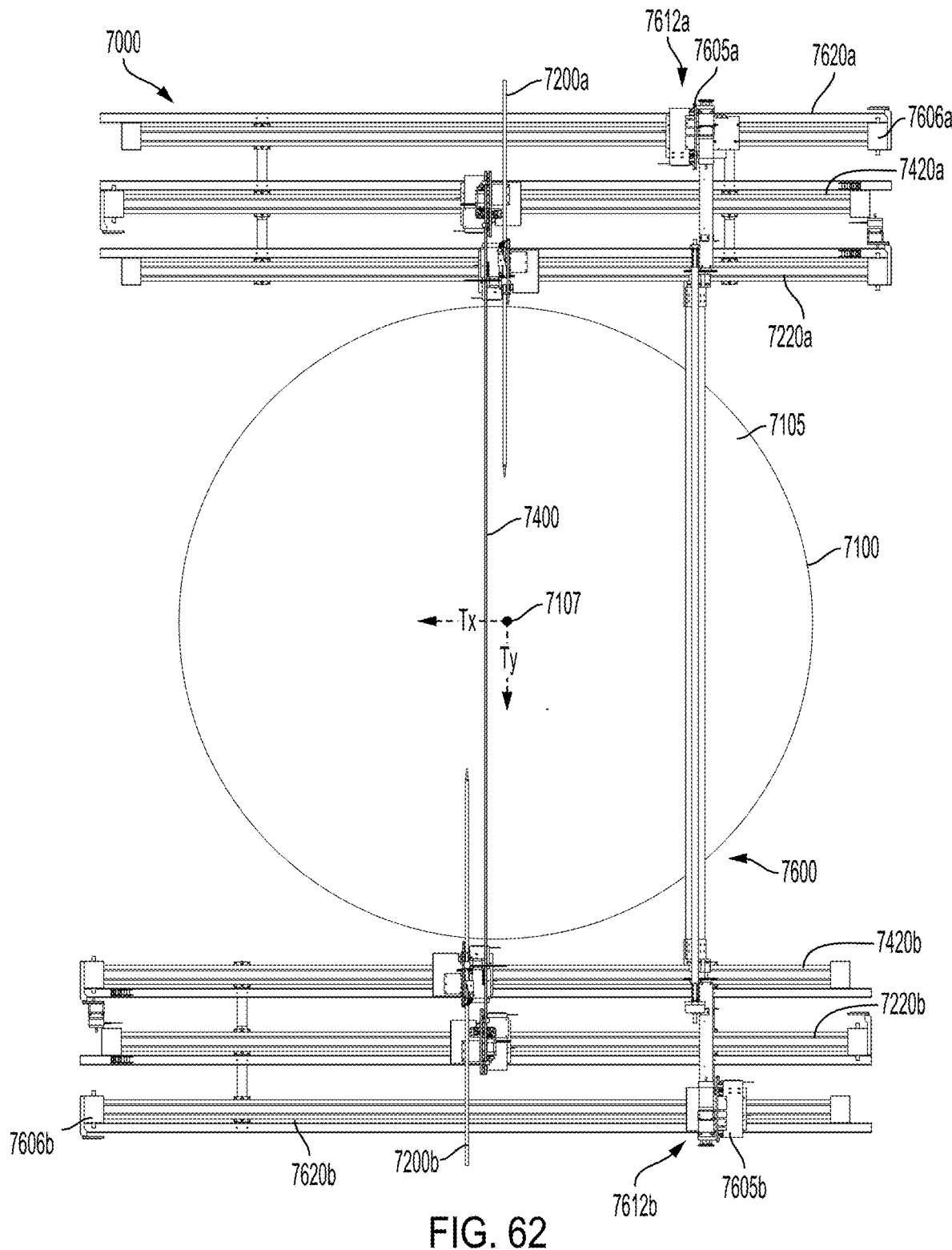
FIG. 62 depicts a top view of an example a folding device including a folding blade suspended over a folding platform.
Figure 63:
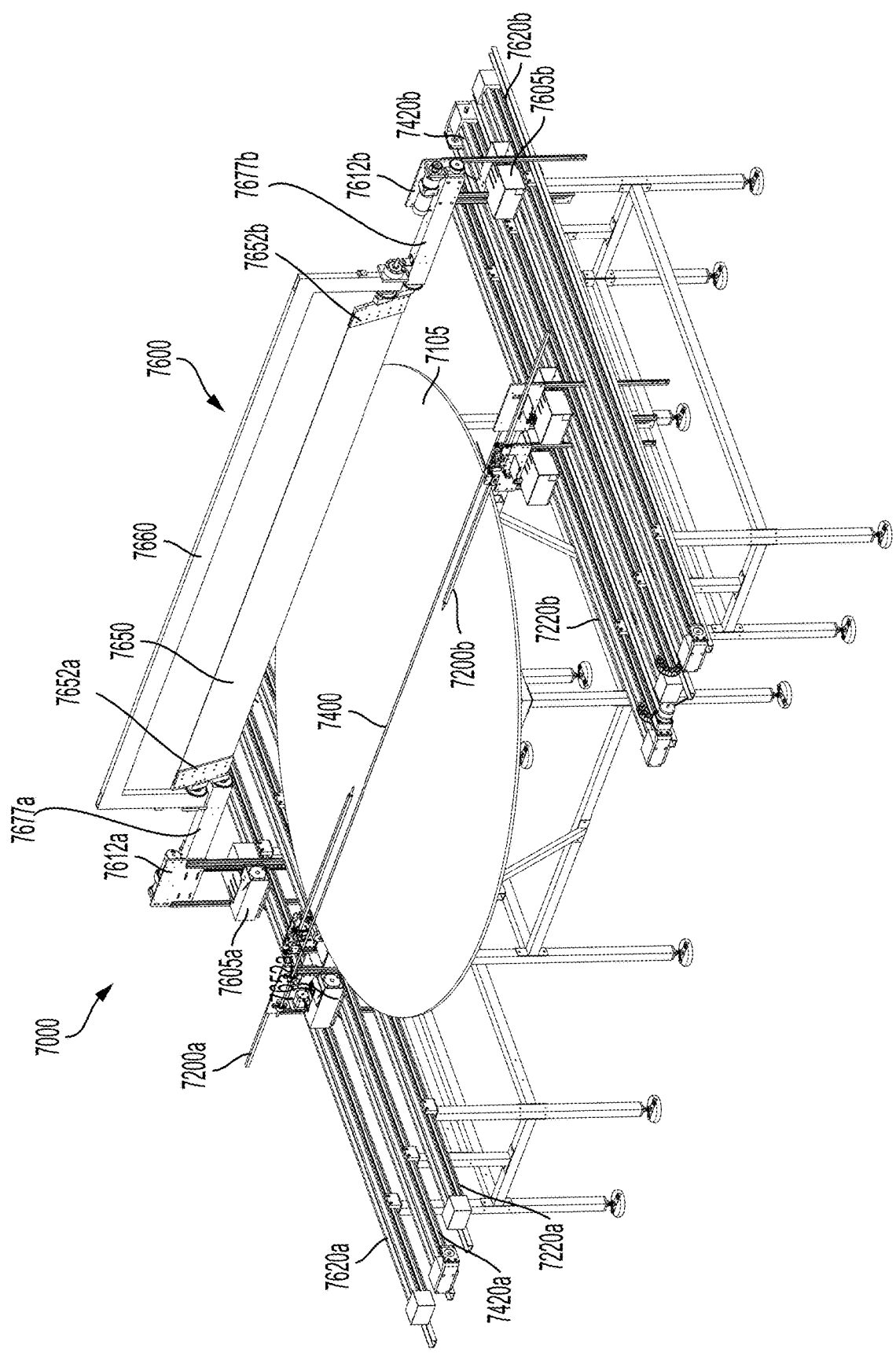
FIG. 63 depicts a perspective front view of the example folding device of FIG. 62.
Figure 64:
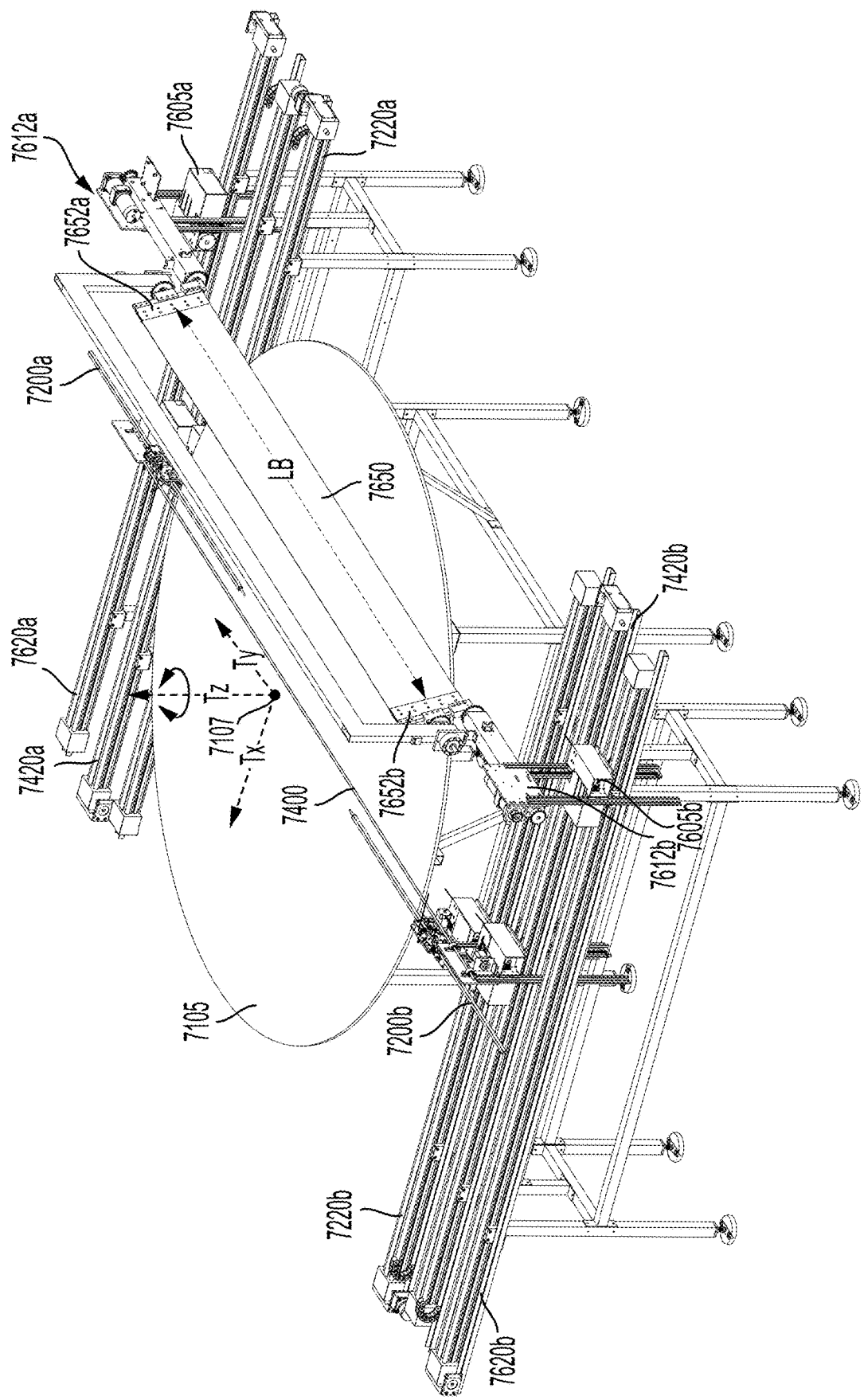
FIG. 64 depicts a perspective rear view of the example folding device of FIGS. 62 and 63.

In implementations, as shown in FIGS. 62-64, additionally or alternatively to the sweep rod 7400, the device 7000 comprises a blade assembly 7600. The elements described herein with regard to one end of the blade assembly 7600 are generally the same on both ends of the blade assembly 7600. In implementations, the blade assembly 7600 is configured to engage with a pair of parallel support rails 7620a, 7620b, Z-axis drive motors 7605a, 7605b, X-axis drive motors 7606a, 7606b, and carriers 7612a, 7612b. The carriers 7612a, 7612b are slidably disposed on the support rails 7620a, 7620b and support the blade assembly 7600 configured to be disposed thereon. The z-axis drive motors 7605a, 7605b are configured to raise and lower the blade assembly 7600 and the X-axis drive motors are configured to move the blade assembly 7600 along the parallel support rails 7620a, 7620b. In implementations, the Z-axis drive motors 7605a, 7605b can operate a linear actuator 7609a-b (FIG. 67) including at least one of a belt, chain and sprocket, a screw drive, and a pneumatic drive. Accordingly, in implementations, the blade assembly 7600 may be moved by the X-axis drive motors 7606a, 7606b and Z-axis drive motors 7605a-b analogous to the operations as described herein with respect to the sweep rod 7400.

Taking FIGS. 63 and 65-67 together, the blade assembly 7600 comprises a blade 7650, blade side carriers 7652a-b, a blade support beam 7660, and synchronously driven rotational drive motors 7670a-b configured to change the angular position of the blade relative to the surface 7105 of the platform 7100 as will be described subsequently with regard to implementations. In implementations, each end of the blade 7650 is operably coupled to one of the rotational drive motors 7670a-b. Each of the rotational drive motors 7670a-b is operably coupled to a pair of drive sprockets 7673a-b, 7674a-b connected by a sprocket chain 7675a-b configured to transfer rotational force from the drive motor 7670. The rotational force is transferred via a drive shaft 7676a-b coupled to one of the drive sprockets 7674a-b at one end and affixed to the blade 7650 at the other end. In implementations, the drive shaft 7676a-b is affixed to the blade with at least one of a keyed surface feature and one or more set screws. In implementations, the drive shafts 7676a-b are configured to be coaxial so that when rotated synchronously, the blade 7650 rotates evenly along its length without twisting.

Figure 66:
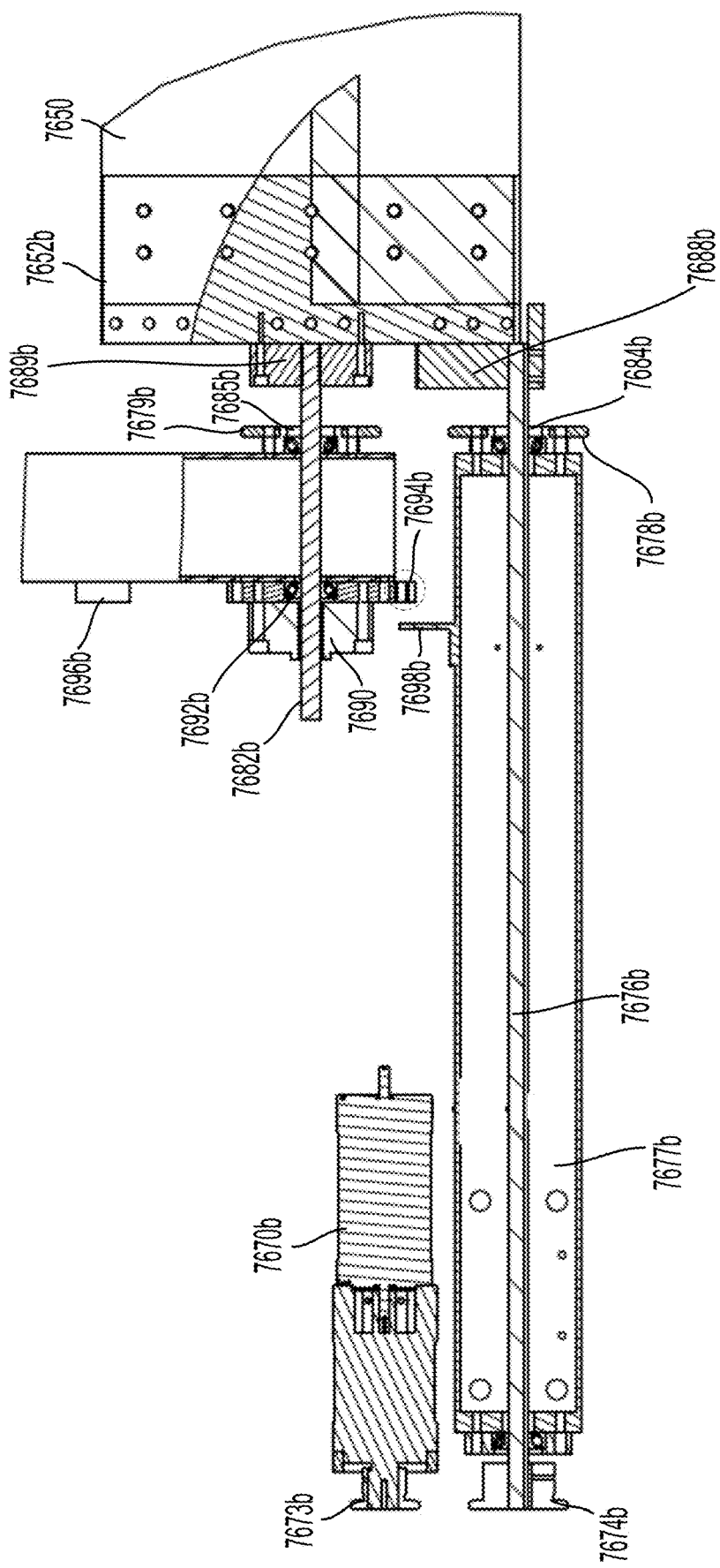
FIG. 66 depicts a top cross section schematic of an end of a blade assembly of the folding device of FIGS. 62-64.

As depicted in FIG. 66, in implementations, the blade assembly 7600 further comprises an edge sprocket 7678a-b and a center sprocket 7679a-b. Each of the edge sprockets 7678a-b is affixed to a corresponding drive shaft housing 7677a-b of the blade assembly 7600, and each one of the drive shaft housings 7677a-b is configured to fixedly engage with corresponding carrier 7612a-b. Each rotating drive shaft 7676 a-b is supported by a bearing 7684a-b engaged within the edge sprocket 7678a-b, and each of the bearings 7684a-b is configured to receive the corresponding drive shaft 7676a-b therein such that the drive shaft is configured to rotate (e.g., spin) within the bearing.

Each edge sprocket 7678a-b is configured to be operably connected to a counter rotating center sprocket 7679a-b by a corresponding sprocket chain 7680a-b such that the blade support beam 7660 is maintained in an upright position as the drive shaft 7676a-b rotates the blade, as will be described subsequently with regard to implementations. The counter rotating center sprockets 7679a-b are configured to be affixed to corresponding legs 7664, 7665 of the blade support beam 7660. As shown in FIGS. 66, each counter rotating center sprocket 7679a-b comprises a central bearing 7685a-b therein for receiving a counter rotation shaft 7682a, 7682b. Each of the counter rotation shafts 7682a-b is configured to rotate freely (e.g., spin) in its corresponding central bearing 7685a-b at one end while being affixed to the blade 7650 at the other end. The drive shafts 7676a-b cause the blade to rotate while the counter rotation shafts 7682a-b keep the blade support beam 7660 vertical. The counter rotation shafts apply a tension force through the blade 7650 to pull it straight and prevent sagging along the span.

In implementations, the counter rotation shafts 7682a-b can be attached to the blade 7650 by at least one of a threaded interface, a press fit, a keyed interface, one or more set screws, and one or more pins. In implementations the counter rotation shafts 7682a-b are affixed to the blade side carriers 7652a-b on their respective ends of the blade for securely engaging with the thin blade at a thicker attachment portion. Additionally or alternatively, the blade side carriers 7652a-b further comprise attachment blocks 7689a-b for securely affixing the counter rotation shafts to the blade 7650 and/or blade side carriers 7652a-b. In implementations, the blade side carriers 7652a-b are blocks of metal (e.g., aluminum, stainless steel) configured to withstand constant stress, strain, and torsional force without flexing or deformably yielding. In implementations, the blade side carriers 7652a-b are affixed at both ends of the blade and are at least one of welded, riveted, screwed, glued, pressfit and pinned securely across the width of the blade 7650 so that tension forces and rotational forces transfer evenly from front-to-back and side-to-side along the blade. Additionally, the blade assembly 7600 comprises at least one load cell 7690b for measuring a tension force applied by the counter rotation shafts 7682 through the length of the blade LB (FIG. 64). In implementations, the tension force can be in a range of between about 175 lbf to 215 lbf. Additionally, in implementations, the load cell 7690b is configured to receive therein a bearing 7692b supporting the end of the counter rotation shaft 7682b such that the shaft rotates on the bearing 7692b. In implementations, the blade side carriers 7652a-b distribute the tension forces evenly from front-to-back across the plane of the blade 7650.

Figure 65:
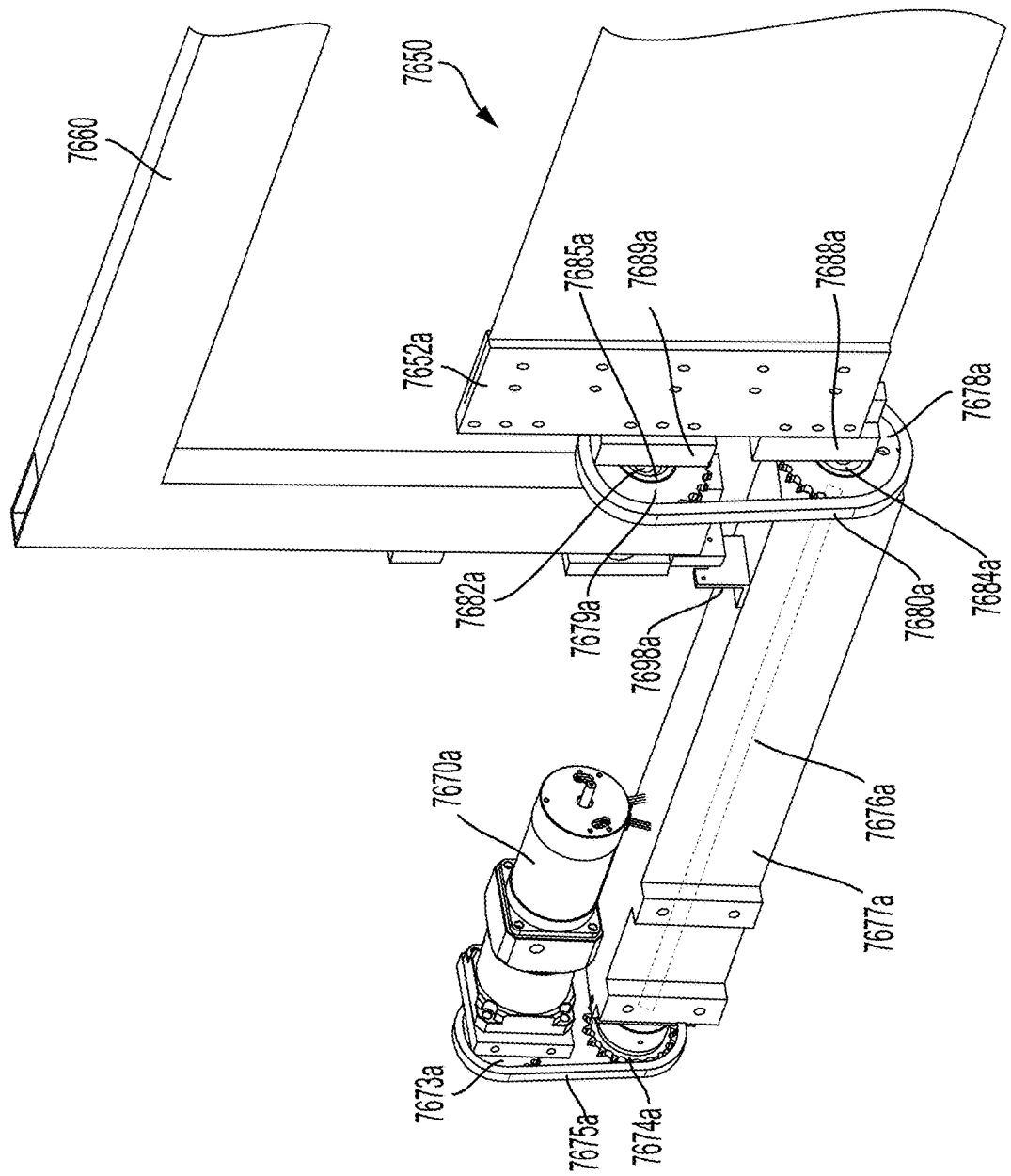
FIG. 65 depicts a close-up partial view of a blade assembly of the folding device of FIGS. 62-64.

In the position shown in FIG. 65, the blade 7650 is perpendicular to the platform surface 7105 (shown in FIGS. 62-64). When the rotational drive motor 7670 drives the pair of drive sprockets 7673a-b, 7674a-b, the drive shaft rotates and causes the blade 7650 to rotate while the blade support beam 7660 remains vertically upright but is pushed out to one side or another of the drive shaft housings 7677a-b. Concurrently, the counter rotation shafts 7682a-b move through an arc above the drive shaft housings 7677a-b (e.g., vertically upright blade "home" position (FIG. 65), aside the drive shaft housings 7677a-b (horizontally rotated blade (FIG. 67)), and below the drive shaft housings 7677a-b (e.g., rotated past horizontal (FIG. 68)). In implementations, the blade assembly 7600 comprises one or more position sensors for detecting a position of the blade support beam 7660 relative to the drive shaft housings 7677a-b. In implementations, as shown in FIG. 66 for example, one or more sensors (e.g., a limit switch 7698, a Hall sensors) can be mounted to one or more brackets 7698b on outside surfaces of the drive shaft housings 7677a-b for detecting one or more magnets 7694b, 7696b mounted in a plurality of positions along each of the two corresponding legs 7664, 7665 to detect the position of the blade support beam. In implementations, the one or more sensors are configured to detect a starting, or home, position of the blade 7650 and blade support beam 7660. Additionally or alternatively, in implementations, rotational positions of the blade 7650 and blade support beam 7660 are tracked by a motor encoder (e.g., shaft encoder 7696 of FIG. 3) operably mounted to the rotational drive motor 7670a-b.

Figure 67:
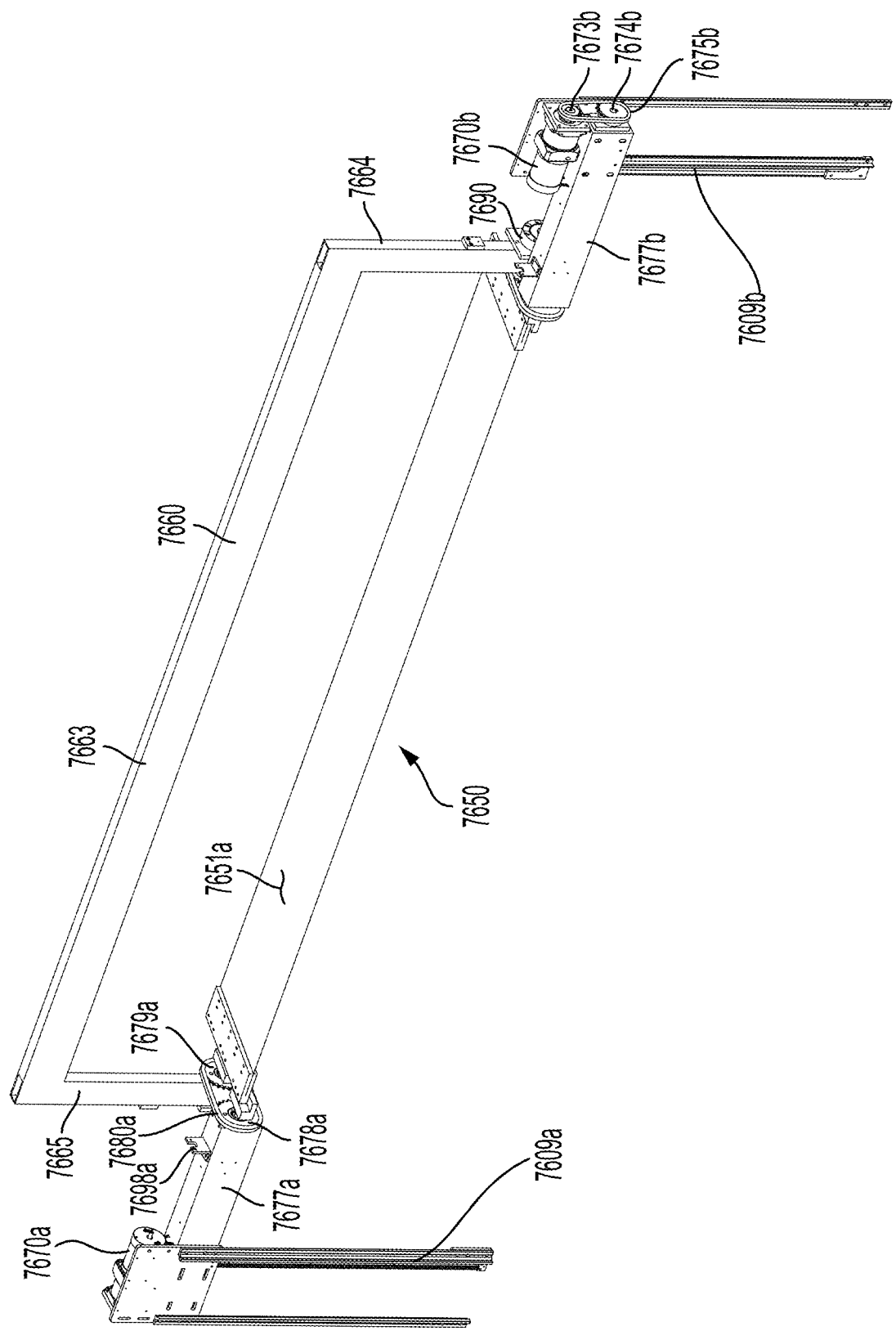
FIG. 67 depicts a perspective view of the blade assembly of the folding device of FIGS. 62-64 with the blade rotated to a horizontal position.
Figure 68:
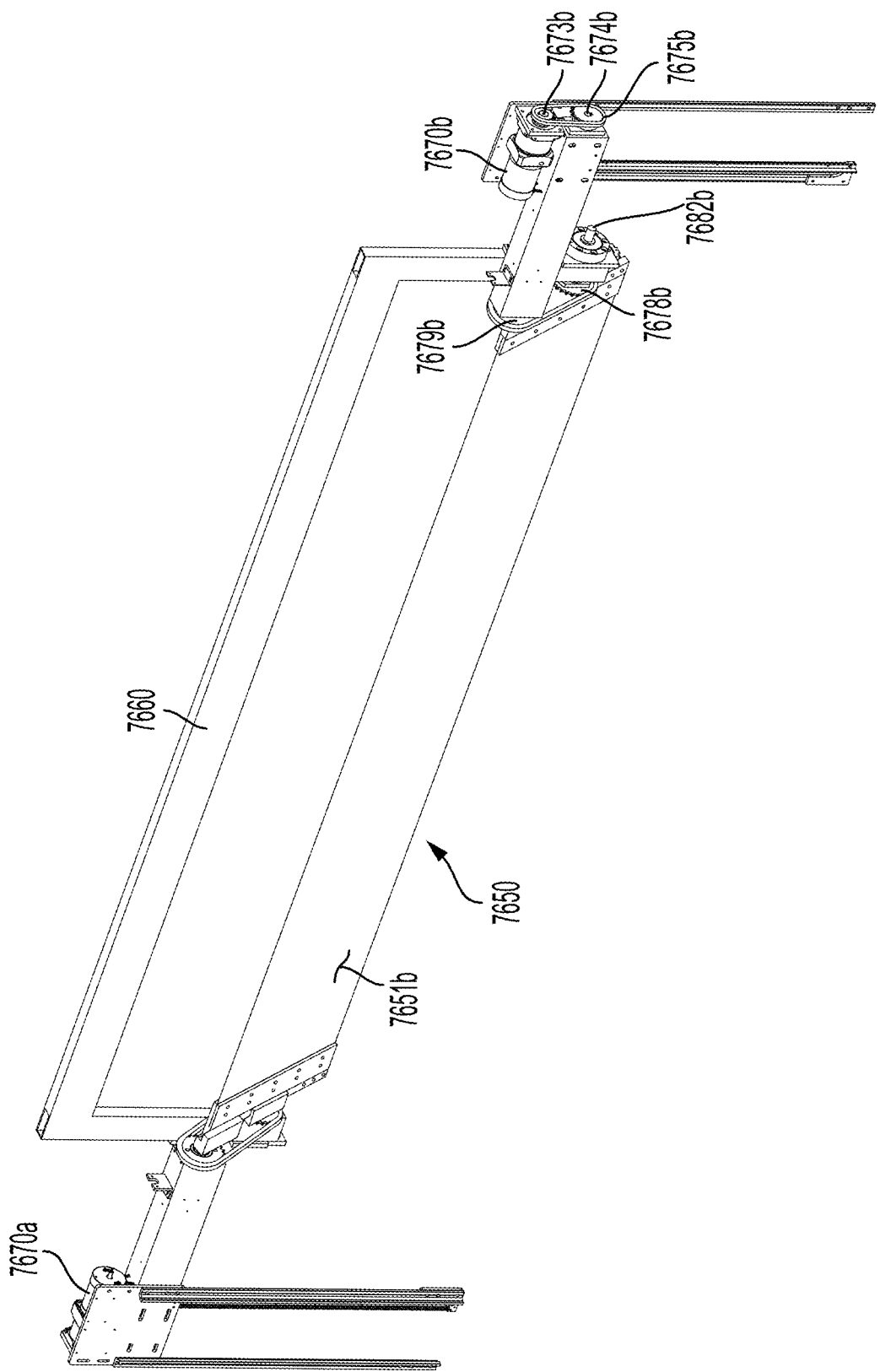
FIG. 68 depicts a perspective view of the blade assembly of FIG. 67 with the blade rotated past horizontal position to an angled position relative to a folding device platform.

As shown in FIG. 67, as the blade rotates, each edge sprocket 7678a-b and corresponding counter rotating center sprocket 7679a-b counter rotate, holding the load beam 7660 in an upright position without tipping or tilting while moving in the X-axis Tx and Z-axis Tz directions. As shown in FIG. 67, the blade 7650 rotates into a position that is at about a 5-degree angle to the platform surface 7105. As shown in FIG. 68, each of the sprocket chains 7680a-b engages the teeth of one of the affixed edge sprockets 7678a-b and a corresponding one of the central counter rotation sprockets 7679a-b and maintains the blade support beam 7660 in its upright position as the blade 7650 rotates to about a 60-degree angle with respect to the platform surface 7105. This approximate rotational angle may be advantageous for smoothing a deformable article when placing the blade 7650 under a clamped article as described subsequently with respect to FIGS. 71A-D and when moving the blade 7650 along a deformable article on the platform to smooth any wrinkles and/or unfurl any folded over portions of the article prior to folding. In implementations, the blade 7650 is configured to rotate through a range of between about 0 to 345 degrees for lifting, flipping, and manipulating an article during smoothing and folding processes.

As shown in FIG. 67, a blade support beam 7660 is illustrated as having an elongated bar 7663 and two downwardly extending bars (e.g. legs) 7664, 7665 perpendicular to the elongated bar 7663. The blade support beam 7660 may have any suitable configuration for stabilizing and/or tensioning the blade 7650. For example, the blade 7650 may be a thin, substantially planar blade, and tensioning the blade 7650 within the blade support beam 7660 increases the stability and uniformity of the planar shape of the blade 7650. The blade support beam 7660 carrying the tension load ensures that the carriers and support rails do not need to carry the tension load. The surface of the blade 7650 may be generally smooth to reduce catching on or creating friction with the deformable article. The blade 7650 may be formed of a metal (e.g., aluminum, stainless steel, chromoly), carbon fiber, stretched canvas, nylon or plastic/elastomeric material; however, any suitable material configured to be held in tension along its length may be used.

In implementations, the length of the blade 7650 is generally sufficiently long so that it extends across the platform 7100, e.g., from 0.5 m to 5.0 m, or the blade 7650 may extend only a portion of the platform 7100. In implementations, the blade 7650 comprises a length in a range of between about 2.5 m to 3.2 m. The width of the blade 7650 may be from 5 or 10 cm to 20 cm, 30 cm, 40 cm, 50 cm or more. In implementations, the width of the blade 7650 is between 10 cm and 50 cm wide. In implementations, the thickness of the blade 7650 can be 5 mm to 3 mm or 2 mm or 1 mm or less. The dimensions of the blade 7650 may be selected to pass under a deformable article and/or to provide smoothing motions over a top of the deformable article. Because the blade 7650 is relatively long compared to its thickness, the blade 7650 is held in tension across its length LB to prevent sagging over the platform 7100, which would result in less effective smoothing and folding of an article thereon because not all portions of the blade 7650 would contact the article evenly. In implementations, a ratio of the blade length BL to thickness comprises a range of between about 1500 to 1 to 3000 to 1.

In implementations, the blade support beam 7660 holds the affixed blade 7650 in tension to reduce bending, warping, or other asymmetries in the blade 7650. In implementations, the blade support beam 7660 is configured to pretension the blade in an upright position to an upwardly bowed state. An application of tension force by the counter rotation shafts 7682a-b then pulls the blade into a straightened position across its length such that the two corresponding legs 7664, 7665 supporting the blade support beam 7660 are positioned vertically and not splayed outward at their tops when the counter rotation shafts 7682a-b apply a force to the blade 7650. In implementations, the blade support beam 7660 comprises one or more pre-tensioning elements. As illustrated in FIG. 69, in implementations, a blade support beam 7660a comprises an elongated bar 7663a supported by two corresponding legs 7664a, 7665b each comprising a perpendicular bar. A top bar 7666a extends upward from the elongated bar 7663 and tension rods 7667a-b extend from the top of the top bar 7666a to the ends of the elongated bar, pulling the ends upward in tension so that the bottom of the two corresponding legs splay outward in the absence of a tension force running down the length of the blade 7650. The tension rods 7667a-b thus pretension the blade 7650 and counteract the tensioning forces applied to the two corresponding legs 7664a, 7665a by the counter rotation shafts 7682a-b such that the two corresponding legs remain vertical and not splayed as the blade (not shown) is tensioned by the counter rotation shafts 7682a-b. Additionally or alternatively, in implementations, as shown in FIG. 70, the blade support beam 7660b comprises a horizontal top truss 7663b preloaded in tension by the truss elements disposed therein to counteract tension forces applied through the two corresponding legs 7664b, 7665b into the blade (not shown) connected thereto by counter rotation shafts.

In implementations, the blade 7650 comprises a variable or tapered thickness with one tapered edge that is suited to be able to slide underneath or over a deformable article more easily due to a thin profile of the tapered edge. The edge may also be smooth to reduce snagging or catching on the deformable article. In examples, the blade 7650 may have two opposing tapered edges that are suitable to be able to slide underneath a deformable article with a thicker profile in its midsection for additional stability or a uniformly thin profile may be used throughout the blade 7650. Although the blade 7650 is illustrated as having a rectangular shape with a uniform width, it should be understood that a variable width may also be used so that the blade 7650 can have any suitable shape, such as a curved, wing shape. As illustrated, the blade 7650 is a generally uniform, solid material; however, the blade 7650 may be formed on one or more rods or other stabilizing structure. In implementations, the blade 7650 is configured to rotate around a central axis or to rotate around an axis that is off-center and closer to one of the side edges. Additionally or alternatively to any of the implementations described, a sweep rod 7400 can move simultaneously in the X-axis Tx direction with the blade 7650, the sweep rod 7400 rotating about its longitudinal axis and leading the blade by a distance in a range of between about 1 mm and 5 mm to lift the terminal edge of an article and allow the blade 7650 to smoothly slide therebeneath without bunching or wrinkling the article.

In all implementations herein described, the blade 7650 can be used in operations analogous to the operations as described herein with respect to the sweep rod 7400. In examples, the blade Z-axis drive motors 7605a-b are configured to raise and lower the blade assembly 7600 relative to the platform surface 7105 and the X-axis drive motors 7606a-b are configured to move the blade assembly 7600 along the parallel support rails 7620a-b in the X-axis direction Tx (FIGS. 62 and 64). The rotational drive motors 7670a-b are configured to rotate the blade 7650 and in implementations the rotational drive motors 7670a-b are geared for synchronized motion. The clamp rod 7400 is parallel to the blade 7650 and is configured to raise and lower from the rotatable platform and slidably move parallel to the surface such that the clamp rod 7400 can clamp a deformable article to the surface 7105 of the platform 7100. Similar to the sweep rod 7400, the blade assembly 7600 is operably controlled by the controller 7005 and comprises various drives, sensors, processors, and communication electronics as depicted in FIG. 3 for controlling operations of the blade assembly 7600.

Advantageously, the blade 7650 comprises a substantially planar top surface 7651*a* (FIG. 67) and a substantially planar bottom surface 7651*b* (FIG. 68). In examples, the blade 7650, held with one of the planar surfaces 7651*a-b* at an angle to the surface of the article during movement in the X-axis Tx direction, is configured to glide over protrusions (e.g., buttons, pockets, raised decorative embellishments) on deformable articles without catching or pulling on them. Additionally, in implementations, a top surface top surface 7651*a* comprises a smooth, low friction surface for smoothing an article, and a bottom surface 7651*b* can comprises a higher friction, grippy surface or adhered surface material (e.g., felt, rubber, a scored surface topography) for retaining an article prior to flipping over the clamp rod. As will be described with regard to implementations, each of the planar surfaces 7651*a-b* provides a substantial contact area for lifting heavy and/or stiff articles and placing them over the clamp by rotating the blade 7650 about the drive shafts 7676*a-b* as the blade lifts a portion of the article from the platform and passes over the clamp rod 7400 so the heavy and/or stiff lifted portion folds over the clamp rod. Additionally or alternatively, the blade can use inertia to fling a lifted heavy article and/or an already partially folded portion of an article over the clamp rod 7400 while moving across the platform in the X-axis Tx direction perpendicular to a length LB of the blade 7650. Additionally, the planar surfaces 7651*a-b* of the blade 7650 provide continuous contact area for engaging and unfurling folded over portions during execution of a pre-folding sweep routine such that the blade does not snag on any protruding features of the article, such as buttons or other embellishments.

Additionally, each of the planar surfaces 7651*a-b* is configured to support an already folded portion of the article thereon in balance such that it does not unfold or topple during a subsequent motion such as a subsequent folding motion over the clamp rod. The blade 7650 is configured to lift an already folded portion, such as a partially folded pant leg, above a clamp rod 7200 and then rotate as the blade travels over the clamp rod 7200 to flip the already folded portion neatly down. Additionally, in implementations, the planar blade 7650 is configured to securely lift a folded article during a movement onto another surface or transport conveyor. For example, in one implementation, the planar blade 7650 is configured to slide beneath an edge of a folded garment and rotate to lift the edge off of the surface 7105 of the platform 7100 so that an extending packing retrieval conveyer can approach the article and easily slide beneath the lifted edge for receiving the article without bumping it and potentially unfolding or toppling the article during extraction.

Figure 71A:
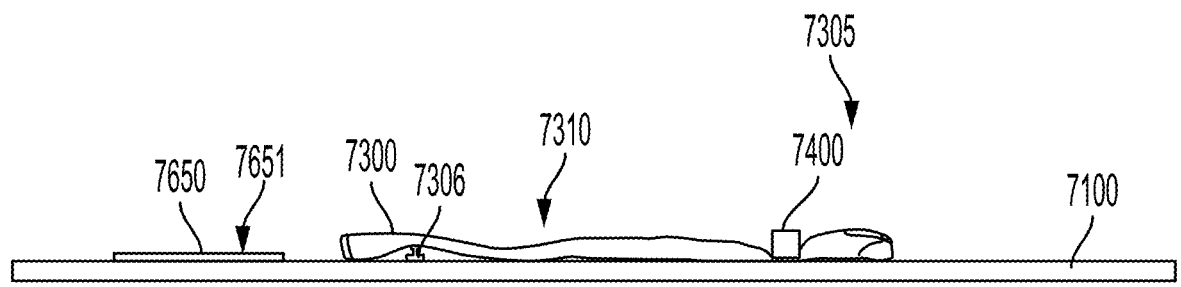
FIGS. 71A-D depict a sequential schematic side view of the folding device executing a method of an underside sweep of a clamped article with the rotatable blade of the folding device of FIGS. 62-64.
Figure 71B:
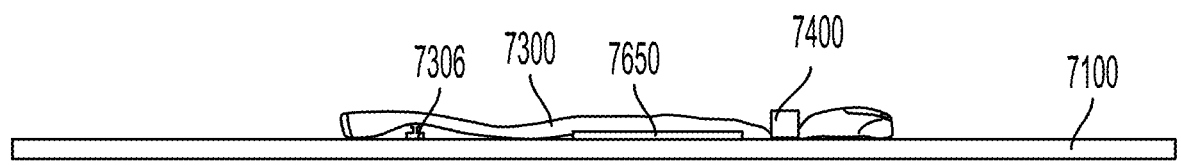
Figure 71C:
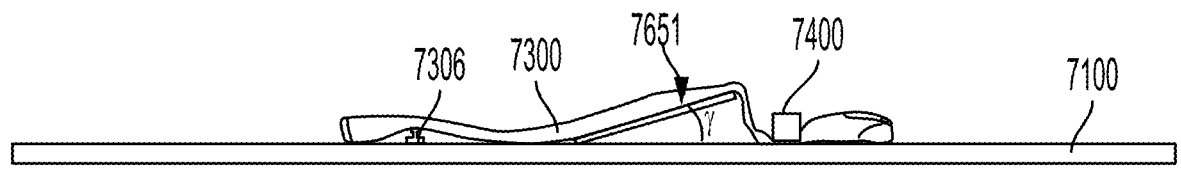
Figure 71D:
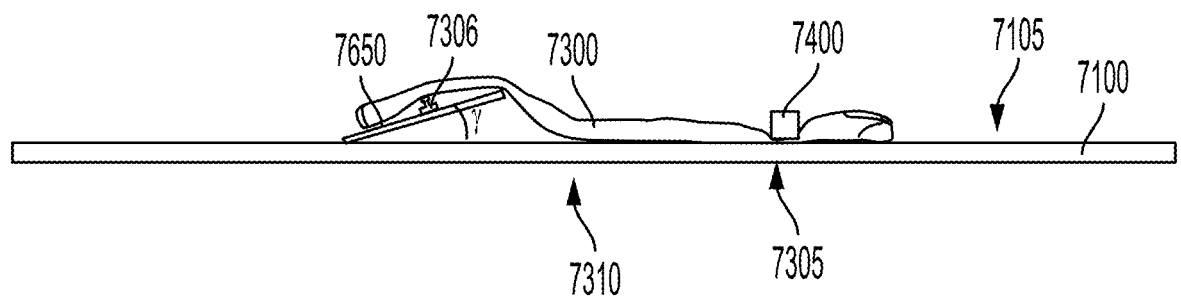

As shown in FIG. 71A, the blade 7650 is adjacent a deformable article 7300 on the surface 7105 of the platform 7100, and the clamp rod 7400 defines a clamped portion 7305 and an unclamped portion 7310 of the article 7300. As illustrated, the deformable article 7300 includes a protrusion or feature 7306, such as a button or rivet. The controller instructs the blade 7650 to move under the unclamped portion 7310 of the deformable article 7300 towards the clamped portion 7305 in FIG. 71B. The blade 7650 is rotated to lift a planar surface 7651 of the blade to an angle $\gamma$ with the lower edge of the blade 7650 contacting the surface 7105 of the platform 7500 such that the blade 7650 is pulling the article 7300 in tension against the clamp rod 7400 in FIG. 71C. The blade 7650, held at this angle, is then moved away from the clamp rod 7400 in FIG. 71D to flatten and smooth the deformable article 7300 from an underside of the article 7300 while pulling the article in tension against the clamped portion 7305. The angle $\gamma$ can be a predetermined angle. Additionally or alternatively, in implementations, the controller 7005 is configured to receive a signal from a force sensor (e.g., a loadcell disposed on the blade 7650) indicative of force such that the controller 7500 can adjust the angle of the blade 7650 dynamically to maintain a constant force during the sweep movement. In implementations, the underside sweep angle $\gamma$ can be in a range of between about 15 to 60 degrees.

As described previously, in implementations, the blade 7650 is configured to fold one portion of the deformable article 7300 over another by operating similarly to the sweep rod 7200 as shown in FIGS. 10A-10B, 11, and 12. As illustrated in FIGS. 72A-72C, the blade 7650 is positioned under the unclamped portion 7310 in FIG. 72A. The blade 7650 is raised to a height of Lz away from the surface 7105 of the platform 7100. In implementations, the blade is raised by moving in an arc motion 7410*a*. The blade 7650 is rotated in the direction of arc 7410*b* by the drive shafts 7676*a-b* (omitted for clarity) toward the clamp rod 7200 in FIG. 72B as the blade 7650 raises the article thereon above the surface 7105 of the platform 7100. The blade 7650 continues to move over the clamp rod 7200 and, in implementations, continues to rotate while moving in an East to West direction (E-W) to dispose the raised portion of the article 7310 over the clamp rod 7200 in FIG. 72C. Similarly to the sweep rod 7400, the blade 7650 can continue to move (e.g., East to West) until free from contact with the article 7300. The blade disposes the folded portion 7310*a* of the article atop another portion 7310*b* of the deformable article 7300 and forms a fold line at or around the clamp 7200. In this example operation, the blade 7650 may be used to fold one portion of a deformable article over another portion of a deformable object at a fold line defined by the clamp 7200. This operation may be repeated with the platform 7100 optionally rotating before clamping and folding one or more times as described herein with respect to implementations of folding with the clamp rod 7200 and sweep rod 7400.

The blade 7650 can be used with any deformable article, but is particularly useful in operations involving heavier fabrics, such as denim, to form fold lines or to reduce wrinkles and smooth deformable articles 7300 as described herein. In examples, the blade 7650 and the sweep rod 7400 are provided on the same device 7000 with an optional clamp rod 7200. In implementations, controller selects one or both of the blade 7650 and the sweep rod 7400 to forming fold lines. In implementations, selecting one or the other of the blade 7650 or sweep rod 7400 is dependent on detected or provided characteristics of the deformable article, such as at least one of fabric type, weight, article size, and shape of the deformable article.

Additionally or alternatively to folding, the blade 7650 may be used to manipulate deformable articles using various operations. In examples, the blade 7650 is configured to sweep beneath and atop an article to remove wrinkles and unfurl folded over portions. In examples, the blade 7650 may be passed at an angle over a top of an unclamped portion of a clamped deformable article such that at least an edge of the blade 7650 contacts the deformable article to reduce folds or wrinkles in the deformable article and unfurl any folded over portions. In implementations, the topside sweep angle comprises a range of between about 5 to 90 degrees. In implementations, the top side sweep angle comprises a range of between about 15 to 45 degrees. In implementations, the top side sweep angle can be preset. Additionally or alternatively, the blade 7650 further comprises one or more feedback sensors configured to output measurements to the controller for dynamic control. The controller thus can dynamically control the angle of the blade to ride up and over protrusions and not run into them and potentially damage the article.

In implementations, the controller determines an edge of a folded article and operably controls the blade 7650 to slide under the edge. In implementations, the blade is configured to lift the folded deformable article and maintain the folded configuration while moving the deformable article to another location.

In examples, two or more blade assemblies 7600 may be used with corresponding blades 7650. The blades 7650 may be sized and configured for different operations or different fabrics. Moreover, the blade assembly or assemblies 7600 may be used in a device 7000 including any suitable number or configuration of clamp rods or sweep rods, or two or more blade assemblies 7600 may be used with at least one of the clamp rods and sweep rod being omitted.

As described previously, in implementation as shown in FIGS. 3 and 10B the folding device 7000 further comprises one or more sensors 7160, 7160a-c configured to at least one of detect one of one or more features and capture one or more images of the deformable article 7300 disposed on the rotatable platform 7100. In implementations, one or more light sources 7170a-b are disposed about the platform for enabling detection by the one or more sensors 7160a-c of an article 7300 on the platform 7100. As described previously with regard to FIG. 3 the folding device 7000 further comprises a controller 7005 in operative communication with the table drive motor 7110, the at least one Z-axis drive motors 7205, 7405, the at least one Y-axis drive motors 7207a-b, the at least one X-axis drive motors 7206, 7406, the at least one spin motor 7407a-b, and the one or more sensors 7160, 7160a-c disposed about the surface 7105. The one or more sensors 7160, 7160a-c comprise at least one of a 3-D point cloud sensor, a 2-D camera, LIDAR (Light Detection And Ranging, which can entail optical remote sensing that measures properties of scattered light to find range and/or other information of a distant target), LADAR (Laser Detection and Ranging), a sonar proximity sensor, an ultrasonic ranging sensor, a radar sensor (e.g., including Doppler radar and/or millimeter-wave radar), and a pair of stereo depth cameras. In implementations, the one or more sensors 7160, 7160a-c output to the controller 7005 at least one of a depth map, RGB images, and IR images. In implementations at least one of the one or more sensors 7160, 7160a-c comprises a REALSENSE camera configured to output any of a depth map, RGB images, and IR images. In implementations, the one or more sensors 7160, 7160a-c can be configured to output 3-D image data to the controller 6005. Additionally or alternatively, in implementations, at least one of the one or more sensors 7160, 7160a-c can be configured to output one or more 2-D images to the controller 6005. In implementations, each one of the one or more sensors 7160, 7160a-c is a camera calibrated at a fixed position and orientation relative to the platform 7100.

In one implementation, the one or more sensors 7160, 7160a-c can be imaging sensors including at least one of an infrared range sensor and a volumetric point cloud sensor configured to generate range value data representative of the deformable laundry article 7300 disposed on the platform 7100. The one or more sensors 7160, 7160a-c can be configured to generate presence value data representative of the deformable laundry article 7300. In implementations, the presence value data can indicate a position and orientation of the deformable laundry article on the platform 7100.

In implementations, the controller 7005 is further configured to determine, based on a comparison of a received output signal of the one or more sensors 7160, 7160a-c to data stored in a memory 7010 in communication with the controller 7005, at least one of an article type, a front side, a back side, and an inside surface of the deformable article 7300. In implementations, at least one of the one or more sensors 7160, 7160a-c can be a 2-D camera and the data associated with repositioned deformable laundry article is size invariant image data.

Figure 21:
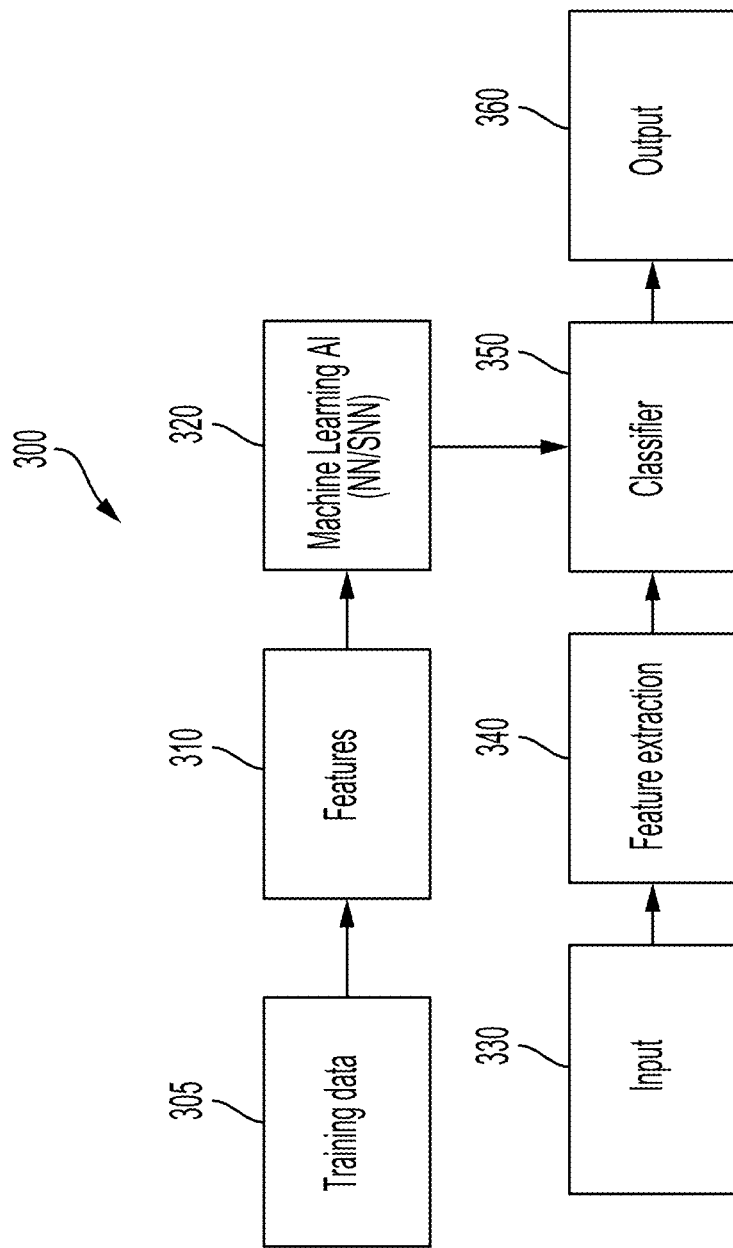
FIG. 21 depicts an example schematic of a neural network configured to be utilized by a folding device of FIGS. 10A-B.

In implementations, the memory 7010 of the controller 7005 comprises a neural network 300, and determining the one or more characteristics of each one of the plurality of deformable articles comprises processing the received output signal of the at least one sensor with a neural network classifier. In implementations, as shown in FIG. 21, the neural network 300 comprises a trained neural network, for example a convolutional neural network that operates quickly on 3D and/or 2D data and is configured to classify images from one or more 3D and/or 2D cameras. In an implementation, the classification comprises generating a descriptor based on the output signal of the one or more sensors 7160, 7160a-c and classifying, using the neural network, the output signal based on the descriptor. The neural network is configured to output a probability that the output signal corresponds to a class of the stored data indicative of one or more deformable article types that require particular folding maneuvers, for example. The classes of trained data in the neural network include data associated with many types of deformable articles. For example, as shown in FIG. 21, a neural network 300 can be trained with a set of training data 305. After training, the neural network 300 comprises a set of weights that can be used for neural network inference to determine whether an input 330 (e.g., output signal from the one of the one or more sensors 7160, 7160a-c) is within one of the trained classes.

In implementations, the neural network is configured to output a probability that the output signal of the one or more sensors 7160, 7160a-c corresponds to a class of the stored data indicative of one or more deformable laundry article types. The classes of trained data in the neural network include data associated with many types of deformable laundry articles that require particular folding maneuvers to reach a final folded state within a footprint area, as level as possible, and without unfolding.

Additionally or alternatively, in implementations, a memory store 7010 in communication with the controller 7005 comprises a trained regressor. The controller 7005 is configured to receive an input signal of the one or more sensors 7160, 7160a-c and, based on an output of the trained regressor, identify a feature of one or more article types to rotate in alignment with or perpendicular to one or more clamp rods 7200, 7200a-b. For example, the trained regressor can identify a sagittal line of a shirt and the controller 7005 can instruct the drive motor 7110 of the platform to rotate the sagittal line in one direction or the other depending on the number of radians from a perpendicular orientation to the one or more clamp rods 7200, 7200a-b.

In implementations the one or more sensors 7160, 7160a-c comprises a REALSENSE camera, positioned above the rotatable platform 7100 and aimed at the surface 7105. In implementations, the surface of the platform 7100 is non-speculative. In implementations, the surface 7105 is a single color, such as white or grey, for providing readily detected contrast to most deformable articles 7300. As shown in FIGS. 10A-B, the one or more sensors 7160, 7160a-c is a camera positioned at a height of CZ above the rotatable platform. In implementations, the one or more sensors 7160, 7160a-c can be positioned directly above the center 7107 of the platform 7100. Additionally or alternatively, the one or more sensors 7160, 7160a-c may be offset from the center of the platform and/or angled from the vertical axis Tz. In all implementations, the one or more sensors 7160, 7160a-c are positioned at a fixed height and orientation relative to the platform 7100.

Figure 9B:
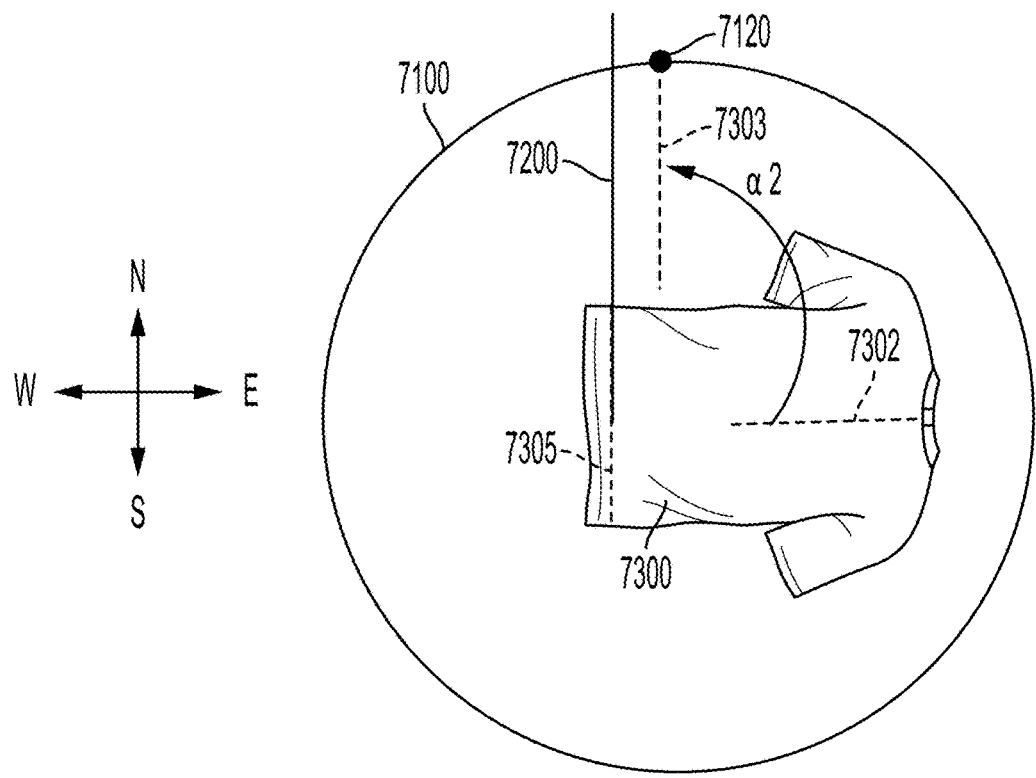

In examples, the controller 7005 is configured to receive one or more output signals from the one or more sensors 7160, 7160a-c, determine, based on the received one or more output signals, at least one of an article type, size, thickness, and location of the deformable article 7300 on the platform 7100. The controller 7005 is configured to determine based on the at least one of the determined article type, determined article size, determined article thickness, and the location, a first fold line 7320 of the deformable article, instruct a drive motor 7110 to rotate the platform 7100 to align the fold line 7320 of the deformable article with the at least one clamp rod suspended above the platform, and instruct the at least one clamp rod 7200 to lower onto the first fold line 7320, the lowered at least one clamp rod 7200 configured to apply force and immobilize the fold line of the deformable laundry article 7300 against the surface 7105. The controller 7005 is further configured to instruct the at least one movable sweep rod 7400 to slidably move in a first direction between the deformable article 7300 and the surface 7105 to a position adjacent and parallel to the at least one retractable clamp rod 7200, and raise the deformable article up and over the at least one retractable clamp rod 7200, slidably moving in the first direction at least until the article disengages from the at least one movable sweep rod. In examples, such as that described above with regard to FIGS. 9A-B aligning the fold line (e.g., the location on the article 7300 where the clamp presses, also called the clamp position 7305) of the deformable article 7300 with the at least one clamp rod 7200 comprises rotating the fold line to a substantially parallel position with the at least one clamp rod 7200.

In implementations, the fold lines, such as those 7320a-k shown in FIGS. 22A-23D each comprise a line across at least a portion of the deformable article 7300 at which the folding device 7000 is configured to fold the deformable article. The fold line 7320 crosses two outer edges of at least a portion of the deformable article. Each article type, such as the short-sleeved shirt of FIG. 22A, the spaghetti strap camisole of 22B, and the pants of FIGS. 23A-D can comprise one or more fold lines 7320 about which the clamp and sweep rods and/or sweep blade 7650 will fold the unclamped portions of the article 7300. As will be described subsequently with regard to implementations, the one or more fold lines 7320 can be preplanned in a specific order to achieve a final folded state of the article 7300 that is at or within a predetermined footprint area for queuing and packing. For example, each of the fold lines can be folded in the direction and order of the numerically marked arrows of FIGS. 22A-B and 23A-D. Additionally or alternatively, in implementations each of the one or more fold lines 7320 can be selected inward from a lifted edge (e.g. perimeter edge, terminal edge) to include, at a minimum, a distance accommodating a bend radius of the fabric of the deformable article 7300 and an allowance for folding the article around the clamp rod 7400 without the folding portion springing back to an unfolded state, as will be described subsequently with regard to implementations of folding. For example, in implementations, the controller 7005 clamps at a minimum distance from an edge of an article in a range of between about 1 to 5 inches (e.g., 2.54 cm to 12.7 cm) for a clamp 7400 having a height and width (measured in the fold direction, e.g., the X-axis Tx direction) each in a range of between about of 0.25 inch to 1.5 inches (e.g., 0.6 cm to 3.81 cm).

As described previously, in examples, the at least one clamp rod 7200, 7200a-b is retractable and configured to extend and retract over the platform 7100. In examples, the at least one clamp rod 7200 is telescoping. In examples, the at least one clamp rod 7200, 7200a-b engages a driven friction wheel configured to advance and retract the at least one clamp rod 7200. In examples, after the article 7300 disengages from the at least one movable sweep rod 7400, the controller 7005 is further configured to instruct the at least one clamp rod 7200, 7200a-b to retract until disengaged from the deformable article 7300.

Figure 24A:
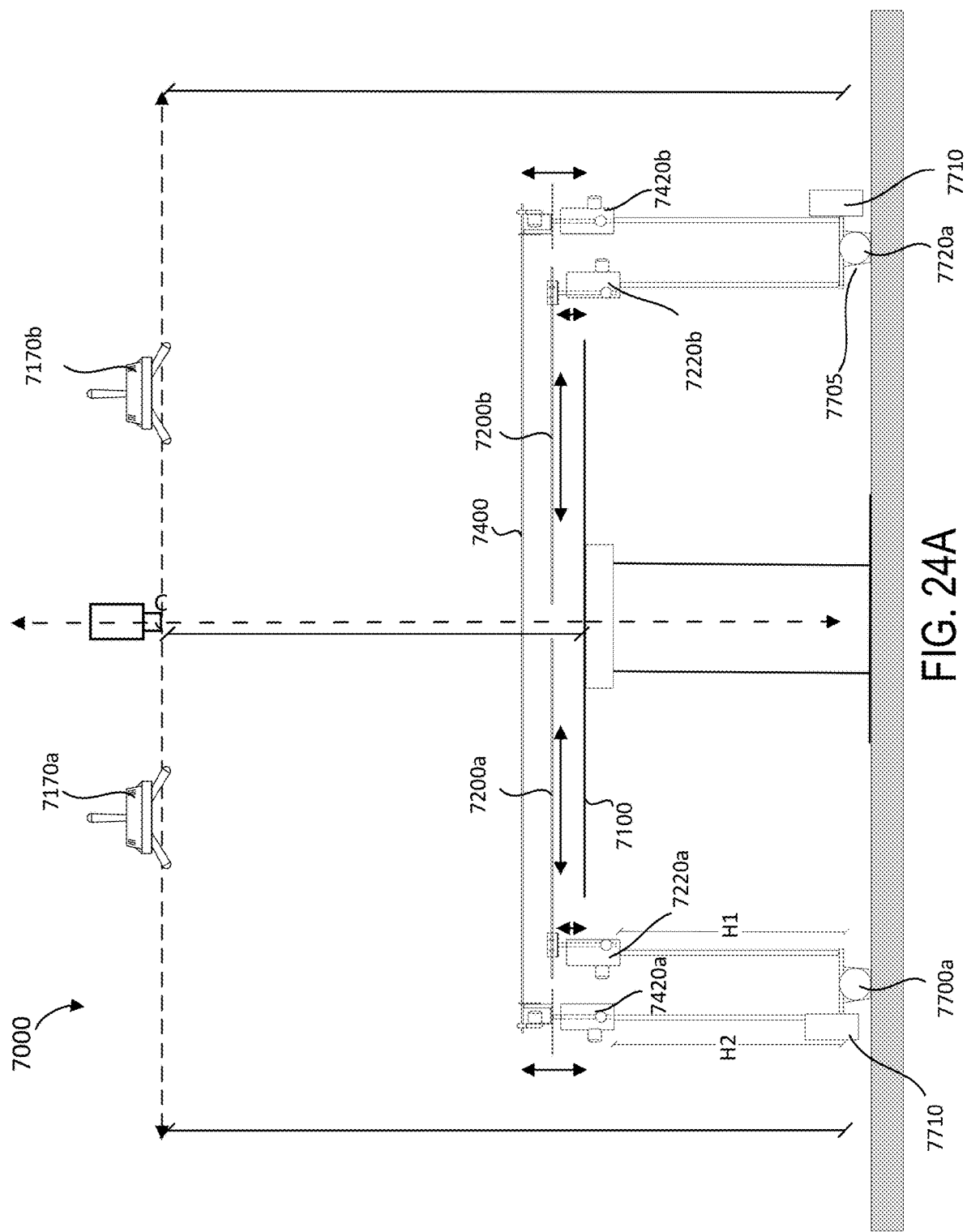
FIG. 24A depicts a top view of an example of a folding device.

Although in the above examples and implementations, the platform 7100 is rotatable, any of the above examples and implementations can apply to an alternative embodiment in which the platform 7100 is stationary and the pairs of parallel support rails 7420a-b, 7220a-b, 7620a-b are fixed to one another and configured to rotate about a fixed position and about the stationary platform. As shown in FIGS. 24A-B, for example, the pairs of parallel support rails 7420, 7220 can be mounted to wheels or casters 7700a-b configured to roll within a trough 7705 anchored about the platform. The wheels 7700a-b can be drive by one or more rail rotation drive motors 7710a-b.

Figure 25:
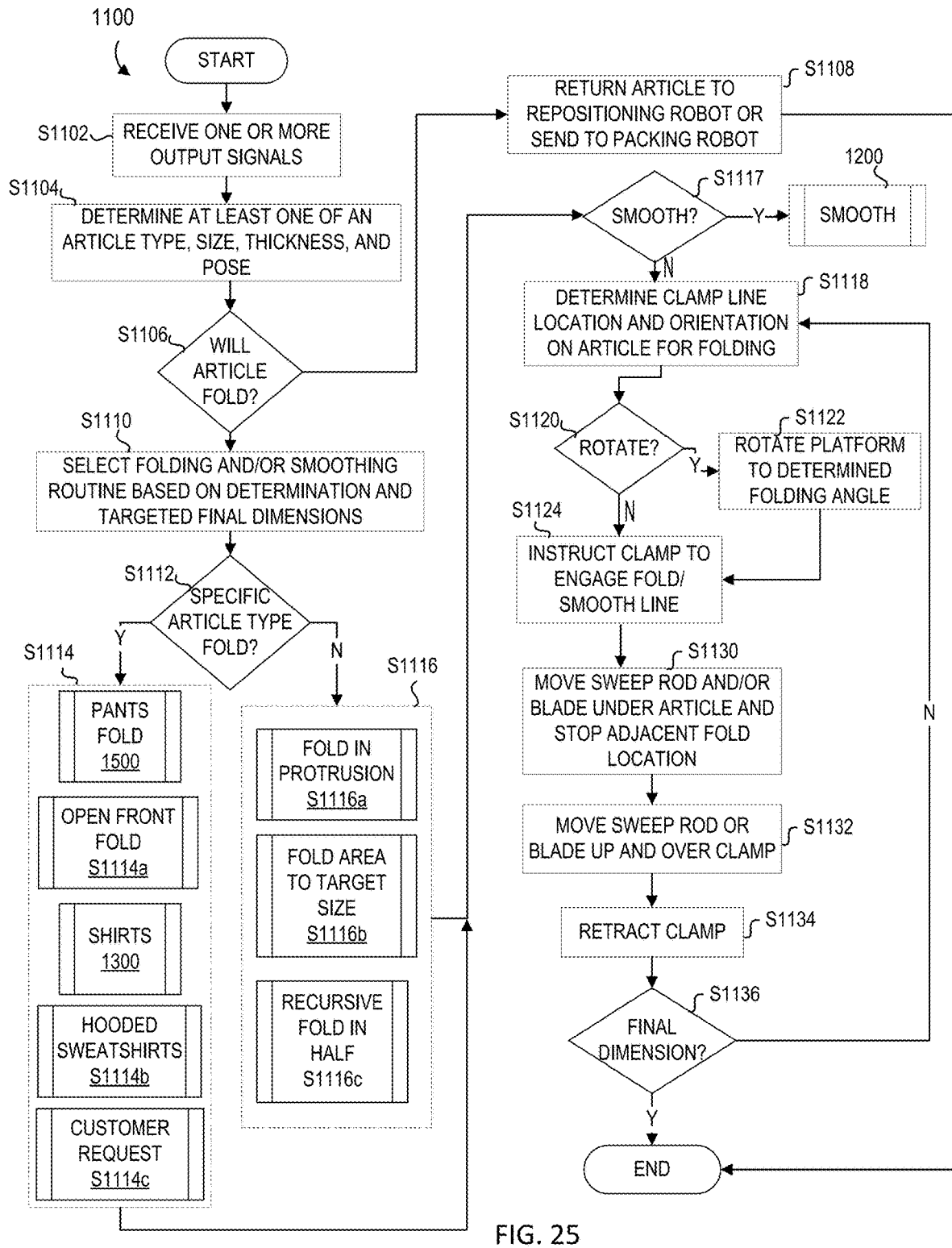
FIG. 25 depicts an example method of folding executed by a controller of the folding device.

Referring now to FIG. 25, any of the examples and implementations described previously with regard to an autonomous folding device 7000 are applicable to implementations described herein with regard to a method 1100 of autonomously folding a deformable article 7300 (e.g., also referred to herein as a "deformable laundry article").

In implementations, the method 1100 of robotically folding is configured to be executed autonomously by the controller 7005, and, as previously described with regard to implementations, the controller 7005 is configured to be in operative communication with the one or more sensors 7160 7160a-c, the drive motor 7110 of the rotatable platform 7100, the drive motors and position sensors of the at least one clamp 7200, and the drive motors and position sensors of the elongated sweep rod 7400 and/or blade 7650. In examples, the controller 7005 is configured to communicate with a network 230 via at least one of wired and wireless communication protocols. In implementations, the method 1100 further comprises receiving one or more folding instructions from a remote device in operable communication with the network 230.

In implementations, as shown in FIG. 25, the method 1100, comprises iterating a folding sequence one or more times, and stopping iterating the folding sequence upon the determining the article 7300 is folded to at or within a footprint area (e.g., final folded dimensions). The folding sequence comprises receiving S1102, at a controller 7005, one or more output signals from one or more sensors 7160, 7160a-c in communication with the controller, the one or more sensors being configured to at least one of detect one of one or more features and capture one or more images of a deformable article 7300 disposed on a platform 7100. As described previously with regard to implementations, such as that of FIG. 10B, the one or more sensors 7160, 7160a-c comprise one or more cameras. In implementations, each camera 7160 is disposed at a fixed position relative to the platform 7160. In implementations the one or more sensors 7160 comprise a single camera 7160a affixed to a support at a central position suspended above the platform 7100 and having a field of view 7161a encapsulating the entire surface 7105 of the platform 7100. Additionally or alternatively, the one or more sensors 7160, 7160a-c can comprise a camera 7160b affixed to a support above and aside the platform and having an angled field of view 7161b relative to the Z-axis Tz direction. Additionally or alternatively, the one or more sensors 7160, 7160a-c can comprise a camera 7160c affixed to a support aside the platform and having an field of view 7161c having a central focal point that is approximately perpendicular to the Z-axis Tz direction such that the camera 7160c can detect a prominence indicative of an article thickness on the surface 7105 of the platform 7100.

In implementations, the folding robot 7000 is configured to fold a plurality of article types and article sizes received in any unpredictable order. The folding robot executes the method 1100 regardless of article type and processes signals and data transmitting from at least one of the one or more sensors 7160, 7160a-c and a preceding robotic device, e.g., a repositioning robot 6000, to determine which folding routines to execute.

As described previously, the one or more sensors 7160, 7160a-c comprise at least one of a 3-D point cloud sensor, a 2-D camera, LIDAR (Light Detection And Ranging, which can entail optical remote sensing that measures properties of scattered light to find range and/or other information of a distant target), LADAR (Laser Detection and Ranging), a sonar proximity sensor, an ultrasonic ranging sensor, a radar sensor (e.g., including Doppler radar and/or millimeter-wave radar), and a pair of stereo depth cameras. In implementations, the one or more sensors 7160, 7160a-c output to the controller 7005 at least one of a depth map, RGB images, and IR images. In implementations at least one of the one or more sensors 7160, 7160a-c comprises a REALSENSE camera configured to output any of a depth map, RGB images, and IR images. In implementations, the one or more sensors 7160, 7160a-c can be configured to output 3-D image data to the controller 6005. Additionally or alternatively, in implementations, at least one of the one or more sensors 7160, 7160a-c can be configured to output one or more 2-D images to the controller 6005. In implementations, each one of the one or more sensors 7160, 7160a-c is a camera calibrated at a fixed position and orientation relative to the platform 7100.

In one implementation, the one or more sensors 7160, 7160a-c can be imaging sensors including at least one of an infrared range sensor and a volumetric point cloud sensor configured to generate range value data representative of the deformable laundry article 7300 disposed on the platform 7100. The one or more sensors 7160, 7160a-c can be configured to generate presence value data representative of the deformable laundry article 7300. In implementations, the presence value data can indicate a position and orientation of the deformable laundry article on the platform 7100. In implementations the one or more sensors 7160, 7160a-c comprises a REALSENSE camera, positioned above the rotatable platform 7100 and having a field of view aimed at the surface 7105.

Figure 26:
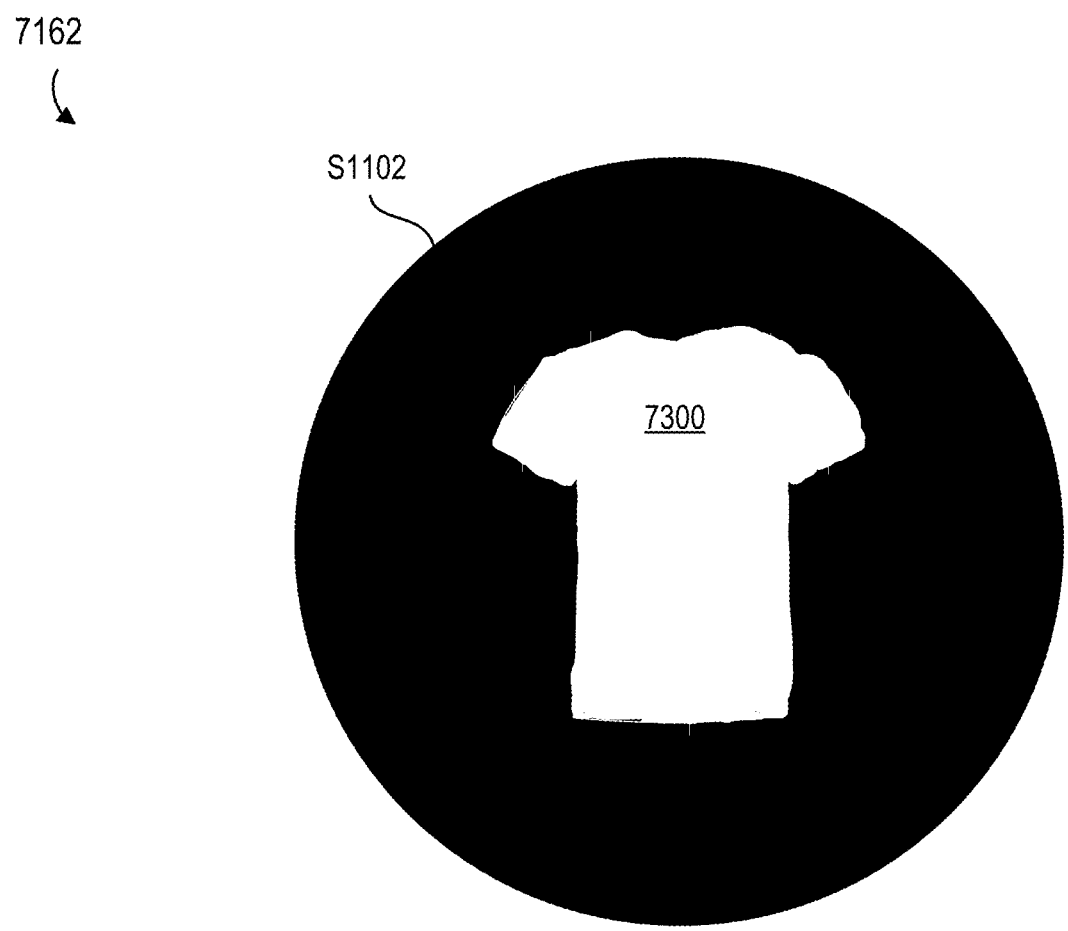
FIG. 26 depict an example mask generated by the controller executing the method of folding of FIG. 25.

The method determines 51104, based on the at least one of one or more features and one or more images output from the one or more sensors 7160, 7160a-c, at least one of an article type, size, thickness, and a location and orientation (e.g., pose) of the footprint area of the deformable article 7300 on the platform 7100 and awaiting folding. In implementations, the controller 7005 is configured to generate a pixel map, such as the black and white map of FIG. 26, of where the article 7300 is and where it isn't on the platform 7100. For example, in implementations, the pixel map can determine, as indicated in white, which pixels represent a portion of the article 7300 and in back which pixels represent the surface 7105 of the platform 7100. Determining where the garment 7300 is on the platform 7100 enables the controller 7005 to determine how far into the garment pixels to place the one or more clamp rods 7200, 7200a-b and how far in the X-axis direction Tx to move the at least one of the sweep rod 7400 and sweep blade 7650 to start the folding process.

Additionally or alternatively, the controller 7005 can identify and predict a thickness of the article 7300. In implementations, the controller 7005 generates a depth map from a point cloud detected by the one or more sensors 7160, 7160a-c disposed above or adjacent the platform, and determined based on the depth map the height of the article 7300 off the surface of the platform 7100. Additionally or alternatively, the one or more sensors can comprise one or more depth sensing devices (e.g., a 3-D stereo depth camera, a side long 2-D camera, LIDAR, etc.). This article height detection from the platform surface 7105 enables the controller 7500 to determine how deep to clamp the article 7300 down onto the surface 7105 (e.g., in the Z-axis direction Tz) with the at least one clamp rod 7200 and how far off the surface to position at least one of the sweep rod 7400 and blade 7650 to lightly graze a top surface of the article 7300 while passing over it in the X-axis direction.

The controller 7005 thus need not know exactly article type, size, and thickness characteristics in advent. As will be described subsequently with regard to implementations, the folding robot 7000 is configured to accommodate a plurality of disparate article types and sizes presented sequentially within a load of laundry without requiring human intervention, resetting mechanical fixtures on the robot 7000, and or having to aim the article in a particular orientation when introduced onto the platform 7100. The rotating platform 7100 aligns any article disposed thereon with the sweep rod 7400 and at least one of the at least one clamp rod 7200, 7200a-b and sweep blade 7650 regardless of size, thickness, and article type. In implementations, as will be described subsequently, the controller 7005 can select a folding routine for an article 7300 that will be ensure an efficient, stable, and visually appealing fold to a desired target footprint area for packing and return to a customer.

Returning to the method 1100 of folding, before selecting a folding routine, the method comprises determining S1106 whether the article 7300 will fold to one of a plurality of target final footprint area dimensions or whether the article 7300 cannot be folded. For example, the controller 7005 can determine based on the at least one of the pixel map and depth map that the article is at least one of too small and too thick to fold. Additionally or alternatively, the controller can determine that the article 7300 is not sufficiently repositioned, perhaps too twisted or entangled with itself to fold. In implementations, if the article 7300 is not sufficiently repositioned, the controller 70005 can instruct the folding device or another device in the process line 100 to return the article 7300 to the repositioning robot 6000 for another attempt at repositioning. In implementations, if the controller 7005 has failed to determine the article 7300 is foldable after two or more passes through the repositioning robot 6000 or has determined the article 7300 is too small for folding, the controller 7005 is configured to send the article 7300 to the packing robot 9000 without being folded by the folding robot 7000. Alternatively, the folding robot can attempt to fold the article 7300 in accordance with a general fold algorithm as will be described subsequently with regard to implementation. For example, the folding robot 7000 can fold a pair of pants with one leg inside out in accordance with one or more general folding routines. Although not ideal, the final result will be an article folded to at or withing a target area for proper stacking and packing without a customer return box.

If the repositioned article 7300 received on the platform can be folded, the method 1100 comprises selecting S1110 a folding and/or smoothing routine based on targeted final folded dimensions and the determined at least one of an article type, size, thickness, and a location and orientation of the footprint area of the deformable article 7300.

In implementations, the targeted final folded dimension comprise at least one final folded dimension that is dynamically determined. In implementations, the controller 7005 determines the at least one final folded dimension of the article 7300 based on receiving a communication from the packing robot 8000 indicative of a remaining volume in a packing container configured to receive the folded article. Additionally or alternatively, in implementations the controller 7005 is configured to select the at least one final folded dimension of the article from a plurality of target dimensions stored in a database including a plurality of target folded dimensions associated with at least two of article type, article size, article thickness, and container dimensions.

Figure 27A:
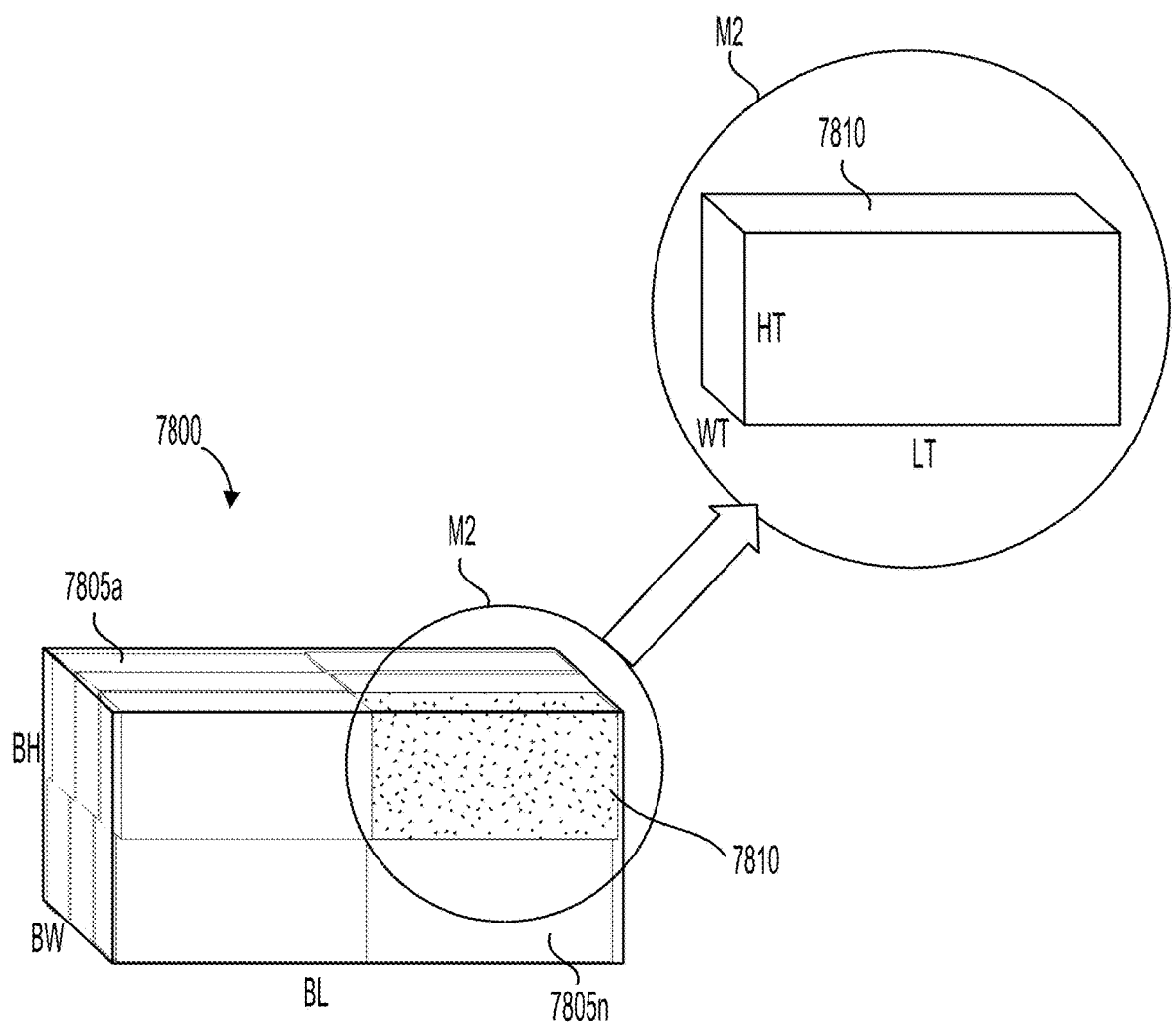
FIG. 27A depicts an example shipping container for containing one or more folded articles for return to a customer.
Figure 27B:
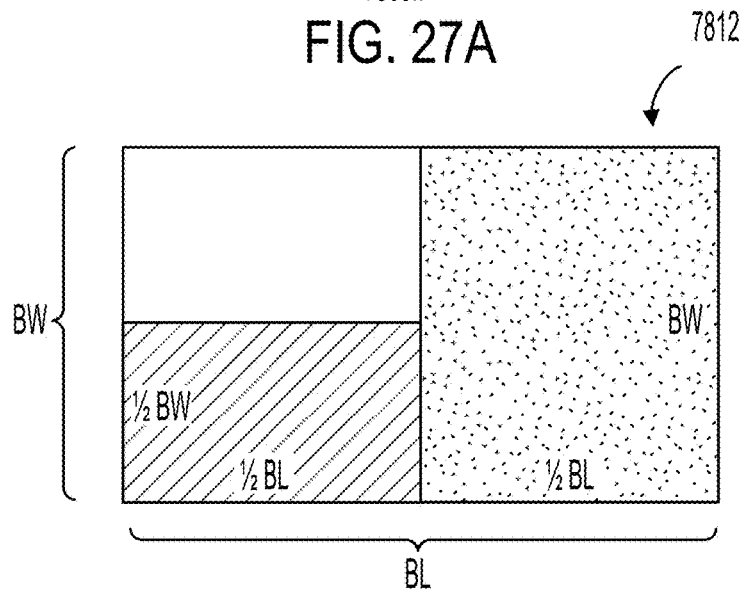
FIG. 27B depicts example target rectangle sizes to which one or more articles are folded to fit within the example shipping container of FIG. 27A.

As shown in FIGS. 27A-B, the one or more final folded dimensions can be one or more of the volumetric envelope dimensions of the folded article. The one or more volumetric envelope dimensions can be, for example a predetermined target rectangle size (WT×LT) associated with at least one of article type, article size, and article thickness, or predetermined volumetric dimensions (WT×LT×HT) associated with at least one of the article type, article size, and article thickness. In implementations, the predetermined target rectangle size is selected based on at least two of the article type, article size, and article thickness. In implementations, the controller can dynamically change the target rectangle size based on variations and article behaviors and partially folded states during the folding process.

For example, in implementations, the plurality of predetermined rectangle sizes can include folded length and width dimensions of 10×12 inches, 5×12 inches, 6×10 inches, and 5×6 inches for combining and orienting folded articles in even stacks in a particular order for efficiently loading into a shipping container 7800 having storage volume dimensions of approximately 14×24 inches. The predetermined one or more dimensions can inform the location and orientation of one or more fold lines across the article 7300 and the sequence of folds at the one or more fold lines. In some examples, an article type may be unknown or unidentifiable, and the article may be folded according to size remaining in a packing box 7800 configured to receive a plurality of folded articles 7805a-n. For example, in implementations, an unoccupied volume 7810 determines the maximum envelope size of the final folded article for including within the box 7800, and the controller can select a sequence of folds until the article height, width, and length fit with the volume 7810.

Additionally or alternatively, in implementations, the controller is configured to dynamically determine the position and orientation of a fold line at which to clamp and fold an article based on at least one of the accrued number of folds already executed (if any) and a difference in a maximum height and a minimum height of a top surface of the article from the surface 7105 of the platform 7500. The maximum and minimum height can be measured by the one or more sensors 7160, 7160a-b and the controller can compare the difference to a threshold indicative of a maximum allowable slope, or lean, of the top of the folded article. For example, the threshold can be in a range of between about 1 to 3 inches (e.g., 25 mm to 75 mm) such that the folded article can be stacked with other folded articles in a stable stack in a packing queue and/or packing container without toppling. Additionally or alternatively, the controller is configured to detect a slope of the top surface based on the output signal of the one or more sensors 7160, 7160a-b and compare an angle of the slope relative to the horizontal plane of the platform surface 7105 to a threshold angle. For example, the threshold angle indicative of an acceptable top surface slope can be in a range of between about 0 to 30 degrees. In implementations a threshold maximum allowable tilt angle for the top surface that ensures stable stacking of two or more articles is around about 15 to 20 degrees.

Returning to the method 1100 of folding, in implementations, selecting S1110 a folding and/or smoothing routine comprises determining S1112 whether the article 7300 requires a specific article type fold, such as one of a plurality of specific routines S1114 executable by the controller 7005 operably communicating with the at least one clamp rod 7200, 7200a-b and at least one of the sweep rod 7400 and the sweep blade 7650. Additionally or alternatively, the method 1100 comprises determining S1112 whether the article 7300 requires executing a general article fold routine, such as one of a plurality of general routines S1116 executable by the controller 7005 operably communicating with the clamp rod and at least one of the sweep rod 7400 and sweep blade 7650 to fold any article in accordance with a generalized folding routine applicable to all article types, sizes, and thicknesses. The specific routines S1114 and general routings S1116 will be described subsequently with regard to implementations.

Once the folding routine is selected from a plurality of specific folding routines S1114 and general folding routines S1116, the method comprises determining S1117 whether the article 7300 requires smoothing by executing a smoothing routine 1200 (e.g., an algorithm with executable instructions). In other implementations, the method 1100 comprises executing a smoothing routine 1200 by default. If no smoothing is required, the method 1100 proceeds to executing the selected folding routine as will be described subsequently with regard to implementations. Each of the routines comprises one or more iterations of folding S1132 the article over the clamp rod 7400 to achieve final dimensions at or within a pre-selected targeted final footprint area. The iterations of folding comprise determining S1118 a clamp line of the deformable article, determining S1120 whether the platform 7100 requires rotating to align a fold line 7320 of the deformable article with a clamp suspended about the platform, instructing 51122 a drive motor 7110 to rotate the platform 7100 to align the fold line 7320 of the deformable article 7300 with the at least one clamp rod 7200, 7200a-b suspended above and elongated parallel to a surface of the platform 7100, instructing S1124 the at least one clamp rod 7200, 7200a-b to lower onto the fold line, the lowered clamp rod being configured to apply force and immobilize the fold line of the deformable article 7300 against the surface 7105 of the platform 7100, and instructing at least one of an elongated sweep rod 7400 and a sweep blade 7650 to move. Instructing the at least one of an elongated sweep rod 7400 and sweep blade 7650 to move comprises instructing S1130 the at least one of the elongated sweep rod and sweep blade 7650 to at least one of smooth the article, and lift and fold the article 7300 as described previously with regard to implementations of the sweep rod 7400 and blade 7650.

In implementations, the fold line 7320 (e.g., fold lines 7320*a-k* described with regard to FIGS. 22A-23D), comprises a corresponding line across at least a portion of the deformable article about which the deformable article is configured to fold. In examples, the fold line crosses two outer edges of at least a portion of the deformable article 7300.

In implementations, the drive motor 7110 is configured to operate bi-directionally and wherein instructing the drive motor to rotate the platform 7100 comprises rotating the platform 7100 at least one of in a forward direction and in a reverse direction.

Additionally or alternatively, in implementations, the method further comprises receiving input from a force sensor in operable communication with the at least one clamp drive configured to limit the applied clamping force to a range of between about 2.5 N and 50 N.

Additionally or alternatively, in implementations, the method further comprises receiving an output signal comprising a 3-D image data of the deformable article and determining, based on the 3-D image data, one or more critical features of the deformable article. In implementations, the one or more critical features comprises a portion of the deformable article comprising at least one of a raised prominence, a closure, and an affixed embellishment.

Additionally or alternatively, in implementations, determining the fold line comprises, based on the output signal of each of the one or more sensors, determining one or more natural fold lines of the deformable article. In implementations, the one or more natural fold lines comprises a bisector of the deformable article.

Additionally or alternatively, in implementations, the one or more natural fold lines comprises a seam of the deformable article.

In implementations, as will be described subsequently with regard to implementations of general and specific folding routines, the controller 7005 is configured to determine one or more fold lines 7320 based on at least one of the article type, the article size, and the article thickness. Additionally or alternatively, the controller 7005 is configured to determine the at least one targeted final folded dimension of the article by identifying in a memory store one or more predetermined final folded dimensions associated with the determined at least one of the article type, the article size, and the article thickness. Determining one or more fold lines can be based at least in part on selecting the one or more predetermined final folded dimensions and adjusting fold line location based on thickness as will be described subsequently with regard to a bend allowance.

Figure 30:
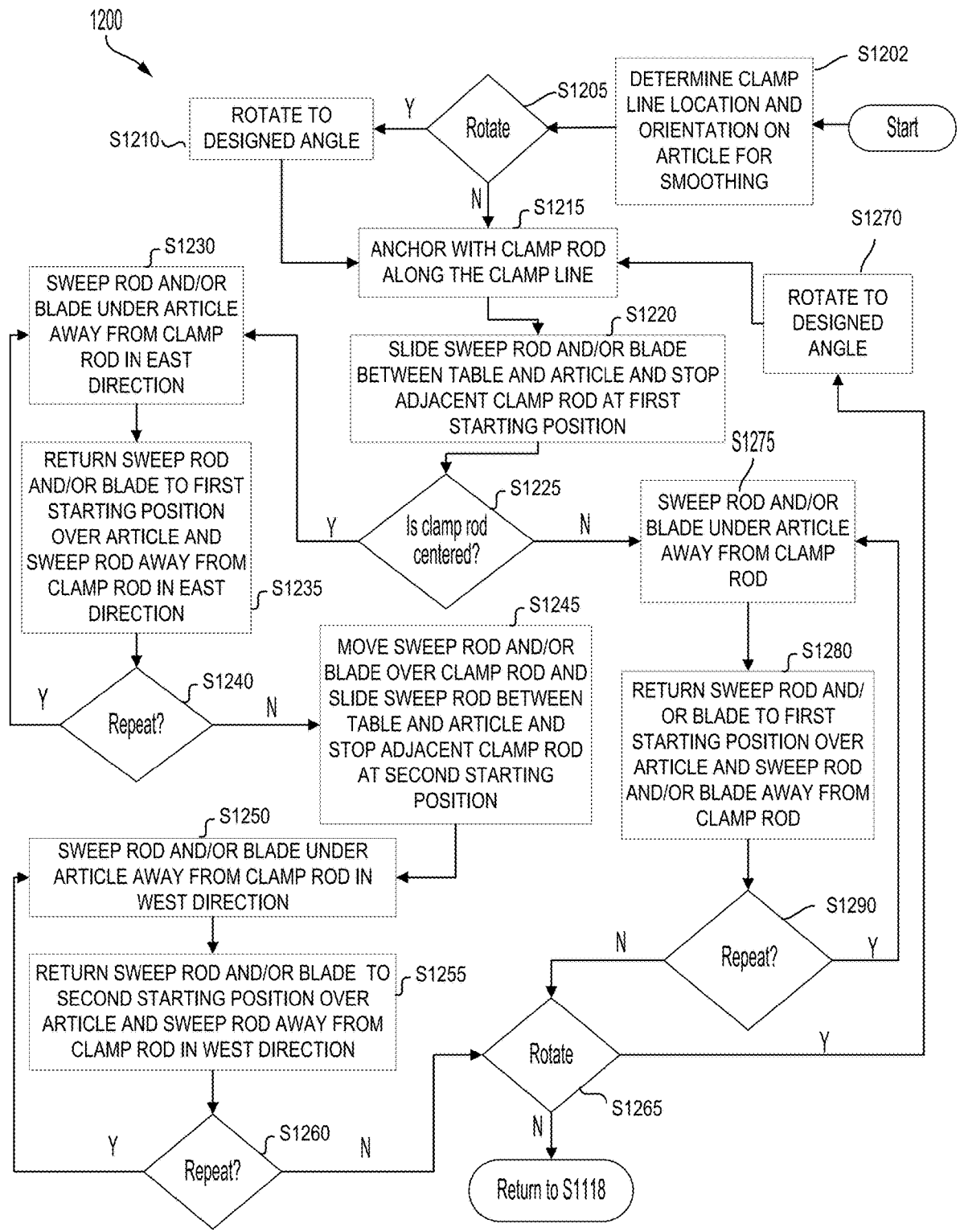
FIG. 30 depicts an example method of smoothing a deformable article prior to folding.
Figure 31A:
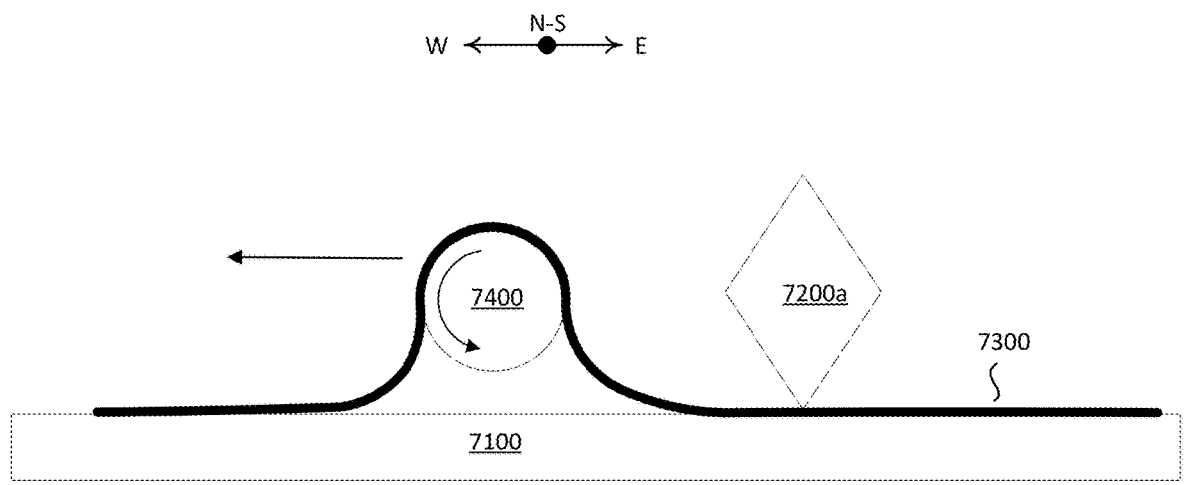
FIG. 31A depicts a schematic side view of an underside sweep of a clamped article during smoothing on a first side of a clamp.
Figure 31B:
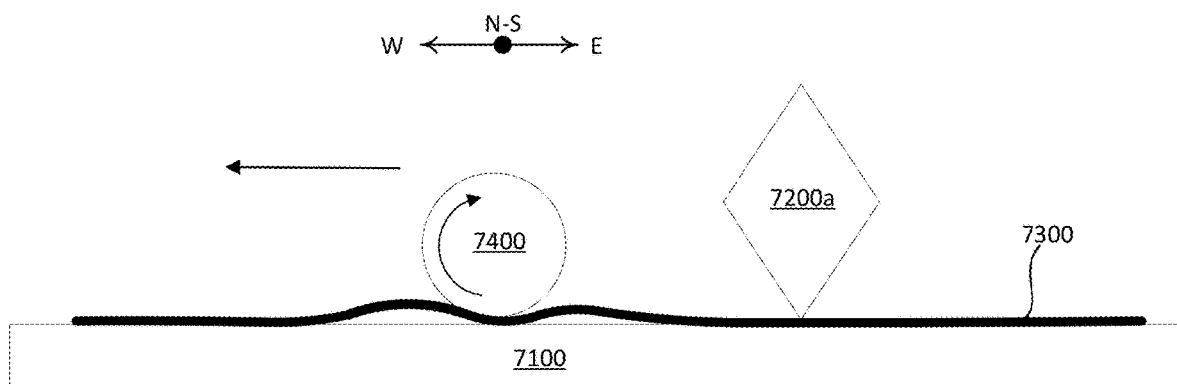
FIG. 31B depicts a schematic side view of an overside sweep of the clamped article of FIG. 31A on the first side of the clamp.
Figure 32A:
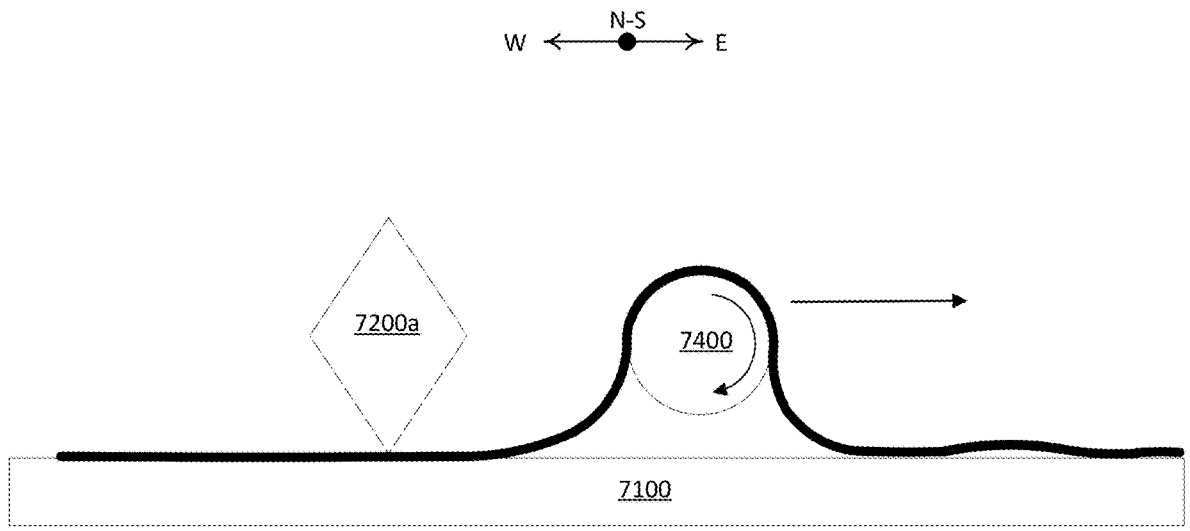
FIG. 32A depicts a schematic side view of an underside sweep of the clamped article of FIGS. 31A-B during smoothing on a second side of a clamp.
Figure 32B:
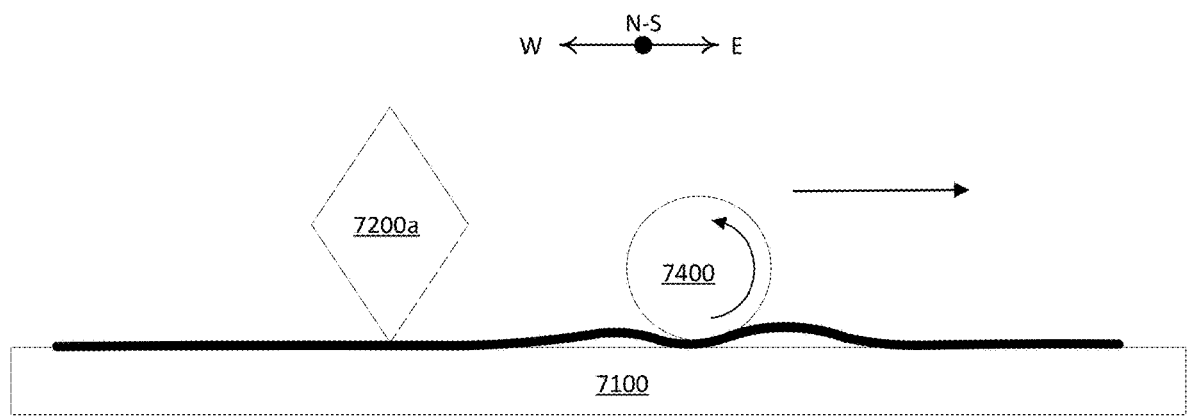
FIG. 32B depicts a schematic side view of an overside sweep of the clamped article of FIG. 32A on the second side of the clamp.

As previously described, in implementations, the method 1100 comprises determining S1117 whether the article 7300 requires smoothing. In other implementations, the method 1100 comprises executing a smoothing routine 1200 by default. If no smoothing is required, the method proceeds to folding. If smoothing is required, the controller 7005 is configured to execute a smoothing routine 1200, as shown in FIG. 30.

In some examples, an article may require only smoothing and not folding, such a small, wrinkled article, like a sock. In such examples, the device 7000 will smooth the article, and the controller 7005 will signal completion to one or more packing robots 8000 of the process line 100 for packing and returning the article to the customer.

Determining S1117 whether an article 7300 requires smoothing comprises determining whether the entire article 7300 requires smoothing or whether only particular portions of the article require smoothing and not others. Additionally or alternatively, determining S1117 whether an article 7300 requires smoothing comprises determining whether only one of a top side smoothing pass and an underside smoothing pass is required prior to folding an article. The determining S1117 step considers each individual article presented to the folding device 7000 and each sequentially presented article can be a unique article type, size, and thickness as is common with household laundry. Regardless of article type, size, and thickness, smoothing proceeds similarly. However, the controller 7005 can dynamically determine whether to place a clamp rod along an article bisector or closer to an edge of the article, for example based on article type, size, and thickness. Smoothing in an underside pass draws the article away from an engaged clamp rod to pull wrinkles flat. A pair of adult jeans, for example, can be clamped at the waistband and each leg can be smoothed independently.

Additionally or alternatively, smoothing outward and upward at a diagonal angle from the clamp rod can unfurl twisted protrusions and/or folded over portions of an article and particular article types, sizes, and thicknesses may benefit from the outward and upward underside smoothing, such as a pair of adult jeans. Similarly, a topside smoothing pass flattens wrinkles and unfurls folded over portions of the article. Determining whether only portions of the article require smoothing enables the controller 7005 to eliminate unnecessary, time consuming processing steps of rotating the platform 7100 and executing the smoothing routine 1200 unnecessarily. Smoothing the article flattens the article to a foldable state such that the folded article is presentably folded to a target size for efficient packing and stably folded so that the article is unlikely to unfold during subsequent maneuvers in queuing, packing, and return to a customer.

Figure 28:
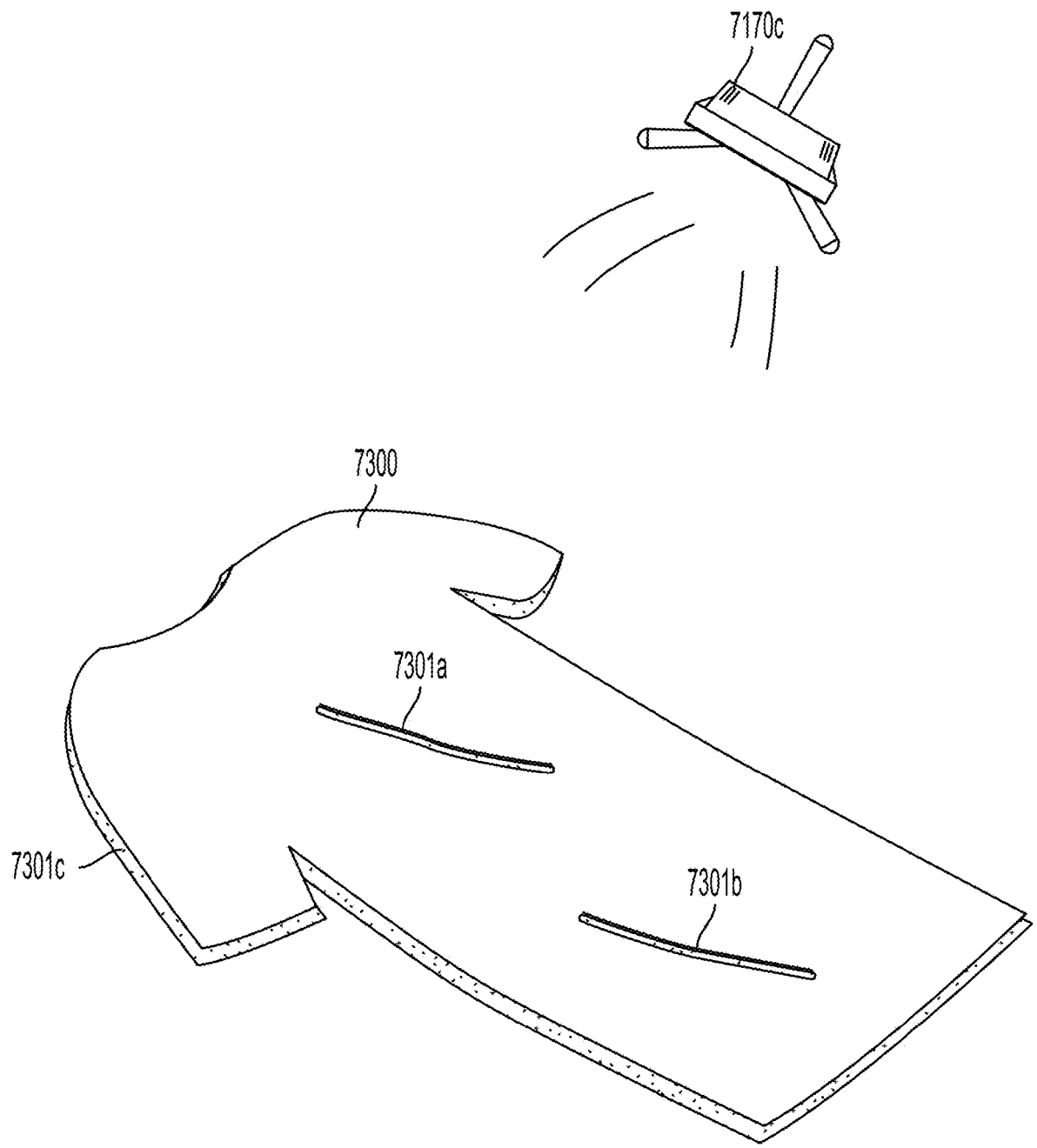
FIG. 28 depicts a perspective view of an example schematic of casting shadows on an article for wrinkle detection and article edge detection.
Figure 29:
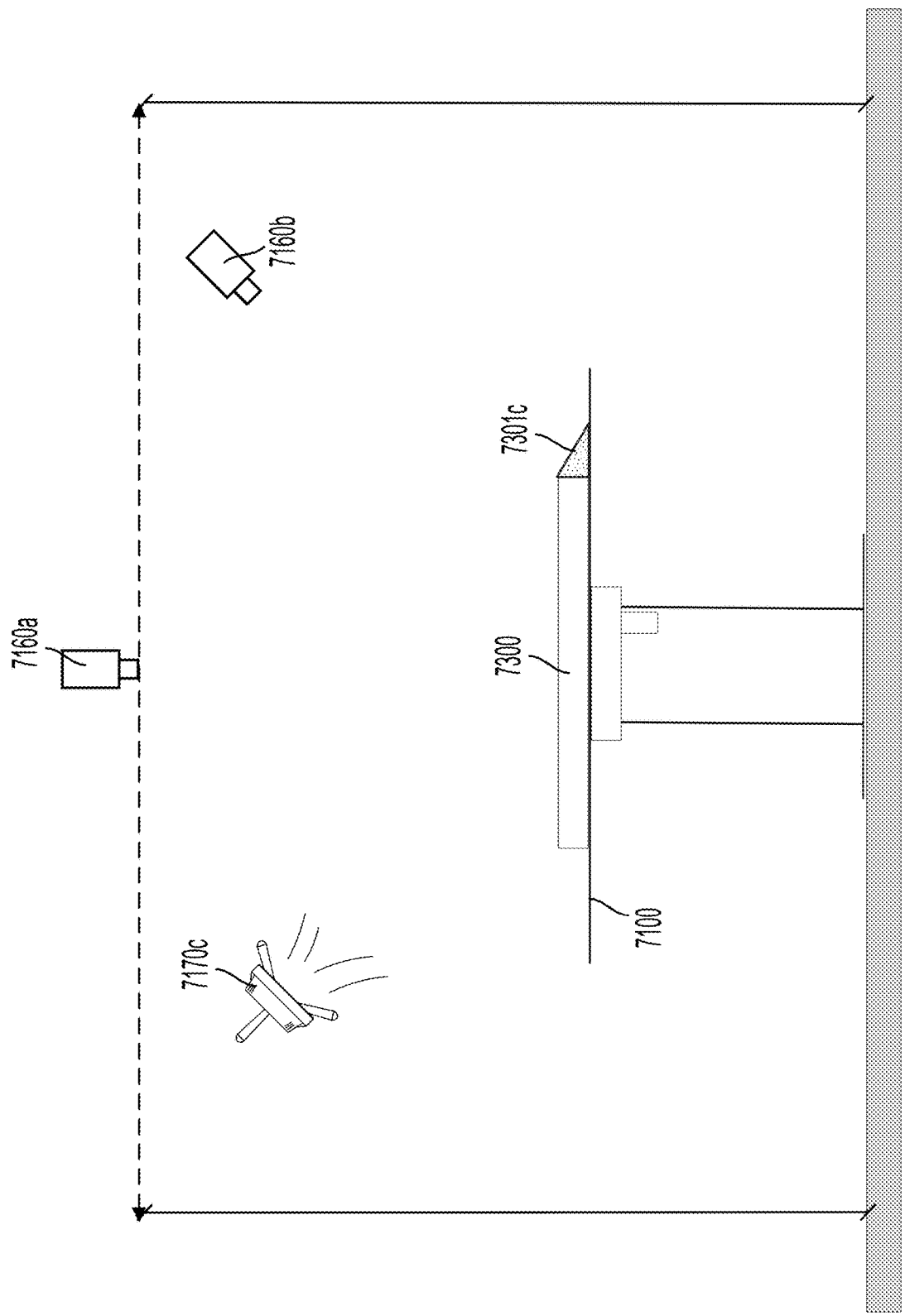
FIG. 29 depicts an example side view schematic of casting shadows on an article disposed on a platform of a folding device for article outline detection.

In implementations, determining S1117 whether the article requires smoothing comprises detecting one or more wrinkles on the article 7300 disposed on the platform 7100. In implementations, as shown in FIGS. 28-29, identifying wrinkles comprise lighting the article from an angled source, such as the light 7170*c* tilted from the Z-axis Tx and aimed at an angle to the surface of the platform 7100. The determination then comprises detecting with the one or more sensors 7160, 7160*a-c* b, whether a shadow 7301, 7301*a-c* matches an outline of the article or falls with the edges of the article 7300, thereby indicating a location and orientation of one or more wrinkles 7905, 7905*a-b*. In implementations, creating a shadow 7301*c* about the edges of the article 7300 disposed on the platform enables the controller 7005 to match 3D sensor data of the article 7300 to the shadow 7301*c*. The directional lighting creates a shadow 7301*c* that enables the controller to detect the edges of the article, which is especially advantageous when color contrast between the surface 7105 of the platform 7100 and the article is low and the article is therefore difficult to perceive.

In implementations, such as that of FIG. 30, a smoothing routine 1200 comprises a sequence of instructions that are executable by the controller 7005 and stored on a memory 7010 in communication with the controller. In implementations, as shown in the sequence of FIGS. 31A-32B and 33A-37, the sequence of instructions for smoothing 1200 the deformable article prior to folding comprises determining 51202 a clamp line location (e.g. article anchor location) and orientation on the article for smoothing, determining 51205 whether a platform rotation is needed, instructing S1210 a drive motor 7110 to rotate the platform 7100 to align clamp line location (also herein referred to as a fold line) of the deformable article 7300 with the at least one clamp 7200, 7200*a-b* suspended above and elongated parallel to a surface 7105 of the platform 7100. The smoothing method 1200 comprises instructing S1215 the at least one clamp 7200, 7200a-b to lower onto the location, the lowered at least one clamp 7200, 7200a-b configured to apply force and anchor of the deformable laundry article against the surface. The smoothing method 1200 comprises instructing S1220 at least one of the elongated sweep rod 7400 and the sweep blade 7650 to slidably move in a first direction toward the at least one clamp 7200, 7200a-b to a position adjacent and parallel to the at least one clamp 7200, 7200a-b, the elongated sweep rod 7400 and/or sweep blade 7650 being disposed between the deformable article 7300 and the surface 7105 of the platform 7100. In implementations comprising a sweep rod 7400, the sweep rod is configured to rotate about a longitudinal axis while slidably moving beneath the article 7300 to prevent the article from bunching while the sweep moves in the X-axis Tx direction while in contact with the article.

In any of the preceding examples and implementations, as shown in FIGS. 31A-B and 32A-B, the sweep rod 7400 can rotate counterclockwise for the first motion comprising a right to left (east to west) movement between the article and the platform, and clockwise for the first motion comprising a left to right (west to east) movement between the article and the platform. The sweep rod 7400 can rotate clockwise for the first motion comprising a right to left movement atop the article and counterclockwise for the first motion comprising a left to right movement atop the article 7300. The direction of rotation as the sweep rod 7400 moves between the article and away from the clamp rod 7200 prevents the article thereon from bunching and pulls the fabric in the direction of movement to smooth out any wrinkles and/or folded over portions of the article. Similarly, the direction of rotation as the sweep rod 7400 moves atop the article and away from the clamp rod 7200 prevents the article thereon from bunching and pulls the fabric in the direction of movement to smooth out any wrinkles and/or folded over portions of the article. In examples, in any of the preceding examples and implementations the method further comprising repeating the sequence of instructions for smoothing, the repeated sequence comprising at least one of sliding and rotating the elongated sweep rod at a relatively slower rate than a first execution of the sequence of instructions for smoothing.

In implementations, the sweep rod 7400 rotates about its longitudinal axis. Additionally or alternatively, the sweep rod 7400, under control of the X and Z drive motors being actuated together, can sweep a circular or spiral motion as it transits underneath an article for providing addition vibration and agitation to unfurl and/or untwist folded over or twisted portions of the article.

In any of the preceding examples and implementations, the anchor location can comprise a middle location (e.g., a bisector of an article or a longitudinal axis near the bisector but offset from the bisector) of the deformable article and the sequence of instructions for smoothing the deformable article prior to folding is executed by the controller on both sides of the anchor location. In implementations, the method 1200 comprises determining S1225 whether the at least one clamp rod 7200, 7200a-b is approximately centered on the article 7300.

Figure 33A:
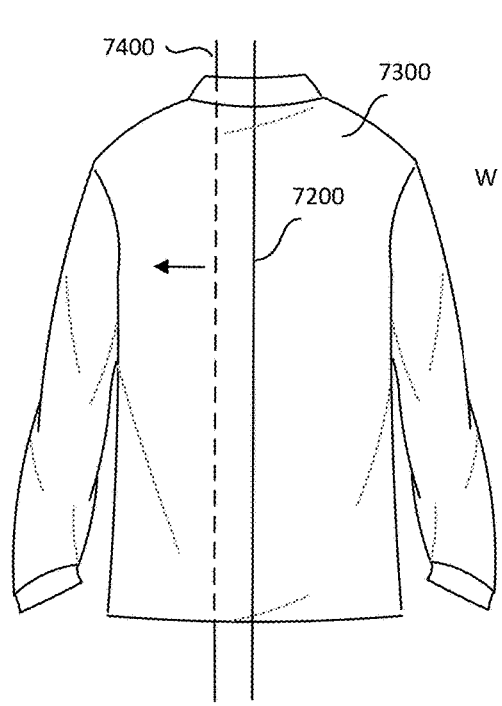
FIGS. 33A-33C depict an example sequence of smoothing a clamped shirt in a first orientation relative to clamp and sweep rods.
Figure 33B:
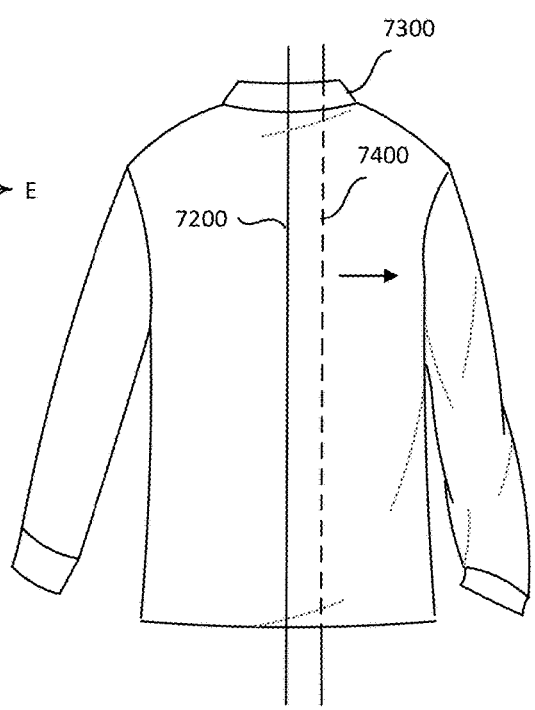
Figure 33C:
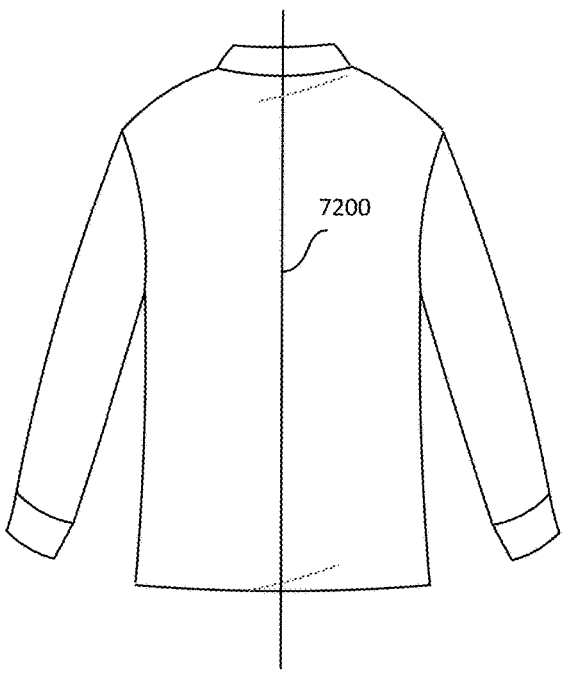
Figure 34A:
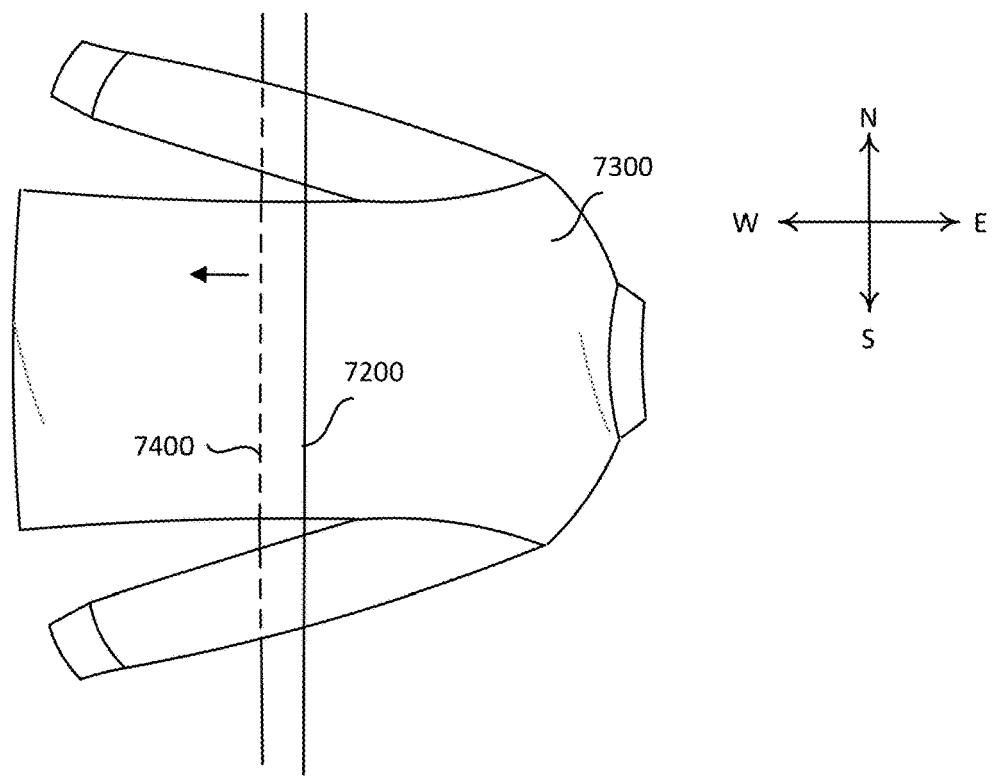
FIGS. 34A-34B depict an example sequence of smoothing the clamped shirt of FIGS. 33A-C in a second orientation rotated from the first orientation relative to clamp and sweep rods.
Figure 34B:
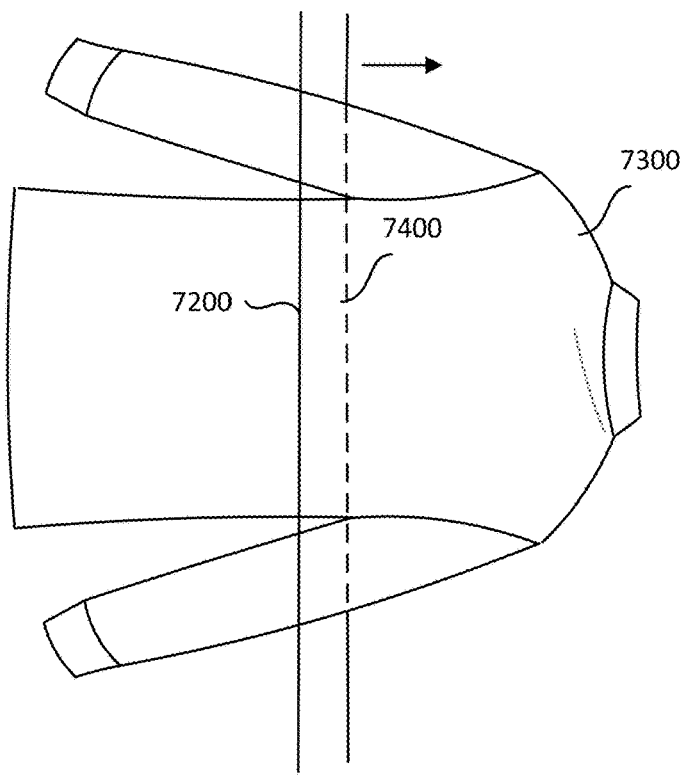
Figure 35:
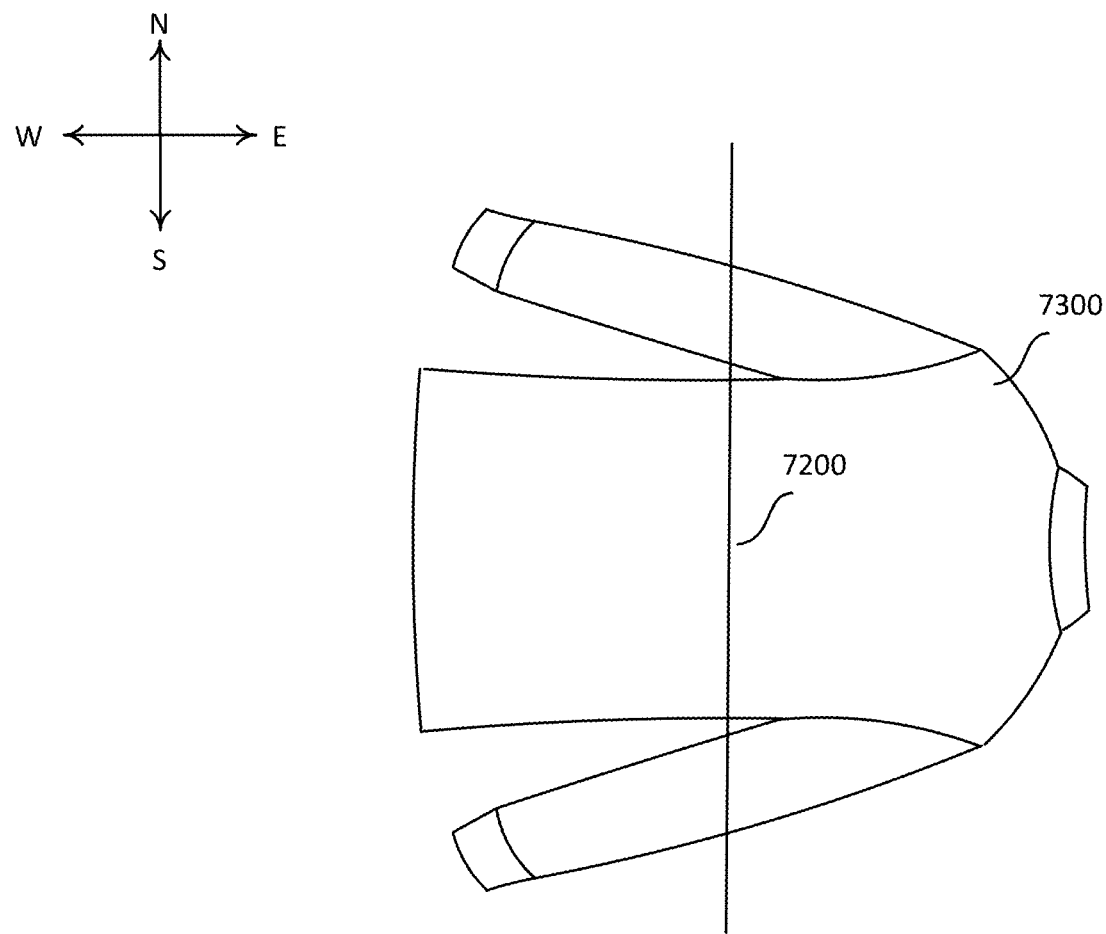
FIG. 35 depicts the shirt of FIGS. 33A-34B at the completion of smoothing with wrinkles smoothed flat.

FIGS. 33A-33C depict an example sequence of smoothing a clamped shirt in a first orientation relative to clamp anchored at or around a bisector of the torso. The sweep rod sweeps first on one side of the clamp and then on the other. The platform rotates and, as shown in FIGS. 34A-B, the clamp anchors a middle of the rotated shirt and smooths on both sides of the clamp. FIG. 35 depicts the shirt of FIGS. 33A-34B at the completion of smoothing with wrinkles smoothed flat. Although not shown in FIGS. 33A-35, smoothing the shirt additional can include repositioning and smoothing one or both sleeves independent of smoothing the torso portion of the shirt.

Figure 36A:
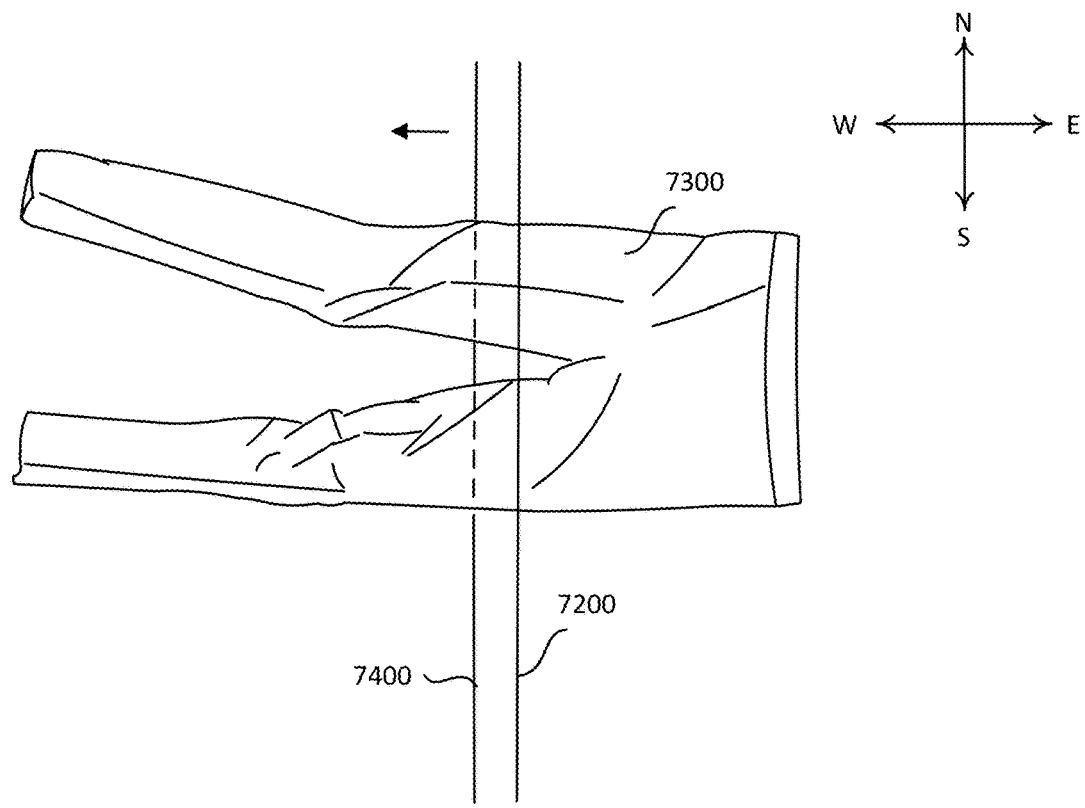
FIGS. 36A-B depict an example sequence of smoothing pants sequentially on either side of a clamp rod to remove wrinkles and straighten twisted and/or angular protrusions.
Figure 36B:
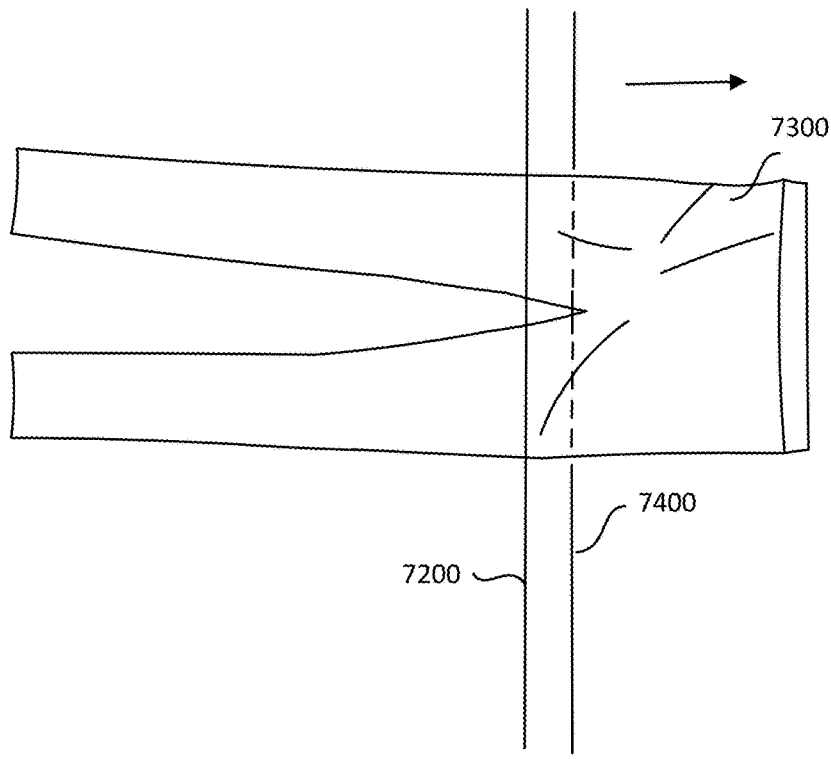
Figure 37:
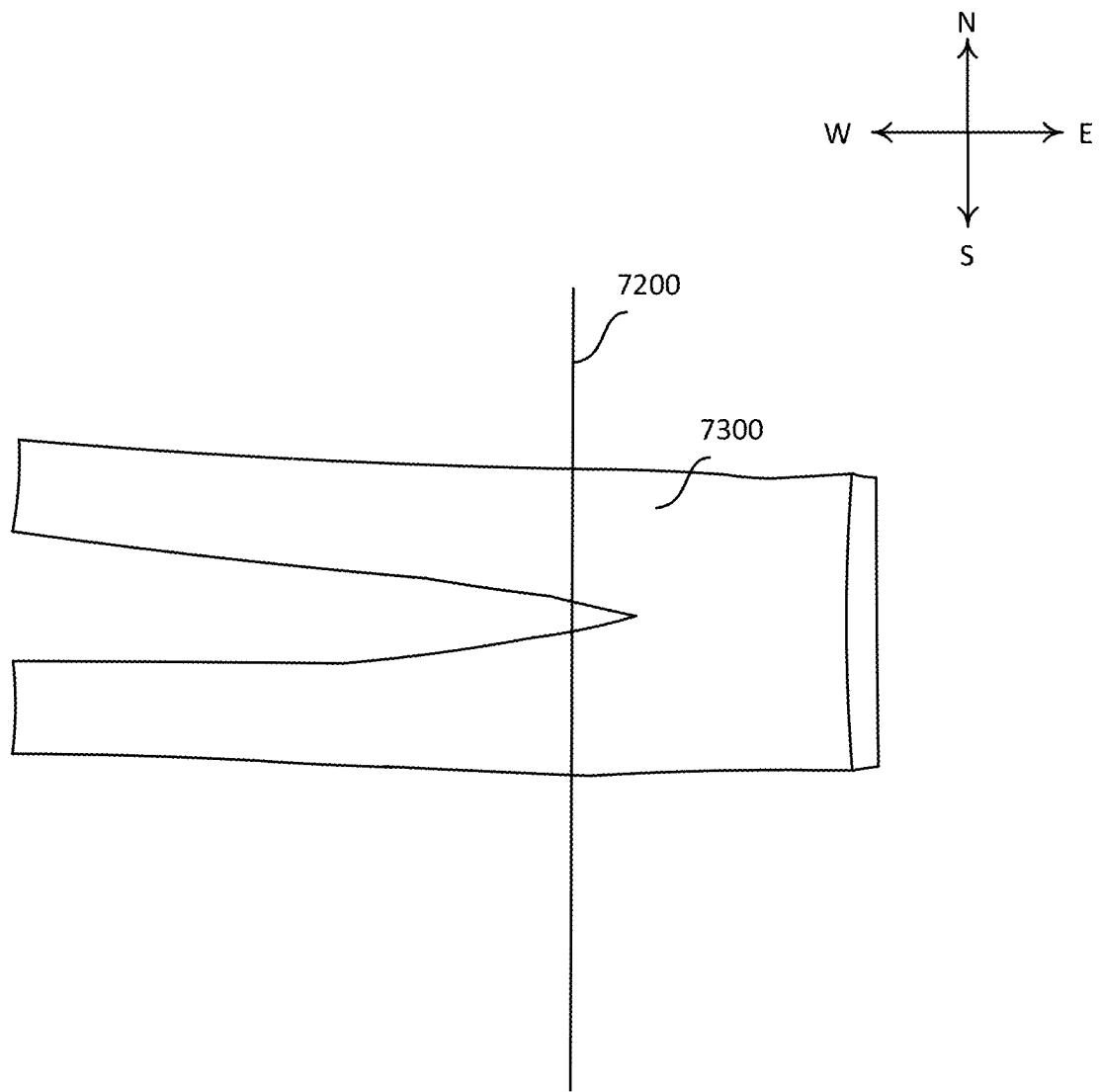
FIG. 37 depicts the pants of FIGS. 36A-36B at the completion of smoothing.

Similarly, FIGS. 36A-B depict an example sequence of smoothing pants sequentially on either side of a clamp rod to remove wrinkles and straighten twisted and/or angular protrusions, and FIG. 37 depicts the pants of FIGS. 36A-36B at the completion of smoothing. Although the pants are clamped in the middle of the legs and smoothed on either side of that middle clamp position, in alternative implementations, as previously described, clamping a waist band and independently smoothing each leg with the sweep rod or blade oriented substantially perpendicular to the longitudinal access of each leg can be advantageous for untwisting and unfurling folded over portions. Additionally or alternatively, in implementations, the controller can rotate the platform to align each leg for individual clamping and smoothing.

If the at least one clamp rod 7200, 7200a-b is not centered, the controller 7005 instructs at least one of the sweep rod 7400 and sweep blade 7650 to sweep S1275 under the article, away from the at least one clamp rod 7200, move atop the article 7300, return 51280 to the first starting positioning, and sweep the at least one of the sweep rod 7400 and sweep blade 7650 over the article, away from the at least one clamp rod 7200, 7200a-b.

The method 1200 comprises determining 51290 whether more smoothing is necessary, e.g., wrinkles or folded over portions of the article are still detected by the one or more sensors, and iteratively repeat smoothing beneath and over the article until no additional smoothing is required or a maximum number of attempts (e.g., no more than 3 attempts) are executed. In implementations, the method comprises determining S1265 whether one or more wrinkles or folded over portions of the article would be smoothed best by rotating the article relative to the at least one clamp rod 7200, 7200a-b and the at least one of a sweep rod 7400 and a sweep blade 7650. If additional smoothing is determined to be recruited, the method comprises rotating S1270 the platform 7100 to a desired angle and returning to anchoring S1215 the article with the one or more clamp rods 7200, 7200a-b.

If the at least one clamp rod 7200 is determined S1225 to be centered, the method includes sweeping beneath and over the article on either side of the at least one clamp rod 7200, 7200a-b as described above with regard to FIGS. 31A-B and 32A-B. As shown in FIG. 30, the method includes the controller 7005 instructing at least one of the sweep rod 7400 and sweep blade 7650 to sweep 51230 under the article, away from the at least one clamp rod 7200 in one of an east to west direction or a west to east direction, move atop the article 7300, return 51235 to the first starting positioning, and sweep the at least one of the sweep rod 7400 and sweep blade 7650 over the article, away from the at least one clamp rod 7200, 7200a-b in the same direction as the under article sweep. The method comprises determining 51240 whether more smoothing is necessary, e.g., wrinkles or folded over portions of the article are still detected by the one or more sensors, and iteratively repeat smoothing beneath and over the article until no additional smoothing is required or a maximum number of attempts (e.g., no more than 3 attempts) are executed.

If no additional smoothing is required, the method comprises moving S1245 the at least one of the sweep rod 7400 and sweep blade 7650 over the at least one clamp rod 7200, 7200a-b, sliding the at least one of the sweep rod 7400 and sweep blade 7650 between the platform 7100 and the article 7300 and stopping adjacent the at least one clamp rod 7200, 7200a-b at a second starting position. The method 1200 includes the controller 7005 instructing at least one of the sweep rod 7400 and sweep blade 7650 to sweep S1250 under the article, away from the at least one clamp rod 7200 in the other of an east to west direction or a west to east direction opposite the direction of motion on the first side of the clamp 7200, move atop the article 7300, return S1255 to the second starting positioning, and sweep the at least one of the sweep rod 7400 and sweep blade 7650 over the article, away from the at least one clamp rod 7200, 7200a-b in the same direction as the under article sweep. The method comprises determining S1260 whether more smoothing is necessary, e.g., wrinkles or folded over portions of the article are still detected by the one or more sensors, and iteratively repeat smoothing beneath and over the article until no additional smoothing is required or a maximum number of attempts (e.g., no more than 3 attempts) are executed.

In implementations, the method comprises determining S1265 whether one or more wrinkles or folded over portions of the article would be smoothed best by rotating the article relative to the at least one clamp rod 7200, 7200a-b and the at least one of a sweep rod 7400 and a sweep blade 7650. If additional smoothing is determined to be recruited, the method comprises rotating S1270 the platform 7100 to a desired angle and returning to anchoring S1215 the article with the one or more clamp rods 7200, 7200a-b.

In implementations, sweeping at least one of the sweep rod 7400 and sweep blade 7650 under the article, away from the at least one claim 7200, 7200a-b comprises raising the deformable article 7300 up above the surface of the platform, and slidably moving until the at least one of the sweep rod 7400 and sweep blade 7650 disengages from the deformable article. In implementations, the at least one of the sweep rod 7400 and sweep blade 7650 can move diagonally upward as it slides along the support rails to assist with unfurling any wrinkled or folded over portions of the article.

Returning now to FIG. 25, after the completion of smoothing or upon determining smoothing is unnecessary, the method 1100 comprises instructing the at least one of the sweep rod 7400 and/or blade 7650 to fold. Folding comprises slidably moving S1130 the elongated sweep rod and/or blade in a first direction toward the at least one clamp 7200, 7200a-b to a position adjacent and parallel to the at least one clamp 7200, 7200a-b, the elongated sweep rod 7400 and/or blade 7650 being disposed between the deformable article and the surface. In implementations comprising the elongated sweep rod, the sweep rod can rotate about a longitudinal axis while slidably moving to assist with sliding beneath the article and subsequently to assist with extracting from the folded portion of the article 7300. In implementations, the at least one movable sweep rod is configured to slide under a terminal edge of the unclamped portion of the article 7300 while rotating. In examples, the elongated sweep rod comprises a circular cross section and rotates about a central axis. In examples, the elongated sweep rod rotates under the deformable article clockwise while sliding from the right of the at least one clamp rod to left and counterclockwise while sliding from the left of the at least one clamp rod to right. Additionally or alternatively, the elongated sweep rod rotates under the deformable article 7300 counterclockwise while sliding from the right of the at least one clamp rod to left and clockwise while sliding from the left of the at least one clamp rod to right. In examples, the sweep rod rotates in a range of about 5 to 500 RPM.

With the sweep rod 7400 and/or blade 7650 under the article 7400 and adjacent the at least one clamp rod 7200, 7200a-b, the method comprises raising S1132 the deformable article up and over the at least one clamp rod 7200, 7200a-b while slidably moving in the first direction at least until the article 7300 disengages from the elongated sweep rod and/or blade, retracting S1134 the clamp until disengaged from the article, and determining S1136 whether the article comprises the at least one final fold dimension (e.g., a final footprint area).

In examples, the method further comprises communicating with a packing robot 8000 configured to receive the deformable article from the platform upon stopping iterating the folding sequence.

In examples, the method further comprises instructing a packing robot 8000 in communication with the network to retrieve the deformable article upon stopping iterating the folding sequence.

In examples, the method further comprises instructing a tilt motor of the platform to tilt the platform around a table pivot 7120 to slidably release the deformable article to a receiving platform upon stopping iterating the folding sequence.

Returning now to the step of determining S1112 whether a specific article type fold routine is required, on implementations, the plurality of specific folding routines comprises at least one of a pants folding algorithm, an open front top folding algorithm, a shirt folding algorithm, a hooded sweatshirt folding algorithm, and an algorithm for querying specific customer requests for folding one or more particular articles or article types in a load of household laundry. The specific article type fold routines ensure stable, presentable folds for particular article types. Additionally, the specific article type fold routines assist with folding particular article types to target dimensions for stable, efficient packing with as level a top surface as possible to preventing leaning or toppling within a stack of folded articles.

Taking FIGS. 38-40C together, an implementation for folding a shirt is shown. In implementations, the controller 7005 is configured to determine the article 7300 is a shirt based on processing the one or more received sensor signals 7160, 7160a-c with at least one of a neural network, a regressor, and a size-invariant image database. Additionally or alternatively, a preceding robot in the process line 100, e.g, the repositioning robot 6000, can communicate with the folding robot 7000 via the communication network 230 and provide data indicative of the article being a shirt based on at least one of one or more sensors of the repositioning robot and one or more executed reposition movements indicative of the article being a shirt. Additionally, the repositioning robot can communicate at least one of whether the shirt is an open front shirt, whether the front is facing upward or downward on the surface 7105, and whether the shirt is already partially folded by the repositioning robot. In implementations, the controller 7005 is configured to compare the received output signal to data stored in a memory in communication with the controller for determining the article type. The controller can identify features indicative of at least one of a front side and a back side of the deformable article. In examples, the method can further comprise identifying features indicative of the deformable article being inside out. The identifiable features indicative of the deformable article being inside out comprises at least one a visible seam, a tag, and stitching.

Figure 38:
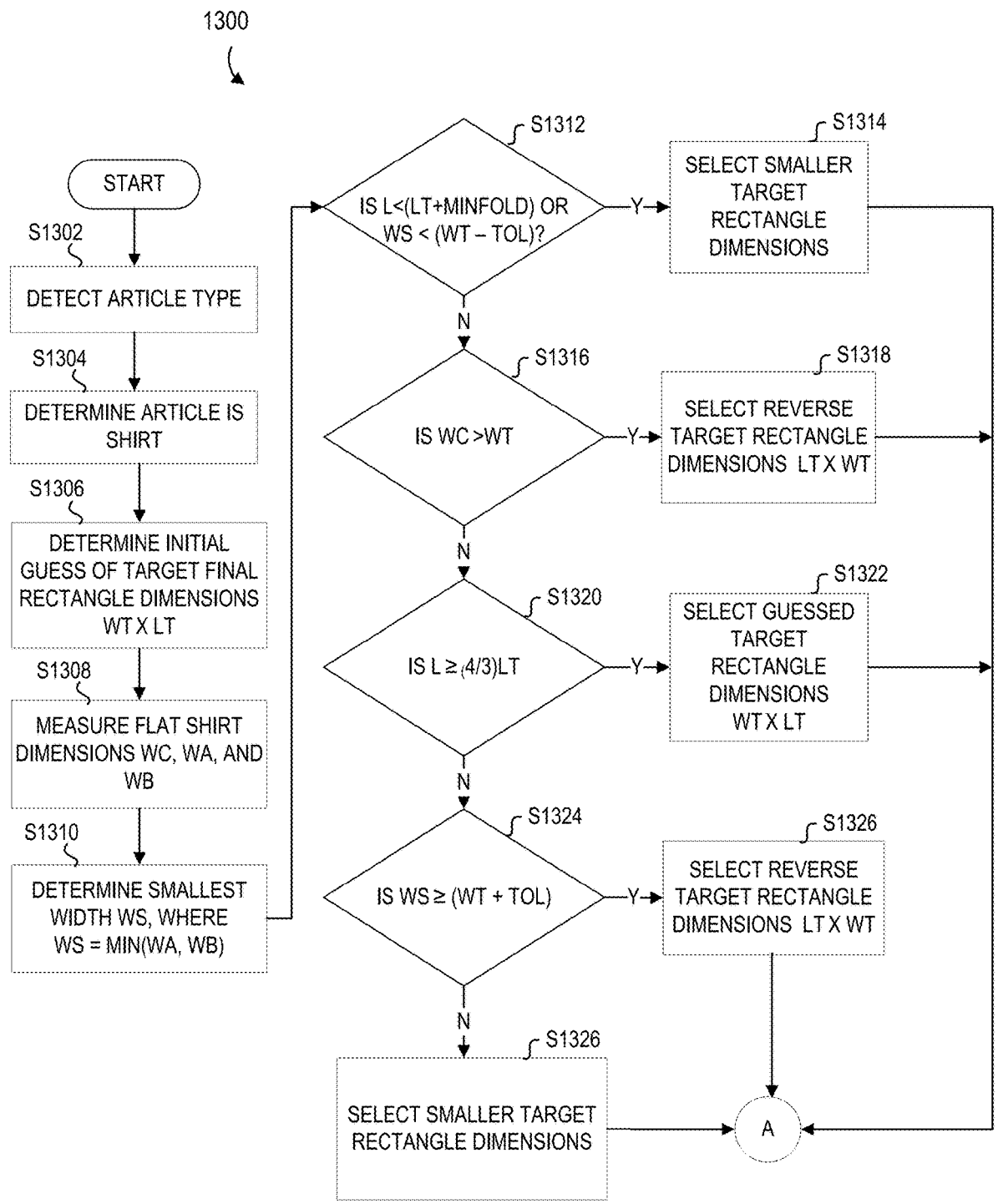
FIG. 38 depicts an example method executable by a controller of the folding robot for determining target folded dimensions for a shirt in accordance with a particular article type fold routine of the folding method of FIG. 25.
Figure 39:
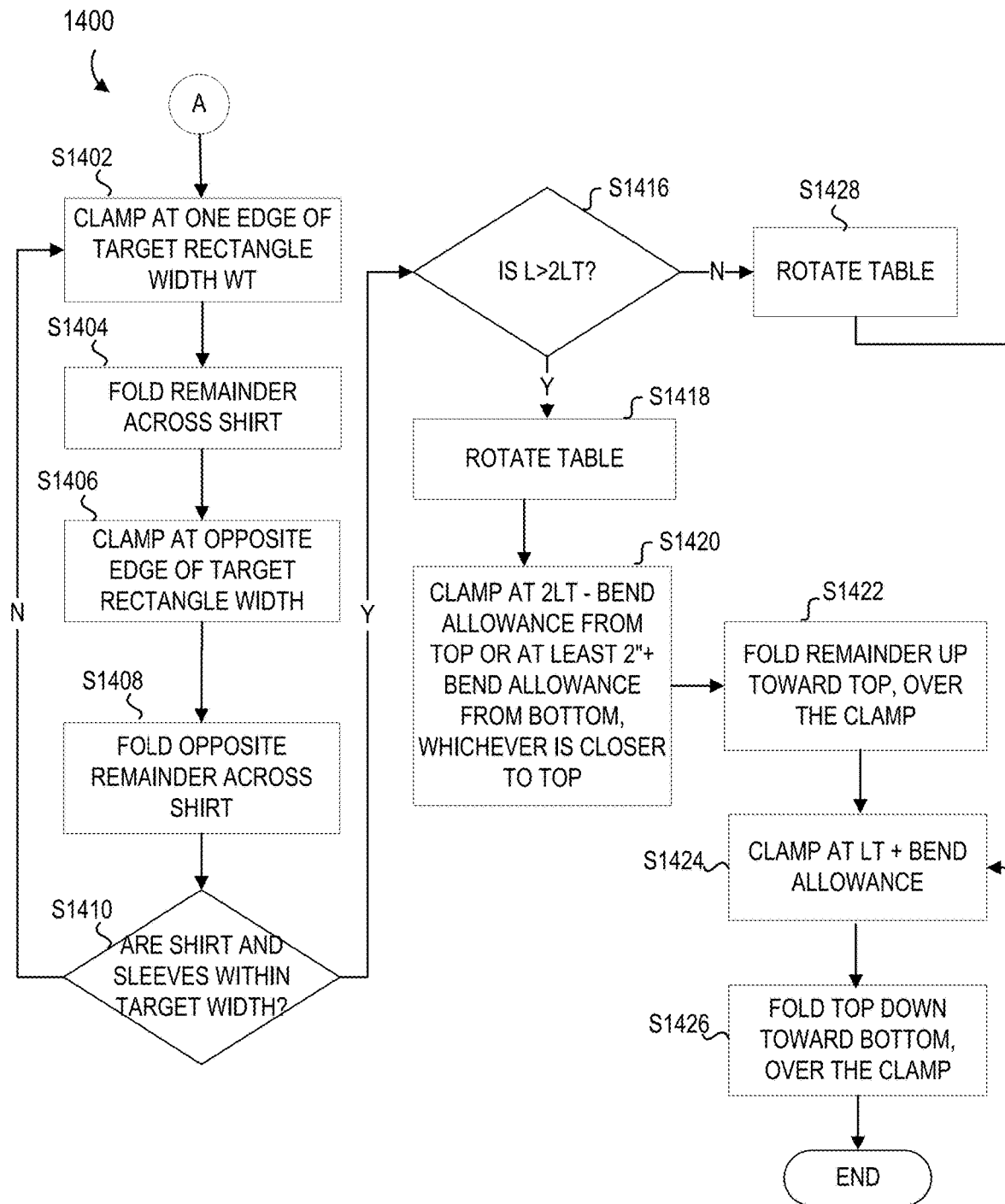
FIG. 39 depicts an example method of folding a shirt to the target folded dimensions determined by the method of FIG. 38.
Figure 41:
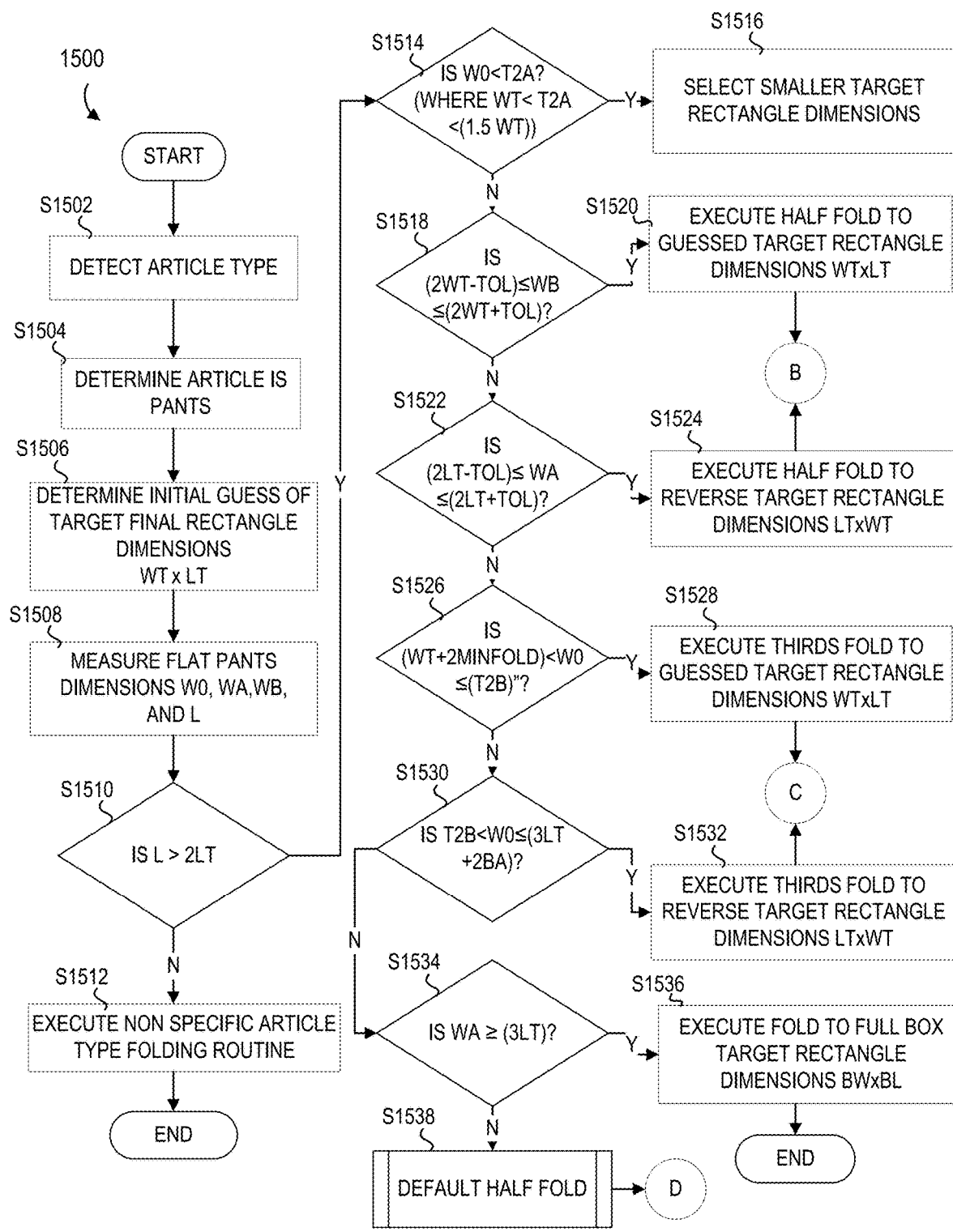
FIG. 41 depicts an example method executable by a controller of the folding robot for determining target folded dimensions for pants in accordance with a particular article type fold routine of the folding method of FIG. 25.
Figure 42:
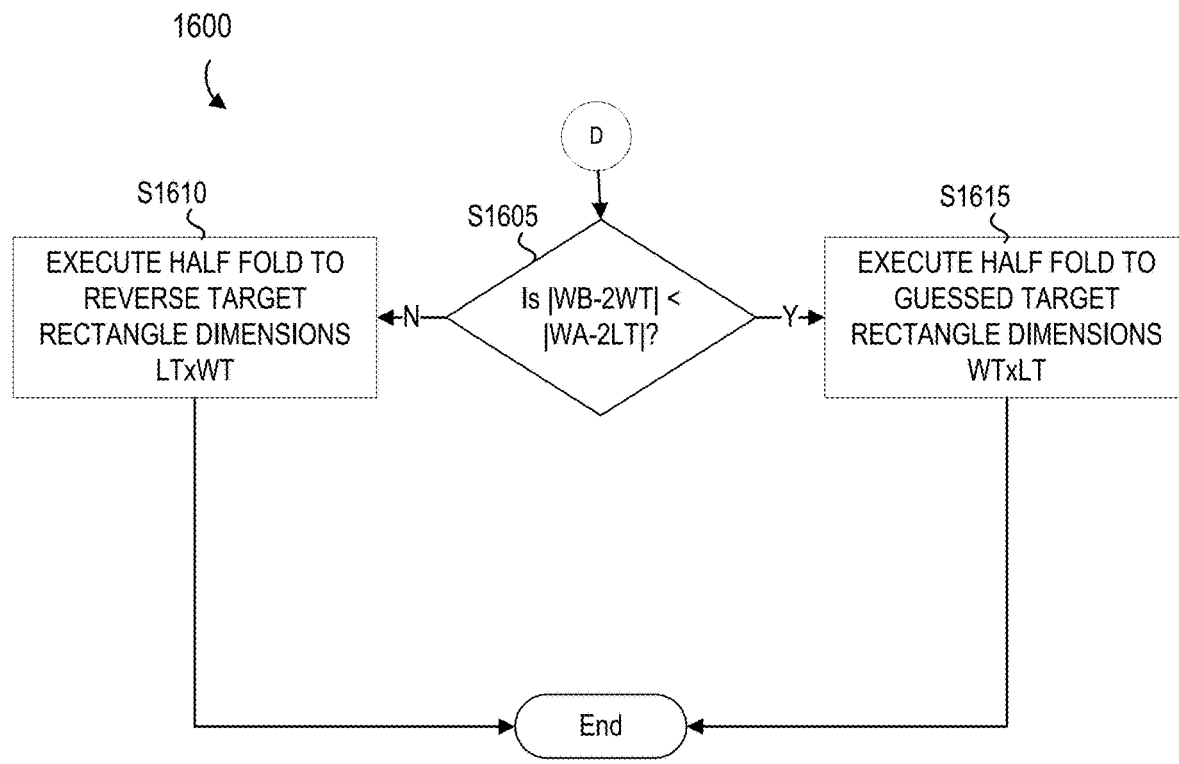
FIG. 42 depicts an example method of folding pants in accordance with a default half fold method to the target folded dimensions determined by the method of FIG. 41.

Turning now to FIGS. 38 and 40, an implementation of a method 1300 of determining target folded rectangle dimensions for a shirt is shown. The method 1300 comprises detecting 51302 an article type and determining 51304 the article is a shirt as described previously with regard to implementations. The method 1300 comprises determining 51306 an initial guess of target final rectangle dimensions WT×LT, measuring S1308 flat shirt dimensions WC, WA, and WB, and determining 51310 smallest width WS, where the smallest width WS is equal to the minimum of the measured shirt dimensions WA and WB. The method 1300 comprises selecting targeted folded rectangle dimensions depending on one or more determined conditions. The method 1300 comprises determining S1312 whether a measured length L of the article is less than a guessed target final rectangle length LT plus a is the minimum allowable fold size (MINFOLD) or whether the smallest determined width of WA and WB is less that a guessed target final rectangle width WT minus a tolerance (TOL) for the width/length dimensions. In implementations the minimum allowable fold size (MINFOLD) is defined by the article stiffness and a fold direction (e.g., X-axis Tx) dimension of the at least one clamp 7200. In implementations, the minimum allowable fold size (MINFOLD) accounts for a bend allowance. In implementations, the minimum allowable fold size (MINFOLD) is determined initially for an unfolded garment and increases as the number of layers in a folded garment increase. In implementations, MINFOLD is in a range of between about 2" to 4" (e.g., 5 cm to 10 cm). In implementations, the tolerance (TOL) is predetermined by at least one of packing box dimensions and other packing queuing and loading components of the packing robot 8000. If either condition of the determination S1312 is met, the method comprises selecting S1325 a smaller target rectangle dimensions to which the shirt will be folded for packing. For example, if the initial guess target final rectangle dimensions are 10 inches by 12 inches, if the measured length L is less than 15 inches and the smallest width WS is less than 9 inches, the method comprises selecting S1325 a smaller target rectangle dimensions to which the shirt will be folded for packing.

If neither condition is met at the determining S1312 step, the method 1300 comprises determining S1316 whether WC is greater than the guessed target final rectangle width WT. If that determination is true, the method comprises selecting S1318 reverse target rectangle dimensions LT×WT. For example, if the initial guess target final rectangle dimensions are 10 inches by 12 inches and WC is less than 10 inches, the reverse target folded rectangle dimensions are 12×10.

If the determination S1316 is not true, the method 1300 comprises determining 1320 whether a measured length L of the shirt is greater than or equal to four thirds the initial guess target final rectangle length LT. If the determination is true, the method comprises selecting S1322 the initial guessed target rectangle dimensions WT×LT. For example, if the initial guess target final rectangle dimensions are 10 inches by 12 inches and if the measured length L of the shirt is greater than or equal to 18 inches, the method selects the initial guessed target rectangle dimensions WT×LT, or 10×12 inches.

If the determination 51320 is not true, the method 1300 comprises determining S1324 whether the smallest width WS is greater than or equal to the guessed target final rectangle width WT plus the tolerance (TOL). If the determination is true, the method comprises selecting S1326 reverse target rectangle dimensions LT×WT. For example, if the initial guess target final rectangle dimensions are 10 inches by 12 inches, the tolerance TOL is 1", and WS is greater than or equal to 11", the reverse target folded rectangle dimensions are 12×10 inches.

If the determination S1324 is not true, the method 1300 comprises selecting S1326 smaller target rectangle dimensions. The determination S1324 thus ensures the folded article will fit inside the packing box of known dimensions. As described previously with regard to implementations, final folded dimensions of an article are at or within the bounds of a plurality of predetermined rectangle sizes. Additionally, in implementations, the plurality of predetermined rectangle sizes are dimensioned such that they can be combined to fit alone or in multiple side by side stacking positions to fit within a packing box (e.g., a shipping container 7800, FIG. 27). For example, the rectangle sizes can comprise, in one implementation, a largest rectangle size of 10×24, medium rectangle size of 10×12 and a smallest rectangle size of at least one of 5×6 and 6×10.

Taking 39 and 40 together, an implementation of a method 1400 of folding the shirt to the selected target folded rectangle dimensions comprises clamping S1402 at one edge of the target rectangle width WT, folding S1404 the remainder across the shirt, clamping S1406 at the opposite edge of the target rectangle width WT, and folding 51408 the opposite remained across the shirt. The method 1400 comprises determining S1410 whether the shirt body and sleeves are within the target width WT. If this determination S1410 is not true, the method 1400 returns to the clamping S1402, S14056 at the first edge and second edge of the target rectangle and iterates folding across the shirt in both directions until the shirt body and sleeves are within the target width. The method 1400 then comprises determining S1416 whether a measured length L of the shirt is less than twice the initial target guess length LT. If this determination S1416 is true the method comprises rotating S1418 the platform (e.g., rotating clockwise C or counterclockwise CCW) and clamping S1420 at a position along the shirt that is located at twice the initial guess length (e.g., 2Lt) minus a bend allowance from the top or at least two inches in from the bottom edge plus a bend allowance, whichever location is closer to the top edge (the neck hole edge) of the shirt. The method 1400 then comprises folding the remainder of the shirt up toward the top edge, over the at least one clamp rod 7200. The method then comprises clamping S1424 at LT plus a bend allowance and folding S1426 the shirt top edge down, toward the bottom and over the at least one clamp 7200.

If the determination S1416 is not true, the method comprises rotating S1428 the platform and clamping S1424 at LT plus a bend allowance and folding S1426 the shirt top edge down, toward the bottom and over the at least one clamp 7200.

The bend allowance is defined as, at a minimum, the amount of distance from an edge of the article needed to wrap around the outside edge and top of the clamp rod 7200 during folding (e.g., the clamp rod 7200 is engaged with an outside edge along the fold line). At a minimum, the bend allowance comprises a distance equal to the height of the clamp rod 7200 plus the width of the clamp rod 7200 because the article 7300 will wrap around the clamp rod 7200 when folded. In implementations, the bend allowance is greater than this minimum distance because the fabric of the article has a thickness. A perimeter of an outer diameter of the folded article at the fold bend will increase for thicker article fabrics and/or as the article is folded into more layers. In one example, the bend allowance for all fabric thicknesses comprises a distance of between about 0.25 to 0.75" (e.g., approximately 0.5 cm to 2 cm) for a clamp rod 7200 comprising a diameter of 0.25" (e.g., 0.6 cm). In implementations, the bend allowance increases with at least one of thicker fabric and larger clamp rods. In implementations, the controller is configured to dynamically adjust the bend allowance to account for folded thickness by at least one of determining a thickness based on an output signal from the one or more sensors 7160, 7160*a-c* (e.g., a depth camera) and detecting or measuring a height of the clamp rod at a force value indicative of contact with the article as measured by a force sensor disposed on the clamp rod and/or Z-axis motor 7405, 7405*a-b*.

Taking FIGS. 41-45E together, an implementation for folding pants is shown. In implementations, the controller 7005 is configured to determine the article 7300 is pants based on processing the one or more received sensor signals 7160, 7160*a-c* with at least one of a neural network, a regressor, and a size-invariant image database. Additionally or alternatively, a preceding robot in the process line 100, e.g, the repositioning robot 6000, can communicate with the folding robot 7000 via the communication network 230 and provide data indicative of the article being pants based on at least one of one or more sensors of the repositioning robot and one or more executed reposition movements indicative of the article being pants. Additionally, the repositioning robot can communicate at least one of whether the front side of the pants is facing upward or downward on the surface 7105, and whether the pants are already partially folded by the repositioning robot. In implementations, the controller 7005 is configured to compare the received output signal to data stored in a memory in communication with the controller for determining the article type. The controller can identify features indicative of at least one of a front side and a back side of the deformable article. In examples, the method can further comprise identifying features indicative of the deformable article being inside out. The identifiable features indicative of the deformable article being inside out comprises at least one a visible seam, a tag, and stitching.

Turning now to FIGS. 41-42 and 45A-E, an implementation of a method 1200 of determining target folded rectangle dimensions for pants is shown. An implementation of a method 1500 of determining target folded rectangle dimensions for pants comprises detecting S1502 an article type and determining S1504 that the article is pants as described previously with regard to implementations. The method 1500 comprises determining S1506 an initial guess of target final rectangle dimensions WT×LT, measuring S1508 flat pants width dimensions W0, WA, and WB at various locations along the length of the pants and measuring a length L. The method 1500 comprises selecting targeted folded rectangle dimensions depending on one or more determined conditions. The method 1500 comprises determining S1510 whether a measured length L of the article is greater than twice the initial guess target length LT. If the determination S1510 is not true, the method 1500 comprises executing S1512 a non-specific article type folding routing (e.g., a general folding routine S1116).

If the determination S1510 is true, the method comprises determining S1514 whether the measured width dimension W0 at the pants waistband is less than a first threshold value T2A, where the initial guess width WT is less than T2A and T2A is less than one and half times the initial guess width WT. If that determination is true, the method comprises selecting S1516 smaller target rectangle dimensions. For example, if the initial guess rectangle dimensions are 10×12 inches and the measured waistband width W0 is less than 13 inches the method 1500 selects smaller target rectangle dimensions.

If the determination S1514 is not true, the method 1500 comprises determining S1518 whether a measured width WB is greater than or equal to twice the initial guess width WT minus the tolerance (TOL) and less than twice the initial guess width WT plus the tolerance. If the determination is true, the method 1500 comprises executing S1520 a half fold to the initial guessed target rectangle dimensions WT×LT. For example, if the initial guess rectangle dimensions are 10×12, the tolerance is 1", and the measured width WB is greater than or equal to 19 inches and less than or equal to 21 inches, the method 1500 executes S1520 a half fold to the initial guessed target rectangle dimensions WT×LT, or 10×12 inches.

If the determination S1518 is not true, the method 1500 comprises determining S1522 whether a measured width WA is greater than or equal to twice the initial guess length LT minus the tolerance (TOL) and less than twice the initial guess length LT plus the tolerance (TOL). If the determination is true, the method 1500 comprises executing S1524 a half fold to the reverse initial guessed target rectangle dimensions LT×WT. For example, if the initial guess rectfangle dimensions are 10×12 and the measured width WA is greater than or equal to 23 inches and less than or equal to 25 inches, the method 1500 executes a half fold to the reverse initial guessed target rectangle dimensions LT×WT, or 12×10 inches.

If the determination S1522 is not true, the method 1500 comprises determining S1526 whether a measured waistband width W0 is greater than the initial guess width WT plus two times the minimum allowable fold size (MINFOLD) and less than or equal to a second threshold T2B value. In implementations, T2B is a value in a range of between about The target length plus twice the minimum allowable fold size (LT+2MINFOLD) to three times the target width plus twice the bend allowance (3WT+2BA) for producing a stable and aesthetically pleasing fold. If the determination is true, the method 1500 comprises executing S1528 a thirds fold to the initial guessed target rectangle dimensions WT×LT. For example, if the initial guess rectangle dimensions are 10×12 and the measured waistband width W0 is greater than or equal to 16 inches and less than or equal to 31 inches, the method 1500 executes a thirds fold to the initial guessed target rectangle dimensions WT×LT, or 10×12 inches.

If the determination S1526 is not true, the method 1500 comprises determining 51530 whether a measured waistband width W0 is greater than the second threshold T2B value and less than three times the initial guess length LT plus twice the bend allowance BA. If the determination 51530 is true, the method 1500 comprises executing 51531 a thirds fold to reverse initial guessed target rectangle dimensions LT×WT. For example, if the initial guess rectangle dimensions are 10×12 and the measured waistband width W0 is greater 28 inches and less than 37 inches, the method 1500 executes a thirds fold to the reverse initial guessed target rectangle LT×WT, or 12×10 inches.

If the determination 51530 is not true, the method 1500 comprises determining S1534 whether a measured width WA is greater than or equal to three times the initial guess length LT. If the determination S1534 is true, the method 1500 comprises folded the pants to a full box target rectangle dimension BW×BL. If the determination S1534 is not true, the method comprises executing S1538 a default half fold method 1600. In implementations, the default half fold method comprises determining S1605 whether the absolute value of the difference between measured width WB and twice the initial guess width WT is less than the absolute value of the difference between the measured width WA minus twice the initial guess length LT. If the determination is true, the method 1600 comprises executing 51615 a half fold to the guessed target rectangle dimensions WT×LT. If the determination S1605 is not true, the method 1600 comprises executing S1610 a half fold to reversed guessed target rectangle dimensions LT×WT. For example, for initial guess dimensions of 10×12 inches if measured width WB minus 20 is less than measured with WA minus 24, the method 1600 is configured to execute a half fold to the guessed target rectangle dimensions, 10×12 inches. Otherwise, the method 1600 is configured to execute a half fold to reverse guessed target rectangle dimensions, 12×10 inches.

As described previously with regard to implementations, final folded dimensions of an article are at or within the bounds of a plurality of predetermined rectangle sizes. Additionally, in implementations, the plurality of predetermined rectangle sizes are dimensioned such that they can be combined to fit alone or in multiple side by side stacking positions to fit within a shipping container for example, the rectangle sizes can comprise, in one implementation, a largest rectangle size of 10×24, medium rectangle size of 10×12 and a smallest rectangle size of at least one of 5×6 and 6×10. In implementations, as shown in FIG. 45A, measured width W0 is the width of the pants at the waistband W0, measured width WA is the measured width from outer edge to outer edge of the unfolded pants at a point lower down from the waistband W0 and above measured width WB. In implementations, for example WA can be measured at 20 inches down from the waistband and WB can be measured at 24 inches down from the waistband W0.

Figure 43:
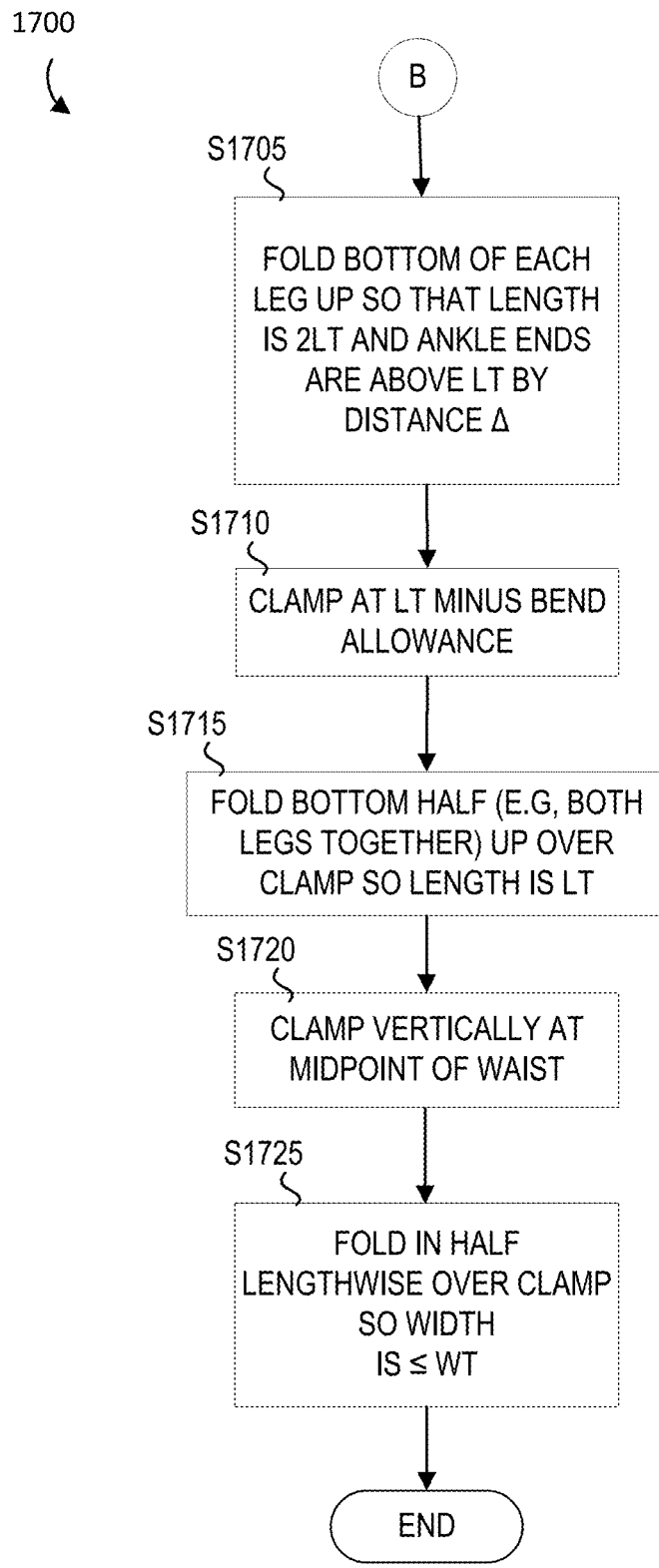
FIG. 43 depicts an example half fold method of folding pants.
Figure 44:
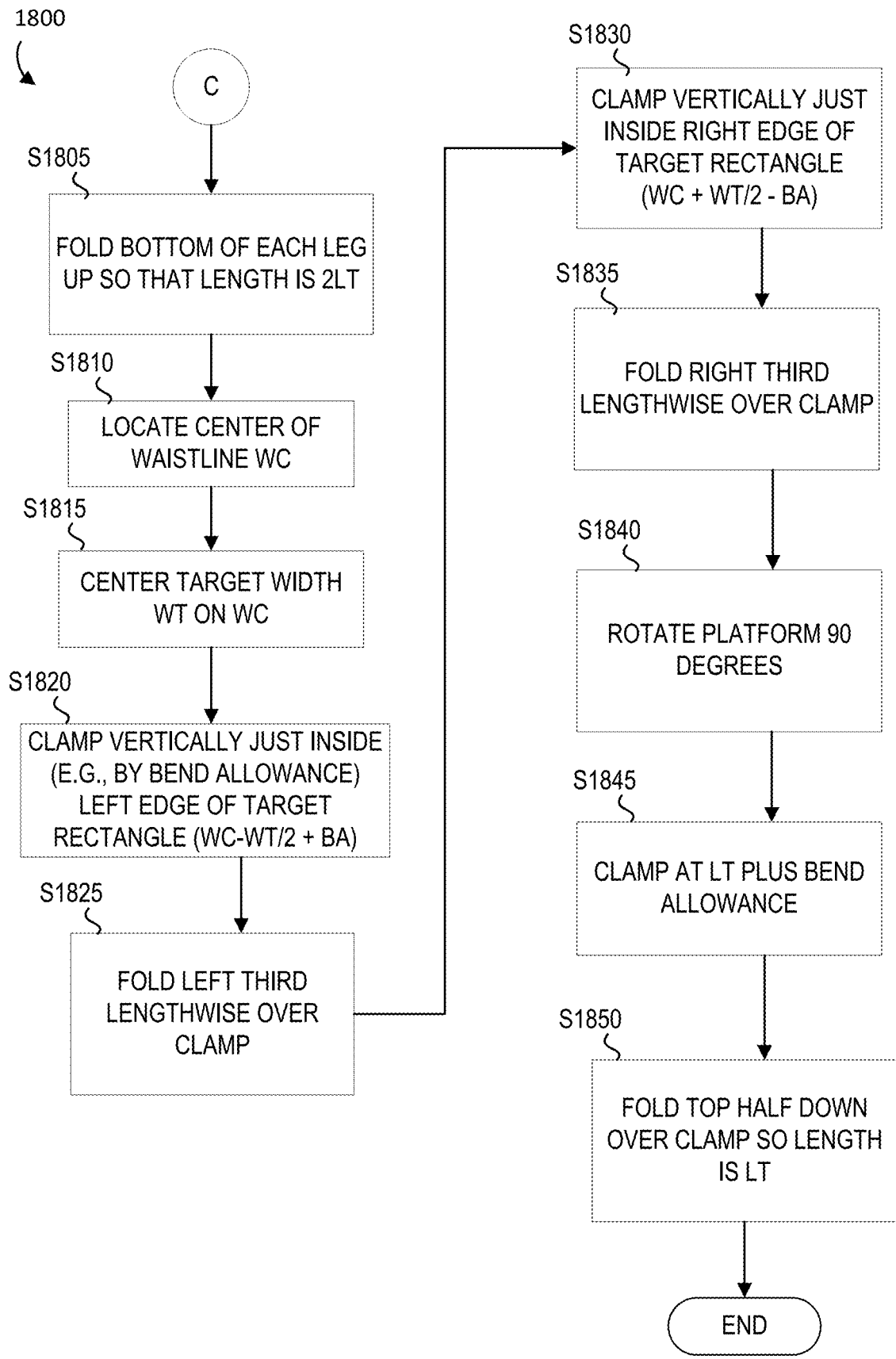
FIG. 44 depicts an example thirds fold method of folding pants.

Taking FIGS. 43-45 together, folding the pants to the target folded rectangle dimensions comprises include executing a "half fold" method 1700 or a "thirds fold" method 1800 depending on the measured dimensions of the pants as detected by the one or more sensors 7160a-c and determined by the controller 7005.

In implementations, the half fold method 1700, as depicted in FIGS. 43 and 45A-C comprises folding S1705 a bottom of each leg up so that overall measured length of the folded pants is 2LT and the ankle ends AE1, AE2 are above LT by distance delta A. In implementations, each leg can be folded independently with the platform rotated such that the clamp rod is perpendicular to a longitudinal axis of each leg for precise alignment of the folded over lower leg portion atop the upper leg portion. Alternatively, in implementations, the legs can be folded simultaneously. The distance delta A is the amount of fabric clamped. In implementations, the distance delta A is in a range of between about 1 cm to 4 cm. Clamping the ankle ends AE1, AE2 prevents the folded pants legs from unfolding, especially during subsequent maneuvers and thereby maintains a precise, compact fold. The method 1700 comprises clamping S1710 the pants at LT minus a bend allowance. The method 1700 comprises folding S1715 a bottom half up (e.g., both legs together, simultaneously folded up in one sweep) over the at least one clamp 7200 so the overall length of the partially folded pants is LT. The method 1700 comprises rotating the platform 7100 (e.g., rotating clockwise C or counterclockwise CCW) and clamping S1720 the pants vertically at a midpoint of the waistband WC and folding S1725 the pants in half lengthwise over the at least one clamp so that the folded width is less than or equal to WT.

In implementations, the thirds fold method 1800, as depicted in FIGS. 44 and 45D-E comprises folding 51805 the bottom of each leg up so that the measured length is 2LT. The method comprises locating S1810 a center of the waistband WC and centering S1815 a target width WT on WC. The method 1800 comprises clamping 51820 vertically just inside (e.g., accounting for BA) a left edge of the target rectangle (WC−WT/2+BA) and folding S1825 the left third lengthwise over the at least one clamp rod 7200. The method 1800 comprises clamping S1830 vertically just inside (e.g., accounting for BA) a right edge of target rectangle (WC+WT/2−BA), and folding 51835 a right third of the pants lengthwise over the at least one clamp 7200. The method comprises rotating 51840 the platform 90 degrees (e.g., rotating clockwise C or counterclockwise CCW) and clamping at LT plus a bend allowance. The method comprises folding a top half of the pants down over the at least one clamp so the measured length of the folded pants is LT.

The bend allowance is defined as, at a minimum, the amount of distance from an edge of the article needed to wrap around the outside edge and top of the clamp rod 7200 during folding (e.g., the clamp rod 7200 is engaged with an outside edge along the fold line). At a minimum, the bend allowance comprises a distance equal to the height of the clamp rod 7200 plus the width of the clamp rod 7200 because the article 7300 will wrap around the clamp rod 7200 when folded. In implementations, the bend allowance is greater than this minimum distance because the fabric of the article has a thickness. A perimeter of an outer diameter of the folded article at the fold bend will increase for thicker article fabrics and/or as the article is folded into more layers. In one example, the bend allowance for all fabric thicknesses comprises a distance of between about 0.25 to 0.75" (e.g., approximately 0.5 cm to 2 cm) for a clamp rod 7200 comprising a diameter of 0.25" (e.g., 0.6 cm). In implementations, the bend allowance increases with at least one of thicker fabric and larger clamp rods. In implementations, the controller is configured to dynamically adjust the bend allowance to account for folded thickness by at least one of determining a thickness based on an output signal from the one or more sensors 7160, 7160a-c (e.g., a depth camera) and detecting or measuring a height of the clamp rod at a force value indicative of contact with the article as measured by a force sensor disposed on the clamp rod and/or Z-axis motor 7405, 7405a-b.

Figure 50:
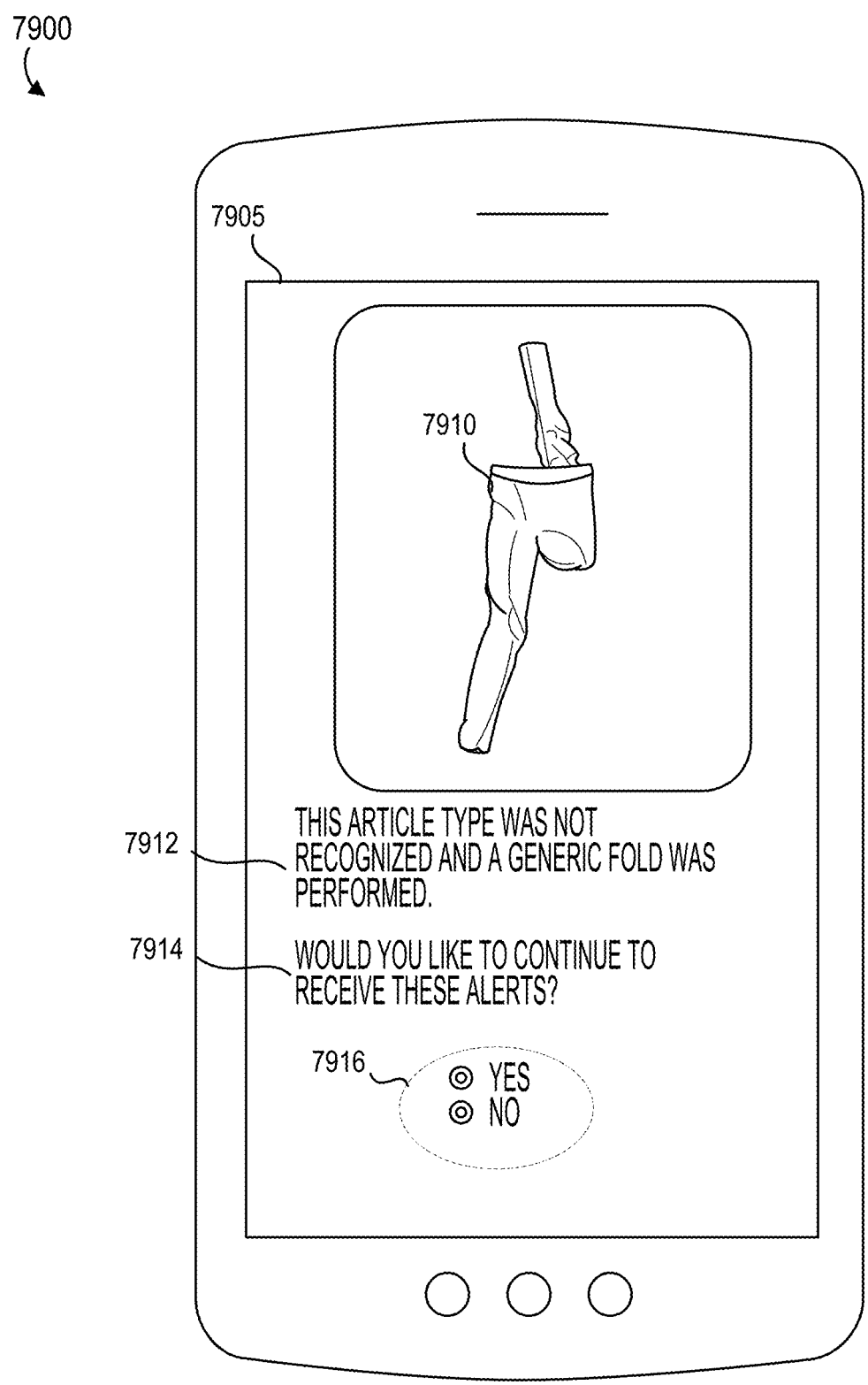
FIGS. 50 through 54 depict example user interfaces for remote customer interaction with the folding device.
Figure 51:
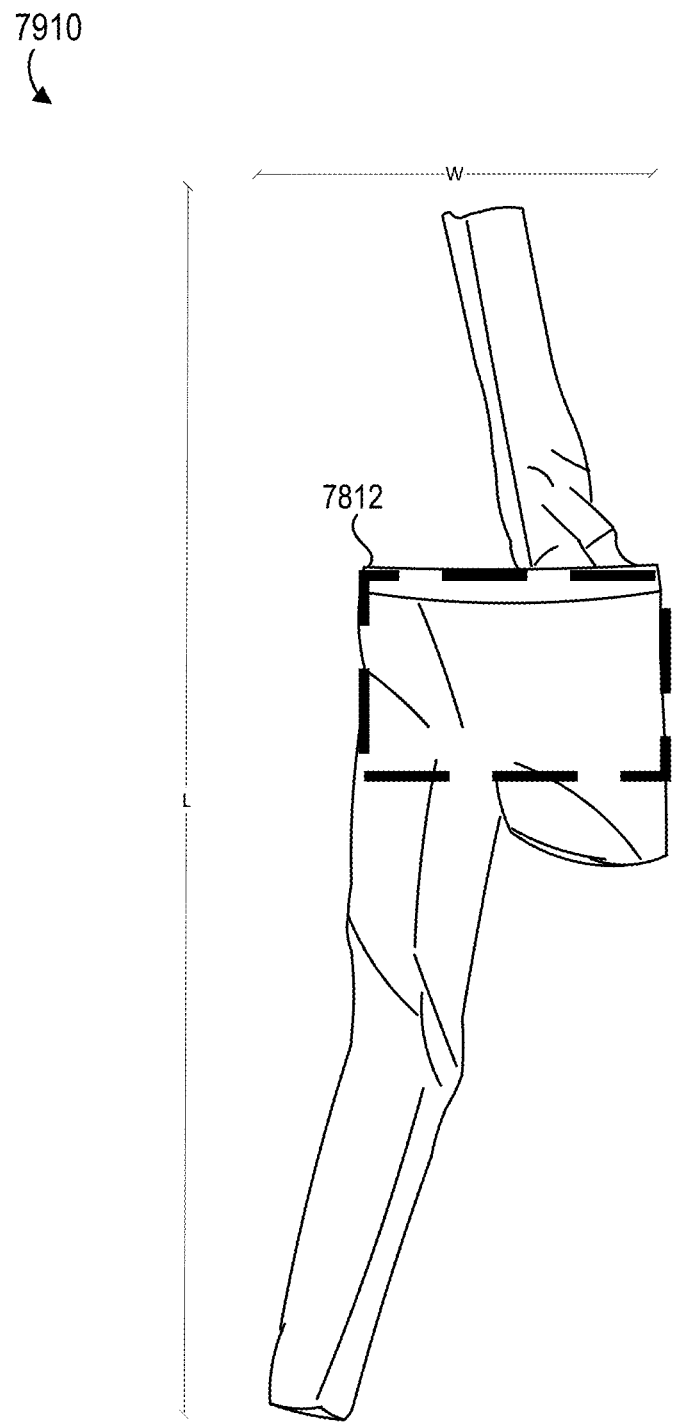
Figure 52:
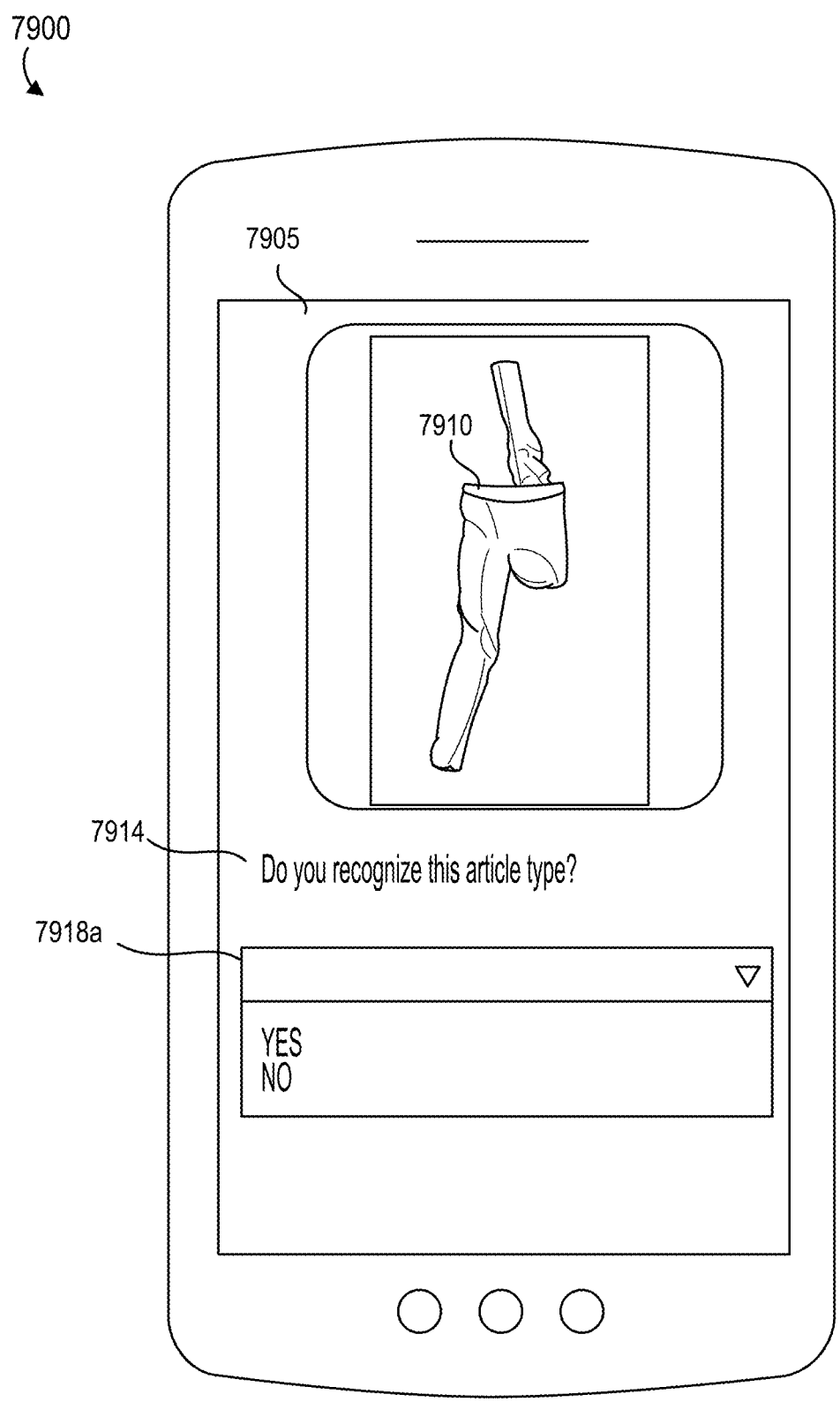
Figure 53:
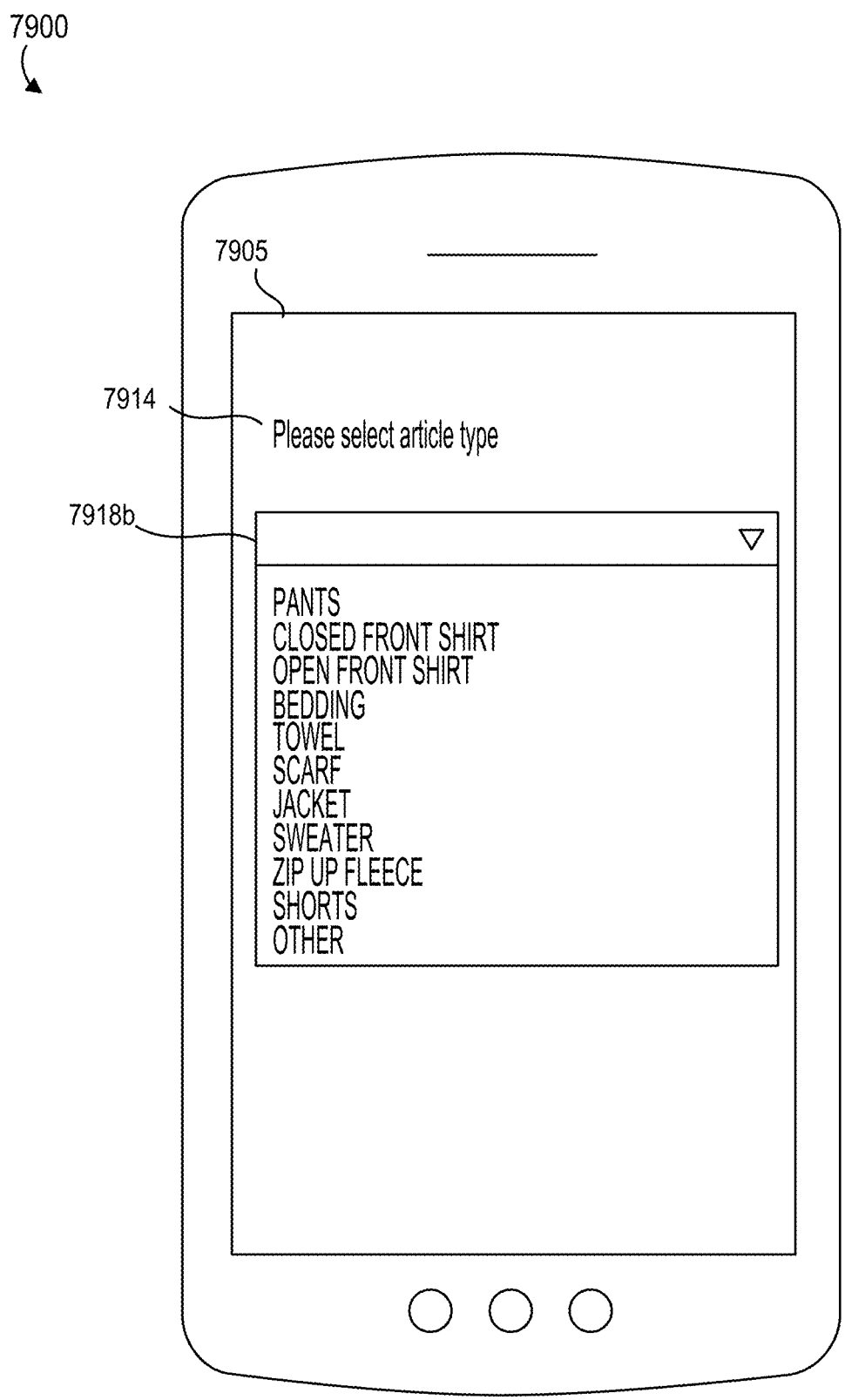

Taking FIGS. 50-54 together, in implementations, a specific article type folding routine can comprise executing a customer request S1114c for a particular folding sequence. In implementations, the customer request routine S1114c comprises receiving one or more folding instructions from a remote device 7900 in operable communication with the network. As shown in FIGS. 50 and 52-54, the one or more folding instructions comprises user inputs to at least one of a computer portal and smartphone display running an application operating on a display screen 7905 for receipt of one or more user inputs, such as touch screen taps. As shown in FIG. 50, the user device comprises a display screen 7905 comprising at least one of graphics 7910, one or more text fields 7912, 7914 for conveying information, and interactive fields 7916, such as selectable radio buttons, selectable text boxes, or drop-down menus that eliciting interactive input from the customer (e.g., device user) and, once pressed or tapped, communicate actionable information to the controller via a wired or wireless communication network. For example, in FIG. 50, a display screen 7905 shows the customer a picture of twisted pair of pants prior to execution of a general folding routine rather than a pants type folding routine, the image being taken by the one or more sensors 7160*a-c* disposed adjacent a folding device 7000 platform 7100 on which the twisted pants were delivered for folding. The display screen can also include text indicia 7912 explaining the article type was not recognized by the autonomous folding device 7000 and that a general fold was performed to fit the article within a preferred finish folding rectangle size. Additionally, in implementations, the display screen provides text indicia 7914 querying the customer about an interest in continuing to receive such alerts and radio buttons 7916 for receiving and transmitting a user response to the controller 7005 of the folding device 7000. Additionally, a graphic display screen may appear to the user indicating the relative size and placement of the target rectangle 7812 defining the outer bounds of the folded deformable article.

Additionally, the application running on the remote device 7900 can display to the user a query 7914 for customer identification of the article type. For example, the query 7914 of FIG. 52 asks the customer whether the customer recognizes the article type of the article displayed on the screen 7905. Interactive fields, such as selectable radio buttons, selectable text boxes, or a drop-down options menu 7918*a* eliciting interactive input from the customer (e.g., device user) and, once pressed or tapped, communicate actionable information to the controller via a wired or wireless communication network. Here, the customer can indicate via pull down menu options whether or not the deformable article is a recognized type. If the customer indicates recognition of the article, in implementations, such as the display of FIG. 53, the remote device 7900 queries the customer to specifically identify the article type. For example, the customer can select from a plurality of categories provided in a drop-down menu 7918*b*. The folding device 7000 can store this image tagged with a customer-identified article type in a database or other memory store and increase the likelihood over time of learning to identify article types for insufficiently repositioned articles and using that identification to select a most appropriate folding routine.

Figure 54:
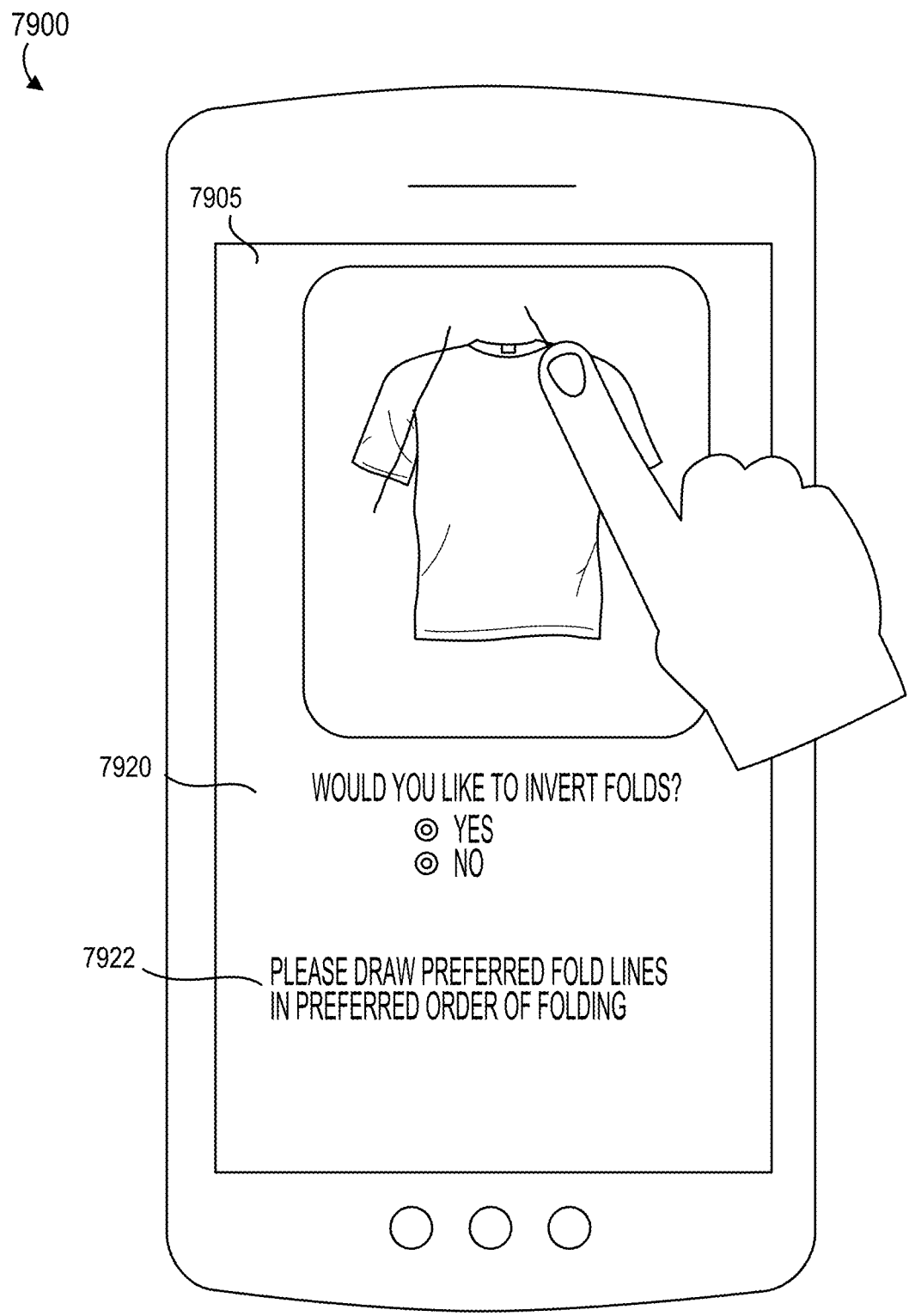

Additionally or alternatively, implementations, the one or more user inputs to the display screen 7905 comprises at least one of a preferred at least one final dimension, such as a final width and/or length of a target rectangle 7812 for the folded deformable article, a user defined folded rectangle bounding box, a request for not folding the deformable article, and a submission of one or more specified fold lines and an order of folding. As shown in FIG. 54, a preferred sequence for folding the deformable article at each of the one of the one or more specified fold lines is indicated by a user tracing fold lines across a displayed image of an article disposed on the platform of a folding robot for folding. The application can ask with text 7920 whether the customer would like to invert folds, for example if a shirt is upside down on the platform 7100. Another text field 7922 can prompt the customer to draw preferred fold lines in a preferred order of folding. A controller 7005 receiving these instructions can then rotation the platform and anchor the article along those indicated fold lines in the order in which they are indicated for sequenced folding.

Although a representative few specific article type folding routines are described herein, other particular folding routines are contemplated for garments such as hooded sweatshirts having several protruding extremities from a central core and open front shirts received partially folded from the repositioning robot 6000. Such shirts may be folded inward along a longitudinal bisector of the torso with sleeves matched together. The sleeve that may require straightening by the sweep rods before being folded onto the torso potion along one or more fold lines. The shirt can then be rotated on the platform and folding again down the length of torso portion along one or more sequential fold lines to end at a final folded area. Although, the list of specific article type fold routines presented herein is non-exhaustive, a plurality of general folding routines are configured to enable the folding robot 7000 to neatly fold any article comprising any type, size, and thickness to a presentable, stable fold that will not unfold or topple during the packing process for return to a customer. The general folding routines can be selected in the order presented vertically in FIG. 25 to more particularly address variation in article size and thickness before defaulting to a most basic recursive folding technique (e.g., recursive fold in half) that results in stacked layers that can be less level and less aesthetically appealing to a customer.

Returning now to the folding method 1100, in implementations, the method comprises determining S1112 that general folding routine is required. In implementations, selecting from a plurality of general folding routines S1116 comprises selecting at least one of a routine for folding in one or more protrusions S1126*a*, a routine for folding a footprint area of a repositioned article to a target size S1116*b*, and a routine for recursively folding an article in half S1116*c*.

Figure 46:
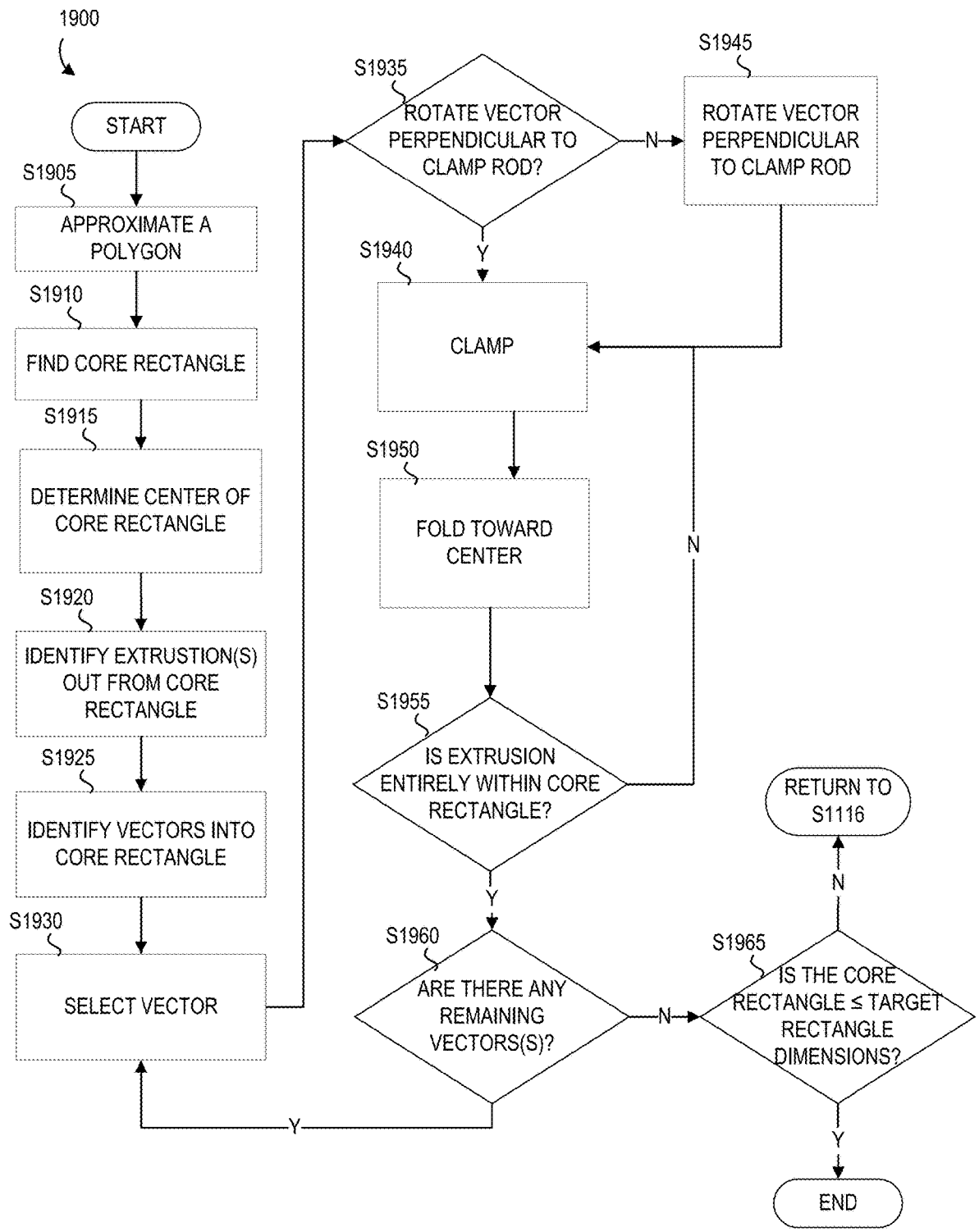
FIG. 46 depicts an example method executable by a controller of the folding robot for folding an article according to a general fold in protrusions routine of the folding method of FIG. 25.
Figure 47A:
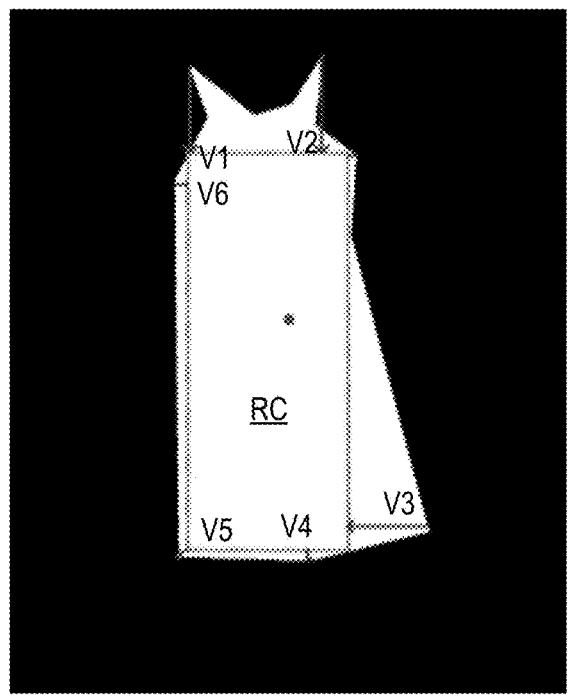
FIG. 47A depicts a schematic example of a controller generated mask and identification of a core rectangle and vectors defining the fold directions of protrusions into the core rectangle in accordance with the method of FIG. 46.
Figure 47B:
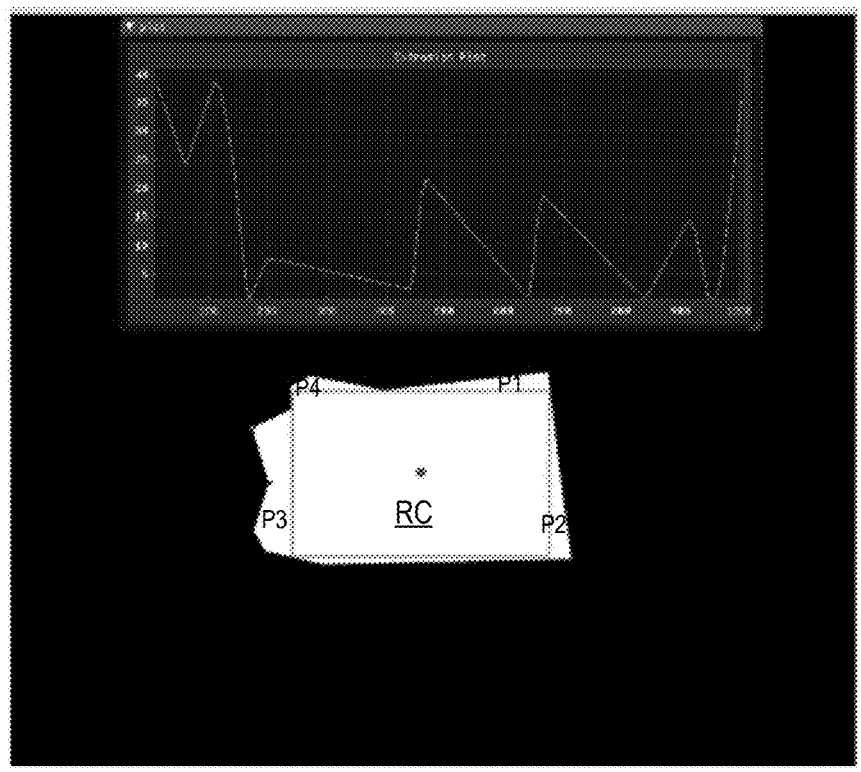
FIG. 47B depicts a schematic example of a controller generated mask and a plot of distances from an outer perimeter to the core rectangle for identifying protrusions and executing the method of FIG. 46.

For example, taking FIGS. 46-47B together, in implementations, a method 1900 for folding in a protrusion (e.g., one or more sleeves, pant legs, and hoods), comprises finding a rectangular core of an article (e.g., where human core is—on human torso—belly button of shirt, waistband area of pants), finding the center of the core rectangle, determining what is a protrusion emitted out from core (e.g. sleeve), determining the vectors that describe protrusions into core, planning a generalized fold of the protrusions in toward the center, and folding until the article fits within one or more predetermined box dimensions. As described previously with regard to implementations, final folded dimensions of an article are at or within the bounds of a plurality of predetermined rectangle sizes. Additionally, in implementations, the plurality of predetermined rectangle sizes are dimensioned such that they can be combined to fit alone or in multiple side by side stacking positions to fit within a shipping container for example, the rectangle sizes can comprise, in one implementation, a largest rectangle size of 10×24, medium rectangle size of 10×12, and a smallest rectangle size of at least one of 5×6 and 6×10.

Returning to FIGS. 46-47B, the method comprises approximating S1905 a polygon about the detected article 7300, finding 51910 a core rectangle RC (FIGS. 47A-B) within the article, determining S1915 a center of the core rectangle, identifying S1920 one or more protrusion(s) extending out from the core rectangle, identifying S1925 one or more vectors V (FIG. 47A) into the core rectangle RC, selecting 51930 a vector from the one or more vectors, determining whether to rotate S1935 the platform 7100 such that the selected one of the one or more vectors is perpendicular to the at least one clamp rod 7200, rotating S1945 the platform if not, clamping S1940 the at least one clamp rod 7200 perpendicular to the vector, and folding S1950 the protrusion toward the center in the direction of the vector.

FIG. 47A depicts a schematic example of a controller generated mask and identification of a core rectangle RC and vectors V defining the fold directions of protrusions into the core rectangle RC in accordance with the method of FIG. 46. FIG. 47B depicts a schematic example of a controller generated mask and a plot of distances from an outer perimeter to the core rectangle for identifying protrusions P and executing the method of FIG. 46.

The method 1900 comprises determining 51955 whether the folded protrusion is entirely within the core rectangle. If not, the method iteratively repeats clamping S1940 perpendicular to the vector and folding toward the core rectangle under the protrusion is entirely within the core rectangle. The method then comprises determining 51960 whether there are any remaining vectors defining one or more protrusions needing to be folded into the core rectangle, and if so, the method 1900 returns to the step of selecting 51930 a vector and folding toward the core rectangle. Once no vectors remain outside of the core rectangle, the method comprises determining whether the core rectangle is less than or equal to final target folded rectangle dimensions. If so, the article is folded and ready for packing and if not, the method 1900 returns to a step of selecting a generalized folding routine. In implementations, the method 1900 executes at least one of the fold to a target area routine S1116a and the recursively fold in half routine S1116c to reduce the core rectangle to at or within target dimensions.

Figure 22A:
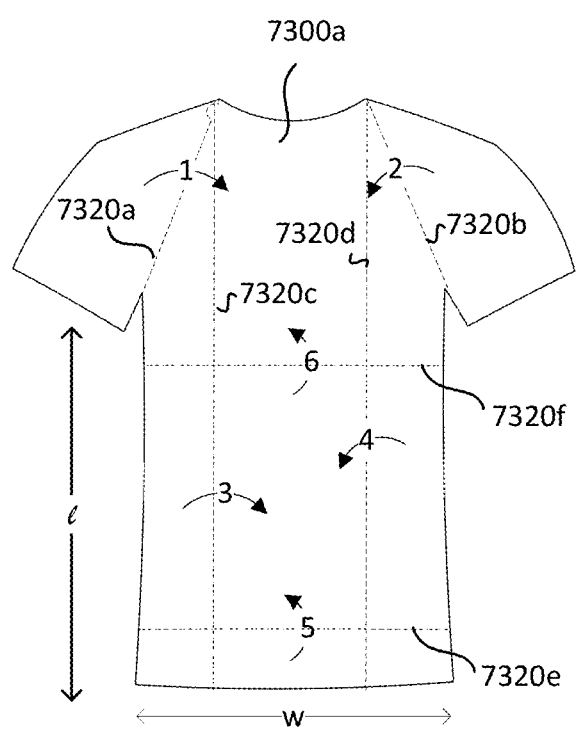
FIG. 22A depicts a schematic example of folding a shirt sequentially along fold lines to arrive at a target folded article size and shape.
Figure 22B:
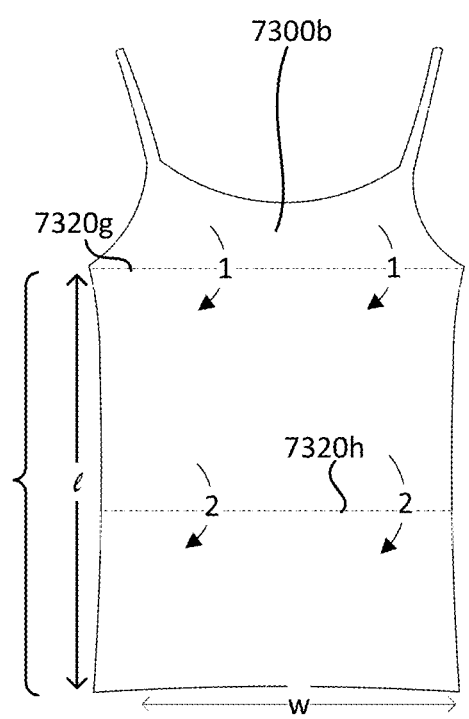
FIG. 22B depicts a schematic example of folding a tank top sequentially along fold lines to arrive at a target folded article size and shape.
Figure 23A:
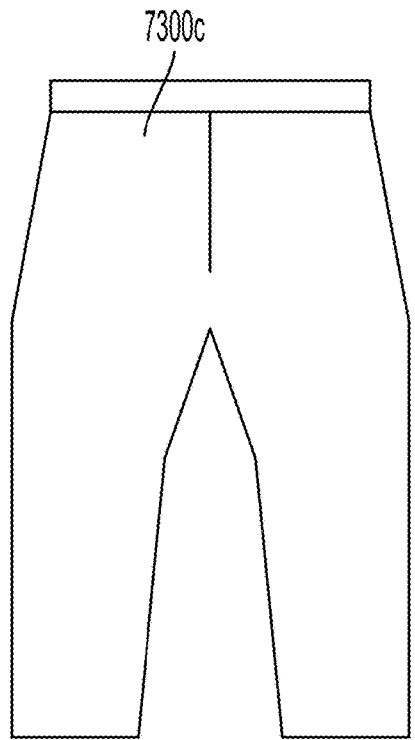
FIG. 23A depicts a schematic example of flattened pants needing folding.
Figure 23B:
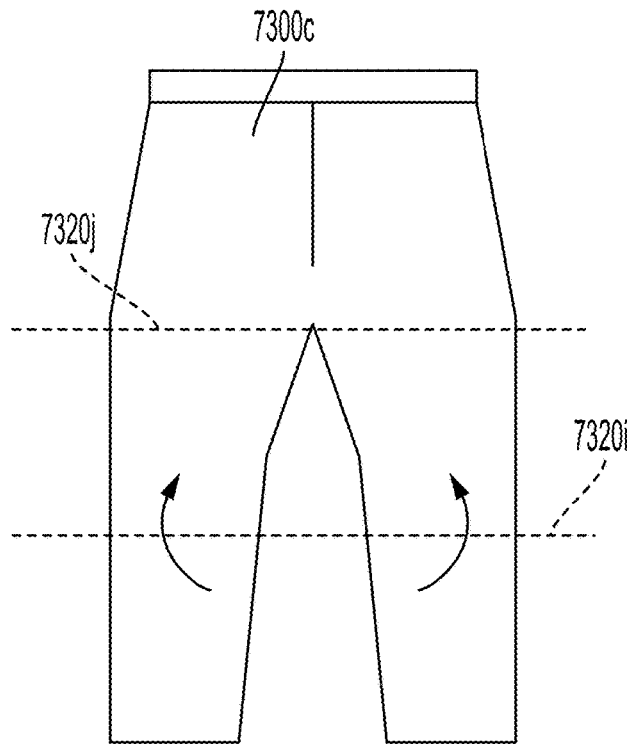
FIG. 23B depicts a schematic example of fold lines along which the pants of FIG. 23 will be sequentially folded.
Figure 23C:
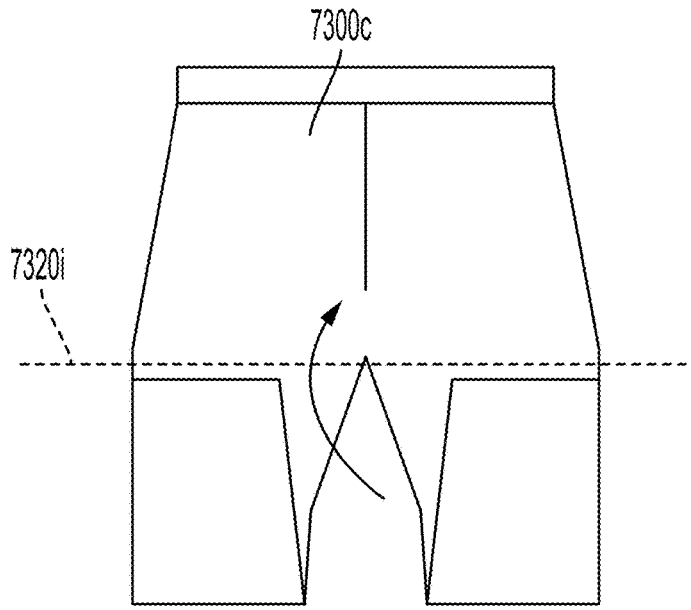
FIG. 23C depicts a schematic example of the pants of FIG. 23B folded along a first sequentially executed fold line.
Figure 23D:
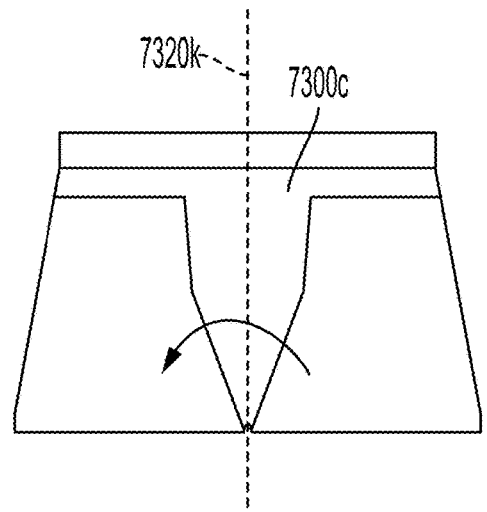
FIG. 23D depicts a schematic example of the pants of FIG. 23C folded along a second sequentially executed fold line and a third fold line indicated for a final fold to a target folded article size.
Figure 48A:
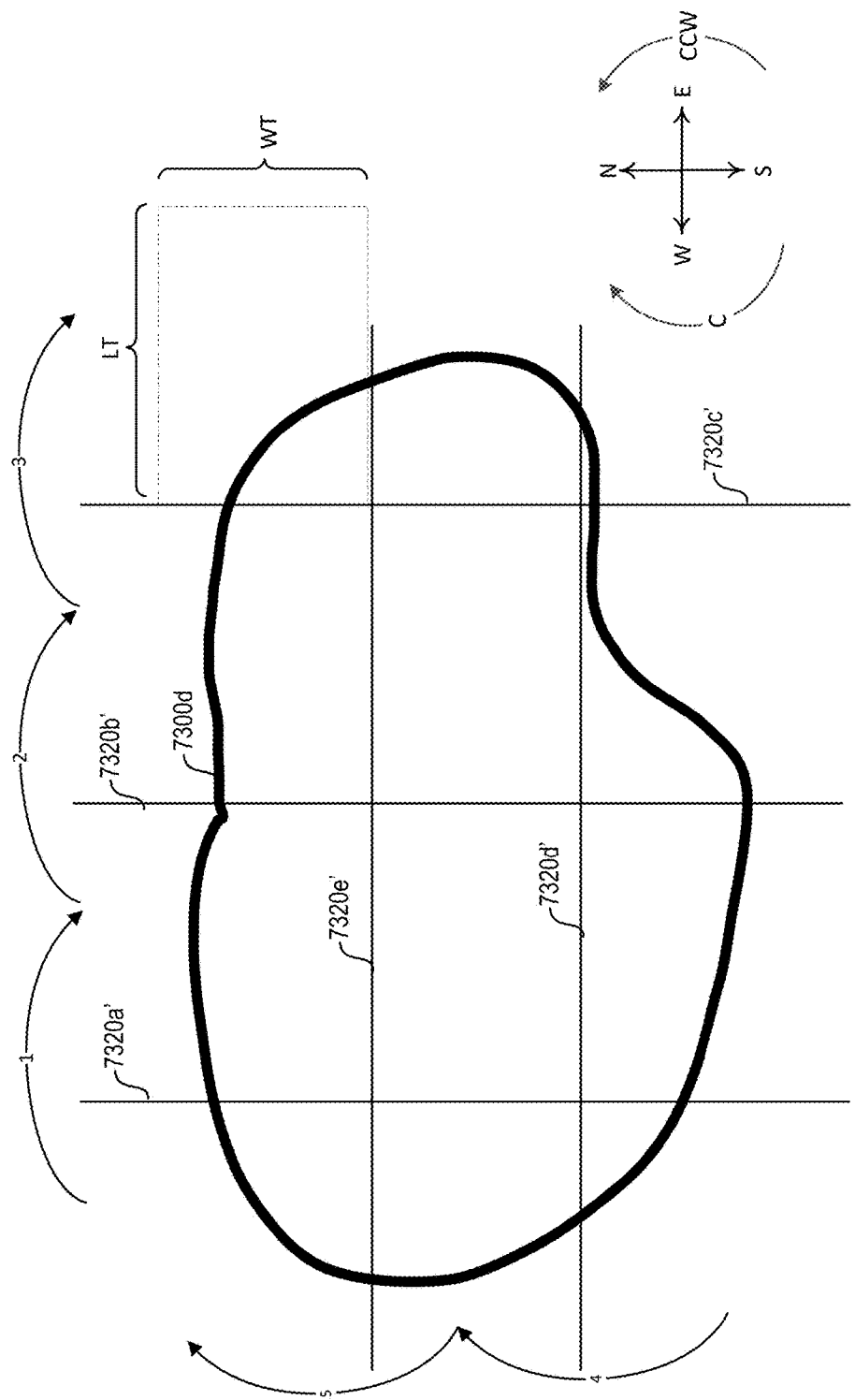
FIG. 48A depicts a schematic example of a method executable by a controller of the folding robot for folding an article according to a general fold area to target size routine of the folding method of FIG. 25.
Figure 48B:
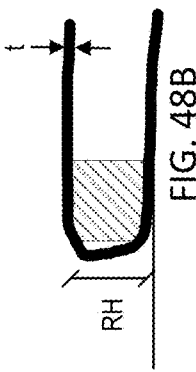
FIG. 48B depicts an example cross section schematic of an article bent around a clamp rod at a bend radius.

Turning now to FIGS. 48A-B, a routine for folding a repositioned article 7300d to a target size S1116b comprises determining one or more fold lines 7320a'-e' and a sequence of folding an article over one or more clamp rods placed sequentially at the determined fold lines to produce a folded article 7300d having final dimensions equal to or withing a target fold area WT×LT. For example, in FIG. 48A, the article 7300d is configured to be folded in thirds, sequentially, at fold lines 7320a'-c', and then the controller will rotate the platform 7100 and fold in a direction perpendicular to fold lines 7320a'-c' along fold lines 7320d' and 7320e' to end up in an upper right quadrant at or within final folded dimensions of width WT by length LT. This general folding method is applicable to all article types, sizes, and thicknesses presented in any random order for folding. For example, FIGS. 22A-B depict two disparate article types folded sequentially along predetermined fold lines 7320a-f and 7320g-h to fold each article 7300a, 7300b to a final target area.

Deciding where to place the one or more fold lines 7320 includes any of the previously described considerations and at least one of determining a final fold area and considering an article thickness t, as shown in FIG. 48B. Because the article 7300d will fold over the one or more clamp rods, which have a height RH, the overall stack height before clamp retraction will be 2t plus RH and will require a sufficient folded over top portion to prevent the article from springing back and unfolding. In implementations of this folding routine of folding to a target area S1116b and in implementations of all general and specific folding methods, to account for the overall stack height and prevent flap back of the folded over portion of an article, the controller 7005 clamps at a minimum distance from an edge of an article in a range of between about 1 to 5 inches (e.g., 2.54 cm to 12.7 cm) for a clamp having a height RH and width each in a range of between about of 0.25 inch to 1.5 inches (e.g., 0.6 cm to 3.81 cm).

Turning now to FIGS. 49A-D, a routine for folding a repositioned article 7300e to a target rectangle size comprises recursively folding the longest dimension in half until the article 7300e is at or within the target rectangle size. For example, as shown in FIG. 49A, the longest edge is folded over fold line 7320a'' to go from 2LT to a target length of LT, resulting in the dimensions and orientation depicted in FIG. 49B. The controller 7005 is configured to rotate the platform 7100 in the direction of either of the clockwise arrow C or the counter clockwise arrow CCW so that the at least one clamp 7200 is aligned with a second fold line 7320b'' aligned perpendicular to a longest length. The controller 7005 then instructs the at least one clamp rod 7200 to clamp the article 7300e and at least one of the sweep rod 7400 and sweep blade 7650 to fold the article over fold line 7320b''. The width of the article 7300e reduces from 2WT in FIG. 49C to WT in FIG. 49D, thereby resulting in final folded rectangle dimensions WT×LT. In implementations, depending on starting dimensions, an article may be folded over in the same direction two or more times before the longest dimension is parallel to the at least one clamp rod 7200. In implementations, the controller 7005 is configured to fold perpendicular to the longest dimension to produce a stable fold, as wide and flat as possible.

In any of the general folding method implementations, deciding where to clamp can be determined based on at least one of article size and material thickness. For example, in implementations, the controller can determine, based on a mask (e.g., FIG. 26) where the article is on the platform 7100 and move the at least one clamp 7200 until the clamp is over the area that is mostly white (e.g., 85% white) and not black, thereby indicating the presence of the article 7300. In implementations, the controller 7005 can then instruct the clamp to move in 50 mm and clamp the article for smoothing. In implementations, the controller can instruct the at least one clamp 7200 to move in at least 2 inches and clamp for folding. In implementations, the controller can instruct the at least one clamp 7200 to move in from the terminal edge of the article by a distance in a range of between about 2 to 6 inches (e.g., 50 mm to 150 mm) before lowering to a clamped position atop the article 7300. In implementations, the controller is configured to dynamically determine a clamping positioned based on at least one of the accrued number of folds and a difference in a maximum height and a minimum height of a top surface of the article from the surface 7105 of the platform 7500. The maximum and minimum height can be measured by the one or more sensors 7160, 7160a-b and the controller can compare the difference to a threshold indicative of a maximum allowable slope, or lean, of the top of the folded article. For example, the threshold can be in a range of between about 1 to 3 inches (e.g. 25 mm to 75 mm) such that the folded article can be stacked with other folded articles in a stable stack in a packing queue and/or packing container without toppling. Additionally or alternatively, the controller is configured to detect a slope of the top surface based on the output signal of the one or more sensors 7160, 7160a-b and compare an angle of the slope relative to the horizontal plane of the platform surface 7105 to a threshold angle. For example, the threshold angle indicative of an acceptable top surface slope can be in a range of between about 0 to 30 degrees. In implementations a threshold maximum allowable tilt angle for the top surface that ensures stable stacking of two or more articles is around about 15 to 20 degrees. Additionally or alternatively, the controller can decide where to clamp an article based on an aspect ratio, for example, clamping perpendicular to a longitudinal length and folding over the at least one clamp in the direction of the longest dimension.

Additionally or alternatively, the controller can instruct the clamp to clamp along a fold line that is not a bisector of the article but is offset such that the article is folded by an amount that less than being folded in half. This can be particularly advantageous in a final folding pass for achieving a target width or length for fitting within target packing dimensions and producing a stable fold that does not unfurl during packing and shipping.

As described herein with regard to implementations, the folding device 7000 is configured to fold a plurality of article types, sizes, and thicknesses presented in any order. The folding device 7000 is configured to accommodate variations common in loads of household laundry and fold each article of the plurality of types, sizes, and thicknesses to target uniformity for stable and aesthetically pleasing final folded states. The platform of the folding device rotates so that the plurality of article types and sizes can be received in any orientation and rotated precisely for alignment of a best suited fold line with a clamp rod. In implementations, the fold lines can be determined dynamically for each unique article and with each iteration of folding without requiring any human intervention to modify settings or swap out mechanical components. Additionally, because the articles are fully folded within the perimeter of the rotatable platform, the active folding area is consolidated to a single area rather than spread out down a line of sequentially moving components or sequential devices for performing various folds in various fold directions.

As described previously with regard to implementations, a deformable article 7300 is delivered to the folding device 7000 by a repositioning robot 6000. In implementations, the repositioning robot 6000 directly deposits the deformable article onto the rotatable platform 7100 of the folding device. In other implementations, as shown in FIGS. 55-58, a transfer conveyor 6070 transits between the repositioning robot 6000 and the folding device 7000 to transfer repositioned articles 7300 onto the rotatable platform 7100 for folding.

Figure 58:
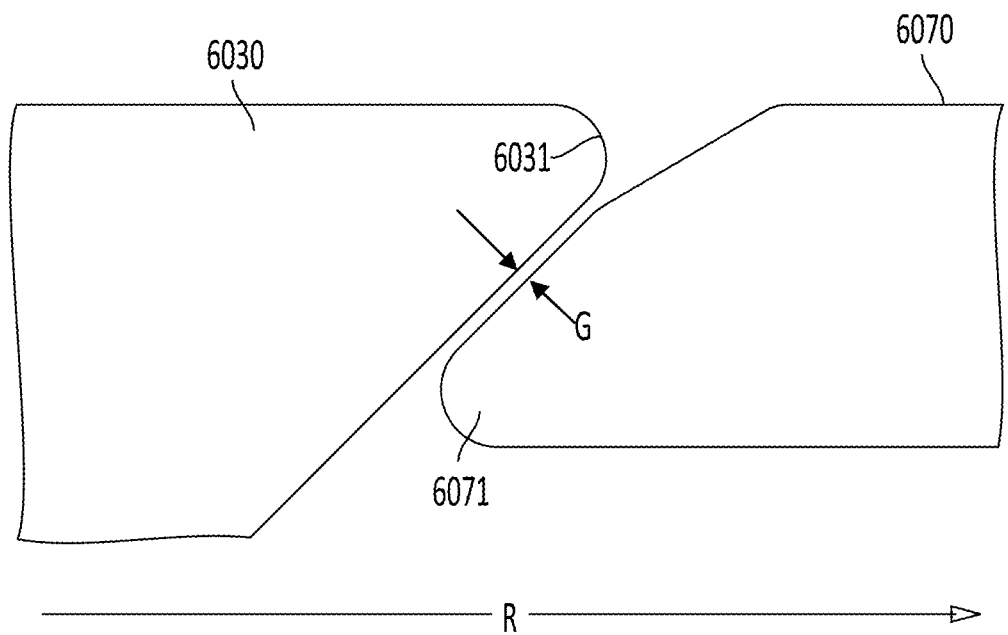
FIG. 58 is a schematic of overlapping portions of an example repositioning robot conveyor and a transit conveyor of an autonomous robotic laundry process line.

Referring to FIG. 58, a leading edge 6031 of a conveyor 6030 of a repositioning robot 6000 is shown in conjunction with a transfer conveyor 6070 configured to be disposed outside a work volume of the repositioning robot 6000. In implementations, a conveyor 6030 disposed at the bottom of the work volume can have an angled leading edge 6031 configured to nest with an angled receiving end 6071 of the transfer conveyor 6070. The nested ends preventing transferred repositioned laundry articles from crumpling or getting stuck between the two overlapped moving conveyors 6030, 6070. The matching angles of the leading edge 6031 and the receiving end 6071 and the matching driving directions (e.g., run direction R) ensures that no part of a transferring article falls between the floor conveyor 6030 and the transfer conveyor 6070. Additionally, a flatter angle of the receiving end 6071 of the transfer conveyor 6070 prevents the transferring article from crumpling during transfer. In implementations, a gap G between the conveyor 6030 and the transfer conveyor 6070 is no greater than 10 mm. In implementations, the gap G is between about 5 mm to 10 mm.

Figure 55A:
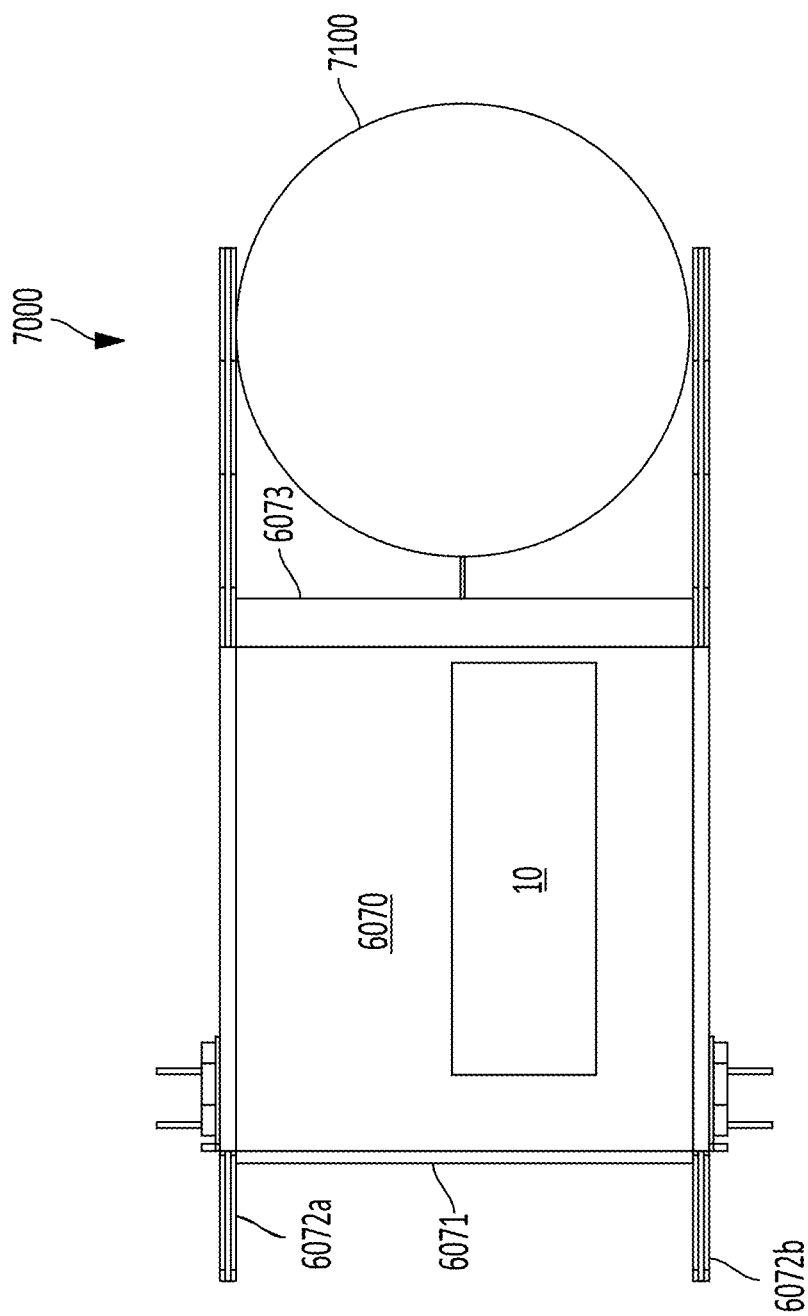
FIG. 55A depicts a top-down view of an example transit conveyor for delivering a repositioned article to a folding device.
Figure 55B:
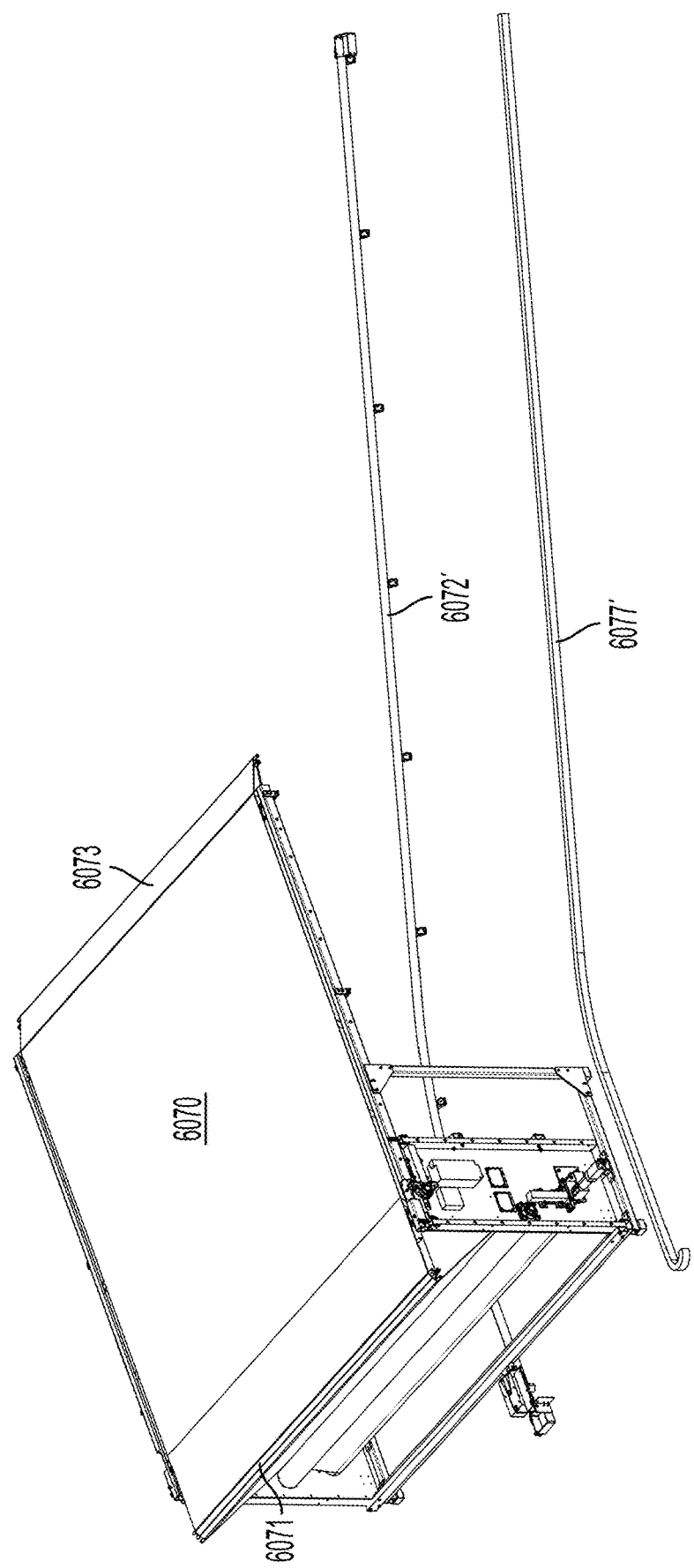
FIG. 55B depicts a side view of an example transit conveyor for delivering a repositioned article to a folding device.
Figure 56:
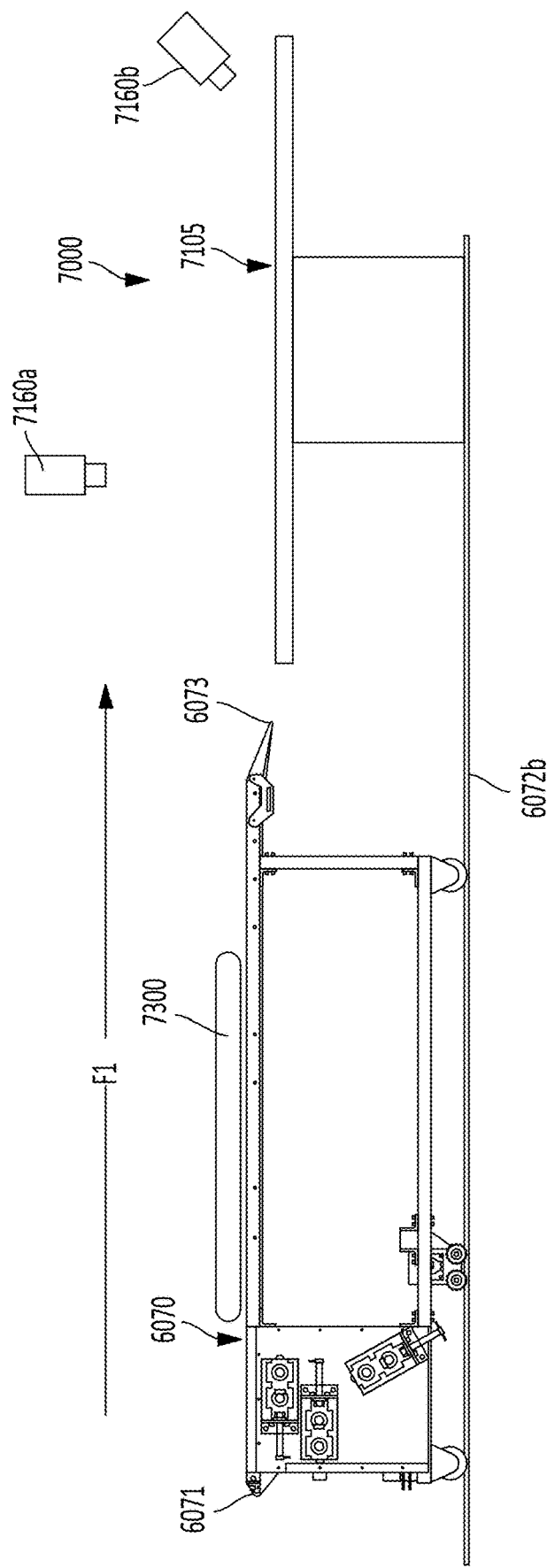
FIG. 56 depicts a side view of a transit conveyor approaching the folding device with a repositioned article.
Figure 57:
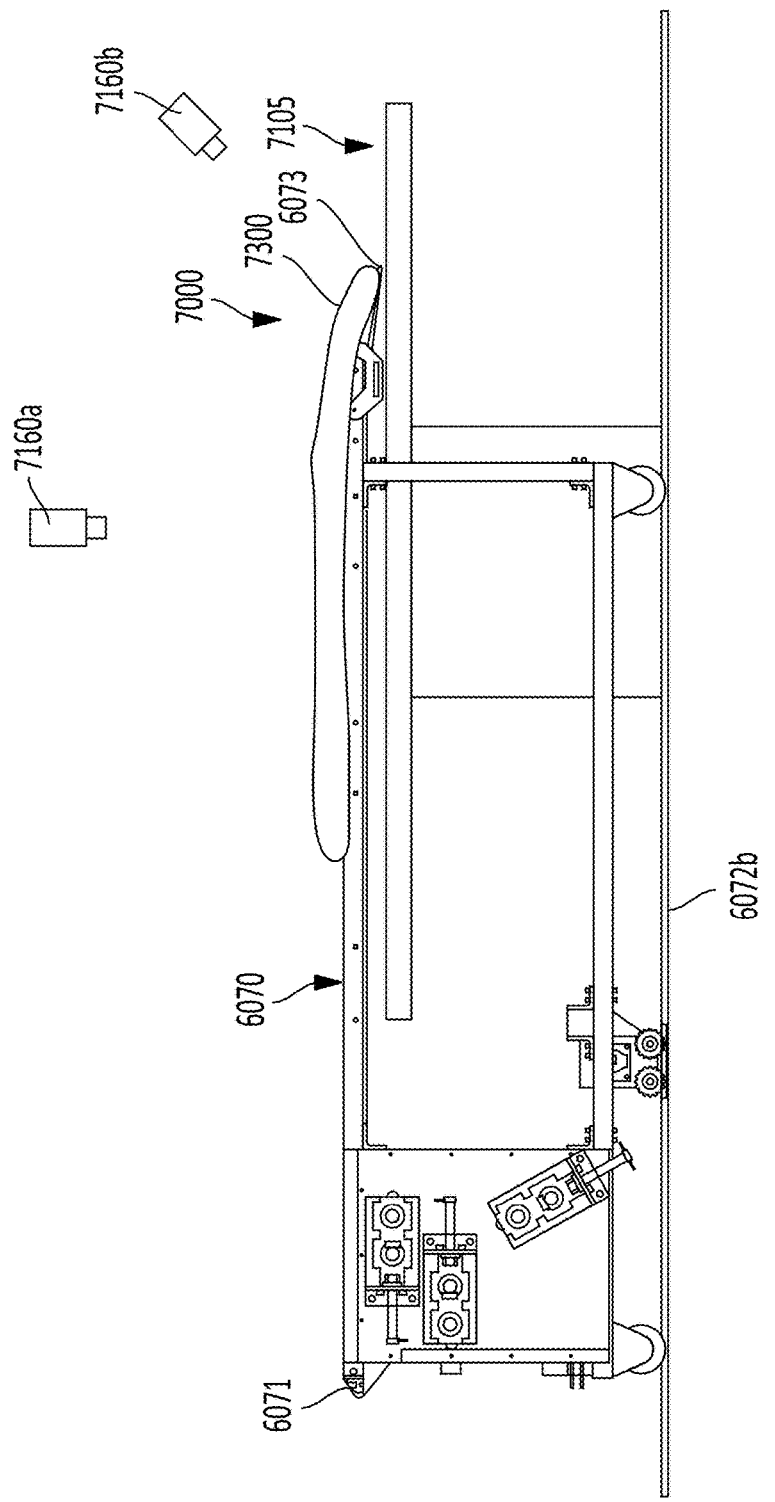
FIG. 57 depicts a side view of the transit conveyor of FIG. 56 delivering the repositioned article to the folding device.

As shown in FIGS. 55A-B, in implementations, the transfer conveyor 6070 is configured to move back and forth on one or more rails 6072*a-b*, 6072' between the repositioning robot 6000 and the folding robot 7000. The transfer conveyor 6070 is configured to deposit the repositioned deformable laundry article 7300 received by the transfer conveyor 6030 onto a receiving surface of the folding robot 7000. In implementations, the depositing end 6072 of the transfer conveyor 6070 comprises an angled downward slope for delivering the repositioned article 7300 onto the rotatable platform 7100. The depositing end 6072 slides over the surface 7105 of the platform 7100 and comprises a clearance in a range of between about 0.25 mm to 5 mm. In implementations, as shown in FIG. 55A, a pair of rails 6072*a-b* extend beyond a center axis (diameter) of the platform 7100 and on either side of the platform so the depositing end 6072 of the conveyor 6070 can extend past the middle of the platform 7100 and ensure that larger items are fully deposited on the platform and not hanging off an edge. Additionally or alternatively, in implementations, such as that of FIG. 55B, the conveyor 6070 is configured to slidably extend out over the platform 7100 upon reaching the end of a guide rail 6072' aligned with a center of the platform 7100 such that the conveyor 6070 is cantilevered on its motorized, transiting base.

In implementations, the drive motor of the transfer conveyor 6070 is in operable communication with one or both of the repositioning robot controller 6005 and the folding device 7000 controller 7005. Additionally or alternatively, upon delivering a repositioned article to the folding device 7000, the transfer conveyor 6070 can retract as it deposits the article onto the platform 7100 of the folding device 7000. In implementations, once the transfer conveyor 6070 is extended out over the platform 7100, the controller 7005 is configured to instruct the transfer conveyor 6070 to retract slightly faster than a belt of the conveyor rotates to place the article 7300 on the platform 7100. The transfer conveyor 6070 thus can persistently drag away from the article 7300 during placement and therefore provide a little stretching and or smoothing of the repositioned article. Additionally or alternatively, the controller 7005 is configured to instruct the one or more clamp rods 7200, 7200*a-b* to clamp the first few inches of the article 7300 as they are disposed on the platform 7100 such that the article 7300 is not dragged across the platform 7100 but is instead stretched and smoothed as the transfer conveyor 6070 retracts slightly faster than the article 7300 is deposited.

In other implementations, the controller 6005 can be configured to instruct one lifter 6105*a* and another lifter 6105*d* of two or more lifters of the repositioning robot 6000 having associated engaged grippers 6105*a,d* to sweep the repositioned one of the plurality of deformable laundry articles 7300 onto a surface outside the work volume. The surface can be, for example, the transfer conveyor 6070 or a surface of the folding robot 7000. In other implementations, the conveyor 6030 can be replaced by a tilting surface configured to receive thereon a repositioned deformable laundry article and tilt to release the article 7300 under the force of gravity onto another surface such as the transfer conveyor 6070 or a surface of the folding robot 7000. In other implementations, the conveyor 6030 can be positioned higher than a stationary transfer conveyor partially stacked therebeneath in a waterfall configuration.

Figure 59:
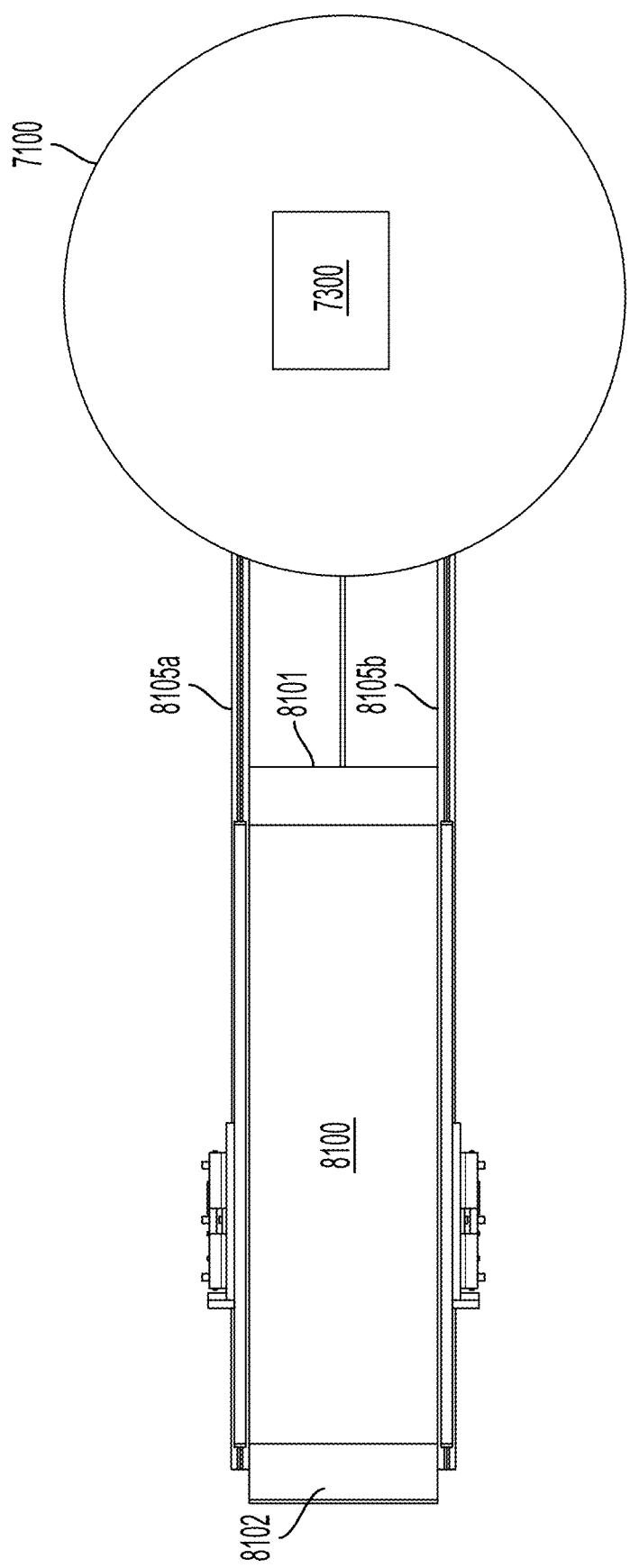
FIG. 59 depicts a top-down schematic example of a retrieving conveyor for extracting a folded article from a folding device.
Figure 60:
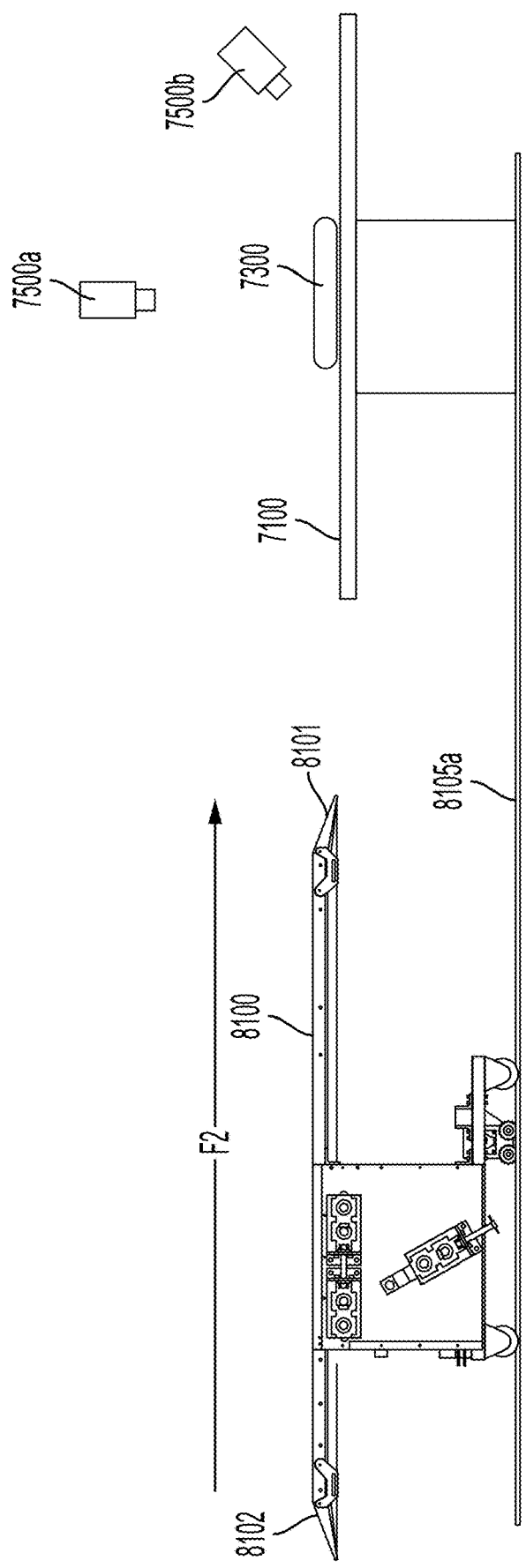
FIG. 60 depicts a side view of the retrieving conveyor approaching the folding device of FIG. 59.
Figure 61:
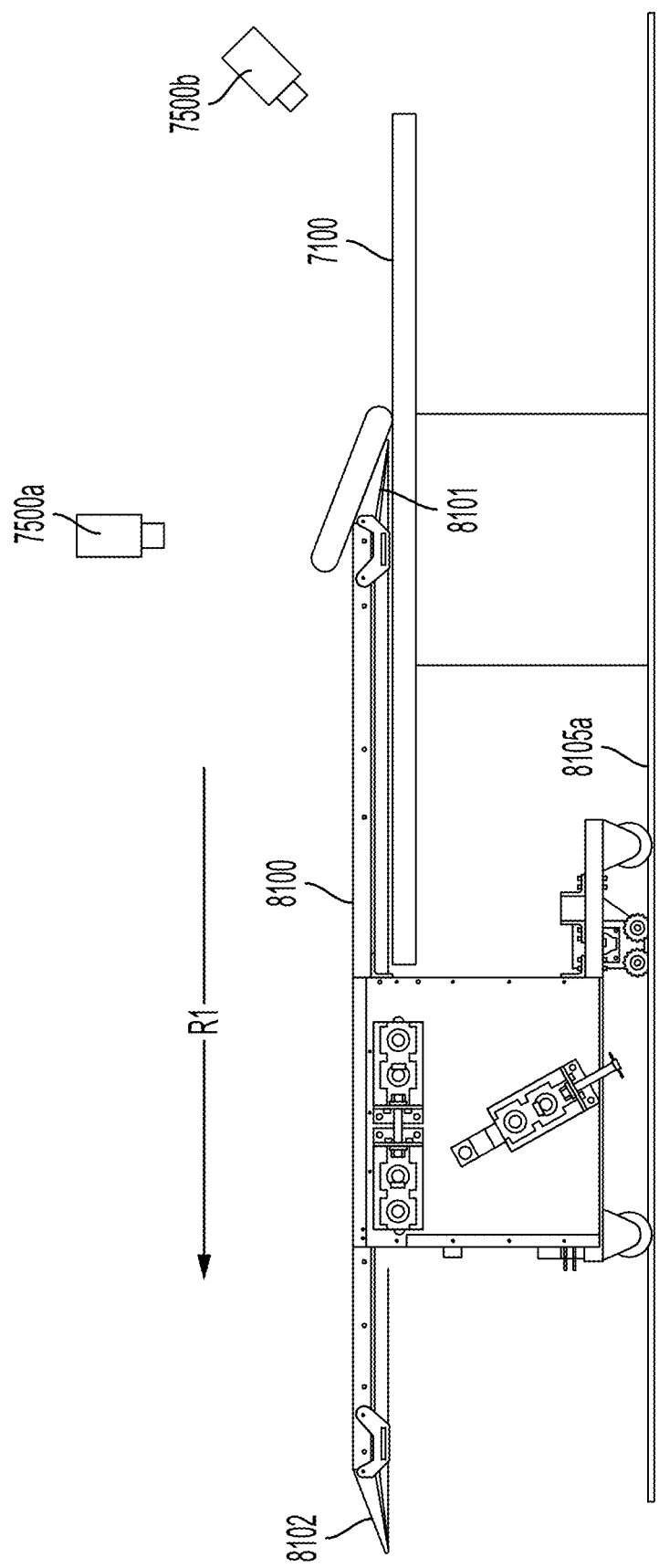
FIG. 61 depicts a side view of the retrieving conveyor of FIG. 60 extracting the repositioned article from the folding device.

Once the deformable article 7300 is folded on the platform 7100, a retrieving conveyor 8100 operates to extract the folded article 7300. Turning now to FIGS. 59-61, the retrieving conveyor 8100 operates similarly to the transfer conveyor 6070. The retrieving conveyor 8100 is in operable communication with a controller 6005, 7005 configured to actuate a drive motor to transit the retrieving conveyor 8100 along one or more fixed rails 8105*a-b* for aligning the retrieving conveyor 8100 with the folding platform 7100. In implementations, a belt of the retrieving conveyor 8100 runs at the same speed and in the opposite direction of movement of the retrieving conveyor 8100 as it extends over the platform 7100. This prevents any need to sense an edge of the folded article 7300. Additionally or alternatively, in implementations, the controller 7005 receives a signal from one or more sensors 7160, 7160*a-c* configured to detect a proximity of a leading edge 8101 of the retrieving conveyor 8100 to the folded article 7300. In implementations, a controller 7005 of the folding device 7000 can rotate the platform to orient the folded article to a position within bounds of the fixed landing path of the retrieving conveyor 8100 over the platform 7100.

Once the leading edge 8101 contacts the folded article 7300, the rotating conveyor draws the folded article 7300 up in the direction of arrow R1 in FIG. 50. As described previously with regard to implementations of the folding robot 7000 comprising a blade assembly 7600, the planar blade 7650 is configured to securely lift a folded article during a movement onto another surface or transport conveyor, such as the retrieving conveyor 8100. For example, in one implementation, the planar blade 7650 is configured to slide beneath an edge of a folded garment and rotate to lift the edge off of the surface 7105 of the platform 7100 so that the retrieving conveyor 8100 can approach the article and easily slide beneath the lifted edge for receiving the article up onto the conveyor without bumping it and potentially unfolding or toppling the article during extraction from the platform 7100.

In all of the preceding implementations of the folding device 7000, the controller 7005 of the folding device is configured to communicate at least one of predicted or achieved footprint area and folded article height with the at least one controller 8005 of the packing and queuing system 8000.

Additionally or alternatively, in implementations, as described previously with regard to the method 1100 of folding, the controller 7005 of the folding device can determine S1106 based on one or more received signals that a laundry article is too small for folding. For example, the article could be a baby sock, a pair of underwear, or a long, thin article like a scarf. In such instances, the controller 7005 can instruct the folding device 7000 to forgo folding the laundry article 7300 and instead pass the unfolded laundry article through the remainder of the process line unfolded. A packing robot conveyor or queue platform can receive the article and deposit the unfolded laundry article into one or more containers such that the unfolded articles are deposited in a container prior to loading the one or more folded laundry articles and/or stacks of folded laundry articles from a queue platform into the conveyor. Additionally or alternatively, the packing robot conveyor can deposit the unfolded laundry articles in one or more piles on the queue platform for conveyance in aggregate into a container.

In embodiments, any of the one or more robots in the process line preceding the queueing and packing robot 8000 can determine one or more articles of household laundry is too small for folding and provide the one or more too small for folding laundry articles to the packing station for loading into an empty container. For example, a repositioning robot 6000 can identify and collect in a container the one or more too small for folding laundry articles and the collection container can transit on rails to the packing station, skipping any processing by subsequent robots in the process line and eliminating the time of those subsequent robots having to handle the article.

In embodiments, one or more retrieval arms each including at least one of a power lifter, jib, or crane mounted above or aside at least one of the separation robot 5000, the repositing robot 6000, the folding device 7000, and the packing robot 8000 can retrieve an article determined by one or more sensors and controllers to be too small for folding, carry it to a container at the packing station of the packing robot 8000, and release the unfolded article into the container. Alternatively, the one or more retrieval arms can comprise a robotic arm on a mobile base for retrieving a too small article from one robot in the process line and transiting across the floor to the packing station for depositing the unfolded laundry article in a container.

All of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors or circuitry or collection of circuits, e.g., a module) that executes program instructions or modules stored in a memory or other non-transitory computer-readable storage medium. The various functions disclosed herein may be embodied in such program instructions, although some or all of the disclosed functions may alternatively be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips and/or magnetic disks, into a different state.

Although the subject matter contained herein has been described in detail for the purpose of illustration, it is to be understood that such detail is solely for that purpose and that the present disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

Other examples are within the scope and spirit of the description and claims. Additionally, certain functions described above can be implemented using software, hardware, firmware, hardwiring, or combinations of any of these. Features implementing functions can also be physically located at various positions, including being distributed such that portions of functions are implemented at different physical locations.

Example embodiments of the present inventive concepts may be embodied in various devices, apparatuses, and/or methods. For example, example embodiments of the present inventive concepts may be embodied in hardware and/or in software (including firmware, resident software, microcode, etc.). Furthermore, example embodiments of the present inventive concepts may take the form of a computer program product comprising a non-transitory computer-usable or computer-readable storage medium having computer-usable or computer-readable program code embodied in the medium for use by or in connection with an instruction execution system. In the context of this document, a computer-usable or computer-readable medium may be any medium that can contain, store, communicate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Example embodiments of the present inventive concepts are described herein with reference to flowchart and/or block diagram illustrations. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means and/or circuits for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the functions specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

All of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors or circuitry or collection of circuits, e.g. a module) that executes program instructions or modules stored in a memory or other non-transitory computer-readable storage medium. The various functions disclosed herein may be embodied in such program instructions, although some or all of the disclosed functions may alternatively be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips and/or magnetic disks, into a different state.

Although the subject matter contained herein has been described in detail for the purpose of illustration, it is to be understood that such detail is solely for that purpose and that the present disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

Other examples are within the scope and spirit of the description and claims. Additionally, certain functions described above can be implemented using software, hardware, firmware, hardwiring, or combinations of any of these. Features implementing functions can also be physically located at various positions, including being distributed such that portions of functions are implemented at different physical locations.

As used herein, a "neural network" refers to machine learning structures. Neural networks include one or more layers of "neurons" that each receive input information and produce an output as, for example, a weighted sum of the inputs with an optional internal bias value within the neuron, or some other predetermined function that produces an output numeric value based on a combination of the input values to the neuron. The weights that are assigned to different inputs in the structure of the neural network are produced during a training process for the neural network. A simple neural network includes an input layer of neurons connected to an output layer of neurons. The output layer of neurons is configured to produce outputs based on numeric functions applied to the inputs received at the output layer such as threshold functions with parameters that are produced during a training process. A neural network may include "deep" neural networks in which multiple layers of "hidden" neurons are arranged between the input layer and the output layer with varying structures for the hidden layers including fully connected layers where the output of a neuron in a first layer is connected to an input of each neuron in the next layer or partially connected layers where the outputs of neurons in a first layer are only connected to inputs of a portion of the neurons in the next layer.

A "pose" is the position and orientation of an object in a reference frame. In some embodiments, the pose is a position and orientation of a deformable laundry article. The pose can be specified by a position in two- (x,y) or three-dimensions (x,y,z) and a heading ($\theta$). The pose can also be further specified by an orientation including a deformable shape or volume of the laundry article, which may take into account folds, creases, curves or other shapes and positions of the laundry article. The reference frame may be a global reference frame that is fixed to the environment or may be a relative reference frame that is in relationship to another object in the environment.

"Deformable" means that a shape of an article can be bent or folded. Deformable laundry articles are typically fabric clothing or washable household items as described herein. Deformable laundry articles do not typically hold a particular or stiff shape when lifted or manipulated.

"Intelligently sorted" refers to grouping or ordering articles, for example, by size, weight, shape, function, color, fabric type, washing and/or drying requirements or other characteristics.

What is claimed is:
1. A device for autonomously folding a deformable article, comprising:
a rotatable platform having a surface configured to receive the deformable article at any location on the surface;
a table drive configured to engage the rotatable platform and rotate the platform about a central axis; and a rotatable blade suspended above the surface in operable communication with at least one X-axis drive configured to slidably move the rotatable blade parallel to the surface, at least one Z-axis drive configured to raise and lower the at least one rotatable blade from the surface of the rotatable platform, and at least one rotational drive being configured to rotate the rotatable blade about a longitudinal axis, the at least one X-axis drive, the at least one Z-axis drive, and the at least one rotational drive being configured to raise and lower the rotatable blade from the surface of the rotatable platform, slidably move the rotatable blade parallel to the surface, and manipulate an unclamped portion of the deformable article to thereby fold the deformable article; and at least one clamp rod disposed parallel to the longitudinal axis of the rotatable blade and being configured to raise and lower from a surface of the rotatable platform and slidably move parallel to the surface, the at least one clamp rod being in operable communication with at least one clamp drive and being configured to clamp the deformable article to the surface in a lowered position.

2. The device of claim 1, wherein the at least one X-axis drive and the at least one rotational drive of the at least one rotatable blade are configured to manipulate the at least one rotatable blade to slide the blade under an unclamped portion of the deformable article, rotate the blade to lift a side of the blade adjacent the at least one clamp rod, slidably move the rotated blade away from the at least one clamp rod, and move the blade away from the at least one clamp rod and out from under the unclamped portion of the deformable article to thereby reduce folds or wrinkles in the deformable article.

3. The device of claim 1, wherein the at least one X-axis drive, the at least one Z-axis drive, and the at least one rotational drive of the rotatable blade are configured to manipulate the rotatable blade to slide under an unclamped portion of the deformable article, wherein the clamp rod defines a clamped portion of the deformable article by clamping the deformable article to the surface of the rotatable platform, lift the unclamped portion above the at least one clamp rod, pass the unclamped portion over the at least one clamp rod, rotate the blade, and dispose the unclamped portion to a resting position atop another portion of the deformable article.

4. The device of claim 1, further comprising a pair of parallel support rails, each support rail having a carrier slidably disposed on respective ones of the pair of parallel support rails, the pair of parallel support rails being disposed on opposing sides of the platform, wherein the blade is configured to engage the respective carriers at opposite ends of the blade.

5. The device of claim 4, wherein the carriers comprise the at least one Z-axis drive configured to raise and lower the blade and the at least one X-axis drive configured to move the blade linearly along the pair of parallel support rails.

6. The device of claim 5, wherein the at least one Z-axis drive comprises a linear drive.

7. The device of claim 1, wherein the blade has a thickness of less than 10 mm and rounded leading and trailing edges.

8. The device of claim 1, further comprising at least one sensor configured to detect a position and orientation of the deformable article on the rotatable platform and a controller in operable communication with the at least one clamp drive, the table drive, the at least one X-axis drive, the at least one Z-axis drive, and the at least one rotational drive.

9. The device of claim 8 wherein the at least one sensor comprises at least one of a 3-D camera, an IR sensor, a 2-D camera, LIDAR, LADAR, a sonar proximity sensor, an ultrasonic ranging sensor, a radar sensor, and a pair of stereo depth cameras.

10. The device of claim 8, further comprising at least one movable sweep rod disposed parallel to the at least one clamp rod and being in operable communication with at least one sweep drive in operable communication with the controller, the at least one movable sweep rod configured to raise and lower from the surface of the rotatable platform, slidably move parallel to the surface, and manipulate the unclamped portion of the deformable article to thereby fold the deformable article.

11. The device of claim 10, wherein the controller is configured to instruct one or the other of the rotatable blade and the at least one clamp rod to fold the deformable article based on at least on of fabric type, weight, article size, and shape of the deformable article.

12. The device of claim 1, wherein the rotatable blade configured to rotate in a range of between 0 to 354 degrees about a central longitudinal axis.

13. The device of claim 1, wherein the rotatable blade comprises at least one tapered edge.

14. The device of claim 1, wherein the rotatable blade is configured to be held in tension above the platform by a blade support comprising two downwardly extending legs.

15. A method of robotically folding a deformable article, comprising:

iterating a folding sequence one or more times, the sequence comprising receiving, at a controller, one or more output signals from one or more sensors in communication with the controller, the one or more sensors being configured to at least one of detect one of one or more features and capture one or more images of a deformable article disposed on a platform, determining, based on the at least one of one or more features and one or more images, at least one of an article type and an article size, determining a fold line of the deformable article, instructing a drive motor to rotate the platform to align the fold line of the deformable article with a clamp suspended above and elongated parallel to a surface of the platform, instructing the clamp to lower onto the fold line, the lowered clamp configured to apply force and immobilize the fold line of the deformable article against the surface, instructing a Z-axis drive motor of a blade suspended above the platform to lower the blade to the platform, instructing an X-axis drive motor of the blade to slide the blade under an unclamped portion of the deformable article, instructing the Z-axis and X-axis drive motors of the blade to raise the blade and the unclamped portion of the deformable article thereon in an arc toward and above the clamp, and fold over unclamped portion of the deformable article over the clamp.

16. The method of claim 15, wherein the controller is configured to stop executing the iterating folding sequence when the deformable article is folded to at or within final folded dimensions stored on a memory in communication with the controller, folded dimensions of the deformable article being output to the controller by the one or more sensors.

17. The method of claim 15, wherein the controller is configured to instruct a rotational drive of the blade to rotate the blade while lifting the unclamped portion in an arc above the clamp, the rotational drive being configured to rotate the blade about a central longitudinal axis.

18. The method of claim 15, wherein the controller is configured to instruct at least one of the Z-axis and X-axis drives to move the blade beneath an edge of the folded deformable article and instruct at least one of the Z-axis drive and a rotational drive of the blade to lift a folded edge for delivery onto a retrieval conveyor, the rotational drive being configured to rotate the blade about a central longitudinal axis.

19. The method of claim 15, wherein the controller is configured to instruct at least one of the Z-axis and X-axis drives to move the blade beneath an edge of the folded deformable article and lift the folded deformable article off of the platform to move the folded deformable article to another location.

20. The method of claim 15 wherein the drive motor is configured to operate bi-directionally and wherein instructing the drive motor to rotate the platform comprises rotating the platform at least one of in a forward direction and in a reverse direction.

* * * * *